US010919997B2

(12) United States Patent
Endo et al.

(10) Patent No.: US 10,919,997 B2
(45) Date of Patent: Feb. 16, 2021

(54) ETHYLENE α-OLEFIN NON-CONJUGATED POLYENE COPOLYMER, USE THEREOF, AND MANUFACTURING METHOD THEREOF

(71) Applicant: MITSUI CHEMICALS, INC., Tokyo (JP)

(72) Inventors: Koji Endo, Chiba (JP); Mayumi Hiwara, Chiba (JP); Sadahiko Matsuura, Iwakuni (JP); Yusuke Mizobuchi, Ichihara (JP); Yuichi Yamamura, Ichihara (JP); Yuji Noguchi, Funabashi (JP); Yuji Ishii, Kisarazu (JP); Tatsuya Sakai, Ichihara (JP); Keisuke Shishido, Ichihara (JP); Kotaro Ichino, Ichihara (JP); Kiyohide Inomata, Ichihara (JP); Fumito Takeuchi, Chiba (JP); Kenta Ide, Singapore (SG)

(73) Assignee: MITSUI CHEMICALS, INC., Tokyo (JP)

( * ) Notice: Subject to any disclaimer, the term of this patent is extended or adjusted under 35 U.S.C. 154(b) by 176 days.

(21) Appl. No.: 15/116,691

(22) PCT Filed: Feb. 10, 2015

(86) PCT No.: PCT/JP2015/053706
§ 371 (c)(1),
(2) Date: Aug. 4, 2016

(87) PCT Pub. No.: WO2015/122415
PCT Pub. Date: Aug. 20, 2015

(65) Prior Publication Data
US 2016/0347894 A1 Dec. 1, 2016

(30) Foreign Application Priority Data

Feb. 13, 2014 (JP) .............................. JP2014-025159
Sep. 5, 2014 (JP) .............................. JP2014-181206
Dec. 3, 2014 (JP) .............................. JP2014-245083
Dec. 3, 2014 (JP) .............................. JP2014-245084
Dec. 3, 2014 (JP) .............................. JP2014-245085

(51) Int. Cl.
*C08F 210/18* (2006.01)
*C08L 23/20* (2006.01)
*C09K 3/10* (2006.01)
*C08F 4/659* (2006.01)

(52) U.S. Cl.
CPC ............ *C08F 210/18* (2013.01); *C08L 23/20* (2013.01); *C09K 3/1006* (2013.01); *C08F 4/65908* (2013.01); *C08F 4/65912* (2013.01)

(58) Field of Classification Search
CPC .. C08F 210/18; C08F 210/20; C08F 4/65908; C08F 4/65912; C08L 23/16; C08L 23/08; C08L 23/20; C09K 3/10

USPC .................................................. 525/191, 232
See application file for complete search history.

(56) References Cited

U.S. PATENT DOCUMENTS

| 4,960,878 | A | 10/1990 | Crapo et al. |
| 4,990,640 | A | 2/1991 | Tsutsui et al. |
| 5,041,584 | A | 8/1991 | Crapo et al. |
| 5,155,080 | A | 10/1992 | Elder et al. |
| 5,278,119 | A | 1/1994 | Turner et al. |
| 5,321,106 | A | 6/1994 | Lapointe |
| 5,387,568 | A | 2/1995 | Ewen et al. |
| 5,407,884 | A | 4/1995 | Turner et al. |
| 5,483,014 | A | 1/1996 | Turner et al. |
| 5,561,092 | A | 10/1996 | Ewen et al. |
| 5,614,457 | A | 3/1997 | Ewen et al. |
| 5,663,249 | A | 9/1997 | Ewen et al. |
| 5,696,214 | A | 12/1997 | Sagane et al. |
| 5,744,566 | A | 4/1998 | Tsutsui et al. |
| 5,807,948 | A | 9/1998 | Sagane et al. |
| 5,922,811 | A | 7/1999 | Suzuki et al. |
| 5,922,823 | A | 7/1999 | Sagane et al. |
| 6,410,650 | B1 | 6/2002 | Koda et al. |

(Continued)

FOREIGN PATENT DOCUMENTS

| CN | 1498905 A | 5/2004 |
| CN | 1791619 A | 6/2006 |

(Continued)

OTHER PUBLICATIONS

Taiwanese Office Action dated May 15, 2018 in corresponding application No. 104105001.
Hansch et al., "A Survey of Hammett Substituent Constants and Resonance and Field Parameters," Chem. Rev. 91:165-195 (1991).
Hsieh et al., "Ethylene-1-Butene Copolymers. 1. Comonomer Sequence Distribution," Macromolecules 15(2):353-360 (Mar.-Apr. 1982).
Laine et al., "Elemental Reactions in Copolymerization of α-Olefins by Bis(cyclopentadienyl) Zirconocene and Hafnocene: Effects of the Metal as a Function of the Monomer and the Chain End," Organometallics 30:1350-1358 (2011).

(Continued)

*Primary Examiner* — Lee E Sanderson
(74) *Attorney, Agent, or Firm* — Foley & Lardner LLP

(57) ABSTRACT

The purpose of the present invention is to obtain an ethylene.α-olefin.non-conjugated polyene copolymer that has a low permanent compression set at low temperatures, is flexible, and has an excellent balance of rubber elasticity at low temperatures and tensile strength at normal temperatures. This ethylene-based polymer is an ethylene.α-olefin.non-conjugated polyene copolymer that includes units derived from ethylene (A), units derived from an α-olefin (B) containing 4-20 carbon atoms, and units derived from a non-conjugated polyene (C) and satisfies (1)-(4). (1) The molar ratio of (A) to (B) is 40/60-90/10, (2) the contained amount of the units derived from (C) is 0.1-6.0 mol %, (3) $ML_{(1+4)}125°$ C. is 5-100, and (4) the B value is 1.20 or more.

10 Claims, 1 Drawing Sheet

(56) References Cited

U.S. PATENT DOCUMENTS

| | | | |
|---|---|---|---|
| 6,787,623 | B1 | 9/2004 | Murakami et al. |
| 6,939,928 | B1 | 9/2005 | Kawai et al. |
| 7,241,848 | B2 | 7/2007 | Tohi et al. |
| 7,452,946 | B2 | 11/2008 | Matsuura et al. |
| 2005/0131171 | A1 | 6/2005 | Tohi et al. |
| 2005/0228155 | A1 | 10/2005 | Kawai et al. |
| 2006/0161013 | A1 | 7/2006 | Tohi et al. |
| 2006/0199925 | A1 | 9/2006 | Matsuura et al. |
| 2008/0171651 | A1 | 7/2008 | Tohi et al. |
| 2008/0220193 | A1 | 9/2008 | Tohi et al. |
| 2009/0043057 | A1 | 2/2009 | Funaya et al. |
| 2010/0010155 | A1 | 1/2010 | Fuse et al. |
| 2010/0190941 | A1 | 7/2010 | Funaya et al. |
| 2013/0233376 | A1 | 9/2013 | Ikenaga et al. |

FOREIGN PATENT DOCUMENTS

| | | | | |
|---|---|---|---|---|
| CN | 1807469 | A | | 7/2006 |
| CN | 101180305 | A | | 5/2008 |
| CN | 101568590 | A | | 10/2009 |
| EP | 0 981 556 | A1 | | 3/2000 |
| JP | H01-501950 | A | | 7/1989 |
| JP | H01-502036 | A | | 7/1989 |
| JP | H02-024701 | A | | 1/1990 |
| JP | H02-078687 | A | | 3/1990 |
| JP | H02-167305 | A | | 6/1990 |
| JP | H03-103407 | A | | 4/1991 |
| JP | H03-179005 | A | | 8/1991 |
| JP | H03-179006 | A | | 8/1991 |
| JP | H03-207703 | A | | 9/1991 |
| JP | H03-207704 | A | | 9/1991 |
| JP | H09-067485 | A | | 3/1997 |
| JP | H09-071617 | A | | 3/1997 |
| JP | H09-235327 | A | | 9/1997 |
| JP | 2000-212194 | A | | 8/2000 |
| JP | 2001-002866 | A | | 1/2001 |
| JP | 2001-114837 | A | | 4/2001 |
| JP | 2001-192488 | A | | 7/2001 |
| JP | 2001-522398 | A | | 11/2001 |
| JP | 2004-051676 | A | | 2/2004 |
| JP | 2004-168744 | A | | 6/2004 |
| JP | 2004-175759 | A | | 6/2004 |
| JP | 2005-075964 | A | | 3/2005 |
| JP | 2011-001489 | A | | 1/2011 |
| JP | 2011-001497 | A | | 1/2011 |
| JP | 2011001497 | A | * | 1/2011 |
| JP | 2012-207086 | A | | 10/2012 |
| JP | 2012214576 | A | * | 11/2012 |
| JP | 5204727 | B2 | | 6/2013 |
| JP | 2014-114379 | A | | 6/2014 |
| TW | 383313 | B | | 3/2000 |
| WO | WO-88/05793 | A1 | | 8/1988 |
| WO | WO-98/49212 | A1 | | 11/1998 |
| WO | WO-00/59962 | A1 | | 10/2000 |
| WO | WO-01/27124 | A1 | | 4/2001 |
| WO | WO-2006/123759 | A1 | | 11/2006 |
| WO | WO-2009/081792 | A1 | | 7/2009 |
| WO | WO-2009/081794 | A1 | | 7/2009 |
| WO | WO-2009081792 | A1 * | 7/2009 | ............ C08F 210/18 |

OTHER PUBLICATIONS

Patsidis et al., "The synthesis, characterization and polymerization behavior of ansa cyclopentadienyl fluorenyl complexes; the X-ray structures of the complexes [$(C_{13}H_8)SiR_2(C_5H_4)$]$ZRCl_2$ (R=Me or PH)," J. Organomet. Chem. 509:63-71 (1996).

Prakash et al., "N-Carboethoxypiperdine, a Convenient Reagent for the Preparation of Symmetrical Ketones from Organolithiums," Heterocycles 40(1):79-83 (Jan. 1995).

Ray et al., "Carbon-13 Nuclear Magnetic Resonance Determination of Monomer Composition and Sequence Distributions in Ethylene-Propylene Copolymers Prepared with a Stereoregular Catalyst System," Macromolecules 10(4):773-778 (Jul.-Aug. 1977).

International Search Report issued in International Patent Application No. PCT/JP2015/053706 dated May 12, 2015.

Extended European Search Report dated Jul. 25, 2017 in European Patent Application No. 15748989.9.

Office Action dated Jun. 13, 2017 in Chinese Patent Application No. 201580006914.1.

Office Action dated Dec. 10, 2019 for corresponding Japanese Patent Application No. 2015-562833.

* cited by examiner

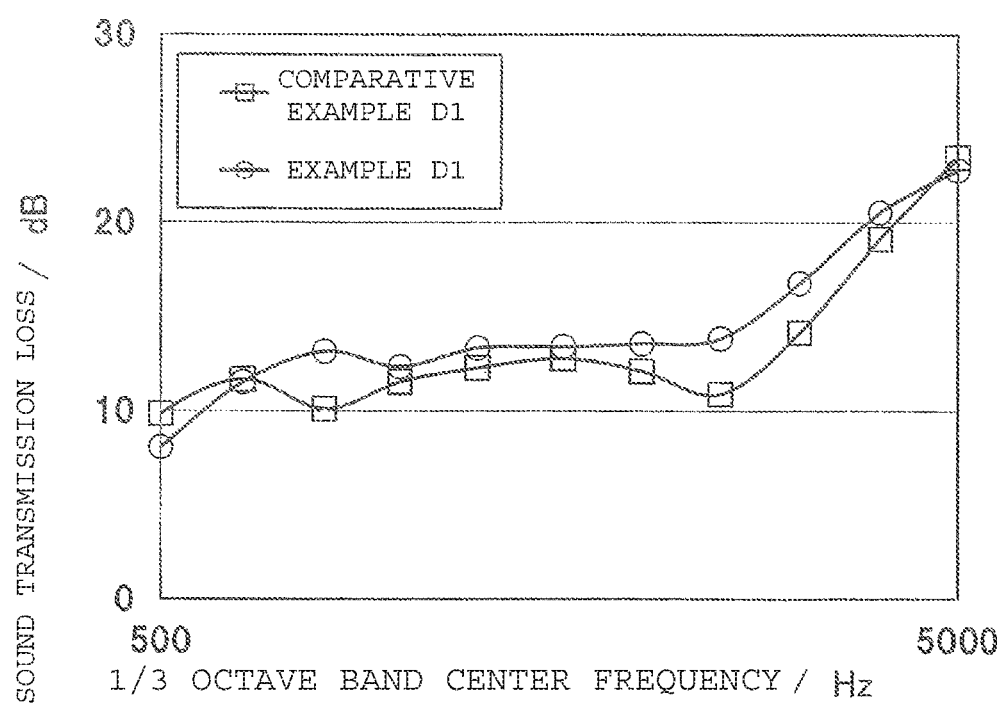

ETHYLENE α-OLEFIN NON-CONJUGATED POLYENE COPOLYMER, USE THEREOF, AND MANUFACTURING METHOD THEREOF

CROSS-REFERENCE TO RELATED APPLICATIONS

The present application is a U.S. national stage application claiming the benefit of International Patent Application No. PCT/JP2015/053706, filed Feb. 10, 2015, which claims the benefit of priority to Japanese Patent Application No. 2014-025159, filed Feb. 13, 2014; Japanese Patent Application No. 2014-181206, filed Sep. 5, 2014; Japanese Patent Application No. 2014-245083, filed Dec. 3, 2014; Japanese Patent Application No. 2014-245084, filed Dec. 3, 2014; and Japanese Patent Application No. 2014-245085, filed Dec. 3, 2014, the entireties of which are hereby incorporated by reference.

TECHNICAL FIELD

The present invention relates to ethylene.α-olefin.non-conjugated polyene copolymers, uses thereof, and manufacturing methods thereof.

BACKGROUND ART

Ethylene.α-olefin rubber, such as ethylene.propylene copolymer rubber (EPR) and ethylene.propylene.diene copolymer rubber (EPDM), has no unsaturated bond in the main chain of the molecular structure thereof and hence exhibits excellent heat aging resistance, weather resistance, and ozone resistance as compared with general-purpose conjugated diene rubber, and has been applied widely to uses, e.g., automobile components, wire materials, electric/electronic components, construction and civil engineering materials, and industrial materials and components.

Conventionally, ethylene/α-olefin/non-conjugated polyene copolymer rubber such as EPDM has been manufactured using a catalyst system generally composed of a combination of a titanium-based catalyst or a vanadium-based catalyst and an organoaluminum compound (so-called Ziegler-Natta catalyst system). The biggest disadvantage of this catalyst system is lower productivity in that it has a low polymerization activity and a short catalyst life, which compel polymerization to be done at low temperatures in the order of 0 to 50° C. This poses a problem of a high viscosity of a polymerization solution, which prevents the olefin copolymer in a polymerizer from having a sufficiently increased concentration, resulting in having a drawback in that the productivity is remarkably low. In addition, because of the low polymerization activity, the copolymer will contain a lot of catalyst residues at the completion of polymerization, and will often not meet product performance requirements. Eliminating the residues, then, requires a deashing process, which is remarkably disadvantageous in production cost.

On one hand, ethylene/α-olefin/non-conjugated polyene copolymerization based on a polymerization catalyst including a bridged metallocene compound having a biscyclopentadienyl group or a bisindenyl group as a ligand is disclosed (Japanese Patent Application Laid-Open (JP-A) No. 2005-344101, JP-A No. H09-151205, Japanese National-Phase Publication (JP-A) No. 2000-507635). This method provides the obtainable ethylene/α-olefin/non-conjugated polyene copolymer with a higher molecular weight compared to the aforementioned Ziegler-Natta catalyst system, but the molecular weight is not sufficiently high yet for carrying out high-temperature polymerization. Generally, in high-temperature solution polymerization, the viscosity of a polymerization solution is lowered, which enables the olefin copolymer in a polymerizer to maintain its concentration high, enhancing productivity per polymerizer. On the other hand, however, it is well known to those of skill in the art that the molecular weight of an olefin copolymer produced at an increased polymerization temperature will decrease. Accordingly, in order to manufacture an olefin copolymer with a desired high molecular weight even in highly productive high-temperature polymerization, a catalyst for producing a high molecular weight olefin copolymer is needed.

In products made of ethylene/α-olefin/non-conjugated polyene copolymer rubber such as EPDM, the content of a residual polymerization solvent or an unreacted olefin monomer is usually controlled depending on the required performance for use. In manufacturing facilities, elimination of these impurities is generally carried out by operations such as heating and pressure reduction in a post-polymerization process. For example, in the manufacture of EPDM, a large amount of load is required for elimination of unreacted non-conjugated polyene having a high boiling point, and hence a smaller amount of residual unreacted non-conjugated polyene, as compared to EPDM, in a polymerization solution discharged from a polymerization reactor will lead to a more enhanced productivity. In other words, in cases where a certain amount of EPDM is continuously manufactured during a certain period of time, the smaller the amount of unreacted non-conjugated polyene is, the lower the load of operations of heating and pressure reduction is, allowing production cost to be reduced. Conversely, in cases where the load of operations of heating and pressure reduction is maintained constant, an effect is given by which the smaller the amount of unreacted non-conjugated polyene is, the larger the amount of production per a certain period of time for manufacturing facilities is.

Examples of a method for reducing the amount of unreacted non-conjugated polyene in a polymerization solution in order to obtain such advantages include a method using a polymerization catalyst having a high copolymerization performance for non-conjugated polyene. Using such a polymerization catalyst enables the amount added of non-conjugated polyene to be reduced in manufacturing EPDM having a desired non-conjugated polyene content, and an effect of reducing the amount of resulting residual unreacted non-conjugated polyene can be achieved.

As described above, a polymerization catalyst, which produces an ethylene/α-olefin/non-conjugated polyene copolymer with a high molecular weight to achieve a high productivity via high-temperature polymerization, and which has a high non-conjugated polyene copolymerization performance to enhance productivity via reduction of load in a post-polymerization process, is needed. In industry, above all, a polymerization catalyst by which these performances and a high polymerization activity that does not require a deashing process are achieved at a high level in a well-balanced manner at the same time is desired.

In Patent Literature 1 (WO2009/081792) and Patent Literature 2 (WO2009/081794), the present applicant proposes a method for manufacturing an ethylene/α-olefin/non-conjugated polyene copolymer using a catalyst including a specific bridged cyclopentadienyl-fluorenyl metallocene compound. The manufacturing method according to Patent Literature 1 allows an ethylene/α-olefin/non-conjugated polyene copolymer having a high molecular weight to be manufactured based on a favorable polymerization activity and a favorable non-conjugated polyene copolymerization ability, and the manufacturing method according to Patent Literature 2 allows an ethylene/α-olefin/non-conjugated polyene copolymer having a high molecular weight to be manufactured based on a favorable polymerization activity and a favorable non-conjugated polyene copolymerization ability and further allows a polymerization temperature to be set higher.

In recent years, for the needs exploiting the excellent heat resistance, weather resistance and flexibility of ethylene.α-olefin rubber, raw material development and product development for transparent bridged sheets have been carried out vigorously.

As a use of EPDM, for example, using EPDM to obtain a rubber molded article for sealing is known (see, for example, Patent Literature 3). Seal packings which are rubber molded articles for sealing are used for various uses such as automobiles, industrial machinery and electronic components, and since automobiles, industrial machinery and the like are used in a cold area, the seal packings require mechanical strength at room temperature as well as low-temperature properties.

As a use of EPDM, for example, it is known to use ethylene.propylene.diene copolymer rubber (EPDM) as a rubber component of a composition for forming a hose (Patent Literature 4). In a use in which a hose is used, for example, automobiles, use in a cold area is assumed, and thereby mechanical properties (such as tensile strength) for room temperature as well as rubber characteristics (such as rubber elasticity) for low temperature are required.

As a method for improving low-temperature flexibility and heat aging resistance of ethylene.propylene.diene copolymer rubber (EPDM), an ethylene.α-olefin.non-conjugated polyene copolymer is proposed which uses a $C_4$-$C_{10}$ α-olefin as an α-olefin and which has an excellent randomness of an ethylene and an α-olefin (Patent Literature 5: JP-A No. H09-71617). It is described in Example 4 of Patent Literature 5 that an ethylene 1-butene ENB copolymer was obtained, having a B value of 1.12 at maximum, wherein the B value is an index indicating whether randomness is acceptable or not, and is represented by the equation below.

$$B \text{ value}=[EX]/(2[E]\times[X]) \quad (i)$$

wherein [E] and [X] represent a mole fraction of an ethylene and a $C_4$-$C_{20}$ α-olefin respectively in an ethylene.α-olefin.non-conjugated polyene copolymer; and [EX] represents an ethylene.$C_4$-$C_{20}$ α-olefin diad chain fraction.

In another case, it is disclosed in the examples of Patent Literature 2 (WO2009/081794) that an ethylene.propylene.ENB copolymer having a B value of 1.11 to 1.24 was obtained using a specific transition metal compound (bridged metallocene compound), wherein the B value is indicative of randomness (but is somewhat different in definition from the B value described in Patent Literature 5). In Patent Literature 2, however, the mechanical properties of an ethylene.propylene.ENB copolymer are not described.

$$[B \text{ value}=(c+d)/[2\times a\times(e+f)] \quad [IV]$$

wherein a, e and f are an ethylene mole fraction, an α-olefin mole fraction and a non-conjugated polyene mole fraction respectively of the ethylene/α-olefin/non-conjugated polyene copolymer; c is an ethylene-α-olefin diad mole fraction; and d is an ethylene-non-conjugated polyene diad mole fraction.

A bridged foam made from EPDM is used as a sound insulation material for automobiles, electrical products, and the like. For example, it is known that EPDM or a mixture of EPDM and EPR is used as a rubber component of a composition for forming a sound insulation material (Patent Literature 6 to 8).

In this regard, in cross-linking and foaming a composition including EPDM and manufacturing a cross-linked foam for use for sound insulation materials, an EPDM having a favorable foamability is preferably used. However, conventionally used EPDM having an excellent foamability has problems in that its roll processability is not favorable and that a molded article formed from the EPDM does not have sufficient sound insulation performance.

For this reason, butyl rubber is conventionally blended with EPDM to improve roll processability. However, EPDM and butyl rubber are different from each other in behavior in cross-linking. Because of this, a composition including EPDM and butyl rubber is difficult to control for cross-linking and foaming, and poses a problem, for example, in that the specific gravity of the obtainable molded article is large.

CITATION LIST

Patent Literature

Patent Literature 1: WO2009/081792
Patent Literature 2: WO2009/081794
Patent Literature 3: WO2000/59962
Patent Literature 4: JP-A No. H09-67485
Patent Literature 5: JP-A No. H09-71617
Patent Literature 6: JP-A No. 2001-2866
Patent Literature 7: JP-A No. 2001-192488
Patent Literature 8: JP-A No. 2005-75964

SUMMARY OF INVENTION

Technical Problem

However, a conventional method for manufacturing an ethylene/α-olefin/non-conjugated polyene copolymer, such as the manufacturing methods disclosed in Patent Literature 1 and 2, has room for further improvement with regard to achieving three possibilities at a high level at the same time: increasing the molecular weight of an ethylene/α-olefin/non-conjugated polyene copolymer produced during high-temperature polymerization, enhancing the non-conjugated polyene copolymerization performance, and producing an ethylene/α-olefin/non-conjugated polyene copolymer via a high polymerization activity.

In view of such problems of conventional techniques, a problem to be solved by the present invention 1 consists in solving the following problems (1) to (3) at a high level in a well-balanced manner.

First, the problem (1) is to provide a method for manufacturing an ethylene/α-olefin/non-conjugated polyene copolymer having a high molecular weight. As aforementioned, high-temperature solution polymerization has some advantages such as enhanced productivity and reduced production cost, but will result in the produced olefin polymer having a lowered molecular weight at the same time, and thus, according to a manufacturing method using a conventional catalyst, it is difficult to have a sufficiently high polymerization temperature. To enjoy the advantage of high-temperature solution polymerization by solving this problem, achievement of a method capable of manufacturing an ethylene/α-olefin/non-conjugated polyene copolymer having a high molecular weight even in high-temperature polymerization is desired.

Next, the problem (2) is to provide a method for manufacturing an ethylene/α-olefin/non-conjugated polyene copolymer based on a high non-conjugated polyene copolymerization performance. Such a manufacturing method, in manufacturing an olefin copolymer with a desired content of a non-conjugated polyene, enables the amount added of non-conjugated polyene to be reduced, thereby reducing a residual amount of unreacted non-conjugated polyene in a polymerization solution and hence providing the advantage of reducing load in eliminating the residual amount in a post-polymerization process.

Next, the problem (3) is to provide a method for manufacturing an ethylene/α-olefin/non-conjugated polyene copolymer based on a high polymerization activity. The high polymerization activity not only reduces catalyst cost but also provides the advantage of making a deashing process unnecessary because the catalyst residue in the ethylene/α-olefin/non-conjugated polyene copolymer is reduced.

In other words, a problem to be solved by the present invention 1 is to provide a method for manufacturing an ethylene/α-olefin/non-conjugated polyene copolymer that can solve the above problems (1), (2) and (3) at a high level in a well-balanced manner at the same time; i.e., the method for manufacturing an ethylene/α-olefin/non-conjugated polyene copolymer that can achieve three possibilities at a high level in a well-balanced manner at the same time: increasing the molecular weight of a copolymer produced during high-temperature polymerization, enhancing non-conjugated polyene copolymerization performance and producing a copolymer via a high polymerization activity. Such a method can provide and make commercially available, at a significant production efficiency and production cost in industry, an ethylene/α-olefin/non-conjugated polyene copolymer having an excellent performance as a processing material.

A problem of the present invention 2 is to provide an ethylene.α-olefin.non-conjugated polyene copolymer that, compared with previously proposed ethylene.α-olefin.non-conjugated polyene copolymers, further has a lower compression set at low temperature and flexibility and that has an excellent balance between low-temperature rubber elasticity and room temperature tensile strength.

There are some problems with conventional seal packings: ones made of EPDM have insufficient low-temperature properties; and ones made of silicone rubber have excellent low-temperature properties but have the sealing properties impaired by insufficient room-temperature strength and susceptibility to cuts and cracks.

A problem of the present invention 2-1 is to provide: a composition for seal packings that is capable of forming a seal packing having low-temperature properties and a mechanical strength (strength and strain) compatible therewith; and a seal packing formed from the composition.

A problem of the present invention 2-2 is to achieve compatibility between the processability of an uncross-linked composition including an ethylene.α-olefin.non-conjugated polyene copolymer and the sound insulation performance and properties, such as specific gravity, of a molded article obtained by cross-linking the composition.

Considering the possibility that hoses are used also in a cold area, hoses having both low-temperature properties and mechanical properties are desired. For example, it is known that using a hose-forming composition including EPDM with a lowered ethylene content improves the low-temperature properties of the obtained hose, but that its tensile strength is decreased.

A problem of the present invention 2-3 is to provide: a composition for forming hoses that is capable of forming a hose excellent in terms of low-temperature properties and mechanical properties; and a hose formed from the composition.

Solution to Problem

The present inventors have made intensive studies to solve the aforementioned problems. As a result, they have found an ethylene.α-olefin.non-conjugated polyene copolymer that, compared with previously proposed ethylene.α-olefin.non-conjugated polyene copolymers, further has a lower compression set at low temperature and flexibility and that has an excellent balance between low-temperature rubber elasticity and room temperature tensile strength, and have come to complete the present invention 2.

The present inventors have made intensive studies to solve the aforementioned problems. As a result, they have found that the aforementioned problems can be solved by using an ethylene.α-olefin.non-conjugated polyene copolymer that, compared with previously proposed ethylene.α-olefin.non-conjugated polyene copolymers, has a lower compression set at low temperature and flexibility and that has an excellent balance of properties of low-temperature rubber elasticity and room temperature tensile strength, and have come to complete the present invention 2-1.

The present inventors have made intensive studies to solve the aforementioned problems. As a result, they have found that the aforementioned problems can be solved by using a composition including a specific ethylene.α-olefin.non-conjugated polyene copolymer having a different B value, and have come to complete the present invention 2-2.

The present inventors have made intensive studies to solve the aforementioned problems. As a result, they have found that the aforementioned problems can be solved by using an ethylene.α-olefin.non-conjugated polyene copolymer that, compared with previously proposed ethylene α-olefin non-conjugated polyene copolymers, has an excellent balance of properties of low-temperature rubber elasticity and room-temperature tensile strength, and have come to complete the present invention 2-3.

In other words, the present invention 2 relates to, for example, the following [1] to [7]; the present invention 2-1 relates to, for example, the following [8] to [10]; the present invention 2-2 relates to, for example, the following [11] to [15]; and the present invention 2-3 relates to, for example, the following [16] to [18].

The present invention 1 for solving the aforementioned problems is a method for manufacturing an ethylene/α-olefin/non-conjugated polyene copolymer based on an olefin polymerization catalyst including a bridged metallocene compound having a specific fluorene structure.

In other words, the present invention 1 relates to, for example, the following [19] to [34].

[1] An ethylene.cα-olefin.non-conjugated polyene copolymer including a structural unit derived from an ethylene [A], a structural unit derived from a $C_4$-$C_{20}$ α-olefin [B] and a structural unit derived from a non-conjugated polyene [C], and satisfying the following (1) to (4):

(1) a molar ratio ([A]/[B]) of the structural units derived from the ethylene [A] to the structural units derived from the α-olefin [B] is 40/60 to 90/10;

(2) a content of the structural units derived from the non-conjugated polyene [C] is 0.1 to 6.0 mol % based on the total of the structural units of [A], [B] and [C] as 100 mol %;

(3) a Mooney viscosity $ML_{(1+4)}125°$ C. at 125° C. is 5 to 100; and (4) a B value represented by the following formula (i) is 1.20 or more.

$$B \text{ value} = ([EX]+2[Y])/[2\times[E]\times([X]+[Y])] \qquad (i),$$

wherein [E], [X] and [Y] represent a mole fraction of the ethylene [A], the $C_4$-$C_{20}$ α-olefin [B] and the non-conjugated polyene [C] respectively, and [EX] represents an ethylene [A]-$C_4$-$C_{20}$ α-olefin [B] diad chain fraction.

[2] The ethylene.α-olefin.non-conjugated polyene copolymer according to [1], wherein the $C_4$-$C_{20}$ α-olefin [B] is 1-butene.

[3] The ethylene.α-olefin.non-conjugated polyene copolymer according to [1] or [2], wherein the ethylene.α-olefin.non-conjugated polyene copolymer is obtained by copolymerizing an ethylene, a $C_4$-$C_{20}$ α-olefin and a non-conjugated polyene in the presence of an olefin polymerization catalyst containing:

(a) a transition metal compound represented by the following general formula [VII]; and (b) at least one compound selected from (b-1) organometallic compounds, (b-2) organoaluminum oxy-compounds, and (b-3) components which react with the transition metal compound (a) to form an ion pair.

[Chem. 1]

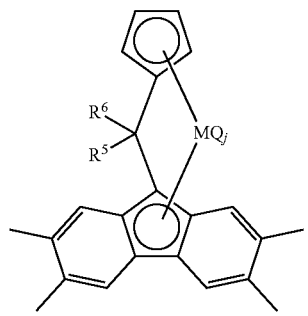

[VII]

wherein M is a titanium atom, a zirconium atom, or a hafnium atom;

$R^5$ and $R^6$ are substituted aryl groups wherein one or more of the hydrogen atoms of an aryl group are substituted with an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group optionally includes a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group includes a plurality of the substituents, each of the substituents may be the same or different;

Q is selected in an identical or different combination from halogen atoms, $C_1$-$C_{20}$ hydrocarbon groups, anionic ligands and neutral ligands capable of being coordinated with a lone electron pair; and j is an integer of 1 to 4.

[4] A cross-linked ethylene.α-olefin.non-conjugated polyene copolymer, wherein the ethylene.α-olefin.non-conjugated polyene copolymer according to any one of [1] to [3] is cross-linked using a cross-linking agent.

[5] A molded article formed using the ethylene.α-olefin.non-conjugated polyene copolymer according to any one of [1] to [3] or the cross-linked ethylene.α-olefin.non-conjugated polyene copolymer according to [4].

[6] A composition including the ethylene.α-olefin.non-conjugated polyene copolymer according to any one of [1] to [3].

[7] A method for manufacturing the ethylene.α-olefin.non-conjugated polyene copolymer according to any one of [1] to [3], wherein the ethylene, the $C_4$-$C_{20}$ α-olefin and the non-conjugated polyene are copolymerized in the presence of an olefin polymerization catalyst including:

(a) a transition metal compound represented by the following general formula [VII]; and (b) at least one compound selected from (b-1) organometallic compounds, (b-2) organoaluminum oxy compounds, and (b-3) components which react with the transition metal compound (a) to form an ion pair.

[Chem. 2]

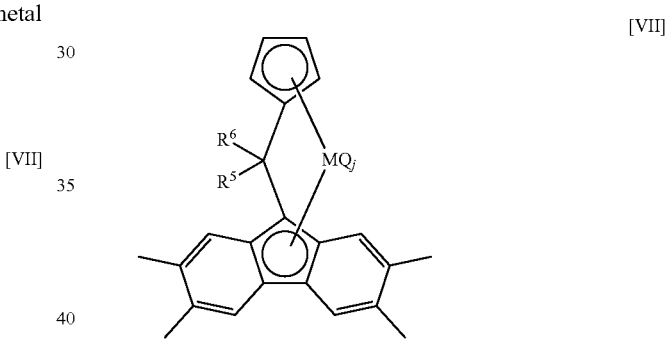

wherein M is a titanium atom, a zirconium atom, or a hafnium atom;

$R^5$ and $R^6$ are substituted aryl groups wherein one or more of the hydrogen atoms of an aryl group are substituted with an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group optionally contain a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group has a plurality of the substituents, each of the substituents may be the same or different;

Q is selected in an identical or different combination from halogen atoms, $C_1$-$C_{20}$ hydrocarbon groups, anionic ligands and neutral ligands capable of being coordinated with a lone electron pair; and j is an integer of 1 to 4.

[8] A composition for a seal packing, wherein the composition includes the ethylene.α-olefin.non-conjugated polyene copolymer according to any one of [1] to [3].

[9] A seal packing formed using the composition for a seal packing according to [8].

[10] The seal packing according to [9], wherein the seal packing is a seal component for automobiles, a seal component for machinery, a seal component for electronic and electrical components, a gasket for construction, or a seal component for civil engineering and building materials.

[11] A composition including:

an ethylene.α-olefin.non-conjugated polyene copolymer (1) and an ethylene.α-olefin.non-conjugated polyene copolymer (2) including a structural unit derived from ethylene [A'], a structural unit derived from a $C_3$-$C_{20}$ α-olefin [B'] and a structural unit derived from a non-conjugated polyene [C'], and satisfying the following (I):

(I) the B value represented by the following equation (i) is less than 1.20;

wherein the ethylene.α-olefin.non-conjugated polyene copolymer (1) is the ethylene.*α-olefin.non-conjugated polyene copolymer of any one of [1] to [3].

$$B \text{ value}=([EX]+2[Y])/\{2\times[E]\times([X]+[Y])\} \quad (i)$$

wherein [E], [X] and [Y] represent a mole fraction of the ethylene [A'], the $C_3$-$C_{20}$ α-olefin [B'] and the non-conjugated polyene [C'] respectively, and [EX] represents an ethylene [A']-$C_3$-$C_{20}$ α-olefin [B'] diad chain fraction.

[12] The composition according to [11], wherein a mass ratio [(1)/(2)] of the ethylene.α-olefin.non-conjugated polyene copolymer (1) to the ethylene.α-olefin.non-conjugated polyene copolymer (2) is 10/90 to 50/50.

[13] A cross-linked material obtained by cross-linking the composition according to [11] or [12].

[14] A cross-linked foam obtained by cross-linking and foaming the composition according to [11] or [12].

[15] A sound insulation material obtained from the composition according to [11] or [12].

[16] A composition for forming a hose, wherein the composition includes the ethylene.α-olefin.non-conjugated polyene copolymer according to any one of [1] to [3].

[17] A hose having a layer formed by cross-linking treatment of the composition according to [16] for forming a hose.

[18] The hose according to [17], wherein the hose is used for any of uses for automobiles, motorbikes, industrial machinery, construction machinery or agricultural machinery.

[19] A method for manufacturing an ethylene/α-olefin/non-conjugated polyene copolymer, the method including copolymerizing an ethylene, an α-olefin having three or more carbon atoms and a non-conjugated polyene in the presence of an olefin polymerization catalyst containing:

(a) a transition metal compound represented by the following general formula [I]; and (b) at least one compound selected from (b-1) organometallic compounds, (b-2) organoaluminum oxy-compounds, and (b-3) components which react with the transition metal compound (a) to form an ion pair.

[Chem. 3]

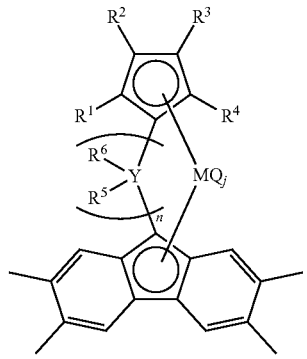

[I]

wherein Y is selected from a carbon atom, a silicon atom, a germanium atom and a tin atom;

M is a titanium atom, a zirconium atom or a hafnium atom;

$R^1$, $R^2$, $R^3$, $R^4$, $R^5$ and $R^6$, each of which may be the same or different, are atoms or substituents selected from hydrogen atoms, $C_1$-$C_{20}$ hydrocarbon groups, aryl groups, substituted aryl groups, silicon-containing groups, nitrogen-containing groups, oxygen-containing groups, halogen atoms and halogen-containing groups;

adjacent substituents between $R^1$ and $R^6$ are optionally bound together to form a ring;

Q is selected in an identical or different combination from halogen atoms, $C_1$-$C_{20}$ hydrocarbon groups, anionic ligands and neutral ligands capable of being coordinated with a lone electron pair;

n is an integer of 1 to 4; and j is an integer of 1 to 4.

[20] The method for manufacturing an ethylene/α-olefin/non-conjugated polyene copolymer according to [19], wherein n in the general formula [I] is 1.

[21] The method for manufacturing an ethylene/α-olefin/non-conjugated polyene copolymer according to [19] or [20], wherein $R^1$, $R^2$, $R^3$ and $R^4$ in the general formula [I] are all hydrogen atoms.

[22] The method for manufacturing an ethylene/(α-olefin/non-conjugated polyene copolymer according to any one of [19] to [21], wherein Y in the general formula [I] is a carbon atom.

[23] The method for manufacturing an ethylene/α-olefin/non-conjugated polyene copolymer according to any one of [19] to [22], wherein $R^5$ and $R^6$ in the general formula [I] are groups selected from aryl groups and substituted aryl groups.

[24] The method for manufacturing an ethylene/α-olefin/non-conjugated polyene copolymer according to [23], wherein $R^5$ and $R^6$ in the general formula [I] are substituted aryl groups wherein one or more of the hydrogen atoms of an aryl group are substituted with an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl groups optionally contain a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group has a plurality of the substituents, each of the substituents may be the same or different.

[25] The method for manufacturing an ethylene/α-olefin/non-conjugated polyene copolymer according to [24], wherein the electron-donating substituent is a group selected from nitrogen-containing groups and oxygen-containing groups.

[26] The method for manufacturing an ethylene/α-olefin/non-conjugated polyene copolymer according to [25], wherein $R^5$ and $R^6$ in the general formula [I] are substituted phenyl groups in which a group selected from the nitrogen-containing groups and the oxygen-containing groups is contained in the meta position and/or para position to the bond to Y.

[27] The method for manufacturing an ethylene/α-olefin/non-conjugated polyene copolymer according to [26], wherein $R^5$ and $R^6$ in the general formula [I] are substituted phenyl groups including a nitrogen-containing group represented by the following general formula [II] as the electron-donating substituent.

[Chem. 4]

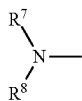

[II]

wherein $R^7$ and $R^8$, each of which may be the same or different and may be bound together to form a ring, are atoms or substituents selected from hydrogen atoms, $C_1$-$C_{20}$ hydrocarbon groups, silicon-containing groups, oxygen-containing groups and halogen-containing groups; and the line on the right of N represents a bond to a phenyl group.

[28] The method for manufacturing an ethylene/α-olefin/non-conjugated polyene copolymer according to [26], wherein $R^5$ and $R^6$ in the general formula [I] are substituted phenyl groups including an oxygen-containing group represented by the following general formula [III] as the electron-donating substituent.

[Chem. 5]

$R^9$—O—    [III]

wherein $R^9$ is an atom or a substituent selected from hydrogen atoms, $C_1$-$C_{20}$ hydrocarbon groups, silicon-containing groups, nitrogen-containing groups and halogen-containing groups; and the line on the right of O represents a bond to a phenyl group.

[29] The method for manufacturing an ethylene/α-olefin/non-conjugated polyene copolymer according to any one of [19] to [28], wherein M in the general formula [I] is a hafnium atom.

[30] The method for manufacturing an ethylene/α-olefin/non-conjugated polyene copolymer according to any one of [19] to [29], wherein the α-olefin is a $C_3$-$C_{10}$ α-olefin.

[31] The method for manufacturing an ethylene/α-olefin/non-conjugated polyene copolymer according to any one of [19] to [30], wherein the α-olefin is at least one selected from propylene and a 1-butene.

[32] The method for manufacturing an ethylene/α-olefin/non-conjugated polyene copolymer according to any one of [19] to [31], wherein the non-conjugated polyene is represented by the following general formula [IV].

[Chem. 6]

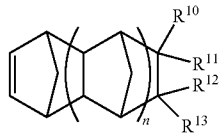

[IV]

wherein n is an integer of 0 to 2;
$R^{10}$, $R^{11}$, $R^{12}$ and $R^{13}$, each of which may be the same or different, are atoms or substituents selected from hydrogen atoms, $C_1$-$C_{20}$ hydrocarbon groups, silicon-containing groups, nitrogen-containing groups, oxygen-containing groups, halogen atoms and halogen-containing groups, which hydrocarbon groups optionally contain a double bond;

two optional substituents of $R^{10}$ to $R^{13}$ are optionally bound together to form a ring which optionally contains a double bond, $R^{10}$ and $R^{11}$, or $R^{12}$ and $R^{13}$ optionally form an alkylidene group, $R^{10}$ and $R^{12}$, or $R^{11}$ and $R^{13}$ are optionally bound together to form a double bond; and at least one requirement of the following (i) to (iv) is satisfied:

(i) at least one of $R^{10}$ to $R^{13}$ is a hydrocarbon group having one or more double bonds;

(ii) two optional substituents of $R^{10}$ to $R^{13}$ are bound together to form a ring and the ring contains a double bond;

(iii) $R^{10}$ and $R^{11}$, or $R^{12}$ and $R^{13}$, form an alkylidene group; and (iv) $R^{10}$ and $R^{12}$, or $R^{12}$ and $R^{13}$, are bound together to form a double bond.

[33] The method according for manufacturing an ethylene/α-olefin/non-conjugated polyene copolymer to any one of [19] to [32], wherein the non-conjugated polyene is 5-ethylidene-2-norbornene (ENB) or 5-vinyl-2-norbornene (VNB).

[34] The method for manufacturing an ethylene/α-olefin/non-conjugated polyene copolymer according to any one of [19] to [33], wherein a polymerization temperature is 80° C. or more.

Advantageous Effects of Invention

The method according to the present invention 1 for copolymerizing an ethylene, an α-olefin and a non-conjugated polyene in the presence of an olefin polymerization catalyst including a bridged metallocene compound having a specific fluorene structure can achieve the following effects (1) to (3) at a high level in a well-balanced manner at the same time, thereby enabling an ethylene/α-olefin/non-conjugated polyene copolymer having an excellent performance as a processing material to be manufactured at high productivity and low cost, so that a very large and superior contribution is made to industry.

Effect (1): an ethylene/α-olefin/non-conjugated polyene copolymer having a high molecular weight can be manufactured. This makes it possible to maintain, at a desired high value, the molecular weight of an ethylene/α-olefin/non-conjugated polyene copolymer produced even in high temperature polymerization, and thereby enables high temperature polymerization to be carried out. In particular, in high temperature solution polymerization, the viscosity of a polymerization solution including the produced copolymer is lowered, thereby enabling the concentration of the copolymer in a polymerizer to be increased compared with that in low temperature polymerization, resulting in a significantly enhanced productivity per polymerizer. Further, carrying out high temperature polymerization reduces a heat removal cost for a polymerizer significantly.

Effect (2): an ethylene/α-olefin/non-conjugated polyene copolymer can be manufactured at a high non-conjugated polyene copolymerization performance. Accordingly, in manufacturing an olefin copolymer containing a desired non-conjugated polyene content, the amount added of non-conjugated polyene can be reduced, resulting in a reduced amount of residual unreacted non-conjugated polyene in a polymerization solution, and the advantage that load is lowered in removing the residue in a post-polymerization process can be obtained, leading to enhanced productivity.

Effect (3): an ethylene/α-olefin/non-conjugated polyene copolymer can be manufactured at a high polymerization activity. This not only reduces a catalyst cost but also reduces a catalyst residue in the ethylene/α-olefin/non-conjugated polyene copolymer, thereby making a deashing process unnecessary, and the advantage that the production cost is reduced can be obtained.

Because the ethylene.α-olefin./non-conjugated polyene copolymer of the present invention 2 has a small compression set at low temperature as well as flexibility and has an excellent balance between low temperature rubber elasticity and room temperature tensile strength, a composition having the ethylene.α-olefin.non-conjugated polyene copolymer can preferably be used for various uses, utilizing such properties.

According to the present invention 2-1, there can be provided a composition for seal packings that is capable of forming a seal packing excellent in terms of low temperature properties, such as low temperature flexibility, and mechanical properties, such as tensile strength; and a seal packing formed from the composition.

According to the present invention 2-2, compatibility can be achieved between the processability of an uncross-linked composition including an ethylene.α-olefin.non-conjugated polyene copolymer and the sound insulation performance and properties, such as specific gravity, of a molded article obtained by cross-linking the composition.

According to the present invention 2-3, there can be provided a composition for forming hoses that is capable of forming a hose excellent in terms of low-temperature properties, such as low temperature rubber elasticity, and mechanical properties, such as room temperature tensile strength; and a hose formed from the composition.

BRIEF DESCRIPTION OF DRAWINGS

FIG. 1 is a chart showing the sound transmission losses (dB) at 500 to 5000 Hz for the tabular sponges obtained in Example D1 and Comparative Example D1.

DESCRIPTION OF EMBODIMENTS

The present invention will be described in further detail. Below, the present invention 1, the present invention 2, the present inventions 2-1, 2-2, and 2-3 will be described in this order.

[Present Invention 1]

The method according to the present invention 1 for manufacturing an ethylene/α-olefin/non-conjugated polyene copolymer is characterized by copolymerizing an ethylene, an α-olefin having three or more carbon atoms, and a non-conjugated polyene in the presence of an olefin polymerization catalyst including the transition metal compound (a) represented by the general formula [I] and the compound (b).

<Transition Metal Compound (a)>

The transition metal compound (a) is represented by the general formula [I]. The transition metal compound (a) is a metallocene compound having a bridged structure in the molecule, i.e., a bridged metallocene compound.

[Chem. 7]

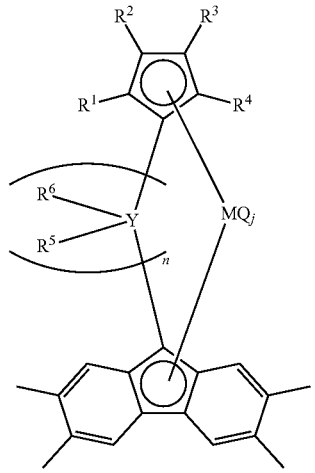

[I]

wherein Y is selected from a carbon atom, a silicon atom, a germanium atom and a tin atom;

M is a titanium atom, a zirconium atom or a hafnium atom;

$R^1$, $R^2$, $R^3$, $R^4$, $R^5$ and $R^6$, each of which may be the same or different, are atoms or substituents selected from hydrogen atoms, $C_1$-$C_{20}$ hydrocarbon groups, aryl groups, substituted aryl groups, silicon-containing groups, nitrogen-containing groups, oxygen-containing groups, halogen atoms and halogen-containing groups;

adjacent substituents between $R^1$ and $R^6$ may be bound together to form a ring;

Q is selected in the same or different combination from halogen atoms, $C_1$-$C_{20}$ hydrocarbon groups, anionic ligands and neutral ligands capable of being coordinated with a lone electron pair;

n is an integer of 1 to 4; and j is an integer of 1 to 4.

Y, M, $R^1$ to $R^6$, Q, n and j in the formula [I] will be described below.

The transition metal compound (a) can also be used in the present inventions 2, 2-1, 2-2 and 2-3 and accordingly these inventions may be described in the description of the transition metal compound (a).

(Y, M, $R^1$ to $R^6$, Q, n and j)

Y is selected from a carbon atom, a silicon atom, a germanium atom and a tin atom, and is preferably a carbon atom.

M is a titanium atom, a zirconium atom or a hafnium atom, and is preferably a hafnium atom.

$R^1$, $R^2$, $R^3$, $R^4$, $R^5$ and $R^6$, each of which may be the same or different, are atoms or substituents selected from hydrogen atoms, $C_1$-$C_{20}$ hydrocarbon groups, aryl groups, substituted aryl groups, silicon-containing groups, nitrogen-containing groups, oxygen-containing groups, halogen atoms and halogen-containing groups. The adjacent substituents between $R^1$ and $R^6$ are optionally bound together to form a ring or are optionally not unbound together.

Here, examples of the $C_1$-$C_{20}$ hydrocarbon groups include a $C_1$-$C_{20}$ alkyl group, a $C_3$-$C_{20}$ cyclic saturated hydrocarbon group, a $C_2$-$C_{20}$ chain unsaturated hydrocarbon group and a $C_3$-$C_{20}$ cyclic unsaturated hydrocarbon group. If adjacent substituents of $R^1$ to $R^6$ are bonded to each other to form a ring, a $C_1$-$C_{20}$ alkylene group, a $C_6$-$C_{20}$ arylene group, etc. can be given as examples.

Examples of the $C_1$-$C_{20}$ alkyl groups include methyl group, ethyl group, n-propyl group, allyl group, n-butyl group, n-pentyl group, n-hexyl group, n-heptyl group, n-octyl group, n-nonyl group and n-decanyl group that are straight-chain saturated hydrocarbon groups, and isopropyl group, isobutyl group, s-butyl group, t-butyl group, t-amyl group, neopentyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group, 1-methyl-1-isopropyl-2-methylpropyl group and cyclopropylmethyl group that are branched saturated hydrocarbon groups. The number of carbon atoms of the alkyl group is preferably 1 to 6.

Examples of the $C_3$-$C_2$ cyclic saturated hydrocarbon groups include cyclopropyl group, cyclobutyl group, cyclopentyl group, cyclohexyl group, cycloheptyl group, cyclooctyl group, norbornenyl group, 1-adamantyl group and 2-adamantyl group that are cyclic saturated hydrocarbon groups, and 3-methylcyclopentyl group, 3-methylcycohexyl group, 4-methylcyclohexyl group, 4-cyclohexylcyclohexyl group and 4-phenylcyclohexyl group that are groups wherein a hydrogen atom of a cyclic saturated hydrocarbon group is substituted by a $C_1$-$C_{17}$ hydrocarbon group. The number of carbon atoms of the cyclic saturated hydrocarbon group is preferably 5 to 11.

Examples of the $C_2$-$C_{20}$ chain unsaturated hydrocarbon groups include ethenyl group (vinyl group), 1-propenyl group, 2-propenyl group (allyl group) and 1-methylethenyl group (isopropenyl group) that are alkenyl groups, and ethynyl group, 1-propynyl group and 2-propynyl group (propargyl group) that are alkynyl groups. The number of carbon atoms of the chain unsaturated hydrocarbon group is preferably 2 to 4.

Examples of the $C_3$-$C_{20}$ cyclic unsaturated hydrocarbon groups include cyclopentadienyl group, norbornyl group, phenyl group, naphthyl group, indenyl group, azulenyl group, phenanthryl group and anthracenyl group that are cyclic unsaturated hydrocarbon groups, 3-methylphenyl group (m-tolyl group), 4-methylphenyl group (p-tolyl group), 4-ethylphenyl group, 4-t-butylphenyl group, 4-cyclohexylphenyl group, biphenylyl group, 3,4-dimethylphenyl group, 3,5-dimethylphenyl group and 2,4,6-trimethylphenyl group (mesityl group) that are groups wherein a hydrogen atom of a cyclic unsaturated hydrocarbon group is substituted by a $C_1$-$C_{15}$ hydrocarbon group, and benzyl group and cumyl group that are groups wherein a hydrogen atom of a straight-chain hydrocarbon group or a branched saturated hydrocarbon group is substituted by a cyclic saturated hydrocarbon group or a $C_3$-$C_{19}$ cyclic unsaturated hydrocarbon group. The number of carbon atoms of the cyclic unsaturated hydrocarbon group is preferably 6 to 10.

Examples of the $C_1$-$C_{20}$ alkylene groups include methylene group, ethylene group, dimethylmethylene group (isopropylidene group), ethylmethylene group, 1-methylethylene group, 2-methylethylene group, 1,1-dimethylethylene group, 1,2-dimethylethylene group and n-propylene group. The number of carbon atoms of the alkylene group is preferably 1 to 6.

Examples of the $C_6$-$C_{20}$ arylene groups include o-phenylene group, m-phenylene group, p-phenylene group and 4,4'-biphenylene group. The number of carbon atoms of the arylene group is preferably 6 to 12.

Examples of the aryl groups, part of which overlap with the above-mentioned examples set forth for the $C_3$-$C_{20}$ cyclic unsaturated hydrocarbon groups, include phenyl group, 1-naphthyl group, 2-naphthyl group, anthracenyl group, phenanthrenyl group, tetracenyl group, chrysenyl group, pyrenyl group, indenyl group, azulenyl group, pyrrolyl group, pyridyl group, furanyl group and thiophenyl group that are substituents derived from aromatic compounds. As the aryl group, a phenyl group or a 2-naphthyl group is preferable.

Examples of the aromatic compounds include benzene, naphthalene, anthracene, phenanthrene, tetracene, chrysene, pyrene, pyrene, indene, azulene, pyrrole, pyridine, furan and thiophene that are aromatic hydrocarbons and heterocyclic aromatic compounds.

Examples of the substituted aryl groups, part of which overlap with the above-mentioned examples set forth for the $C_3$-$C_{20}$ cyclic unsaturated hydrocarbon groups, include groups wherein one or more hydrogen atoms possessed by the above aryl groups are substituted by substituents selected from $C_1$-$C_{20}$ hydrocarbon groups, aryl groups, silicon-containing groups, nitrogen-containing group, oxygen-containing groups, halogen atoms and halogen-containing groups, and specific examples thereof include 3-methylphenyl group (m-tolyl group), 4-methylphenyl group (p-tolyl group), 3-ethylphenyl group, 4-ethylphenyl group, 3,4-dimethylphenyl group, 3,5-dimethylphenyl group, biphenylyl group, 4-(trimethylsilyl)phenyl group, 4-aminophenyl group, 4-(dimethylamino)phenyl group, 4-(diethylamino)phenyl group, 4-morpholinylphenyl group, 4-methoxyphenyl group, 4-ethoxyphenyl group, 4-phenoxyphenyl group, 3,4-dimethoxyphenyl group, 3,5-dimethoxyphenyl group, 3-methyl-4-methoxyphenyl group, 3,5-dimethyl-4-methoxyphenyl group, 3-(trifluoromethyl)phenyl group, 4-(trifluoromethyl)phenyl group, 3-chlorophenyl group, 4-chlorophenyl group, 3-fluorophenyl group, 4-fluorophenyl group, 5-methylnaphthyl group and 2-(6-methyl)pyridyl group.

For the substituted aryl group, "electron-donating group-containing substituted aryl group" provided later can be mentioned.

Examples of the silicon-containing groups include alkylsilyl groups, such as trimethylsilyl group, triethylsilyl group, t-butyldimethylsilyl group and triisopropyl group, arylsilyl groups, such as dimethylphenylsilyl group, methyldiphenylsilyl group and t-butyldiphenylsilyl group, pentamethyldisilanyl group and trimethylsilylmethyl group, all of which are groups wherein a carbon atom in a $C_1$-$C_{20}$ hydrocarbon group is substituted by a silicon atom. The number of carbon atoms of the alkylsilyl group is preferably 1 to 10, and the number of carbon atoms of the arylsilyl group is preferably 6 to 18.

Examples of the nitrogen-containing groups include amino group, nitro group and N-morpholinyl group; and dimethylamino group, diethylamino group, dimethylaminomethyl group, cyano group, pyrrolidinyl group, piperidinyl group and pyridinyl group that are groups wherein in the aforesaid $C_1$-$C_{20}$ hydrocarbon groups or silicon-containing groups, a =CH— structure unit is substituted by a nitrogen atom, or a —CH$_2$— structure unit is substituted by a nitrogen atom to which a $C_1$-$C_{20}$ hydrocarbon group has been bonded, or a —CH$_3$ structure unit is substituted by a nitrogen atom to which a C$_1$-C$_{20}$ hydrocarbon group has been bonded or a nitrile atom. As the nitrogen-containing group, a dimethylamino group or a N-morpholinyl group is preferable.

Examples of the oxygen-containing groups include hydroxyl group; and methoxy group, ethoxy group, t-butoxy group, phenoxy group, trimethylsiloxy group, methoxyethoxy group, hydroxymethyl group, methoxymethyl group, ethoxymethyl group, t-butoxymethyl group, 1-hydroxyethyl group, 1-methoxyethyl group, 1-ethoxyethyl group, 2-hydroxyethyl group, 2-methoxyethyl group, 2-ethoxyethyl group, n-2-oxabutylene group, n-2-oxapentylene group, n-3-oxapentylene group, aldehyde group, acetyl group, propionyl group, benzoyl group, trimethylsilylcarbonyl group, carbamoyl group, methylaminocarbonyl group, carboxyl group, methoxycarbonyl group, carboxymethyl group, ethocarboxymethyl group, carbamoylmethyl group, furanyl group and pyranyl group that are groups wherein in the aforesaid C$_1$-C$_{20}$ hydrocarbon groups, silicon-containing groups or nitrogen-containing groups, a —CH$_2$— structure unit is substituted by an oxygen atom or a carbonyl group, or a —CH$_3$ structure unit is substituted by an oxygen atom to which a C$_1$-C$_{20}$ hydrocarbon group has been bonded. As the oxygen-containing group, a methoxy group is preferable.

Examples of the halogen atoms include fluorine, chlorine, bromine and iodine that are Group 17 elements.

Examples of the halogen-containing groups include trifluoromethyl group, tribromomethyl group, pentafluoroethyl group and pentafluorophenyl group that are groups wherein in the aforesaid C$_1$-C$_{20}$ hydrocarbon groups, silicon-containing groups, nitrogen-containing groups or oxygen-containing groups, a hydrogen atom is substituted by a halogen atom.

Q is selected from a halogen atom, a C$_1$-C$_{20}$ hydrocarbon group, an anionic ligand and a neutral ligand capable of being coordinated with a lone electron pair, in a combination of the same or different kinds.

Details of the halogen atom and the C$_1$-C$_{20}$ hydrocarbon group are as previously described. When Q is a halogen atom, it is preferably a chlorine atom. When Q is a C$_1$-C$_{20}$ hydrocarbon group, the number of carbon atoms of the hydrocarbon group is preferably 1 to 7.

Examples of the anionic ligands include alkoxy groups, such as methoxy group, t-butoxy group and phenoxy group, carboxylate groups, such as acetate and benzoate, and sulfonate groups, such as mesylate and tosylate.

Examples of the neutral ligands capable of being coordinated with a lone electron pair include organophosphorus compounds, such as trimethylphosphine, triethylphosphine, triphenylphosphine and diphenylmethylphosphine, and ether compounds, such as tetrahydrofuran, diethyl ether, dioxane and 1,2-dimethoxyethane.

n is an integer of 1 to 4.

j is an integer of 1 to 4, and is preferably 2.

The above-mentioned examples set forth regarding the formula [I] will apply in the same manner also in descriptions that will be provided below for the present invention 1.

The present inventors have intensively studied various transition metal compounds and, as a result, have found for the first time that when the transition metal compound (a) represented by the general formula [I] contains, among others, a 2,3,6,7-tetramethyl fluorenyl group in its ligand structure and when an ethylene, an α-olefin having three or more carbon atoms, and a non-conjugated polyene are copolymerized in the presence of an olefin polymerization catalyst including the transition metal compound (a), an ethylene/α-olefin/non-conjugated polyene copolymer with a high molecular weight or the below-mentioned ethylene-based copolymer A can be manufactured based on the high non-conjugated polyene copolymerization performance and the high polymerization activity.

The 2,3,6,7-tetramethyl fluorenyl group contained in the transition metal compound (a) represented by the general formula [I] has four substituents at its 2, 3, 6 and 7 position, hence having a large electronic effect, and from this it is inferred that this results in a high polymerization activity, causing an ethylene/α-olefin/non-conjugated polyene copolymer with a high molecular weight or the below-mentioned ethylene-based copolymer A to be produced. Since a non-conjugated polyene is generally bulky compared with an α-olefin, it is inferred that especially when in a polymerization catalyst for polymerizing it, the vicinity of the central metal of a metallocene compound, which vicinity corresponds to a polymerization activity point, is less bulky, it leads to an increase in the copolymerization performance of the non-conjugated polyene. Because the four methyl groups contained in the 2,3,6,7-tetramethyl fluorenyl group are not bulky compared with other hydrocarbon groups, this is considered to contribute to a high non-conjugated polyene copolymerization performance. From the above, it is inferred that the transition metal compound (a) represented by the general formula [I] including a 2,3,6,7-tetramethyl fluorenyl group in particular achieves a high molecular weight of the produced ethylene/α-olefin/non-conjugated polyene copolymer or the below-mentioned ethylene-based copolymer A, a high non-conjugated polyene copolymerization performance and a high polymerization activity at a high level in a well-balanced manner at the same time.

In the transition metal compound (a) represented by the general formula [I], n is preferably 1. Such a transition metal compound (a-1) is represented by the following general formula [V].

[Chem. 8]

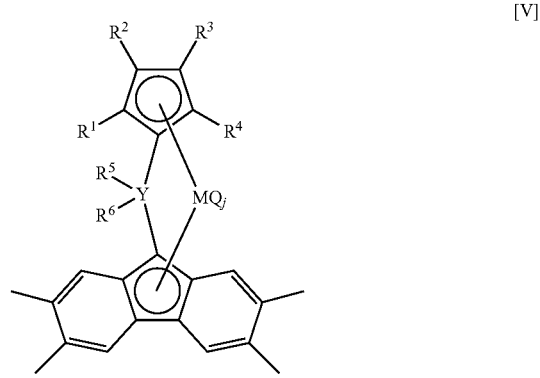

[V]

wherein Y, M, R$^1$, R$^2$, R$^3$, R$^4$, R$^5$, R$^6$, Q and j are defined as aforementioned.

Compared with a compound represented by the general formula [I] wherein n is an integer of 2 to 4, the transition metal compound (a-1) is produced by a simplified process at a lower cost, eventually providing the advantage that using this transition metal compound reduces the production cost of the ethylene/α-olefin/non-conjugated polyene copolymer or the below-mentioned ethylene-based copolymer A. Furthermore, when an ethylene, an α-olefin having three or more carbon atoms, and a non-conjugated polyene are copolymerized in the presence of an olefin polymerization catalyst including a transition metal compound (a-1), the advantage is obtained that the produced ethylene/α-olefin/non-conjugated polyene copolymer and the below-mentioned ethylene-based copolymer A have a high molecular weight.

It is preferred that in the transition metal compound (a) represented by the general formula [I] and the transition metal compound (a-1) represented by the general formula [V], $R^1$, $R^2$, $R^3$ and $R^4$ are all hydrogen atoms.

The transition metal compound (a-2) wherein $R^1$, $R^2$, $R^3$ and $R^4$ are all hydrogen atoms in the transition metal compound (a-1) represented by the general formula [V] is represented by the following general formula [VI].

[Chem. 9]

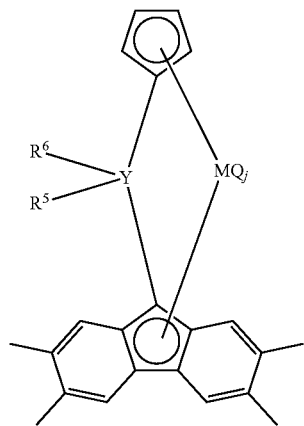

[VI]

wherein Y, M, $R^5$, $R^6$, Q and j are defined as aforementioned.

Compared with a compound represented by the general formula [V] wherein any one or more of $R^1$, $R^2$, $R^3$ and $R^4$ are substituted with a substituent other than a hydrogen atom, the transition metal compound (a-2) is produced by a simplified process at a lower cost, eventually providing the advantage that using this transition metal compound reduces the production cost of the ethylene/α-olefin/non-conjugated polyene copolymer and the below-mentioned ethylene-based copolymer A. Furthermore, when an ethylene, an α-olefin having three or more carbon atoms, and a non-conjugated polyene are copolymerized in the presence of an olefin polymerization catalyst including the transition metal compound (a-2), the advantages are obtained that the polymerization activity is enhanced and that the produced ethylene/α-olefin/non-conjugated polyene copolymer and the below-mentioned ethylene-based copolymer A have a high molecular weight. At the same time, the advantage is also obtained that the copolymerization performance of the non-conjugated polyene is enhanced.

It is more preferred that Y is a carbon atom in the transition metal compound (a) represented by the general formula [I], the transition metal compound (a-1) represented by the general formula [V] and the transition metal compound (a-2) represented by the general formula [VI].

The transition metal compound (a-3) wherein Y is a carbon atom in the transition metal compound (a-2) represented by the general formula [VI] is represented by the following general formula [VII].

[Chem. 10]

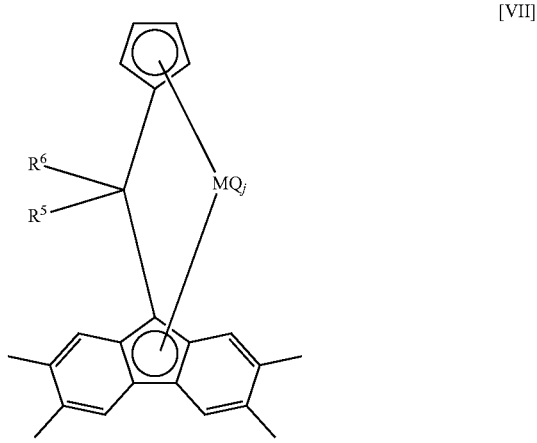

[VII]

wherein M, $R^5$, $R^6$, Q and j are defined as aforementioned.

The transition metal compound (a-3) can be synthesized by a simple method such as the following formula [VIII].

[Chem. 11]

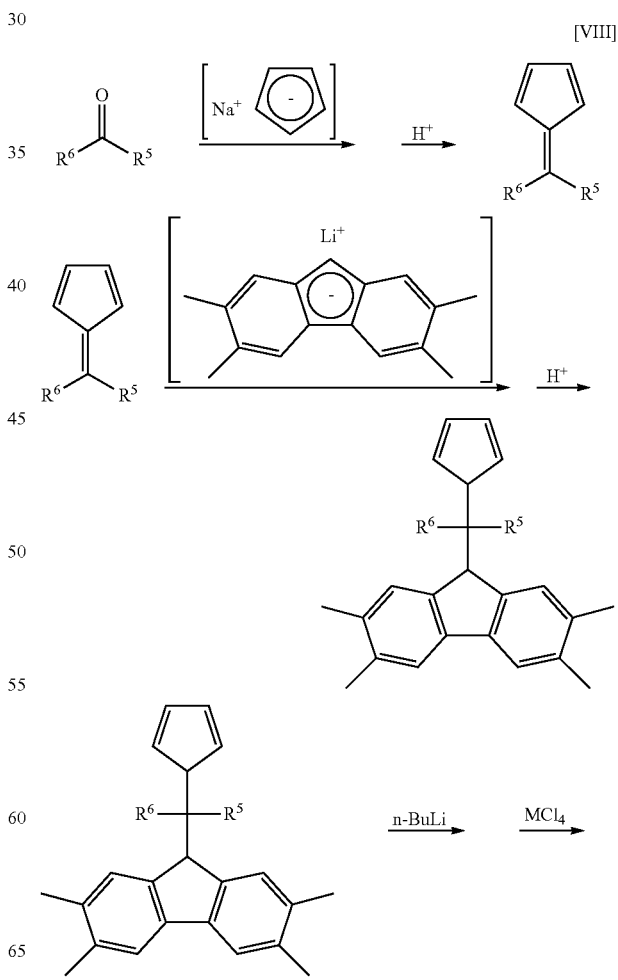

[VIII]

-continued

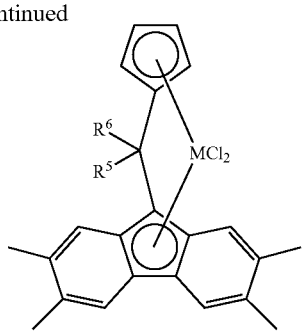

wherein M, $R^5$ and $R^6$ are defined as aforementioned.

$R^5$ and $R^6$, each of which may be the same or different and may be bound together to form a ring, are atoms or substituents selected from hydrogen atoms, $C_1$-$C_{20}$ hydrocarbon groups, aryl groups, substituted aryl groups, silicon-containing groups, nitrogen-containing groups, oxygen-containing groups, halogen atoms and halogen-containing groups, and various ketones which are represented by the general formula $R^5$—C(=O)—$R^6$ and which satisfy such conditions as these are commercially available from common reagent manufacturers, allowing raw materials for the transition metal compound (a-3) to be readily obtained. Even if such ketones are not commercially available, they can easily be synthesized by, for example, a method such as by Olah et al. [Heterocycles, 40, 79 (1995)]. Thus, compared with a compound wherein Y in the general formula [V] is selected from a silicon atom, a germanium atom and a tin atom, the transition metal compound (a-3) is produced by a simplified and easy process at a further lower cost makes manufacturing processes simple and easy and reduces production cost further, eventually providing the advantage that using this transition metal compound reduces the production cost of the ethylene/α-olefin/non-conjugated polyene copolymer and the below-mentioned ethylene-based copolymer A. Furthermore, when an ethylene, an α-olefin having three or more carbon atoms, and a non-conjugated polyene are copolymerized in the presence of an olefin polymerization catalyst including the transition metal compound (a-3), the advantage is also obtained that the produced ethylene/α-olefin/non-conjugated polyene copolymer and the below-mentioned ethylene-based copolymer A have an even higher molecular weight.

It is preferred that in the transition metal compound (a) represented by the general formula [I], the transition metal compound (a-1) represented by the general formula [V], the transition metal compound (a-2) represented by the general formula [VI] and the transition metal compound (a-3) represented by the general formula [VII], $R^5$ and $R^6$ are groups selected from aryl groups or substituted aryl groups.

When an ethylene, an α-olefin having three or more carbon atoms, and a non-conjugated polyene are copolymerized in the presence of an olefin polymerization catalyst including the bridged metallocene compound, the advantages are obtained that the polymerization activity is further enhanced and that the produced ethylene/α-olefin/non-conjugated polyene copolymer and the below-mentioned ethylene-based copolymer A have an even higher molecular weight. At the same time, the advantage is also obtained that the copolymerization performance of the non-conjugated polyene is enhanced.

It is more preferred that in the transition metal compound (a) represented by the general formula [I], the transition metal compound (a-1) represented by the general formula [V], the transition metal compound (a-2) represented by the general formula [VI] and the transition metal compound (a-3) represented by the general formula [VII], $R^5$ and $R^6$ are the same groups selected from aryl groups or substituted aryl groups. Selecting $R^5$ and $R^6$ in such a manner simplifies synthesis processes for the transition metal compound and reduces production cost further, eventually providing the advantage that using this transition metal compound reduces the production cost of the ethylene/α-olefin/non-conjugated polyene copolymer and the below-mentioned ethylene-based copolymer A.

It is more preferred that in the transition metal compound (a) represented by the general formula [I], the transition metal compound (a-1) represented by the general formula [V], the transition metal compound (a-2) represented by the general formula [VI] and the transition metal compound (a-3) represented by the general formula [VII], $R^5$ and $R^6$ are the same substituted aryl group. When an ethylene, an α-olefin having three or more carbon atoms, and a non-conjugated polyene are copolymerized in the presence of an olefin polymerization catalyst including the transition metal compound, the advantage is obtained that the produced ethylene/α-olefin/non-conjugated polyene copolymer and the below-mentioned ethylene-based copolymer A have an even higher molecular weight.

It is preferred that in the transition metal compound (a) represented by the general formula [I], the transition metal compound (a-1) represented by the general formula [V], the transition metal compound (a-2) represented by the general formula [VI] and the transition metal compound (a-3) represented by the general formula [VII], $R^5$ and $R^6$ are substituted aryl groups (hereinafter referred to as "electron-donating group-containing substituted aryl group") wherein one or more of the hydrogen atoms of the aryl group are substituted with an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group may have a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group has a plurality of the substituents, each of the substituents may be the same or different. When an ethylene, an α-olefin having three or more carbon atoms, and a non-conjugated polyene are copolymerized in the presence of an olefin polymerization catalyst including the bridged metallocene compound, the advantage is obtained that the produced ethylene/α-olefin/non-conjugated polyene copolymer and the below-mentioned ethylene-based copolymer A have an even higher molecular weight.

The electron-donating group having a substituent constant σ in the Hammett's rule of not more than −0.2 is defined and illustrated as follows. The Hammett's rule is a rule of thumb proposed by L. P. Hammett in 1935 in order to quantitatively discuss an influence of a substituent on a reaction or an equilibrium of a benzene derivative, and validity of this rule is widely accepted today. As the substituent constant determined by the Hammett's rule, there are σp in the case of substitution at the para position of a benzene ring and σm in the case of substitution at the meta position of a benzene ring, and these values can be found in a large number of common literatures. For example, in a literature [Chem. Rev., 91, 165 (1991)] by Hansch and Taft, detailed description of an extremely wide range of substituents has been made. However, values of σp and σm described in these literatures sometimes slightly vary depending upon the literature even in the case of the same substituents. In order to avoid such confusion caused by circumstances in the present invention, values described in Table 1 (pp. 168-175) of the literature [Chem. Rev., 91, 165 (1991)] by Hansch and Taft are defined as the substituent constants σp and σm of the Hammett's rule, regarding the substituents as long as described. In the present invention, the electron-donating group having a substituent constant σ in the Hammett's rule of not more than −0.2 is an electron-donating group having σp of not more than −0.2 in the case where the electron-donating group substitutes at the para position (4-position) of a phenyl group, and is an electron-donating group having σm of not more than −0.2 in the case where the electron-donating group substitutes at the meta position (3-position) of a phenyl group. Further, in the case where the electron-donating group substitutes at the ortho position (2-position) of a phenyl group or in the case where it substitutes at an arbitrary position of an aryl group other than a phenyl group, the electron-donating group is an electron-donating group having σp of not more than −0.2.

Examples of the electron-donating groups having a substituent constant σp or σm in the Hammett's rule of not more than −0.2 include nitrogen-containing groups, such as p-amino group (4-amino group), p-dimethylamino group (4-dimethylamino group), p-diethylamino group (4-diethylamino group) and m-diethylamino group (3-diethylamino group), oxygen-containing groups, such as p-methoxy group (4-methoxy group) and p-ethoxy group (4-ethoxy group), tertiary hydrocarbon groups, such as p-t-butyl group (4-t-butyl group), and silicon-containing groups, such as p-trimethylsiloxy group (4-trimethylsiloxy group). The electron-donating groups defined in the present invention whose substituent constant σp or σm in the Hammett's rule is not more than −0.2 are not limited to the substituents described in Table 1 (pp. 168-175) of the literature [Chem. Rev., 91, 165 (1991)] by Hansch and Taft. Substituents whose substituent constant σp or σm measured based on the Hammett's rule will be within the above range are included in the electron-donating groups defined in the present invention whose substituent constant σp or σm in the Hammett's rule is not more than −0.2, even if the substituents are not described in the above literature. Examples of such substituents include p-N-morpholinyl group (4-N-morpholinyl group) and m-N-morpholinyl group (3-N-morpholinyl group).

When the electron-donating group-containing substituted aryl group is substituted by a plurality of electron-donating substituents, these electron-donating substituents may be the same as or different from each other, and the electron-donating group-containing substituted aryl group may be substituted not only by the electron-donating substituent but also by a substituent selected from a $C_1$-$C_{20}$ hydrocarbon group, a silicon-containing group, a nitrogen-containing group, an oxygen-containing group, a halogen atom and a halogen-containing group, and when the electron-donating group-containing substituted aryl group is substituted by a plurality of the substituents, these substituents may be the same as or different from each other. However, the total of the substituent constants σ in the Hammett's rule of the electron-donating substituent and the substituent contained in one substituted aryl group is preferably not more than −0.15. Examples of such substituted aryl groups include m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group) and p-methoxy-m,m-dimethylphenyl group (4-methoxy-3,5-dimethylphenyl group).

Examples of the $C_1$-$C_{20}$ hydrocarbon groups, the silicon-containing groups, the nitrogen-containing groups, the oxygen-containing groups, the halogen atoms and the halogen-containing groups, which may be possessed by the electron-donating group-containing substituted aryl group, include the aforesaid specific examples of these atoms and substituents.

The present inventors have intensively studied various transition metal compounds and, as a result, have found for the first time that in particular when $R^5$ and $R^6$ in the transition metal compound (a) represented by the general formula [I], the transition metal compound (a-1) represented by the general formula [V], the transition metal compound (a-2) represented by the general formula [VI] and the transition metal compound (a-3) represented by the general formula [VII] are electron-donating group-containing substituted aryl groups wherein one or more electron-donating substituents having a substituent constant σ of −0.2 or less in the Hammett's rule are substituted and when an ethylene, an α-olefin having three or more carbon atoms, and a non-conjugated polyene are copolymerized in the presence of an olefin polymerization catalyst including these transition metal compounds, the produced ethylene/α-olefin/non-conjugated polyene copolymer and the below-mentioned ethylene-based copolymer A have an even higher molecular weight.

It is known that in coordination polymerization of an olefin with an organic metal complex catalyst such as the transition metal compound (a), preferably the transition metal compound (a-3), repeated polymerization of an olefin on the central metal of the catalyst propagates molecular chains of the produced olefin polymer (propagation), increasing the molecular weight of the olefin polymer. It is also known that in a reaction referred to as chain transfer, dissociation of molecular chains of an olefin polymer from the central metal of a catalyst stops propagation of the molecular chains and accordingly stops increase in the molecular weight of the olefin polymer. Thus, the molecular weight of an olefin polymer is characterized by the ratio of a frequency of propagation to a frequency of chain transfer reaction, which ratio is inherent to an organometallic complex catalyst that produces the polymer. In other words, the relation is such that the larger the ratio of the frequency of propagation to the frequency of chain transfer reaction is, the higher the molecular weight of the produced olefin polymer is, and conversely, the smaller the former, the lower the latter. Here, the frequencies of the respective reactions can be estimated from the activation energies of the respective reactions, and it can be considered that a reaction having a low activation energy is more frequent and that conversely a reaction having a high activation energy is less frequent. It is known that in general a frequency of propagation in olefin polymerization is sufficiently high compared with a frequency of chain transfer reaction, i.e., an activation energy of propagation is sufficiently low compared with an activation energy of chain transfer reaction. Thus, a value (hereinafter referred to as "$\Delta E_c$") obtained by subtracting an activation energy of propagation from an activation energy of chain transfer reaction is positive, and it is inferred that the larger the value is, the larger the frequency of propagation is compared with the frequency of chain transfer reaction and the larger the molecular weight of the resultant olefin polymer produced is. The adequacy of estimation thus conducted of a molecular weight of an olefin polymer is endorsed by the calculation results of, for example, Laine et al. [Organometallics, 30, 1350 (2011)]. It is inferred that when $R^5$ and $R^6$ in the transition metal compound (a-3) represented by the general formula [VII] are electron-donating group-containing substituted aryl groups wherein in particular one or more electron-donating substituents having a substituent constant σ of −0.2 or less in the Hammett's rule is substituted, the $\Delta E_c$ increases and that in copolymerization of an ethylene, an α-olefin having three or more carbon atoms, and a non-conjugated polyene in the presence of an olefin polymerization catalyst including the transition metal compound (a-3), the produced ethylene/α-olefin/non-conjugated polyene copolymer has a high molecular weight.

It is more preferred that electron-donating substituents contained in $R^5$ and $R^6$ in the transition metal compound (a) represented by the general formula [I], the transition metal compound (a-1) represented by the general formula [V], the transition metal compound (a-2) represented by the general formula [VI] and the transition metal compound (a-3) represented by the general formula [VII] are groups selected from nitrogen-containing groups and oxygen-containing groups. These substituents have a particularly low a in the Hammett's rule and exerts a significant effect for achievement of, above all, (1) among the problems to be solved by the present invention 1.

It is more preferred that in the transition metal compound (a) represented by the general formula [I], the transition metal compound (a-1) represented by the general formula [V], the transition metal compound (a-2) represented by the general formula [VI] and the transition metal compound (a-3) represented by the general formula [VII], $R^5$ and $R^6$ are substituted phenyl groups containing groups selected from nitrogen-containing groups and oxygen-containing groups as the electron-donating substituent. For synthesis by a method such as, for example, the formula [VIII], various benzophenones as raw materials are commercially available from common reagent manufacturers, so that the raw materials are readily obtained, production processes are simplified, and furthermore production cost is reduced, eventually providing the advantage that using this transition metal compound reduces the production cost of the ethylene/α-olefin/non-conjugated polyene copolymer and the below-mentioned ethylene-based copolymer A.

Here, examples of substituted phenyl groups containing groups selected from nitrogen-containing groups or oxygen-containing groups as the electron-donating substituent include: o-aminophenyl group (2-aminophenyl group), p-aminophenyl group (4-aminophenyl group), o-(dimethylamino)phenyl group (2-(dimethylamino)phenyl group), p-(dimethylamino)phenyl group (4-(dimethylamino)phenyl group), o-(diethylamino)phenyl group (2-(diethylamino)phenyl group), p-(diethylamino)phenyl group (4-(diethylamino)phenyl group), m-(diethylamino)phenyl group (3-(diethylamino)phenyl group), o-methoxyphenyl group (2-methoxyphenyl group), p-methoxyphenyl group (4-methoxyphenyl group), o-ethoxyphenyl group (2-ethoxyphenyl group), p-ethoxyphenyl group (4-ethoxyphenyl group), o-N-morpholinylphenyl group (2-N-morpholinylphenyl group), p-N-morpholinylphenyl group (4-N-morpholinylphenyl group), m-N-morpholinylphenyl group (3-N-morpholinylphenyl group), o,p-dimethoxyphenyl group (2,4-dimethoxyphenyl group), m, p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group), p-methoxy-m, m-dimethylphenyl group (4-methoxy-3,5-dimethylphenyl group).

It is preferred that in the transition metal compound (a) represented by the general formula [I], the transition metal compound (a-1) represented by the general formula [V], the transition metal compound (a-2) represented by the general formula [VI] and the transition metal compound (a-3) represented by the general formula [VII], $R^5$ and $R^6$ are substituted phenyl groups containing groups selected from nitrogen-containing groups and oxygen-containing groups as the electron-donating substituent in the meta position or para position to the bond to the Y (for example, it is the bond to a carbon atom as Y, when the Y is a carbon atom). Synthesis by a method such as, for example, the formula [VIII] is easier compared with synthesis in which the group is substituted in the ortho position, whereby manufacturing processes are simplified, and furthermore production cost is reduced, eventually providing the advantage that using this transition metal compound reduces the production cost of the ethylene/α-olefin/non-conjugated polyene copolymer and the below-mentioned ethylene-based copolymer A.

It is preferred that when $R^5$ and $R^6$ in the transition metal compound (a) represented by the general formula [I], the transition metal compound (a-1) represented by the general formula [V], the transition metal compound (a-2) represented by the general formula [VI] and the transition metal compound (a-3) represented by the general formula [VII] are substituted phenyl groups containing a nitrogen-containing group as the electron-donating substituent in the meta position or para position to the bond to the Y (for example, it is the bond to a carbon atom as Y, when the Y is a carbon atom), the nitrogen-containing group is a group represented by the following general formula [II].

[Chem. 12]

[II]

wherein $R^7$ and $R^8$, each of which may be the same or different and may be bound together to form a ring, are atoms or substituents selected from hydrogen atoms, $C_1$-$C_{20}$ hydrocarbon groups, silicon-containing groups, oxygen-containing groups and halogen-containing groups; and the line on the right of N represents a bond to a phenyl group. Examples of the $C_1$-$C_{20}$ hydrocarbon group, the silicon-containing group, the oxygen-containing group and the halogen-containing group for $R^7$ and $R^8$ include the aforementioned specific examples of these substituents.

Such a transition metal compound (a-4) is represented by the following general formula [IX].

[Chem. 13]

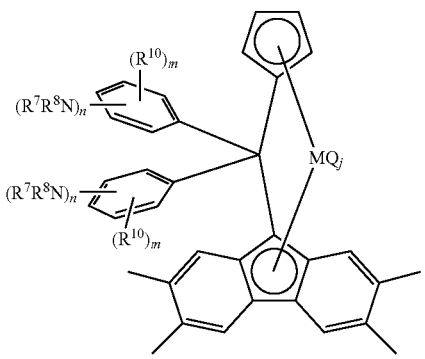

[IX]

wherein M, Q and j are defined as aforementioned.

$R^7$, $R^8$ and $R^{10}$, each of which may be the same or different, are substituents selected from hydrogen atoms, $C_1$-$C_{20}$ hydrocarbon groups, silicon-containing groups, nitrogen-containing groups, oxygen-containing groups, halogen atoms and halogen-containing groups;

adjacent substituents among $R^7$, $R^8$ and $R^{10}$ may be bound together to form a ring;

$NR^7R^8$ is a nitrogen-containing group having a substituent constant σ of −0.2 or less in the Hammett's rule;

when the nitrogen-containing group exists in plurality, each of the nitrogen-containing groups may be the same or different;

n is an integer of 1 to 3; and m is an integer of 0 to 4.

The transition metal compound (a-4) has a particularly low a in the Hammett's rule for $NR^7R^8$ represented by the general formula [II] and thereby exerts a significant effect for achievement of, above all, (1) among the problems to be solved by the present invention 1.

It is preferred that when $R^5$ and $R^6$ in the transition metal compound (a) represented by the general formula [I], the transition metal compound (a-1) represented by the general formula [V], the transition metal compound (a-2) represented by the general formula [VI] and the transition metal compound (a-3) represented by the general formula [VII] are substituted phenyl groups containing an oxygen-containing group as the electron-donating substituent in the meta position or para position to the bond to the Y (for example, it is the bond to a carbon atom as Y, when the Y is a carbon atom), the oxygen-containing group is a group represented by the following general formula [III].

[Chem. 14]

$R^9$—O—   [III]

wherein $R^9$ is an atom or a substituent selected from hydrogen atoms, $C_1$-$C_{20}$ hydrocarbon groups, silicon-containing groups, nitrogen-containing groups and halogen-containing groups; and the line drawn on the right of O represents a bond to a phenyl group. Examples of the $C_1$-$C_{20}$ hydrocarbon groups, the silicon-containing groups, the nitrogen-containing groups and the halogen-containing groups as $R^9$ include the aforementioned specific examples of these substituents.

Such a transition metal compound (a-5) is represented by the following general formula [X].

[Chem. 15]

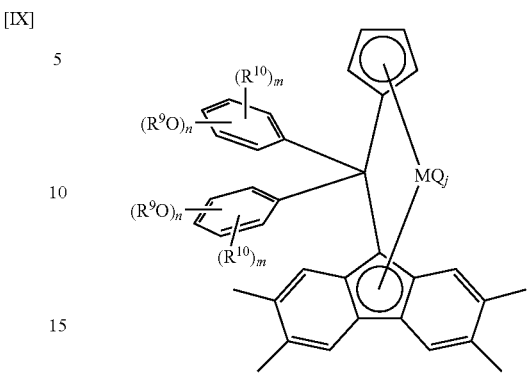

[X]

wherein M, Q and j are defined ah aforementioned.

$R^9$ and $R^{10}$, each of which may be the same or different, are atoms or substituents selected from hydrogen atoms, $C_1$-$C_{20}$ hydrocarbon groups, silicon-containing groups, nitrogen-containing groups, oxygen-containing groups, halogen atoms and halogen-containing groups;

adjacent substituents to $R^{10}$ may be bound together to form a ring;

$OR^9$ is an oxygen-containing group having a substituent constant σ of −0.2 or less in the Hammett's rule;

when the oxygen-containing group exists in plurality, each of the oxygen-containing groups may be the same or different;

n is an integer of 1 to 3; and m is an integer of 0 to 4.

The transition metal compound (a-5) has an even lower a in the Hammett's rule for $OR^9$ represented by the general formula [III] and thereby exerts a significant effect for achievement of, above all, (1) among the problems to be solved by the present invention 1.

It is preferred that M is a hafnium atom in the transition metal compound (a) represented by the general formula [I], the transition metal compound (a-1) represented by the general formula [V], the transition metal compound (a-2) represented by the general formula [VI], the transition metal compound (a-3) represented by the general formula [VII], the transition metal compound (a-4) represented by the general formula [IX] and the transition metal compound (a-5) represented by the general formula [X]. When an ethylene, an α-olefin having three or more carbon atoms, and a non-conjugated polyene are copolymerized in the presence of an olefin polymerization catalyst including the transition metal compound wherein M is a hafnium atom, the advantages are obtained that the produced ethylene/α-olefin/non-conjugated polyene copolymer and the below-mentioned ethylene-based copolymer A have an even higher molecular weight and that the copolymerization performance of the non-conjugated polyene is enhanced.

(Illustrative Examples of Transition Metal Compound (a))

Examples of such a transition metal compound (a) include: [dimethylmethylene($\eta^5$-cyclopentadienyl) ($\eta^5$-2,3, 6,7-tetramethylfluorenyl)]hafniumdichloride, [diethylmethylene($\eta^5$-cyclopentadienyl) ($\eta^5$-2,3,6,7-tetramethylfluorenyl)]hafniumdichloride, [di-n-butylmethylene($\eta^5$-cyclopentadienyl) ($\eta^5$-2,3,6,7-tetramethylfluorenyl)] hafniumdichloride, [dicyclopentylmethylene($\eta^5$-cyclopentadienyl) ($\eta^5$-2,3,6,7-tetramethylfluorenyl)] hafniumdichloride, [dicyclohexylmethylene($\eta^5$-cyclopentadienyl) ($\eta^5$-2,3,6,7-tetramethylfluorenyl)]

hafniumdichloride, [cyclopentylidene($\eta^5$-cyclopentadienyl) ($\eta^5$-2,3,6,7-tetramethylfluorenyl)]hafniumdichloride, [cyclohexylidyne($\eta^5$-cyclopentadienyl) ($\eta^5$-2,3,6,7-tetramethylfluorenyl)]hafniumdichloride, [diphenylmethylene($\eta^5$-cyclopentadienyl) ($\eta^5$-2,3,6,7-tetramethylfluorenyl)] hafniumdichloride, [di-1-naphthylmethylene($\eta^5$-cyclopentadienyl) ($\eta^5$-2,3,6,7-tetramethylfluorenyl)] hafniumdichloride, [di-2-naphthylmethylene($\eta^5$-cyclopentadienyl) ($\eta^5$-2,3,6,7-tetra methylfluorenyl)] hafniumdichloride, [bis(3-methylphenyl)methylene($\eta^5$-cyclopentadienyl) ($\eta^5$-2,3,6,7-tetramethylfluorenyl)] hafniumdichloride, [bis(4-methylphenyl)methylene($\eta^5$-cyclopentadienyl) ($\eta^5$-2,3,6,7-tetramethylfluorenyl)] hafniumdichloride, [bis(3, 4-dimethylphenyl)methylene($\eta^5$-cyclopentadienyl) ($\eta^5$-2,3,6,7-tetramethylfluorenyl)] hafniumdichloride, [bis(4-n-hexylphenyl)methylene($\eta^5$-cyclopentadienyl) ($\eta^5$-2,3,6,7-tetramethylfluorenyl)] hafniumdichloride, [bis(4-cyclohexylphenyl)methylene($\eta^5$-cyclopentadienyl) ($\eta^5$-2,3,6,7-tetramethylfluorenyl)] hafniumdichloride, [bis(4-t-butylphenyl)methylene($\eta^5$-cyclopentadienyl) ($\eta^5$-2,3,6,7-tetramethylfluorenyl)] hafniumdichloride, [bis(3-methoxyphenyl)methylene($\eta^5$-cyclopentadienyl) ($\eta^5$-2,3,6,7-tetramethylfluorenyl)] hafniumdichloride, [bis(4-methoxyphenyl)methylene($\eta^5$-cyclopentadienyl) ($\eta^5$-2,3,6,7-tetramethylfluorenyl)] hafniumdichloride, [bis(3, 4-dimethoxyphenyl)methylene ($\eta^5$-cyclopentadienyl) ($\eta^5$-2,3,6,7-tetramethylfluorenyl)] hafniumdichloride, [bis(4-methoxy-3-methylphenyl)methylene($\eta^5$-cyclopentadienyl)($\eta^5$-2,3,6,7-tetramethylfluorenyl)]hafniumdichloride, [bis(4-methoxy-3,4-dimethylphenyl)methylene($\eta^5$-cyclopentadienyl) ($\eta^5$-2,3,6,7-tetramethylfluorenyl)]hafniumdichloride, [bis(4-ethoxyphenyl)methylene($\eta^5$-cyclopentadienyl) ($\eta^5$-2,3,6,7-tetramethylfluorenyl)]hafniumdichloride, [bis(4-phenoxyphenyl)methylene($\eta^5$-cyclopentadienyl) ($\eta^5$-2,3,6,7-tetramethylfluorenyl)]hafniumdichloride, [bis[4-(trimethylsiloxy)phenyl]methylene($\eta^5$-cyclopentadienyl) ($\eta^5$-2,3,6,7-tetramethylfluorenyl)]hafniumdichloride, [bis [3-(dimethylamino)phenyl]methylene($\eta^5$-cyclopentadienyl) ($\eta^5$-2,3,6,7-tetramethylfluorenyl)]hafniumdichloride, [bis [4-(dimethylamino)phenyl]methylene($\eta^5$-cyclopentadienyl) ($\eta^5$-2,3,6,7-tetramethylfluorenyl)]hafniumdichloride, [bis (4-N-morpholinylphenyl)methylene($\eta^5$-cyclopentadienyl) ($\eta^5$-2,3,6,7-tetramethylfluorenyl)]hafniumdichloride, [bis [4-(trimethylsilyl)phenyl]methylene($\eta^5$-cyclopentadienyl) $\eta^5$-2,3,6,7-tetramethylfluorenyl)]hafniumdichloride, [bis(3-chlorophenyl)methylene($\eta^5$-cyclopentadienyl) ($\eta^5$-2,3,6,7-tetramethylfluorenyl)]hafniumdichloride, [bis(4-chlorophenyl)methylene($\eta^5$-cyclopentadienyl) ($\eta^5$-2,3,6,7-tetramethylfluorenyl)]hafniumdichloride, [bis(3-fluorophenyl)methylene($\eta^5$-cyclopentadienyl) ($\eta^5$-2,3,6,7-tetramethylfluorenyl)]hafniumdichloride, [bis(4-fluorophenyl)methylene($\eta^5$-cyclopentadienyl) ($\eta^5$-2,3,6,7-tetramethylfluorenyl)]hafniumdichloride, [bis(3-(trifluoromethyl)phenyl]methylene($\eta^5$-cyclopentadienyl) ($\eta^5$-2,3,6,7-tetramethylfluorenyl)]hafniumdichloride, [bis [4-(trifluoromethyl)phenyl]methylene($\eta^5$-cyclopentadienyl) ($\eta^5$-2,3,6,7-tetramethylfluorenyl)]hafniumdichloride, [methylphenylmethylene($\eta^5$-cyclopentadienyl) ($\eta^5$-2,3,6,7-tetramethylfluorenyl)]hafniumdichloride, [methyl(4-methylphenyl)methylene($\eta^5$-cyclopentadienyl) ($\eta^5$-2,3,6,7-tetramethylfluorenyl)]hafniumdichloride, [methyl(4-methoxyphenyl)methylene($\eta^5$-cyclopentadienyl) ($\eta^5$-2,3,6,7-tetramethylfluorenyl)]hafniumdichloride, [methyl[4-(dimethylamino)phenyl]methylene($\eta^5$-cyclopentadienyl) ($\eta^5$-2,3,6,7-tetramethylfluorenyl)]hafniumdichloride, [methyl(4-N-morpholinylphenyl)methylene($\eta^5$-cyclopentadienyl) $\eta^5$-2,3,6,7-tetramethylfluorenyl)]hafniumdichloride, [dimethylsilylene($\eta^5$-cyclopentadienyl) ($\eta^5$-2,3,6,7-tetramethyl fluorenyl)]hafniumdichloride, [diethylsilylene($\eta^5$-cyclopentadienyl) ($\eta^5$-2,3,6,7-tetramethylfluorenyl)]hafniumdichloride, [dicyclohexylsilylene($\eta^5$-cyclopentadienyl) ($\eta^5$-2,3,6,7-tetramethylfluorenyl)]hafniumdichloride, [diphenylsilylene($\eta^5$-cyclopentadienyl) ($\eta^5$-2,3,6,7-tetramethyl fluorenyl)]hafniumdichloride, [di(4-methylphenyl)silylene($\eta^5$-cyclopentadienyl) ($\eta^5$-2,3,6,7-tetramethylfluorenyl)]hafniumdichloride, [dimethylgermylene($\eta^5$-cyclopentadienyl) ($\eta^5$-2,3,6,7-tetramethylfluorenyl)]hafniumdichloride, [diphenylgermylene($\eta^5$-cyclopentadienyl) ($\eta^5$-2,3,6,7-tetramethylfluorenyl)]hafniumdichloride, [1-($\eta^5$-cyclopentadienyl)-2-($\eta^5$-2,3,6,7-tetramethylfluorenyl)ethylene]hafniumdichloride, [1-($\eta^5$-cyclopentadienyl)-3-($\eta^5$-2,3,6,7-tetramethylfluorenyl) propylene]hafniumdichloride, [1-($\eta^5$-cyclopentadienyl)-2-($\eta^5$-2,3,6,7-tetramethylfluorenyl)-1,1,2,2-tetramethylsilylene]hafniumdichloride, [1-($\eta^5$-cyclopentadienyl)-2-($\eta^5$-2,3,6,7-tetramethylfluorenyl) phenylene]hafniumdichloride; and compounds wherein the hafnium atom of these compounds is substituted with a zirconium atom, or compounds where the chloro-ligand is substituted with a methyl group; but the transition metal compound (a) is not limited to these examples.

<Method for Manufacturing Transition Metal Compound>

The transition metal compound can be manufactured by a known method and is not limited to a particular manufacturing method. The manufacturing can be done according to the methods described in, for example, J. Organomet. Chem., 63, 509(1996) and the publications according to the applications filed by the present applicant: WO2006/123759, WO01/27124, JP-A No. 2004-168744, JP-A No. 2004-175759, JP-A No. 2000-212194, and so on.

<Compound (b)>

The method for manufacturing an ethylene/α-olefin/non-conjugated polyene copolymer according to the present invention 1 is characterized in that an ethylene, an α-olefin having three or more carbon atoms, and a non-conjugated polyene are copolymerized in the presence of a polymerization catalyst containing the bridged metallocene compound (a) and at least one compound (b) that is selected from organometallic compounds (b-1), organoaluminum oxy-compounds (b-2) and compounds (b-3) which react with the transition metal compound (a) to form an ion pair.

As the organometallic compound (b-1), specifically such organometallic compounds in Groups 1, 2, 12 and 13 of the periodic table as below-mentioned are used.

An organoaluminum compound represented by:

  (b-1a) general formula:

wherein $R^a$ and $R^b$, each of which may be the same or different, represent a $C_1$-$C_{15}$, preferably $C_1$-$C_4$ hydrocarbon group;

X represents a halogen atom;

m, n, p and q are numbers defined as 0<m 3, 0≤n<3, 0≤p<3, 0≤q<3; and m+n+p+q=3.

Examples of such a compound include tri-n-alkylaluminums such as trimethylaluminum, triethylaluminum, tri-n-butylaluminum, tri-n-hexylaluminum and tri-n-octylaluminum;

tri-branched-alkylaluminums such as triisopropylaluminum, triisobutylaluminum, tri-sec-butylaluminum, tri-t-butylaluminum, tri-2-methylbutylaluminum, tri-3-methylhexylaluminum and tri-2-ethylhexylaluminum;

tricycloalkylaluminums such as tricyclohexylaluminum and tricyclooctylaluminum;

triarylaluminums such as triphenylaluminum and tri(4-methylphenyl)aluminum;

dialkylaluminumhydrides such as diisopropylaluminumhydride and diisobutylaluminumhydride;

alkenylaluminums such as isoprenylaluminum represented by the general formula $(i\text{-}C_4H_9)_xAl_y(C_5H_{10})_z$, wherein x, y and z are positive numbers, and $z \leq 2x$);

alkylaluminumalkoxides such as isobutylaluminummethoxide and isobutylaluminumethoxide;

dialkylaluminumalkoxides such as dimethylaluminummethoxide, diethylaluminumethoxide and dibutylaluminumbutoxide;

alkylaluminumsesquialkoxides such as ethylaluminumsesquiethoxide and butylaluminumsesquibutoxide;

partially alcoxylated alkylaluminums having an average composition represented by the general formula $R^a{}_{2.5}Al(OR^b)_{0.5}$ and the like;

alkylaluminumaryloxides such as diethylaluminumphenoxide and diethylaluminum(2,6-di-t-butyl-4-methylphenoxide);

dialkylaluminumhalides such as dimethylaluminumchloride, diethylaluminumchloride, dibutylaluminumchloride, diethylaluminumbromide and diisobutylaluminumchloride; alkylaluminumsesquihalides such as ethylaluminumsesquichloride, butylaluminumsesquichloride and ethylaluminumsesquibromide; partially halogenated alkylaluminums including alkylaluminumdihalides such as ethylaluminumdichloride; dialkylaluminumhydrides such as diethylaluminumhydride and dibutylaluminumhydride;

alkylaluminumdihydrides such as ethylaluminumdihydride and propylaluminumdihydride, and other partially hydrogenated alkylaluminums, partially alcoxylated and halogenated alkylaluminums such as ethylaluminumethoxychloride, butylaluminumbutoxychloride and ethylaluminumethoxybromide.

Compounds similar to the compounds represented by the general formula $R^a{}_mAl(OR^b)_nH_pX_q$ can also be used, examples of which compounds include, for example, an organoaluminum compound wherein two or more aluminum compounds are bound via a nitrogen atom. Examples of such a compound specifically include $(C_2H_5)_2AlN(C_2H_5)Al(C_2H_5)_2$, and the like.

A complex alkylated compound of a metal of Group 1 of the periodic table and aluminum, represented by:

$M^2AlR^a{}_4$      (b-1b) general formula:

wherein $M^2$ represents Li, Na or K; and $R^a$ represents a $C_1$-$C_{15}$, preferably $C_1$-$C_4$ hydrocarbon group.

Examples of such a compound include $LiAl(C_2H5)_4$, $LiAl(C_7H_{15})_4$, and the like.

A dialkyl compound of a metal of Group 2 or 12 of the periodic table, represented by:

$R^aR^bM^3$      (b-1c) general formula:

wherein $R^a$ and $R^b$, each of which may be the same or different, represent $C_1$-$C_{15}$, preferably $C_1$-$C_4$ hydrocarbon groups; and $M^3$ is Mg, Zn or Cd.

As the organoaluminum oxy-compound (b-2), a conventionally known aluminoxane can be used as it is. Specifically, examples of such a compound include a compound represented by the general formula [XI]:

[Chem. 16]

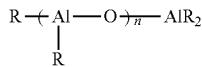

and/or the general formula [XII]:

[Chem. 17]

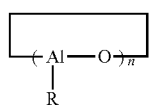

wherein R is a $C_1$-$C_{10}$ hydrocarbon group and n is an integer of 2 or more. In particular, a methylaluminoxane wherein R is a methyl group and wherein n is 3 or more, preferably 10 or more, is used. These aluminoxanes may have a slight amount of organoaluminum compounds mixed thereinto. When, in the present invention, an ethylene, an α-olefin having three or more carbon atoms, and a non-conjugated polyene are copolymerized at high temperature, a benzene-insoluble organoaluminum oxy-compound such as exemplified in JP-A No. H02-78687 may also be applied. An organoaluminum oxy-compound described in JP-A No. H02-167305, an aluminoxane with two or more kinds of alkyl groups described in JP-A No. H02-24701 and JP-A No. H03-103407, and the like may also be preferably utilized. In this regard, the "benzene-insoluble organoaluminum oxy-compound" which may be used in the olefin polymerization according to the present invention has an Al content dissolved in benzene at 60° C. at typically 10% or less, preferably 5% or less, particularly preferably 2% or less based on the conversion to Al atoms, and is an insoluble or poorly-soluble compound to benzene.

Examples of an organoaluminum compound used in preparing an aluminoxane include an organoaluminum similar to the one exemplified as the organoaluminum compound of (b-1a) above. Among these, trialkylaluminums and tricycloalkylaluminums are preferable, and trimethylaluminum is particularly preferable. These organoaluminum compounds can be used singly or in combination of two or more species.

Examples of the organoaluminum oxy-compound (b-2) also include a modified methylaluminoxane such as the one represented by the following general formula [XIII], and the like.

[Chem. 18]

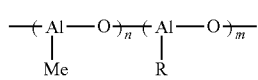

wherein R represents a $C_1$-$C_{10}$ hydrocarbon group and each of m and n is independently an integer of 2 or more.

This modified methylaluminoxane is prepared using trimethylaluminum and an alkylaluminum other than trimethylaluminum. Such a compound is generally referred to as MMAO. Such MMAO can be prepared by a method described in US U.S. Pat. Nos. 4,960,878 and 5,041,584. A compound which is prepared using trimethylaluminum and triisobutylaluminum and wherein R is an isobutyl group is also commercially available under the name of MMAO, TMAO, and the like from Tosoh Finechem Corporation. Such MMAO is an aluminoxane whose solubility and preservation stability to various solvents have been improved, and is soluble in an aliphatic hydrocarbon or an alicyclic hydrocarbon, specifically unlike compounds which are insoluble or poorly-soluble to benzene in compounds represented by the formula [XI] and [XII].

Further, examples of the organoaluminum oxy-compound (b-2) also include boron-containing organoaluminum oxy-compounds represented by the general formula [XIV].

[Chem. 19]

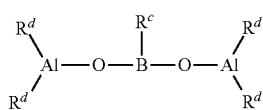

[XIV]

wherein $R^c$ represents a $C_1$-$C_{10}$ hydrocarbon group; and $R^d$ may each be the same or different and represents a hydrogen atom, a halogen atom or a $C_1$-$C_{10}$ hydrocarbon group.

Examples of the compound (b-3) which reacts with the transition metal compound (a) to form an ion pair (hereinafter may be referred to as "ionized ionic compound" or simply "ionic compound" for short) include Lewis acids, ionic compounds, borane compounds and carborane compounds described in JP-A No. H01-501950, JP-A No. H01-502036, JP-A No. H03-179005, JP-A No. H03-179006, JP-A No. H03-207703, JP-A No. H03-207704, U.S. Pat. No. 5,321,106, and so on. Further examples include heteropoly compounds and isopoly compounds. However, organoaluminum oxy-compounds of the aforementioned (b-2) are not included.

An ionized ionic compound preferably used in the present invention 1 is a boron compound represented by the following general formula [XV].

[Chem. 20]

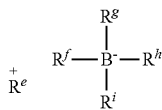

[XV]

In this formula, $R^{e+}$ is $H^+$, carbenium cation, oxonium cation, ammonium cation, phsphonium cation, cycloheptyltrienyl cation, ferrocenium cation having a transition metal, or the like. $R^f$ to $R^i$ may be the same as or different from each other and are each a substituent selected from a $C_1$-$C_{20}$ hydrocarbon group, a silicon-containing group, a nitrogen-containing group, an oxygen-containing group, a halogen atom and a halogen-containing group, preferably a substituted aryl group.

Specific examples of the carbenium cations include tri-substituted carbenium cations, such as triphenylcarbenium cation, tris(4-methylphenyl)carbenium cation and tris(3,5-dimethylphenyl)carbenium cation.

Specific examples of the ammonium cations include trialkyl-substituted ammonium cations, such as trimethylammonium cation, triethylammonium cation, tri(n-propyl)ammonium cation, triisopropylammonium cation, tri(n-butyl) ammonium cation and triisobutylammonium cation, N,N-dialkylanilinium cations, such as N,N-dimethylanilinium cation, N,N-diethylanilinium cation and N,N-2,4,6-pentamethylanilinium cation, and dialkylammonium cations, such as diisopropylammonium cation and dicyclohexylammonium cation.

Specific examples of the phosphonium cations include triarylphosphonium cations, such as triphenylphosphonium cation, tris(4-methylphenyl)phosphonium cation and tris(3, 5-dimethylphenyl)phosphonium cation.

Of the above specific examples, carbenium cation, ammonium cation or the like is preferable as $R^{e+}$, and in particular, triphenylcarbenium cation, N,N-dimethylanilinium cation or N,N-diethylanilium cation is preferable.

Examples of compounds containing carbenium cation, among the ionized ionic compounds preferably used in the present invention 1, include triphenylcarbenium tetraphenylborate, triphenylcarbenium tetrakis(pentafluorophenyl) borate, triphenylcarbenium tetrakis[3,5-di-(trifluoromethyl) phenyl]borate, tris(4-methylphenyl)carbenium tetrakis (pentafluorophenyl)borate and tris(3,5-dimethylphenyl) carbenium tetrakis(pentafluorophenyl)borate.

Examples of compounds containing a trialkyl-substituted ammonium cation, among the ionized ionic compounds preferably used in the present invention 1, include triethylammonium tetraphenylborate, tripropylammonium tetraphenylborate, tri(n-butyl)ammonium tetraphenylborate, trimethylammonium tetrakis(4-methylphenyl)borate, trimethylammonium tetrakis(2-methylphenyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri (n-butyl)ammonium tetrakis(3,5-dimethylphenyl)borate, tri (n-butyl)ammonium tetrakis[4-(trifluoromethyl)phenyl]borate, tri(n-butyl)ammonium tetrakis[3,5-di(trifluoromethyl) phenyl]borate, tri(n-butyl)ammonium tetrakis(2-methylphenyl)borate, dioctadecylmethylammonium tetraphenylborate, dioctadecylmethylammonium tetrakis(4-methylphenyl)borate, dioctadecylmethylammonium tetrakis (4-methylphenyl)borate, dioctadecylmethylammonium tetrakis(pentafluorophenyl)borate, dioctadecylmethylammonium tetrakis(2,4-dimethylphenyl) borate, dioctadecylmethylammonium tetrakis(3,5-dimethylphenyl)borate, dioctadecylmethylammonium tetrakis[4-(trifluoromethyl)phenyl]borate, dioctadecylmethylammonium tetrakis[3,5-di(trifluoromethyl)phenyl]borate and dioctadecylmethylammonium.

Examples of compounds containing a N,N-dialkylanilinium cation, among the ionized ionic compounds preferably used in the present invention 1, include N,N-dimethylanilinium tetraphenylborate, N,N-dimethylanilinium tetrakis(pentafluorophenyl)borate, N,N-dimethylanilinium tetrakis[3,5-di(trifluoromethyl)phenyl]borate, N,N-diethylanilinium tetraphenylborate, N,N-diethylanilinium tetrakis (pentafluorophenyl)borate, N,N-diethylanilinium tetrakis[3, 5-di(trifluoromethyl)phenyl]borate, N,N-2,4,6-pentamethylanilinium tetraphenylborate and N,N-2,4,6-pentamethylanilinium tetrakis(pentafluorophenyl)borate.

Examples of compounds containing a dialkylammonium cation, among the ionized ionic compounds preferably used in the present invention 1, include di-n-propylammonium tetrakis(pentafluorophenyl)borate and dicyclohexylammonium tetraphenylborate.

In addition, ionic compounds disclosed (JP-A No. 2004-51676) by the present applicant are also employable without any restriction.

The ionic compound (b-3) may be used singly, or two or more kinds thereof may be mixed and used.

As the organometallic compounds (b-1), preferable are trimethylaluminum, triethylaluminum and triisobutylaluminum, which are easily obtainable because of commercial products. Of these, triisobutylaluminum, which is easy to handle, is particularly preferable.

As the organoaluminum oxy-compound (b-2), methylaluminoxane, and MMAO that is prepared using trimethylaluminum and triisobutylaluminum, are preferable, since they are commercially available and easily obtainable. Among these, MMAO, whose solubility and preservation stability to various solvents have been improved, is particularly preferable.

As the compound (b-3) which reacts with the transition metal compound (a) to form an ion pair, triphenylcarbeniumte trakis(pentafluorophenyl)borate and N,N-dimethylaniliniumte trakis(pentafluorophenyl)borate are preferable because they are easily obtained as commercially available items and greatly contributory to improvement in polymerization activity.

As the at least one compound (b) selected from the compounds (b-1) to (b-3), a combination of triisobutylaluminum and triphenylcarbenium tetrakis(pentafluorophenyl)borate and a combination of triisobutylaluminum and N,N-dimethylanilinium tetrakis(pentafluorophenyl)borate are particularly preferable because polymerization activity is greatly enhanced.

<Carrier (C)>

In the present invention 1, a carrier (C) may be used as a constituent of the olefin polymerization catalyst, when needed.

The carrier (C) that can be used in the present invention 1 is an inorganic or organic compound and is a granular or fine particulate solid. Of such inorganic compounds, a porous oxide, an inorganic chloride, clay, a clay mineral or an ion-exchanging layered compound is preferable.

As the porous oxides, $SiO_2$, $Al_2O_3$, MgO, ZrO, $TiO_2$, $B_2O_3$, CaO, ZnO, BaO, $ThO_2$ and the like, and composites or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO, can be specifically used. Of these, porous oxides containing $SiO_2$ and/or $Al_2O_3$ as a main component are preferable. Such porous oxides differ in their properties depending upon the type and the production process, but a carrier preferably used in the present invention 1 has a particle diameter of 0.5 to 300 μm, preferably 1.0 to 200 μm, a specific surface area of 50 to 1000 $m^2/g$, preferably 100 to 700 $m^2/g$, and a pore volume of 0.3 to 3.0 $cm^3/g$. Such a carrier is used after it is calcined at 100 to 1000° C., preferably 150 to 700° C., when needed.

As the inorganic chloride, $MgCl_2$, $MgBr_2$, $MnCl_2$, $MnBr_2$ or the like is used. The inorganic chloride may be used as it is, or may be used after pulverized by a ball mill or an oscillating mill. Further, fine particles obtained by dissolving an inorganic chloride in a solvent such as an alcohol and then precipitating it using a precipitant may be used.

The clay usually comprises a clay mineral that is a main component. The ion-exchanging layered compound is a compound having a crystal structure in which constituent planes lie one upon another in parallel and are bonded to each other by ionic bonding or the like with a weak bonding force, and the ions contained are exchangeable. Most of the clay minerals are ion-exchanging layered compounds. These clay, clay mineral and ion-exchanging layered compound are not limited to natural ones, and artificial synthetic products can be also used. Examples of the clays, the clay minerals and the ion-exchanging layered compounds include clays, clay minerals and ionic crystalline compounds having layered crystal structures such as hexagonal closest packing type, antimony type, $CdCl_2$ type and $CdI_2$ type. Examples of such clays and clay minerals include kaolin, bentonite, Kibushi clay, gairome clay, allophane, hisingerite, pyrophyllite, mica group, montmorillonite, vermiculite, chlorite group, palygorskite, kaolinite, nacrite, dickite and halloysite.

Examples of the ion-exchanging layered compounds include crystalline acidic salts of polyvalent metals, such as α-$Zr(HAsO_4)_2.H_2O$, α-$Zr(HPO_4)_2$, α-$Zr(KPO_4)_2.3H_2O$, α-$Ti(HPO_4)_2$, α-$Ti(HAsO_4)_2.H_2O$, α-$Sn(HPO_4)_2.H_2O$, γ-$Zr(HPO_4)_2$, γ-$Ti(HPO_4)_2$ and γ-$Ti(NH_4PO_4)_2.H_2O$. It is preferable to subject the clays and the clay minerals for use in the present invention 1 to chemical treatment. As the chemical treatment, any of surface treatments to remove impurities adhering to a surface and treatments having influence on the crystal structure of clay can be used. Specific examples of the chemical treatments include acid treatment, alkali treatment, salts treatment and organic substance treatment.

The ion-exchanging layered compound may be a layered compound in which spacing between layers has been enlarged by exchanging exchangeable ions present between layers with other large bulky ions. Such a bulky ion plays a pillar-like role to support a layer structure and is usually called pillar. Introduction of another substance (guest compound) between layers of a layered compound as above is referred to as "intercalation". Examples of the guest compounds include cationic inorganic compounds, such as $TiCl_4$ and $ZrCl_4$, metallic alkoxides, such as $Ti(OR)_4$, $Zr(OR)_4$, $PO(OR)_3$ and $B(OR)_3$ (R is a hydrocarbon group or the like), and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds are used singly or in combination of two or more kinds. During intercalation of these compounds, polymerization products obtained by subjecting metallic alkoxides such as $Si(OR)_4$, $Al(OR)_3$ and $Ge(OR)_4$ (R is a hydrocarbon group or the like) to hydrolysis polycondensation, colloidal inorganic compounds such as $SiO_2$, etc. may be allowed to coexist. As the pillar, an oxide formed by intercalating the above metallic hydroxide ion between layers and then performing thermal dehydration, or the like can be mentioned. Of the above carriers, preferable are clays and clay minerals, and particularly preferable are montmorillonite, vermiculite, pectolite, teniorite and synthetic mica.

As the organic compound functioning as the carrier (C), a granular or fine particulate solid having a particle diameter of 0.5 to 300 μm can be mentioned. Specific examples thereof include (co) polymers produced using, as a main component, a $C_2$-$C_{14}$ α-olefin, such as ethylene, propylene, 1-butene and 4-methyl-1-pentene, (co)polymers produced using, as a main component, vinylcyclohexane or styrene, and modified products thereof.

<Copolymerization of Ethylene, α-Olefin and Non-Conjugated Polyene Using the Above Olefin Polymerization Catalyst>

The production process for an ethylene/α-olefin/non-conjugated polyene copolymer according to the present invention 1 is characterized by copolymerizing ethylene, an α-olefin having three or more carbon atoms and a non-conjugated polyene in the presence of the above-mentioned olefin polymerization catalyst.

Examples of an α-olefin having three or more carbon atoms used in the present invention 1 include $C_3$-$C_{20}$ straight-chain or branched α-olefins such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, and vinyl cyclohexane. As an α-olefin, a $C_3$-$C_{10}$ α-olefin, for example, a $C_3$-$C_{10}$ straight-chain or branched α-olefin is preferable, propylene, 1-butene, 1-hexene and 1-octene are more preferable, propylene and 1-butene are still more preferable, and propylene is particularly preferable. These α-olefins can be used singly or in combination of two or more species. In selecting, it is possible to make a selection so that the produced copolymer will be most desirable in terms of properties. For example, it is possible to select a kind of α-olefin so that the ethylene/α-olefin/non-conjugated polyene copolymer obtained according to the present invention 1 or a mixture including the copolymer will have desirable properties when vulcanized.

As a non-conjugated polyene used in the present invention 1, a compound having two or more non-conjugated unsaturated bonds can be used without limitation, examples of which compound include, for example, the below-mentioned non-conjugated cyclic polyene and non-conjugated chain polyene, and can be used singly or in combination of two or more species.

[Non-Conjugated Cyclic Polyene]

Specifically, examples of a non-conjugated cyclic polyene include a compound represented by the following general formula [IV].

[Chem. 21]

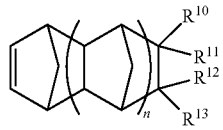

[IV]

wherein n is an integer of 0 to 2;

$R^{10}$, $R^{11}$, $R^{12}$ and $R^{13}$, each of which may be the same or different, are atoms or substituents selected from hydrogen atoms, $C_1$-$C_{20}$ hydrocarbon groups, silicon-containing groups, nitrogen-containing groups, oxygen-containing groups, halogen atoms, and halogen-containing groups, which hydrocarbon groups may have a double bond;

two optional substituents of $R^{10}$ to $R^{13}$ may be bound together to form a ring, the ring may have a double bond, $R^{10}$ and $R^{11}$, or $R^{12}$ and $R^{13}$ may form an alkylidene group, and $R^{10}$ and $R^{12}$, or $R^{11}$ and $R^{13}$ may be bound together to form a double bond; and at least one requirement of the following (i) to (iv) is satisfied:

(i) at least one of $R^{10}$ to $R^{13}$ is a hydrocarbon group having one or more double bonds;

(ii) two optional substituents of $R^{10}$ to $R^{13}$ are bound together to form a ring and the ring contains a double bond;

(iii) $R^{10}$ and $R^{11}$, or $R^{12}$ and $R^{13}$ form an alkylidene group; and (iv) $R^{10}$ and $R^{12}$, or $R^{11}$ and $R^{13}$ are bound together to form a double bond.

Specific examples of $C_1$-$C_{20}$ hydrocarbon groups, silicon-containing groups, nitrogen-containing groups, oxygen-containing groups, halogen atoms and halogen-containing groups, which are given as $R^{10}$, $R^{11}$, $R^{12}$ and $R^{13}$ in the general formula [IV], include specific examples of these atoms and substituents given in the description of the general formula [I].

When, in the general formula [IV], any one or more of $R^{10}$, $R^{11}$, $R^{12}$ and $R^{13}$ are hydrocarbon groups having one or more double bonds, examples of such a hydrocarbon group include ethenyl groups (vinyl groups), 1-propenyl groups, 2-propenyl groups (allyl groups), 1-methylethenyl groups (isopropenyl groups), 1-butenyl groups, 2-butenyl groups, 3-butenyl groups, 1, 4-hexadienyl groups, and the like. For example, when $R^{10}$ is an ethenyl group (vinyl group), the compound of the general formula [IV] can be represented by the following general formula [IV-I].

[Chem. 22]

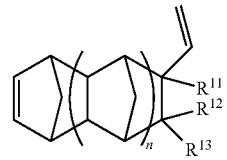

[IV-I]

wherein n is an integer of 0 to 2;

$R^{11}$, $R^{12}$ and $R^{13}$, each of which may be the same or different, are atoms or substituents selected from hydrogen atoms, $C_1$-$C_{20}$ hydrocarbon groups, silicon-containing groups, nitrogen-containing groups, oxygen-containing groups, halogen atoms and halogen-containing groups, which hydrocarbon groups may have a double bond; and two optional substituents of $R^{11}$ to $R^{13}$ may be bound together to form a ring, the ring may have a double bond, $R^{12}$ and $R^{13}$ may form an alkylidene group, and $R^{11}$ and $R^{13}$ may be bound together to form a double bond.

When, in the general formula [IV], two optional substituents of $R^{10}$ to $R^{13}$ are bound together to form a ring and the ring contains a double bond, a compound of the general formula [IV] can be represented by, for example, the following general formula [IV-II] or [IV-III].

[Chem. 23]

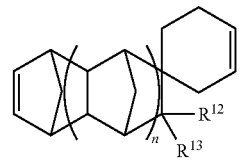

[IV-II]

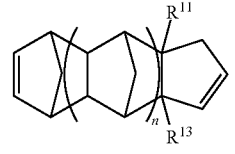

[IV-III]

wherein n is an integer of 0 to 2;

$R^{11}$, $R^{12}$ and $R^{13}$, each of which may be the same or different, are atoms or substituents selected from hydrogen atoms, $C_1$-$C_{20}$ hydrocarbon groups, silicon-containing groups, nitrogen-containing groups, oxygen-containing groups, halogen atoms, or halogen-containing groups, which hydrocarbon groups may have a double bond; and two optional substituents of $R^{11}$ to $R^{13}$ may be bound together to form a ring, the ring may have a double bond, $R^{12}$ and $R^{13}$ may form an alkylidene group, and $R^{11}$ and $R^{13}$ may be bound together to form a double bond.

When, in the general formula [IV], $R^{10}$ and $R^{11}$, or $R^{12}$ and $R^{13}$ form an alkylidene group, the alkylidene group is usually a $C_1$-$C_{20}$ alkylidene group, and specific examples thereof include methylene groups ($CH_2$=), ethylidene groups ($CH_3CH$=), propylidene groups ($CH_3CH_2CH$=) and isopropylidene groups (($CH_3)_2C$=). For example, when $R^{10}$ and $R^{11}$ form an ethylidene group, a compound of the general formula [IV] can be represented by the following general formula [IV-IV].

[Chem. 24]

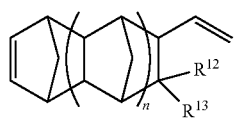

[IV-IV]

wherein n is an integer of 0 to 2;

$R^{12}$ and $R^{13}$, each of which may be the same or different, are atoms or substituents selected from hydrogen atoms, $C_1$-$C_{20}$ hydrocarbon groups, silicon-containing groups, nitrogen-containing groups, oxygen-containing groups, halogen atoms and halogen-containing groups, which hydrocarbon groups may have a double bond; and $R^{12}$ and $R^{13}$ may be bound together to form a ring, the ring may have a double bond, and $R^{12}$ and $R^{13}$ may form an alkylidene group.

When, in the general formula [IV], $R^{10}$ and $R^{12}$, or $R^{11}$ and $R^{13}$ are bound together to form a double bond, a compound of the general formula [IV] can be represented by, for example, the following general formula [IV-V].

[Chem. 25]

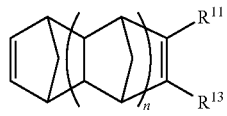

[IV-V]

wherein n is an integer of 0 to 2;

$R^{11}$ and $R^{13}$, each of which may be the same or different, are substituents selected from hydrogen atoms, $C_1$-$C_{20}$ hydrocarbon groups, silicon-containing groups, nitrogen-containing groups, oxygen-containing groups, halogen atoms and halogen-containing groups, which hydrocarbon groups may have a double bond; and $R^{11}$ and $R^{13}$ may be bound together to form a ring, and the ring may have a double bond.

Among non-conjugated cyclic polyenes represented by the general formula [IV], examples of a compound which is a hydrocarbon group wherein at least one of $R^{10}$ to $R^{13}$ has one or more double bonds include, for example, 5-vinyl-2-norbornene (VNB), the following compound, and the like. Among these, 5-vinyl-2-norbornene (VNB) is preferable.

[Chem. 26]

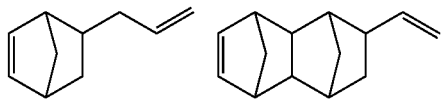

Among non-conjugated cyclic polyenes represented by the general formula [IV], examples of a compound wherein two optional substituents of $R^{10}$ to $R^{13}$ are bound together to form a ring and the ring contains a double bond include, for example, dicyclopentadiene (DCPD), dimethyl dicyclopentadiene, or the following compounds, and the like. Among these, dicyclopentadiene (DCPD) is preferable.

[Chem. 27]

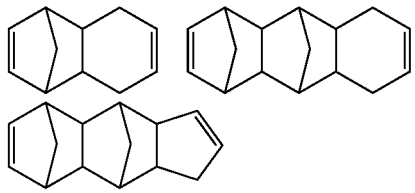

Among non-conjugated cyclic polyenes represented by the general formula [IV], examples of a compound wherein an alkylidene group is formed by $R^{10}$ and $R^{11}$, or $R^{12}$ and $R^{13}$, include 5-methylene-2-norbornene, 5-ethylidene-2-norbornene (ENB), 5-isopropylidene-2-norbornene or the following compounds, and the like. Among these, 5-ethylidene-2-norbornene (ENB) is preferable.

[Chem. 28]

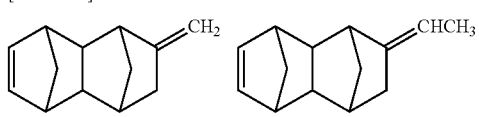

Among non-conjugated cyclic polyenes represented by the general formula [IV], the following is preferable as a compound wherein $R^{10}$ and $R^{12}$, or $R^{11}$ and $R^{13}$ are bound together to form a double bond.

[Chem. 29]

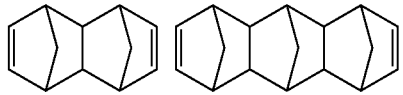

As a non-conjugated cyclic polyene represented by the general formula [IV], a non-conjugated cyclic polyene wherein n is 0 is preferable, and, among others, an alkylidene group-substituted non-conjugated cyclic polyene wherein n is 0 in the general formula [IV], a double bond-containing ring-substituted non-conjugated cyclic polyene wherein n is 0, a double bond-containing hydrocarbon group-substituted non-conjugated cyclic polyene in the general formula [IV] are preferable. Specifically 5-ethylidene-2-norbornene (ENB), dicyclopentadiene (DCPD), and 5-vinyl-2-norbornene(VNB) are preferable. Among these, 5-ethylidene-2-norbornene (ENB) or 5-vinyl-2-norbornene (VNB) is particularly preferable.

[Non-Conjugated Chain Polyene]

Specifically, examples of a non-conjugated chain polyene include, for example, 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 6,7-dimethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 6,7-dimethyl-1,6-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, and the like.

Examples of other non-conjugated chain polyenes include, for example, α,ω-diene such as 1,7-octadiene or 1,9-decadiene.

Examples of other non-conjugated chain polyenes include, for example, a non-conjugated triene or tetraene represented by the following general formula [XVI-I].

[Chem. 30]

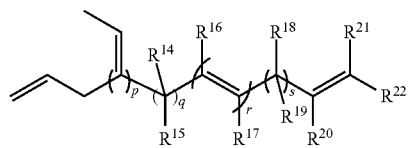

[XVI-I]

wherein p and r are 0 or 1 with the proviso that both p and r are not 0;

q is an integer of 0 to 5 with the proviso that q is not 0 when both p and r are 1;

s is an integer of 1 to 6;

each of $R^{14}$, $R^{15}$, $R^{16}$, $R^{17}$, $R^{18}$, $R^{19}$ and $R^{20}$ is independently a hydrogen atom or a $C_1$-$C_3$ alkyl group;

$R^{21}$ is a $C_1$-$C_3$ alkyl group; and $R^{22}$ is a hydrogen atom, a $C_1$-$C_3$ alkyl group or a group represented by —$(CH_2)_n$—$CR^{23}$=$C(R^{24})R^{25}$ wherein n is an integer of 1 to 5, each of $R^{23}$ and $R^{24}$ is independently a hydrogen atom or a $C_1$-$C_3$ alkyl group, and $R^{25}$ is a $C_1$-$C_3$ alkyl group.

However, when both p and r are 1, $R^{22}$ is a hydrogen atom or a $C_1$-$C_3$ alkyl group.

Among non-conjugated trienes or tetraenes represented by the general formula [XVI-I], a non-conjugated triene represented by the following general formula [XVI-II] is preferable.

[Chem. 31]

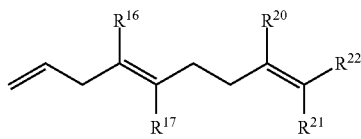

[XVI-II]

wherein each of $R^{16}$, $R^{17}$, $R^{20}$, $R^{21}$ and $R^{22}$ is independently a hydrogen atom, a methyl group or an ethyl group. However, both $R^{21}$ and $R^{22}$ are not hydrogen atoms.

a non-conjugated triene represented by the general formula [XVI-II] is a non-conjugated triene wherein, in a non-conjugated triene or tetraene represented by the general formula [XVI-I], p is 0, q is 0, r is 1, s is 2, and $R^{18}$ and $R^{19}$ are hydrogen atoms. Further, among non-conjugated trienes represented by the general formula [XVI-II], a compound wherein both $R^{20}$ and $R^{22}$ are methyl groups is preferable.

Specifically, examples of a non-conjugated triene or tetraene represented by the general formula [XVI-I] include the following compounds (however, the compounds included in the general formula [XVI-II] are excluded.)

[Chem. 32]

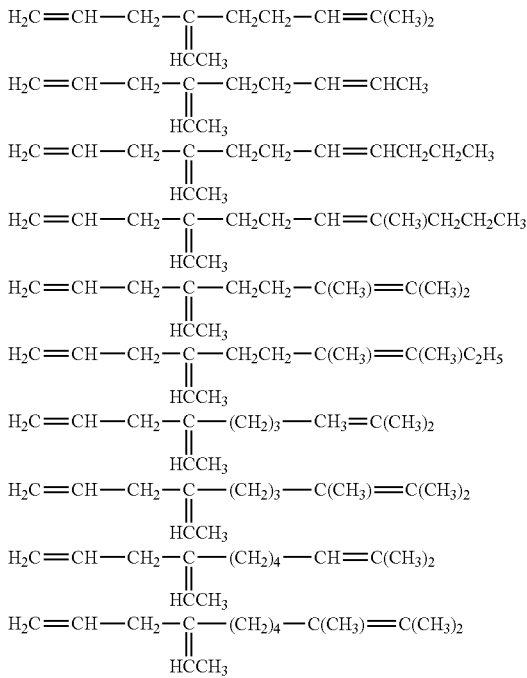

[Chem. 33]

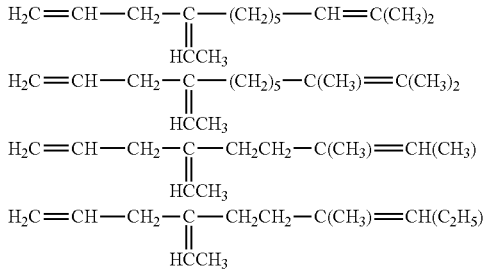

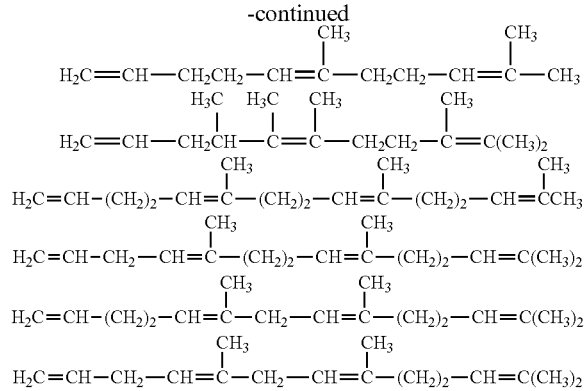

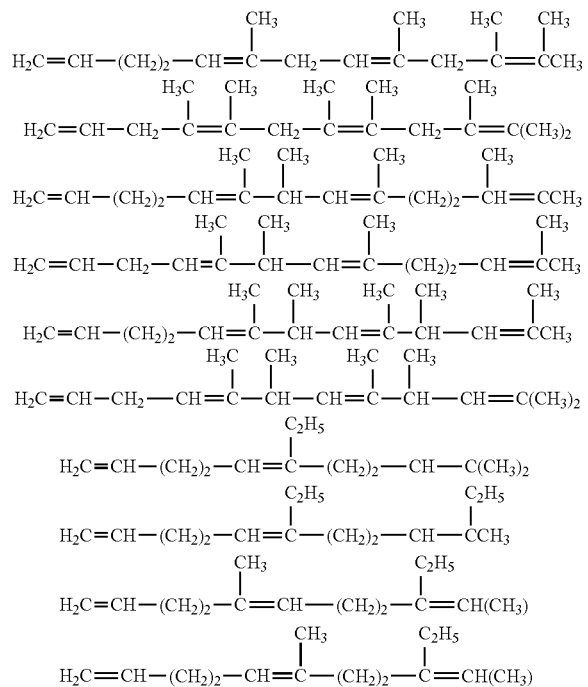

Examples of a non-conjugated triene represented by the general formula [XVI-II] include specifically the following compounds and the like.

[Chem. 35]

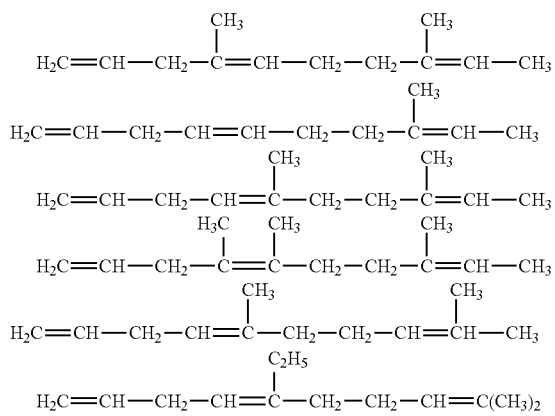

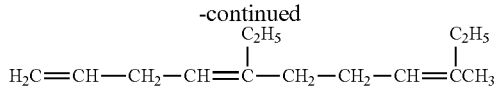

Non-conjugated trienes or tetraenes represented by the general formula [XVI-I] can be manufactured by known methods, which are described in detail, for example, in JP-A No. H09-235327 and JP-A No. 2001-114837, and so on by the present inventors.

According to the present invention 1, using a polymerization catalyst that can produce an ethylene/α-olefin/non-conjugated polyene copolymer having a high molecular weight enables high temperature polymerization of an ethylene/α-olefin/non-conjugated polyene copolymer. In other words, by using the olefin polymerization catalyst, the molecular weight of an ethylene/α-olefin/non-conjugated polyene copolymer produced during high temperature polymerization can be maintained at a desired high value. In solution polymerization, the viscosity of a polymerization solution including the produced ethylene/α-olefin/non-conjugated polyene copolymer is reduced at a high temperature, and thus the concentration of the ethylene/α-olefin/non-conjugated polyene copolymer in a polymerizer can be increased compared with that during low temperature polymerization, resulting in enhanced productivity per polymerizer. Copolymerization of an ethylene, an α-olefin and a non-conjugated polyene in the present invention 1 can be carried out either by a liquid phase polymerization method such as solution polymerization or suspension polymerization (slurry polymerization) or by a gas phase polymerization method, while, as above, solution polymerization is particularly preferable from a viewpoint of enabling enjoyment of the maximum effect of the present invention 1.

Usage and addition order of each component of the polymerization catalyst are selected as desired. At least two or more of the components of the catalyst may be in contact preliminarily.

A transition metal compound (a) (hereinafter referred to as "component (a)") is used in an amount to make up usually $10^{-9}$ to $10^{-1}$ mol, preferably $10^{-8}$ to $10^{-2}$ mol per liter of reaction volume.

The organometallic compound (b-1) (hereinafter also referred to as "component (b-1)") is used in an amount such that the molar ratio [(b-1)/M] of the component (b-1) to a transition metal atom (M) in the component (a) is usually 0.01 to 50000, preferably 0.05 to 10000.

The organoaluminum oxy-compound (b-2) (hereinafter also referred to as "component (b-2)") is used in an amount such that the molar ratio [b-2)/M] of an aluminum atom in the component (b-2) to a transition metal atom (M) in the component (a) is usually 10 to 5000, preferably 20 to 2000.

the compound (b-3) (hereinafter referred to as "component (b-3)") which reacts with the transition metal compound (a) to form an ion pair is used in an amount such that the molar ratio [(b-3)/M] of the component (b-3) to a transition metal atom (M) in the component (a) is usually 1 to 10000, preferably 1 to 5000.

A polymerization temperature is usually 50° C. to 300° C., preferably 80° C. or more, more preferably 80° C. to 250° C., still more preferably 100° C. to 200° C. As aforementioned, in the present invention 1, carrying out high temperature polymerization provides the advantages of enhanced productivity and reduced production cost, but a polymerization temperature excessively above 300° C. may cause degradation to the obtained polymer and hence is not preferable. An ethylene/α-olefin/non-conjugated polyene copolymer preferably used in many industrial fields such as films can be efficiently manufactured at a polymerization temperature in a region of 100° C. to 200° C. from a viewpoint of the properties of the ethylene/α-olefin/non-conjugated polyene copolymer manufactured in the present invention 1.

A polymerization pressure is usually a normal pressure to MPa gauge pressure (MPa-G), preferably a normal pressure to 8 MPa-G.

A polymerization reaction can be carried out by any of a batch type, a semi-continuous type, and a continuous type method. The polymerization can also be carried out continuously in two or more polymerizers having different reaction conditions.

The molecular weight of the obtained ethylene/α-olefin/non-conjugated polyene copolymer can be adjusted by changing a hydrogen concentration and polymerization temperature in a polymerization system. Further, the adjustment can also be done by the amount of the component (b) to be used. In a case where hydrogen is added, its amount is adequate at approximately 0.001 to 5000 NL per kg of an ethylene/α-olefin/non-conjugated polyene copolymer produced.

A polymerization solvent used in the liquid phase polymerization process is usually an inert hydrocarbon solvent and is preferably saturated hydrocarbon having a boiling point of 50° C. to 200° C. at normal pressure. Specific examples of the polymerization solvents include aliphatic hydrocarbons, such as propane, butane, pentane, hexane, heptane, octane, decane, dodecane and kerosine, and alicyclic hydrocarbons, such as cyclopentane, cyclohexane and methylcyclopentane. Particularly preferable are hexane, heptane, octane, decane and cyclohexane. The α-olefin itself that is a polymerization object can be also used as the polymerization solvent. Aromatic hydrocarbons, such as benzene, toluene and xylene, and halogenated hydrocarbons, such as ethylene chloride, chlorobenzene and dichloromethane, can be also used as the polymerization solvents, but from the viewpoints of reduction in burden on the environment and minimization of effect on human body health, use of these hydrocarbons is undesirable.

The ethylene/α-olefin/non-conjugated polyene copolymer manufactured according to the present invention 1 contains (i) a structural unit (ethylene unit) derived from an ethylene and (ii) a structural unit (α-olefin unit) derived from an α-olefin having three or more carbon atoms, usually in a range of 99/1 to 1/99 as expressed in a molar ratio [(i)/(ii)], but is not particularly limited thereto.

In the ethylene/α-olefin/non-conjugated polyene copolymer manufactured according to the present invention 1, a content of structural units derived from an ethylene is usually 50 mol % or more when the α-olefin is propylene and usually 40 mol or more when the α-olefin has 4 to 20 carbon atoms.

The structural units derived from the non-conjugated polyene compound of the ethylene/α-olefin/non-conjugated polyene copolymer manufactured according to the present invention 1 is, without particular limitation, in a proportion ranging from usually 0.1 to 49 mol %, preferably 0.2 to 8 mol %, more preferably 0.3 to 5 mol % in the total structural units.

In the ethylene/α-olefin/non-conjugated polyene copolymer manufactured according to the present invention 1, a limiting viscosity [η] measured in a 135° C. decalin is, without particular limitation, in a range of usually 0.02-20 dl/g, preferably 0.05 to 10 dl/g. The [η] in this range is preferable in that formability is excellent.

It is preferred that for the ethylene/α-olefin/non-conjugated polyene copolymer manufactured according to the present invention 1, a B value calculated according to the formula [XVII] is given as B value ≥1.05.

$$B \text{ value} = (c+d)/[2 \times a \times (e+f)] \quad [XVII]$$

wherein a, e and f are an ethylene mole fraction, an α-olefin mole fraction and a non-conjugated polyene mole fraction respectively in the ethylene/α-olefin/non-conjugated polyene copolymer, c is an ethylene-α-olefin diad mole fraction, and d is an ethylene-non-conjugated polyene diad mole fraction.

The B value is an index that is indicative of randomness of a copolymerization monomer sequence distribution in a copolymer, and a, c, d, e, and f in the formula [XVII] can be determined by measuring $^{13}C$ NMR spectra and being based on the reports by J. C. Randall [Macromolecules, 15, 353 (1982)], J. Ray [Macromolecules, 10, 773 (1977)], and the like.

Compared to an ethylene/α-olefin/non-conjugated polyene copolymer with B value <1.05, an ethylene/α-olefin/non-conjugated polyene copolymer with B value ≥1.05 has a stronger alternating copolymerization of monomers, with the results that the ethylene average chain length is short and that the low temperature properties, which are one of important properties, are favorable. The larger this B value is, the shorter the block-like chain of an α-olefin unit or a non-conjugated polyene unit is (the stronger the alternating copolymerization is), indicating that a distribution of an α-olefin unit and a non-conjugated polyene unit is uniform. On the contrary, the smaller the B value is, the less uniform the distribution of an α-olefin unit and a non-conjugated polyene unit of the non-conjugated-polyene-based copolymer (the weaker the alternating copolymerization is), the longer the block-like chain is. The length of this block-like chain results in affecting the properties of the ethylene/α-olefin/non-conjugated polyene copolymer, and for example, the larger the B value is, the shorter the block-like chain is, indicating favorable low temperature properties. The smaller than 1.00 the B value is, the broader the composition distribution in the polymer chain of the ethylene/α-olefin/non-conjugated polyene copolymer is, and such a copolymer, compared to a copolymer having a narrow composition distribution, may fail to adequately express properties such as strength, when vulcanized, for example.

According to the manufacturing method of the present invention 1, an ethylene/α-olefin/non-conjugated polyene copolymer with B value ≥1.05 can be obtained, but, for example, when a titanium-based non-metallocene catalyst is used or when a constrained geometry catalyst described in JP-A No. 2001-522398 is used, the B value of an obtained ethylene/α-olefin/non-conjugated polyene copolymer is less than 1.05.

For the ethylene/α-olefin/non-conjugated polyene copolymer obtained according to the manufacturing method of the present invention 1, the ratio (Mw/Mn) of a weight average molecular weight (Mw) to a number average molecular weight (Mn) measured by GPC is usually 1.0 to 4.0, preferably 1.2 to 3.5, more preferably 1.5 to 3.2. The Mw/Mn in this range is preferable in terms of a balance between mechanical strength and processability (kneading, extruding).

While the present invention 2 is described below, the present inventions 2-1, 2-2 and 2-3 may be described in the description of the present invention 2 since the present inventions 2-1, 2-2 and 2-3 are inventions related to a composition including the ethylene.α-olefin.non-conjugated polyene copolymer of the present invention 2.

[Present Invention 2]

<Ethylene.α-Olefin.Non-Conjugated Polyene Copolymer>

The ethylene.α-olefin.non-conjugated polyene copolymer according to the present invention 2 contains a structural unit derived from an ethylene [A], a structural unit derived from a $C_4$-$C_{20}$ α-olefin [B] and a structural unit derived from a non-conjugated polyene [C], and is an ethylene.α-olefin.non-conjugated polyene copolymer that satisfies the following (1) to (4). Such a specific ethylene.α-olefin.non-conjugated polyene copolymer is also referred to as "ethylene-based copolymer A."

Among the $C_4$-$C_{20}$ α-olefins [B] and the non-conjugated polyenes [C], one species or two or more species thereof can be used. In other words, the ethylene.α-olefin.non-conjugated polyene copolymer of the present invention 2 contains a structural unit derived from the ethylene [A], a structural unit derived from at least one species of the $C_4$-$C_{20}$ α-olefins [B], and at least one species of the non-conjugated polyenes [C].

(1) a molar ratio ([A]/[B]) of structural units derived from the ethylene [A] to structural units derived from the α-olefin [B] is 40/60 to 90/10;

(2) a content of structural units derived from the non-conjugated polyene [C] is 0.1 to 6.0 mol % based on the total of the structural units of [A], [B] and [C] as 100%;

(3) a Mooney viscosity ML(1+4)125° C. at 125° C. is 5 to 100; and (4) a B value represented by the following formula (i) is 1.20 or more.

$$B \text{ value}=([EX]+2[Y])/[2\times[E]\times([X]+[Y])] \quad (i)$$

wherein [E], [X] and [Y] represent mole fractions of the ethylene [A], the $C_4$-$C_{20}$ α-olefin [B], and the non-conjugated polyene [C] respectively, and [EX] represents an ethylene [A]-$C_4$-$C_{20}$ α-olefin [B] diad chain fraction.

Examples of the $C_4$-$C_{20}$ α-olefin [B] first include $C_4$ 1-butene, then $C_9$ 1-nonene and $C_{10}$ 1-decene, and $C_{19}$ 1-nonadecene, and $C_{20}$ 1-eicosene, which have a structure having a straight chain with no side chain, as well as 4-methyl-1-pentene, 9-methyl-1-decene, 11-methyl-1-dodecene, and 12-ethyl-1-tetradecene, which have a side chain.

These α-olefins [B] can be used singly or in combination of two or more species. Among these, $C_4$-$C_{10}$ α-olefins are preferable, in particular 1-butene, 1-hexene, and 1-octene are preferable, and in particular 1-butene is preferable.

An ethylene.propylene.non-conjugated polyene copolymer wherein an α-olefin is a propylene tends to have an insufficient rubber elasticity at low temperature, and its uses may be limited. On the contrary, the ethylene-based copolymer A has a structure unit derived from a $C_4$-$C_{20}$ α-olefin [B], and hence has an excellent rubber elasticity at low temperature. A molded article obtained from the composition (composition including the ethylene-based copolymer A) of the present invention 2-2 has a small Tg and displays a high sound insulation performance in a wide frequency domain.

Examples of the non-conjugated polyene [C] specifically include a chain non-conjugated diene such as 1,4-hexadiene, 1,6-octadiene, 2-methyl-1,5-hexadiene, 6-methyl-1,5-heptadiene, and 7-methyl-1,6-octadiene; a cyclic non-conjugated diene such as cyclohexadiene, dicyclopentadiene, methyltetrahydrindene, 5-vinyl-2-norbornene, 5-ethylidene-2-norbornene, 5-methylene-2-norbornene, 5-isopropylidene-2-norbornene, and 6-chloromethyl-5-isopropenyl-2-norbornene; a triene such as 2,3-diisopropylidene-5-norbornene, 2-ethylidene-3-isopropylidene-5-norbornene, 2-propenyl-2,5-norbornanediene, 1,3,7-octatriene, 1,4,9-decatriene, 4,8-dimethyl-1,4,8-decatriene, and 4-ethylidene-8-methyl-1,7-nonadiene.

These non-conjugated polyenes [C] can be used singly or in combination of two or more species.

Among these, chain non-conjugated dienes such as 1,4-hexadiene and cyclic non-conjugated dienes such as 5-ethylidene-2-norbornene, 5-ethylidene-2-norbornene and 5-vinyl-2-norbornene are preferable, and, above all, cyclic non-conjugated dienes are preferable, and 5-ethylidene-2-norbornene and 5-vinyl-2-norbornene are particularly preferable.

Examples of the ethylene-based copolymer A include the following:

ethylene.1-butene.1,4-hexadiene copolymer,
ethylene.1-pentene.1,4-hexadiene copolymer,
ethylene.1-hexene.1,4-hexadiene copolymer,
ethylene.1-heptene.1,4-hexadiene copolymer,
ethylene.1-octene.1,4-hexadiene copolymer,
ethylene.1-nonene.1,4-hexadiene copolymer,
ethylene.1-decene.1,4-hexadiene copolymer,
ethylene.1-butene.1-octene.1, 4-hexadiene copolymer,
ethylene.1-butene.5-ethylidene-2-norbornene copolymer,
ethylene.1-pentene.5-ethylidene-2-norbornene copolymer,
ethylene.1-hexene.5-ethylidene-2-norbornene copolymer,
ethylene.1-heptene.5-ethylidene-2-norbornene copolymer,
ethylene.1-octene.5-ethylidene-2-norbornene copolymer,
ethylene.1-nonene.5-ethylidene-2-norbornene copolymer,
ethylene*1-decene.5-ethylidene-2-norbornene copolymer,
ethylene.1-butene.1-octene.5-ethylidene-2-norbornene copolymer,
ethylene.1-butene.5-ethylidene-2-norbornene.5-vinyl-2-norborn ene copolymer,
ethylene.1-pentene.5-ethylidene-2-norbornene.5-vinyl-2-norbornene copolymer,
ethylene.1-hexene.5-ethylidene-2-norbornene.5-vinyl-2-norborn ene copolymer,
ethylene.1-heptene.5-ethylidene-2-norbornene.5-vinyl-2-norbornene copolymer,
ethylene.1-octene.5-ethylidene-2-norbornene.5-vinyl-2-norborn ene copolymer,
ethylene.1-nonene.5-ethylidene-2-norbornene.5-vinyl-2-norborn ene copolymer,
ethylene.1-decene.5-ethylidene-2-norbornene.5-vinyl-2-norborn ene copolymer, and
ethylene.1-butene.1-octene.5-ethylidene-2-norbornene.5-vinyl-2-norbornene copolymer.

One species or two or more species of the ethylene-based copolymer A are used, as necessary.

(1) In the ethylene-based copolymer A, the molar ratio ([A]/[B]) of structural units derived from the ethylene [A] to structural units derived from the α-olefin [B] is in a range of 40/60 to 90/10. The lower limit of [A]/[B] is preferably 45/55, more preferably 50/50, particularly preferably 55/45. The upper limit of [A]/[B] is preferably 80/20, more preferably 75/25, still more preferably 70/30, particularly preferably 65/35.

When the molar ratio of structural units derived from the ethylene [A] to structural units derived from the α-olefin [B] is in the aforementioned range, an ethylene-based copolymer having an excellent balance between low temperature rubber elasticity and room temperature tensile strength can be obtained.

(2) In the ethylene-based copolymer A, the content of structural units derived from the non-conjugated polyene [C] is in a range of 0.1 to 6.0 mol % based on the total of the structural units of [A], [B] and [C] as 100 mol %. The lower limit of the content of structural units derived from [C] is preferably 0.5 mol %. The upper limit of the content of structural units derived from [C] is preferably 4.0 mol %, more preferably 3.5 mol %, still more preferably 3.0 mol %.

In this regard, when the ethylene-based copolymer A is used in the present invention 2-1, the content of structural units derived from the non-conjugated polyene [C] is most preferably in a range of 0.5 to 3.3 mol %

When the content of structural units derived from the non-conjugated polyene [C] is in the aforementioned range, an ethylene-based copolymer having an adequate cross-linkability and flexibility is obtained.

(3) The ethylene-based copolymer A has a Mooney viscosity $ML_{(1+4)}125°$ C. at 125° C. in a range of 5 to 100, preferably 20 to 95, particularly preferably 50 to 90. When the ethylene-based copolymer A is used in the present invention 2-1, the Mooney viscosity $ML_{(1+4)}125°$ C. is in a range of preferably 8 to 95, particularly preferably 8 to 80. And the ethylene-based copolymer A is in a range of preferably 5 to 50, particularly preferably 5 to 30, when used in the present invention 2-2.

When the Mooney viscosity is in the aforementioned range, the ethylene-based copolymer has an excellent processability and fluidity, and the ethylene-based copolymer showing a favorable aftertreatment quality (suitability for ribbon handling) and having excellent rubber properties is also obtained.

(4) The ethylene-based copolymer A has a B value in a range of 1.20 or more, preferably 1.20 to 1.80, particularly preferably 1.22 to 1.40.

The ethylene-based copolymer having a B value of less than 1.20 may cause a large compression set at low temperature, and may fail to provide an ethylene-based copolymer having an excellent balance between low temperature rubber elasticity and room temperature tensile strength.

The ethylene-based copolymer A having a B value in the aforementioned range gives high alternation and low crystallinity of monomer units making up a copolymer, accordingly enhancing processability of a composition obtained when the copolymer is used for the present invention 2-2 as well as enhancing sound insulation performance of an obtained molded article.

Here, the B value in the (4) above is an index that is indicative of randomness of a copolymerization monomer sequence distribution in a copolymer, and [E], [X], [Y] and [EX] in the formula (i) can be determined by measuring $^{13}C$ NMR spectra and being based on the reports by J. C. Randall [Macromolecules, 15, 353 (1982)], J. Ray [Macromolecules, 10, 773 (1977)], and the like. The molar amount of structural units derived from the ethylene [A], that of structural units derived from the α-olefin [B] and that of structural units derived from the non-conjugated polyene [C] in (1) to (2) above can be determined by measurement of intensity using a $^1H$-NMR spectrometer.

<Method for Manufacturing Ethylene.α-Olefin.Non-Conjugated Polyene Copolymer>

The ethylene.α-olefin.non-conjugated polyene copolymer (ethylene-based copolymer A) can be obtained by the following manufacturing method.

Specifically, the copolymer can be manufactured by copolymerizing an ethylene, a $C_4$-$C_{20}$ α-olefin and a non-conjugated polyene in the presence of an olefin polymerization catalyst including (a) a transition metal compound (hereinafter also referred to as "bridged metallocene compound") represented by the following general formula [VII] and (b) at least one compound that is selected from (b-1) organometallic compounds, (b-2) organoaluminum oxy-compounds and (b-3) compounds which react with the transition metal compound (a) to form an ion pair.

[Chem. 36]

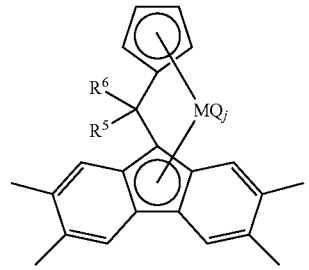

[VII]

wherein M is a titanium atom, a zirconium atom, or a hafnium atom;

$R^5$ and $R^6$ are substituted aryl groups wherein one or more of the hydrogen atoms of the aryl group are substituted with an electron-donating substituent having a substituent constant σ of −0.2 or less in the Hammett's rule; wherein each of the electron-donating substituents may be the same or different when the substituted aryl group has a plurality of the electron-donating substituents; wherein the substituted aryl group may have a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group has a plurality of the substituents, each of the substituents may be the same or different.

Q is selected in the same or different combination from halogen atoms, $C_1$-$C_{20}$ hydrocarbon groups, anionic ligands and neutral ligands capable of being coordinated with a lone electron pair;

j is an integer of 1 to 4.

<Bridged Metallocene Compound (a)>

As the bridged metallocene compound (a), there can be used the transition metal compound (a-3) which is among transition metal compounds (a) described in respect to the present invention 1 and in which $R^5$ and $R^6$ are substituted aryl groups wherein one or more of the hydrogen atoms of the aryl group are substituted with an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group may have a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group has a plurality of the substituents, each of the substituents may be the same or different.

<Preferred Embodiment in Using Bridged Metallocene Compound as Catalyst for Ethylene.α-Olefin.Non-Conjugated Polyene Copolymer>

Next, a preferred embodiment in which the bridged metallocene compound is used as a catalyst (olefin polymerization catalyst) for an ethylene.α-olefin.non-conjugated polyene copolymer will be described.

When the bridged metallocene compound is used as an olefin polymerization catalyst component, the catalyst comprises (a) a bridged metallocene compound represented by the following general formula [VII], (b) at least one compound that is selected from (b-1) organometallic compounds, (b-2) organoaluminum oxy-compounds and (b-3) compounds which react with the bridged metallocene compound (a) to form an ion pair, and, if necessary, (c) a particulate carrier.

Each component will be specifically described below.

<(b-1) Organometallic Compound>

(b-1) As an organometallic compound, specifically an organometallic compound in Group 1, 2, 12 and 13 of the periodic table, such as the following general formula [VII] to [IX], is used.

(b-1a) An organoaluminum compound represented by the general formula $R^a{}_m Al(OR^b)_n H_p X_q$ - - - [VII], wherein $R^a$ and $R^b$, each of which may be the same or different, represent $C_1$-$C_{15}$, preferably $C_1$-$C_4$ hydrocarbon groups; X represents a halogen atom; m, n, p and q are numbers defined as $0 < m \leq 3$, $0 \leq n < 3$, $0 \leq p < 3$, $0 \leq q < 3$; and $m+n+p+q=3$.

Examples of such a compound include trialkylaluminum such as trimethylaluminum, triethylaluminum, triisobutylaluminum, and tri-n-octylaluminum; tricycloalkylaluminum, isobutylaluminumdichloride, diethylaluminumchloride, ethylaluminumdichloride, ethylaluminumsesquichloride, methylaluminumdichloride, dimethylaluminumchloride, and diisobutylaluminumhydride.

(b-1b) A complex alkylated compound of a metal of Group 1 of the periodic table and aluminum, represented by the general formula $M^2 AlR^a{}_4$ - - - [VIII], wherein $M^2$ represents Li, Na or K, and $R^a$ is a $C_1$-$C_{15}$, preferably $C_1$-$C_4$ hydrocarbon group.

Examples of such a compound include, $LiAl(C_2H_5)_4$, $LiAl(C_7H_{15})_4$, and the like.

(b-1c) A dialkyl compound having a metal of Group 2 or 12 of the periodic table, represented by the general formula $R^a R^b M^3$ - - - [IX], wherein $R^a$ and $R^b$, each of which may be the same or different, represent a $C_1$-$C_{15}$, preferably $C_1$-$C_4$ hydrocarbon group, and $M^3$ is Mg, Zn or Cd.

Among the organometallic compounds (b-1), an organoaluminum compound such as triethylaluminum, triisobutylaluminum and trin-octylaluminum is preferable. Such an organometallic compound (b-1) may be used singly or in combination of two or more species.

<(b-2) Organoaluminum Oxy-Compound>

The organoaluminum oxy-compound may be a conventionally known aluminoxane and may be a benzene-insoluble organoaluminum oxy-compound such as exemplified in JP-A No. H02-78687.

A conventionally known aluminoxane can be manufactured by, for example, the following method, and is usually obtained as a hydrocarbon solvent solution.

(1) A method of reacting an absorption water or a crystalline water with an organoaluminum compound through adding an organoaluminum compound such as trialkylaluminum to a hydrocarbon medium suspension such as a absorption water-containing compound or a crystalline water-containing salt, for example, magnesium chloride hydrate, copper sulfate hydrate, aluminium sulfate hydrate, nickel sulfate hydrate or the first cerium chloride hydrate.

(2) A method of applying water, ice or water vapor directly to an organoaluminum compound such as trialkylaluminum in a medium such as benzene, toluene, ethyl ether or tetrahydrofuran.

(3) A method of reacting an organic tin oxide such as dimethyl tin oxide or dibutyl tin oxide with an organoaluminum compound such as trialkylaluminum in a medium such as decane, benzene or toluene.

The aluminoxane may contain a small amount of organic metal components. The aluminoxane solution recovered may have a solvent or unreacted organoaluminum compound distilled off therefrom, followed by being redissolved in a solvent or suspended in a poor solvent of aluminoxane.

Examples of an organoaluminum compound used in preparing aluminoxane specifically include an organoaluminum compound similar to those exemplified as an organoaluminum compound belonging to the (b-1a).

Among these, trialkylaluminum and tricycloalkylaluminum are preferable, and, above all, trimethylaluminum and triisobutylaluminum are particularly preferable.

An organoaluminum compound such as above-mentioned is used singly or in combination of two or more species.

A benzene-insoluble organoaluminum oxy-compound which is an aspect of the (b-2) organoaluminum oxy-compound is preferably one which has an Al component dissolved in a 60° C. benzene at usually 10 wt % or less, preferably 5 wt % or less, particularly preferably 2 wt % or less relative to 100 wt % benzene as based on the conversion to Al atoms, i.e., one which is insoluble or poorly-soluble to benzene.

Examples of the (b-2) organoaluminum oxy-compound include an organoaluminum oxy-compound containing boron represented by the following general formula [X].

[Chem. 37]

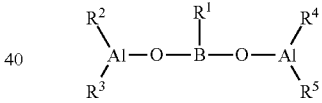

[X]

wherein $R^1$ represents a $C_1$-$C_{10}$ hydrocarbon group, and $R^2$ to $R^5$, each of which may be the same or different, represent hydrogen atoms, halogen atoms or $C_1$-$C_{10}$ hydrocarbon groups.

An organoaluminum oxy-compound including a boron represented by the general formula [X] can be manufactured by reacting an alkyl boronic acid represented by the following general formula [XI]:

$R^1—B(OH)_2$ [XI]

wherein $R^1$ represents the same group as $R^1$ in the general formula [X],
with an organoaluminum compound in an inert solvent in an inert gas atmosphere at a temperature of −80° C. to room temperature for 1 minute to 24 hours.

Specific examples of an alkyl boronic acid represented by the general formula [XI] include methyl boronic acid, ethyl boronic acid, isopropyl boronic acid, n-propyl boronic acid, n-butyl boronic acid, isobutyl boronic acid, n-hexyl boronic acid, cyclohexyl boronic acid, phenyl boronic acid, 3,5-difluorophenyl boronic acid, pentafluorophenyl boronic acid and 3,5-bis(trifluoromethyl)phenyl boronic acid.

Among these, methyl boronic acid, n-butyl boronic acid, isobutyl boronic acid, 3,5-difluorophenyl boronic acid and pentafluorophenyl boronic acid are preferable. These are used singly or in combination of two or more species.

Examples of an organoaluminum compound to be reacted with such an alkyl boronic acid specifically include an organoaluminum compound similar to those exemplified as an organoaluminum compound belonging to the (b-1a).

Among these, trialkylaluminum and tricycloalkylaluminum are preferable, and trimethylaluminum, triethylaluminum and triisobutylaluminum in particular are preferable. These are used singly or in combination of two or more species. A (b-2) organoaluminum oxy-compound such as aforementioned is used singly or in combination of two or more species.

<(b-3) Compound which Reacts with Transition Metal Compound (a) to Form Ion Pair>

Examples of the compound (b-3) (hereinafter referred to as "ionized ionic compound") which reacts with the transition metal compound (a) to form an ion pair include Lewis acids, ionic compounds, borane compounds and carborane compounds described in JP-A No. H01-501950, JP-A No. H01-502036, JP-A No. H03-179005, JP-A No. H03-179006, JP-A No. H03-207703, JP-A No. H03-207704, U.S. Pat. No. 5,321,106, and so on. Further examples also include heteropoly compounds and isopoly compounds. Such an ionized ionic compound (b-3) is used singly or in combination of two or more species.

Specifically, examples of a Lewis acid include a compound represented by $BR_3$ (wherein R is a phenyl group which may have a substituent such as fluorine, methyl group or trifluoromethyl group, or fluorine), for example, trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of an ionic compound include, for example, a compound represented by the following general formula [XII].

[Chem. 38]

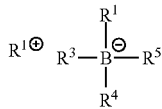

[XII]

wherein $R^{1+}$ is $H^+$, a carbonium cation, an oxonium cation, an ammonium cation, a phosphonium cation, a cycloheptyltrienyl cation, a ferrocenium cation having a transition metal, or the like. $R^2$ to $R^5$, each of which may be the same or different, are organic groups, preferably aryl groups or substituted aryl groups. Examples of the carbonium cation specifically include a trisubstituted carbonium cation such as a triphenyl carbonium cation, a tri(methylphenyl)carbonium cation or a tri(dimethylphenyl)carbonium cation.

Examples of the ammonium cation specifically include a trialkylammonium cation such as a trimethylammonium cation, a triethylammonium cation, a tripropylammonium cation, a tributylammonium cation and a tri(n-butyl)ammonium cation; an N,N-dialkylanilinium cation such as N,N-dimethylanilinium cation, an N,N-diethylanilinium cation and an N,N,2,4,6-pentamethylanilinium cation;
a dialkylammonium cation such as a di(isopropyl)ammonium cation and a dicyclohexylammonium cation; and the like.

Examples of the phosphonium cation specifically include a triarylphosphonium cation such as a triphenylphosphonium cation, a tri(methylphenyl)phosphonium cation, and a tri(dimethylphenyl)phosphonium cation, and the like.

As $R^{1+}$, a carbonium cation, a ammonium cation and the like are preferable, and in particular a triphenylcarbonium cation, an N,N-dimethylanilinium cation and an N,N-diethylanilinium cation are preferable.

Examples of the ionic compound include trialkyl substituted ammonium salts, N,N-dialkylanilinium salts, dialkylammonium salts, triarylphosphonium salts and the like.

Examples of the trialkyl substituted ammonium salt specifically include, for example, triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(N,N-dimethylphenyl)boron, tri(n-butyl)ammoniumtetra(p-trifluoromethylphenyl)boron, tri(n-butyl)ammoniumtetra(3,5-ditrifluoromethylphenyl)boron, tri(n-butyl)ammoniumtetra(o-tolyl)boron.

Examples of the N,N-dialkylanilinium salt specifically include, for example, N,N-dimethylaniliniumtetra(phenyl)boron, N,N-diethylaniliniumtetra(phenyl)boron, N,N, 2,4,6-pentamethylaniliniumtetra(phenyl)boron and the like.

Examples of the dialkylammonium salt specifically include, for example, di(1-propyl) ammoniumtetra (pentafluorophenyl) boron, dicyclohexylammoniumtetra(phenyl)boron and the like.

Further, examples of the ionic compound include triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex, boron compound represented by the following formula [XIII] or [XIV], and the like.

[Chem. 39]

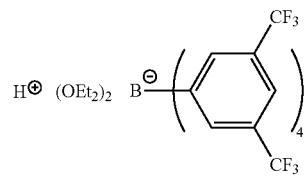

[XIII]

wherein Et represents an ethyl group.

[Chem. 40]

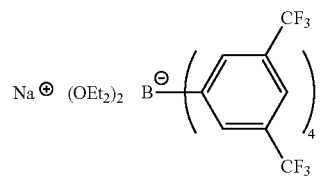

[XIV]

wherein Et represents an ethyl group.

Examples of the borane compound specifically include, for example, decaborane; a salt of an anion such as bis[tri (n-butyl) ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl) ammonium]decachlorodecaborate and bis[tri(n-butyl) ammonium]dodecachlorododecaborate; a salt of a metal borane anion such as tri(n-butyl) ammoniumbis(dodecahydridedodecaborate) cobaltate (III) and bis[tri(n-butyl)ammonium]bis(dodecahydridedodecaborate) nickelate (III); and the like.

Examples of the carborane compound specifically include, for example, a salt of an anion such as 4-carbanonaborane, 1,3-dicarbanonaborane, 6,9-dicarbadecaborane, dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane, 2,7-dicarbaundecaborane, undecahydride-7,8-dimethyl-7,8-dicarbaundecaborane, dodecahydride-11-methyl-2,7-dicarbaundecaborane, tri(n-butyl)ammonium1-carbadecaborate, tri(n-butyl)ammonium-1-carbaundecaborate, tri(n-butyl) ammonium-1-carbadodecaborate, tri(n-butyl)ammonium-1-trimethylsilyl-1-carbadecaborate, tri(n-butyl)ammonium-bromo-1-carbadodecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammoniumdodecahydride-8-methyl-7,9-dicarbaundecaborate, tri(n-butyl) ammoniumundecahydride-8-ethyl-7,9-dicarbaundecaborate, tri(n-butyl)ammoniumundecahydride-8-butyl-7,9-dicarbaundecaborate, tri(n-butyl) ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate; a salt of a metal carborane anion such as tri(n-butyl)ammoniumbis(nonahydride-1,3-dicarbanonaborate)cobaltate (III), tri(n-butyl)ammoniumbis(undecahydride-7,8-dicarbaundecaborate)ferrate (III), tri(n-butyl)ammoniumbis(undecahydride-7,8-dicarbaundecaborate)cobaltate (III), tri(n-butyl)ammoniumbis (undecahydride-7,8-dicarbaundecaborate)nickelate (III), tri (n-butyl)ammoniumbis(undecahydride-7,8-dicarbaundecaborate)cuprate (III), tri(n-butyl) ammoniumbis(undecahydride-7,8-dicarbaundecaborate) aurato (III), tri(n-butyl)ammoniumbis(nonahydride-7,8-dimethyl-7,8-dicarbaundecaborate)ferrate (III), tri(n-butyl) ammoniumbis(nonahydride-7,8-dimethyl-7,8-dicarbaundecaborate)chromate (III), tri(n-butyl) ammoniumbis(tribromooctahydride-7,8-dicarbaundecaborate)cobaltate (III), tris[tri(n-butyl) ammonium]bis(undecahydride-7-carbaundecaborate) chromate (III), bis[tri(n-butyl)ammonium]bis (undecahydride-7-carbaundecaborate)manganate (IV), bis [tri(n-butyl) ammonium]bis(undecahydride-7-carbaundecaborate)cobaltate (III) and bis[tri(n-butyl) ammonium]bis(undecahydride-7-carbaundecaborate) nickelate (IV); and the like.

A heteropoly compound comprises an atom selected from silicon, phosphorus, titanium, germanium, arsenic or tin, and an atom or two or more atoms selected from vanadium, niobium, molybdenum or tungsten. Specifically, phosphorusvanadic acid, germanovanadic acid, arsenicvanadic acid, phosphorusniobic acid, germanoniobic acid, siliconomolybdic acid, phosphorusmolybdic acid, titaniummolybdic acid, germanomolybdic acid, arsenicmolybdic acid, tinmolybdic acid, phosphorustungstic acid, germanotungstic acid, tintungstic acid, phosphorusmolybdovanadic acid, phosphorustungstovanadic acid, germanotungstovanadic acid, phosphorusmolybdotungstovanadic acid, germanomolybdotungstovanadic acid, phosphorusmolybdotungstic acid, phosphorusmolybdoniobic acid, and salts of these acids such as salts with, for example, any of metals of Group 1 or 2 of the periodic table specifically including lithium, sodium, potassium, rubidium, cesium, beryllium, magnesium, calcium, strontium and barium and organic salts such as triphenylethyl salt can be used but are not limited thereto.

Among the (b-3) ionized ionic compounds, the aforementioned ionic compounds are preferable, and above all, triphenylcarbeniumtetrakis(pentafluorophenyl)borate and N,N-dimethylaniliniumtetrakis(pentafluorophenyl)borate are more preferable.

The (b-3) ionized ionic compound is used singly or in combination of two or more species.

When the catalyst is the transition metal compound (a) represented by the general formula [VII], using it together with the organometallic compound (b-1) such as triisobutylaluminum, the organoaluminum oxy-compound (b-2) such as methylaluminoxane or the ionized ionic compound (b-3) such as triphenylcarbeniumtetrakis(pentafluorophenyl)borate presents a very high polymerization activity in manufacturing an ethylene.α-olefin.non-conjugated polyene copolymer.

For the olefin polymerization catalyst, the carrier (c) can be used, if necessary, together with the transition metal compound (a) and at least one compound (b) selected from (b-1) organometallic compounds, (b-2) organoaluminum oxy-compounds and (b-3) ionized ionic compounds.

<(c) Carrier>

The (c) carrier used in the present invention 2 if necessary is an inorganic compound or an organic compound, and is a granular or particulate solid.

As an inorganic compound among them, porous oxide, inorganic halide, clay, clay mineral or an ion-exchanging layered compound is preferable.

As a porous oxide, specifically $SiO_2$, $Al_2O_3$, MgO, ZrO, $TiO_2$, $B_2O_3$, CaO, ZnO, BaO, $ThO_2$ or the like, or a complex or mixture including them can be used, and for example, natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO or the like can be used. Among these, those having $SiO_2$ and/or $Al_2O_3$ as a main component are preferable. While such porous oxides have different characteristics depending on their type and manufacturing method, a carrier preferably used in the present invention 2 has a particle size of 10 to 300 μm, preferably 20 to 200 μm, a specific surface area within a range of 50 to 1000 $m^2$/g, preferably 100 to 700 $m^2$/g, and a pore volume preferably within a range of 0.3 to 3.0 $cm^3$/g. As necessary, such a carrier is calcined at 100 to 1000° C., preferably 150 to 700° C., to be used.

As the inorganic halide, $MgCl_2$, $MgBr_2$, $MnCl_2$, $MnBr_2$ or the like is used. The inorganic halide may be used as it is, or may be used after being pulverized using a vibration mill. An inorganic halide dissolved in a solvent such as alcohol and then precipitated out as fine particles using a precipitation agent can also be used.

Clay is usually composed with a clay mineral as a main component. An ion-exchanging layered compound is a compound having a crystalline structure in which planes structured by ionic bonding and the like are stacked in parallel by a mutual weak bonding force, and the contained ions can be exchanged. Most clay minerals are ion-exchanging layered compounds. As such clay, clay minerals or ion-exchanging layered compounds, not only naturally occurring ones but also artificially synthesized ones can be used.

Examples of clay, clay minerals and ion-exchanging layered compounds include ionic crystalline compounds having clay or clay minerals and having a layered crystalline structure of a hexagonal close-packed type, antimony type, $CdCl_2$ type, $CdI_2$ type or the like. Examples of such clay and clay minerals include kaolin, bentonite, kibushi clay, gairome clay, allophane, hisingerite, pyrophyllite, micas, montmorillonites, vermiculite, chlorites, palygorskite, kaolinite, nacrite, dickite, halloysite and the like; and examples of the ion-exchanging layered compound include a crystalline acid salt of a polyvalent metal such as $\alpha\text{-}Zr(HAsO_4)_2 \cdot H_2O$, $\alpha\text{-}Zr(HPO_4)_2$, $\alpha\text{-}Zr(KPO_4)_2 \cdot 3H_2O$, $\alpha\text{-}Ti(HPO_4)_2$, $\alpha\text{-}Ti(HAsO_4)_2 \cdot H_2O$, $\alpha\text{-}Sn(HPO_4)_2 \cdot H_2O$, $\gamma\text{-}Zr(HPO_4)_2$, $\gamma\text{-}Ti(HPO_4)_2$ and $\gamma\text{-}Ti(NH_4PO_4)_2 \cdot H_2O$, and the like.

For such clay, clay minerals and ion-exchanging layered compounds, a pore volume of pores having a radius of 20 Å or more is preferably 0.1 cc/g or more, particularly preferably 0.3 to 5 cc/g, as measured by a mercury penetration method. Here, the pore volume is measured for the pore radius in a range of 20 to 30000 Å by a mercury penetration method using a mercury porosimeter.

When that which has less than 0.1 cc/g pore volume of pores having a radius of 20 Å or more is used as a carrier, it tends to be difficult to obtain a high polymerization activity.

It is also preferable that the clay or clay minerals undergo chemical treatment. Examples of chemical treatment include a surface treatment for removing impurities stuck on a surface, a treatment for giving effect on the crystalline structure of clay, and the like, any of which can be used. Examples of chemical treatment specifically include acid treatment, alkali treatment, salt treatment, organic matter treatment and the like. Acid treatment not only removes impurities on a surface but also increases the surface area by eluting positive ions of Al, Fe, Mg and the like out of the crystalline structure. Alkali treatment destroys the crystalline structure of clay and results in a change in the structure of clay. Salt treatment or organic matter treatment forms ion complexes, molecular complexes, organic derivatives or the like and can change the surface area or interlayer distance.

The ion-exchanging layered compound may be a layered compound in which spacing between layers has been enlarged by exchanging exchangeable ions present between layers with other large bulky ions. Such a bulky ion plays a pillar-like role to support a layer structure and is usually called pillar. Introduction of another substance between layers of a layered compound as above is referred to as "intercalation". Examples of guest compounds for intercalation include cationic inorganic compounds, such as $TiCl_4$ and $ZrCl_4$, metallic alkoxides, such as $Ti(OR)_4$, $Zr(OR)_4$, $PO(OR)_3$ and $B(OR)_3$ (R is a hydrocarbon group or the like), and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds are used singly or in combination of two or more kinds. During intercalation of these compounds, polymerization products obtained by subjecting metallic alkoxides such as $Si(OR)_4$, $Al(OR)_3$ and $Ge(OR)_4$ (R is a hydrocarbon group or the like) to hydrolysis, colloidal inorganic compounds such as $SiO_2$, etc. may be allowed to coexist. As the pillar, an oxide formed by intercalating the above metallic hydroxide ion between layers and then performing thermal dehydration, or the like can be mentioned.

The clay, clay mineral or ion-exchanging layered compound may be used as it is, or may be used after undergoing a treatment such as ball milling or screening. It may be used after being allowed to adsorb water freshly added to it or undergoing a heating dewatering treatment. And, it may be used singly or in combination of two or more species.

Among these, a preferable one is clay or a clay mineral, and particularly preferable ones are montmorillonite, vermiculite, hectorite, taeniolite and synthetic mica.

Examples of the organic compounds include a granular or particulate solid having a particle size in a range of 10 to 300 μm. Specifically, examples thereof include (co)polymers produced with a $C_2$-$C_{14}$ α-olefin such as ethylene, propylene, 1-butene or 4-methyl-1-pentene as a main component, or (co) polymers produced with vinylcyclohexane or styrene as a main component, and modified products thereof.

The olefin polymerization catalyst can contain the carrier (c), which is used if necessary, together with the transition metal compound (a) and at least one compound (b) selected from (b-1) organometallic compounds, (b-2) organoaluminum oxy-compounds and (b-3) ionized ionic compounds.

<Method for Polymerizing Monomers in the Presence of Catalyst for Ethylene.α-Olefin.Non-Conjugated Polyene Copolymer>

In copolymerizing an ethylene, an α-olefin and a non-conjugated polyene, usage and addition order of each component making up the polymerization catalyst are selected as desired, and the following methods are exemplified.

(1) A method of adding the compound (a) singly to a polymerizer (2) A method of adding the compound (a) and the compound (b) to a polymerizer in optional order (3) A method of adding a catalyst component, which has the compound (a) supported on the carrier (c), and the compound (b) to a polymerizer in optional order (4) A method of adding a catalyst component, which has the compound (b) supported on the carrier (c), and the compound (a) to a polymerizer in optional order (5) A method of adding a catalyst component, which has the compound (a) and the compound (b) supported on the carrier (c), to a polymerizer.

In each of the methods (2) to (5), at least two of the compound (a), the compound (b) and the carrier(c) may be put in contact preliminarily.

In each of the methods (4) and (5), in which a compound (b) is supported, another compound (b) which is not supported may be added in optional order, if necessary. In this case, this compound (b) may be the same as or different from the compound (b) supported on the carrier (c).

A solid catalyst component having the compound (a) supported on the carrier (c) or a solid catalyst component having the compound (a) and the compound (b) supported on the carrier (c) may have an olefin polymerized preliminarily and may further have a catalyst component supported on the preliminarily polymerized solid catalyst component.

In a method for manufacturing an ethylene.α-olefin.non-conjugated polyene copolymer, an ethylene.α-olefin.non-conjugated polyene copolymer can be manufactured by copolymerizing ethylene, α-olefin, and non-conjugated polyene in the presence of a catalyst, such as aforementioned, for an ethylene.α-olefin.non-conjugated polyene copolymer.

For the present invention 2, either of a liquid phase polymerization method such as solution (dissolution) polymerization or suspension polymerization or a gas phase polymerization method can be carried out.

Examples of inactive hydrocarbon media used in a liquid phase polymerization method specifically include aliphatic hydrocarbons such as propane, butane, pentane, hexane, heptane, octane, decane, dodecane, and kerosene; alicyclic hydrocarbons such as cyclopentane, cyclohexane and methylcyclopentane; aromatic hydrocarbons such as benzene, toluene and xylene; and halogenated hydrocarbons such as ethylene chloride, chlorobenzene and dichloromethane; and they can be used singly or in combination of two or more species. An olefin itself can also be used as a solvent.

In polymerizing an ethylene or the like using such a catalyst for copolymers as is aforementioned, the compound (a) is used in an amount to make up usually $10^{-12}$ to $10^{-2}$ mol, preferably $10^{-10}$ to $10^{-8}$ mol per kg of reaction volume.

The compound (b-1) is used in an amount such that a molar ratio [(b-1)/M] of the compound (b-1) to all transition metal atoms (M) in the compound (a) is usually 0.01 to 50000, preferably 0.05 to 10000. The compound (b-2) is used in an amount such that the molar ratio [(b-2)/M] of aluminum atoms in the compound(b-2) to all transition metals (M) in the compound (a) is usually 10 to 50000, preferably 20 to 10000. The compound (b-3) is used in an amount such that the molar ratio [(b-3)/M] of the compound (b-3) to transition metal atoms (M) in the compound (a) is usually 1 to 20, preferably 1 to 15.

The polymerization temperature in using such a copolymer catalyst is usually in a range of −50 to +200° C., preferably 0 to 200° C., more preferably in a range of 80 to 200° C., and a higher temperature (80° C. or higher) is desirable from a viewpoint of productivity while depending on the achieved molecular weight and polymerization activity of the copolymer catalyst system used.

Polymerization pressure is based on the conditions of usually normal pressure to 10 MPa gauge pressure, preferably normal pressure to 5 MPa gauge pressure, and the polymerization reaction can be carried out by any method of a batch method, a semi-continuous method or a continuous method. Further, the polymerization can be carried out in two or more separated stages which differ in reaction conditions.

The molecular weight of the obtained ethylene-based copolymer A can be controlled by having hydrogen present in a polymerization system or by changing polymerization temperature. Further, it can be controlled by the amount of the compound (b) used. Specifically, examples thereof include triisobutyl aluminum, methyl aluminoxane, diethyl zinc and the like. In the case of adding hydrogen, the amount in the order of 0.001 to 100 NL per kg of olefin is suitable.

<Composition Including Ethylene.α-Olefin.Non-Conjugated Polyene Copolymer>

The ethylene.α-olefin.non-conjugated polyene copolymer of the present invention 2 is generally used as a composition having a softener, a filler or the like blended therein (also referred to as "rubber composition"), and forming and cross-linking it allows a desired molded article to be obtained.

The blended amount is generally 0.1 to 200 parts by weight for the softener and 1 to 300 parts by weight for the filler relative to the total 100 parts by weight of the ethylene.α-olefin.non-conjugated polyene copolymer and other polymer(s) (elastomer, rubber or the like) blended if necessary.

Depending on the application and according to the purpose, the rubber composition is blended with other additives, for example, a processing aid, an active agent and a moisture absorbent, and furthermore, a heat-resistance stabilizer, a weathering stabilizer, an antistatic agent, a colorant, a lubricant, a thickener and the like, besides the softener, the filler and the cross-linking agent.

The ethylene.α-olefin.non-conjugated polyene copolymer of the present invention 2 or a rubber composition including it can be blended with another elastomer, rubber or the like, if necessary.

When used for a rubber composition, the ethylene.α-olefin.non-conjugated polyene copolymer in the rubber composition generally has a proportion of 20 weight % or more, preferably 30 to 90 weight %.

The rubber composition according to the present invention 2 can be prepared by kneading the ethylene.α-olefin.non-conjugated polyene copolymer and other components blended if necessary, using, for example, a kneading machine such as a mixer, a kneader or a roll at a desired temperature. The ethylene.α-olefin.non-conjugated polyene copolymer of the present invention 2 has an excellent kneading compatibility and thereby enables a rubber composition to be prepared successfully.

<Cross-Linking Agent>

Examples of cross-linking agents according to the present invention 2 include a cross-linking agent generally used in cross-linking rubber, such as organic peroxides, phenol resins, sulfur-based compounds, hydrosilicone-based compounds, amino resins, quinones or derivatives thereof, amine-based compounds, azo-based compounds, epoxy-based compounds, and isocyanate-based compounds. Among these, a cross-linking agent such as organic peroxide and a sulfur-based compound (also referred to as "vulcanizing agent") is preferred.

Examples of the organic peroxide include dicumyl peroxide (DCP), di-tert-butyl peroxide, 2,5-di-(tert-butylperoxyl)hexane, 2,5-dimethyl-2,5-di-(tert-butylperoxyl)hexane, 2,5-dimethyl-2,5-di-(tert-butylperoxyl)hexyne-3, 1,3-bis(tert-butylperoxylisopropyl)benzene, 1,1-bis(tert-butylperoxyl)-3,3,5-trimethylcyclohexane, n-butyl-4,4-bis(tert-butylperoxyl)valerate, benzoyl peroxide, p-chlorobenzoyl peroxide, 2,4-dichlorobenzoyl peroxide, tert-butyl peroxylbenzoate, ert-butyl peroxyl isopropyl carbonate, diacetyl peroxide, lauroyl peroxide, tert-butyl cumylperoxide and the like.

Among these, bifunctional organic peroxides such as 2,5-di-(tert-butylperoxyl)hexane, 2,5-dimethyl-2,5-di-(tert-butylperoxyl)hexane, 2,5-dimethyl-2,5-di-(tert-butylperoxyl)hexyne-3, 1,3-bis(tert-butylperoxylisopropyl)benzene, 1,1-bis(tert-butylperoxyl)-3,3,5-trimethylcyclohexane and n-butyl-4,4-bis(tert-butylperoxyl)valerate is preferable, and above all, 2,5-di-(tert-butylperoxyl)hexane and 2,5-dimethyl-2,5-di-(tert-butylperoxyl)hexane are most preferable.

When an organic peroxide is used as a cross-linking agent, the blended amount thereof is generally 0.1 to 20 parts by weight, preferably 0.2 to 15 parts by weight, still more preferably 0.5 to 10 parts by weight, relative to the total 100 parts by weight of the ethylene.α-olefin.non-conjugated polyene copolymer and other polymer(s) (rubber or the like) required to be cross-linked which is/are blended if necessary. The blended amount of the organic peroxide in the aforementioned range is preferable because a molded article obtained has no bloom on its surface and the rubber compound exhibits excellent cross-linking characteristics.

When an organic peroxide is used as a cross-linking agent, using a cross-linking aid together is preferred. Examples of the cross-linking aid include, for example, sulfur; quinonedioxime-based cross-linking aid such as p-quinonedioxime; acryl-based cross-linking aid such as ethyleneglycoldimethacrylate and trimethylolpropanetrimethacrylate; allyl-based cross-linking aid such as diallylphthalate and triallylisocyanurate; maleimido-based cross-linking aid; divinylbenzene; metal oxide such as zinc oxide (for example, ZnO #1.zinc oxide No. 2 (JIS Standards (K-1410)), produced by HakusuiTech Co., Ltd.), magnesium oxide, and zinc white (for example, zinc oxide such as "META-Z102" (trade name; produced by Inoue Calcium Corporation)). The blended amount of the cross-linking aid is usually 0.5 to 10 mol, preferably 0.5 to 7 mol, more preferably 1 to 5 mol relative to 1 mol of the organic peroxide.

When a sulfur-based compound (vulcanizing agent) is used as a cross-linking agent, examples thereof include sulfur, sulfur chloride, sulfur bichloride, morpholine disulfide, alkylphenol disulfide, tetramethylthiuram disulfide, selenium dithiocarbamate and the like.

When a sulfur-based compound is used as a cross-linking agent, the blended amount thereof is usually 0.3 to 10 parts by weight, preferably 0.5 to 7.0 parts by weight, still more preferably 0.7 to 5.0 parts by weight relative to the total 100 parts by weight of the ethylene.α-olefin.non-conjugated polyene copolymer and other polymer(s) (rubber or the like) required to be cross-linked which is/are blended if necessary. The blended amount of the sulfur-based compound in the aforementioned range results in no bloom being on the surface of a molded article and in exhibiting excellent cross-linking characteristics.

Next, when a sulfur-based compound is used as a cross-linking agent, using a vulcanizing accelerator together is preferred.

Examples of the vulcanizing accelerator include a thiazole-based vulcanizing accelerator such as N-cyclohexyl-2-benzothiazolemesulfenamide, N-oxydiethylene-2-benzothiazolemesulfenamide, N,N'-diisopropyl-2-benzothiazolemesulfenamide, 2-mercaptobenzothiazole (for example, SANCELER M (trade name; produced by Sanshin Chemical Industry Co., Ltd.)), 2-(4-morpholinodithio)benzothiazole (for example, NOCCELER MDB-P (trade name; produced by Ouchi Shinko Chemical Industrial Co., Ltd.)), 2-(2,4-dinitrophenyl)mercaptobenzothiazole, 2-(2,6-diethyl-4-morpholinothio)benzothiazole and dibenzothiazyldisulfide (for example, SANCELER DM (trade name; produced by Sanshin Chemical Industry Co., Ltd.)); a guanidine-based vulcanizing accelerator such as diphenylguanidine, triphenylguanidine and diorthotolylguanidine; an aldehydeamine-based vulcanizing accelerator such as acetaldehyde.aniline condensate and butylaldehyde.aniline condensate; an imidazoline-based vulcanizing accelerator such as 2-mercaptoimidazoline; a thiourea-based vulcanizing accelerator such as diethylthiourea and dibutylthiourea; a thiuram-based vulcanizing accelerator such as tetramethylthiuram monosulfide (for example, SANCELER TS (trade name; produced by Sanshin Chemical Industry Co., Ltd.)), tetramethylthiuram disulfide (for example, SANCELER TT (trade name; produced by Sanshin Chemical Industry Co., Ltd.)), tetraethylthiuram disulfide (for example, SANCELER TET (trade name; produced by Sanshin Chemical Industry Co., Ltd.)), tetrabutylthiuramdisulfide (for example, SANCELER TBT(trade name; produced by Sanshin Chemical Industry Co., Ltd.)) and dipentamethylenethiuramtetrasulfide (for example, SANCELER TRA (trade name; produced by Sanshin Chemical Industry Co., Ltd.)); a dithioate-based vulcanizing accelerator such as zinc dimethyldithiocarbamate, zinc diethyldithiocarbamate, zinc dibutyldithiocarbamate (for example, SANCELER PZ, SANCELER BZ and SANCELER EZ (trade name; produced by Sanshin Chemical Industry Co., Ltd.)) and tellurium diethyldithio carbamate; a thiourea-based vulcanizing accelerator such as ethylenethiourea (for example, SANCELER BUR(trade name; produced by Sanshin Chemical Industry Co., Ltd.), SANCELER 22-C(trade name; produced by Sanshin Chemical Industry Co., Ltd.)), N,N'-diethylthiourea and N,N'-dibutylthiourea; a xanthate-based vulcanizing accelerator such as zinc dibutylxanthate; others such as zinc white (for example, META-Z102(trade name; produced by Inoue Calcium Corporation, zinc oxide)); and the like.

The blended amount of these vulcanizing accelerator is generally 0.1 to 20 parts by weight, preferably 0.2 to 15 parts by weight, still more preferably 0.5 to 10 parts by weight, relative to the total 100 parts by weight of the ethylene.α-olefin.non-conjugated polyene copolymer and other polymer(s) (rubber or the like) required to be cross-linked which is/are blended if necessary. This range results in no bloom being on the surface of an obtained rubber molded article and in exhibiting excellent cross-linking characteristics.

<Vulcanizing Aid>

The vulcanizing aid in accordance with the present invention 2 is used when the cross-linking agent is a sulfur compound. Examples thereof include, for example, zinc oxide (e.g., ZnO #1/zinc oxide No. 2, produced by HakusuiTech Co., Ltd.), magnesium oxide, zinc white (e.g., zinc oxide such as "META-Z102" (trade name; produced by Inoue Calcium Corporation)) and the like.

The amount of blend thereof is usually 1 to 20 parts by weight based on the total 100 parts by weight of the ethylene.α-olefin.non-conjugated polyene copolymer and other polymer(s) (rubber, etc.) which is/are blended as necessary and need(s) to be cross-linked.

<Softener>

Specific examples of softeners according to the present invention 2 include petroleum-based softeners such as process oil, lubricating oil, paraffin oil, liquid paraffin, petroleum asphalt and Vaseline; coal tar-based softeners such as coal tar; fatty oil-based softeners such as castor oil, linseed oil, rapeseed oil, soybean oil and coconut oil; wax such as beeswax and carnauba wax; fatty acids or salts thereof such as ricinoleic acid, palmitic acid, stearic acid, barium stearate and calcium stearate; naphthenic acid, pine oil, rosin or derivatives thereof; synthetic polymer materials such as terpene resins, petroleum resins and coumarone indene resins; ester-based softeners such as dioctyl phthalate and dioctyl adipate; and in addition, microcrystalline wax, liquid polybutadiene, modified liquid polybutadiene, hydrocarbon-based synthetic lubricating oil, tall oil, substitute (factice) and the like. Petroleum-based softeners are preferred, and in particular, process oil is preferred.

The amount of blend of the softener in the rubber composition is, based on the total 100 parts by weight of the ethylene.α-olefin.non-conjugated polyene copolymer and other polymer (elastomer, rubber, etc.) component(s) which is/are blended as necessary, generally 2 to 100 parts by weight and preferably 10 to 100 parts by weight.

<Inorganic Filler>

Specific examples of inorganic fillers according to the present invention 2 include light calcium carbonate, heavy calcium carbonate, talc, clay and the like, one or two or more types of which are used. Among them, heavy calcium carbonate such as "Whiton SB" (trade name; SHIRAISHI CALCIUM KAISHA, LTD.) is preferred.

When the rubber composition contains an inorganic filler, the amount of blend of the inorganic filler is, based on the total 100 parts by weight of the ethylene.α-olefin.non-conjugated polyene copolymer and other polymer(s) (elastomer, rubber, etc.) which is/are blended as necessary, usually 2 to 50 parts by weight and preferably 5 to 50 parts by weight. When the amount of blend is within the above range, the rubber composition exhibits excellent kneadability, and a molded article with excellent mechanical properties can be achieved.

<Reinforcing Agent>

Specific examples of reinforcing agents according to the present invention 2 include carbon black, carbon black produced though surface treatment with a silane coupling agent, silica, calcium carbonate, activated calcium carbonate, fine powder talc, fine powder silicic acid and the like. When blended, the amount thereof is generally 30 to 200 parts by weight, and preferably 50 to 180 parts by weight based on the total 100 parts by weight of ethylene.α-olefin.non-conjugated polyene copolymer and other polymer(s) (elastomer, rubber, etc.) as necessary.

<Antioxidant (Stabilizer)>

By blending an antioxidant (stabilizer) into the composition according to the present invention 2, the product life of a molded article therefrom can be increased. Examples of such antioxidants include previously known antioxidants, for example, amine-based antioxidants, phenol-based antioxidants, and sulfur-based antioxidants.

Additional examples of antioxidants include aromatic secondary amine-based antioxidants such as phenylbuthylamine and N,N-di-2-naphthyl-p-phenylenediamine; phenol-based antioxidants such as dibutylhydroxytoluene and tetrakis[methylene(3,5-di-t-butyl-4-hydroxy)hydrocinnamate]methane; thioether-based antioxidants such as bis[2-methyl-4-(3-n-alkylthiopropionyloxy)-5-t-butylphenyl] sulfide; dithiocarbamate-based antioxidants such as nickel dibutyldithiocarbamate; sulfur-based antioxidants such as 2-mercaptobenzoylimidazole, 2-mercaptobenzimidazole, zinc salt of 2-mercaptobenzimidazole, dilauryl thiodipropionate and distearyl thiodipropionate and the like.

These antioxidants may be used alone, or two or more types thereof may be used in combination. The amount of blend thereof is, based on the total 100 parts by weight of the ethylene.α-olefin.non-conjugated polyene copolymer and other polymer(s) (elastomer, rubber, etc.), usually 0.3 to 10 parts by weight, and preferably 0.5 to 7.0 parts by weight. Within this range, a molded article achieved from the resulting rubber composition has no bloom on its surface, and furthermore, the inhibition of vulcanization can be prevented.

<Processing Aid>

For the processing aid according to the present invention 2, those generally blended into rubber as a processing aid can be used widely.

Specific examples of processing aids include ricinoleic acid, stearic acid, palmitic acid, lauric acid, barium stearate, zinc stearate, calcium stearate, esters and the like. Among these, stearic acid is preferable.

The amount of blend of the processing aid is, based on 100 parts by weight of the ethylene.α-olefin.non-conjugated polyene copolymer and other polymer(s) than the ethylene-based copolymer (elastomer, rubber, etc.) which are contained in the rubber composition, usually 10 parts by weight or less, and preferably 8.0 parts by weight or less.

<Activator>

Specific examples of activators include amines such as di-n-butylamine, dicyclohexylamine and monoethanolamine; activators such as diethylene glycol, polyethylene glycol, lecithin, triarylate mellirate and zinc compounds of aliphatic or aromatic carboxylic acids; zinc peroxide adjusted substances; ctadecyltrimethylammonium bromide, synthetic hydrotalcite, special quaternary ammonium compounds and the like.

When an activator is contained, the amount of blend thereof is, based on 100 parts by weight of the ethylene.α-olefin.non-conjugated polyene copolymer and other polymer(s) (elastomer, rubber, etc.), usually 0.2 to 10 parts by weight and preferably 0.3 to 5 parts by weight.

<Moisture Absorbent>

Specific examples of moisture absorbents include calcium oxide, silica gel, sodium sulfate, molecular sieve, zeolite, white carbon and the like.

When a moisture absorbent is contained, the amount of blend thereof is, based on 100 parts by weight of the ethylene.α-olefin.non-conjugated polyene copolymer and other polymer(s) (elastomer, rubber, etc.), usually 0.5 to 15 parts by weight and preferably 1.0 to 12 parts by weight.

<Molded Article>

A molded article obtained from the ethylene.α-olefin.non-conjugated polyene copolymer of the present invention 2, the cross-linked ethylene.α-olefin.non-conjugated polyene copolymer, or a composition containing the ethylene.α-olefin.non-conjugated polyene copolymer such as, for example, a cross-linked molded article or cross-linked foam, can be employed in a variety of applications.

Specifically, examples of applications include rubber for tires, O-rings, industrial rolls, packings (e.g., condenser packings), gaskets, belts (e.g., heat-insulating belts, printing machine belts), hoses (e.g., water hoses, brake reservoir hoses, radiator hoses), prevention rubber, sponges (e.g., weather strip sponges, heat-insulating sponges, protection sponges, slightly-foamed sponges), cables (ignition cables, cab tire cables, high tension cables), wire coating materials (high voltage wire coating materials, low voltage wire coating materials, marine wire coating materials), glass run channels, collar surface materials, paper feeding rolls, roofing sheets and the like.

[Present Invention 2-1]

The composition for seal packings according to the present invention 2-1 contains a particular ethylene.α-olefin.non-conjugated polyene copolymer (ethylene-based copolymer A) as described in the present invention 2. The composition for seal packings containing the ethylene-based copolymer A will also be referred to as a composition for seal packings hereinafter.

A seal packing obtained from the composition containing the ethylene-based copolymer A exhibits an excellent balance between rubber elasticity at a low temperature and tensile strength at ambient temperature. Therefore, the composition for seal packings containing the ethylene-based copolymer A can be suitably used for automotive sealing components, machine sealing components, sealing components for electric/electronic parts, gaskets for construction, sealing components for civil engineering and building materials, which may be used in a cold climate.

For the composition for seal packings according to the present invention 2-1, the content ratio of the ethylene-based copolymer A in the composition is usually 20% by mass or more, preferably 20 to 90% by mass, and more preferably 30 to 80% by mass.

<<Other Components>>

The composition for seal packings according to the present invention 2-1 contains the ethylene.α-olefin.non-conjugated polyene copolymer (ethylene-based copolymer A) described above and is preferred to contain a cross-linking agent as other component.

The composition for seal packings according to the present invention 2-1 may contain other polymer(s) than the ethylene-based copolymer A. Examples of other polymers that need to be cross-linked include, for example, cross-linking rubber such as natural rubber, isoprene rubber, butadiene rubber, styrene-butadiene rubber, chloroprene rubber, nitrile rubber, butyl rubber, acrylic rubber, silicone rubber, fluororubber and urethane rubber. Examples of other polymers that do not need to be cross-linked include, for example, elastomers such as styrene-based thermoplastic elastomers (TPS), e.g., styrene-butadiene block copolymers (SBS), polystyrene-poly(ethylene-butylene)-polystyrene (SEBS) and polystyrene-poly(ethylene-propylene)-polystyrene(SEPS), olefin thermoplastic elastomers (TPO), vinyl chloride elastomers (TPVC), ester-based thermoplastic elastomers (TPC), amide-based thermoplastic elastomers (TPA), urethane thermoplastic elastomers (TPU), and other thermoplastic elastomers (TPZ). Other polymer(s) can generally be blended in the amount of 100 parts by mass or less, and preferably 80 parts by mass or less based on 100 parts by mass of the ethylene-based copolymer A.

Furthermore, the composition for seal packings according to the present invention 2-1 may contain, in accordance with the purpose, other additives, for example, at least one additive selected from cross-linking aids, vulcanizing accelerators, vulcanizing aids, softeners, reinforcing agents, antioxidants, inorganic fillers, processing aids, activators, moisture absorbents, heat stabilizers, weathering stabilizers, antistatic agents, coloring agents, lubricants, thickeners, foaming agents and foaming aids. In addition, each additive may be used alone, or two or more types may be used in combination.

The composition for seal packings according to the present invention 2-1 can be prepared by kneading the ethylene-based copolymer A and other component(s) blended as necessary at a desired temperature, using a kneading machine such as, for example, a mixer, kneader or a roll. As the ethylene-based copolymer A has excellent kneadability, the composition for seal packings can be prepared favorably.

Specifically, the composition for seal packings according to the present invention 2-1 can be prepared by, using a previously known kneading machine such as a mixer or a kneader, kneading the ethylene-based copolymer A and other component(s) as necessary at a predetermined temperature for a predetermined period of time, for example, at 80 to 200° C. for 3 to 30 minutes, then, as required, adding to the kneaded material other component(s) such as a cross-linking agent and the like which are used as appropriate, and kneading the mixture, using a roll, at a predetermined temperature for a predetermined period of time, for example at a roll temperature of 30 to 80° C. for 1 to 30 minutes.

<Cross-Linking Agent, Cross-Linking Aid, Vulcanizing Accelerator and Vulcanizing Aid>

Examples of cross-linking agents include cross-linking agents which are generally used to cross-link rubber such as organic peroxides, phenol resins, sulfur compounds, hydrosilicone compounds, amino resins, quinones or derivatives thereof, amine compounds, azo compounds, epoxy compounds and isocyanate compounds. Among these, organic peroxides and sulfur compounds (also referred to as "vulcanizing agent" hereinafter) are suitable.

Examples of organic peroxides include dicumyl peroxide (DCP), di-tert-butylperoxide, 2,5-di-(tert-butylperoxy)hexane, 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxybenzoate, ert-butylperoxyisopropylcarbonate, diacetyl peroxide, lauroyl peroxide, tert-butyl cumyl peroxide and the like.

When an organic peroxide is used as a cross-linking agent, the amount of blend thereof in the composition for seal packings is, based on the total 100 parts by mass of the ethylene-based copolymer A and other polymer(s) (cross-linking rubber, etc.) which is/are blended as necessary and need(s) to be cross-linked, generally 0.1 to 20 parts by mass, preferably 0.2 to 15 parts by mass and more preferably 0.5 to 10 parts by mass. It is suitable that the amount of blend of the organic peroxide is within the above range because the resulting seal packing has no bloom on its surface and the composition for seal packings exhibits an excellent cross-linking characteristic.

When an organic peroxide is used as a cross-linking agent, it is preferred to use a cross-linking aid in combination. Examples of cross-linking aids include sulfur; quinone dioxime-based cross-linking aids such as p-quinonedioxime; acrylic cross-linking aids, e.g., ethylene glycol dimethacrylate and trimethylolpropane trimethacrylate; allyl cross-linking aids, e.g., diallyl phthalate and triallyl isocyanurate; maleimide-based cross-linking aids; divinylbenzene; and metallic oxides such as zinc oxide (e.g., ZnO #1/zinc oxide No. 2 (JIS (K-1410)), produced by HakusuiTech Co., Ltd.), magnesium oxide and zinc white (e.g., zinc oxide such as "META-Z102" (trade name; produced by Inoue Calcium Corporation)).

When a cross-linking aid is used, the amount of blend of the cross-linking aid in the composition for seal packings is usually 0.5 to 10 mol, preferably 0.5 to 7 mol and more preferably 1 to 6 mol based on 1 mol of the organic peroxide.

Examples of sulfur compounds (vulcanizing agent) include sulfur, sulfur chloride, sulfur dichloride, morpholine disulfide, alkylphenol disulfide, tetramethylthiuram disulfide and selenium dithiocarbamate.

When a sulfur compound is used as a cross-linking agent, the amount of blend thereof in the composition for seal packings is, based on the total 100 parts by mass of the ethylene-based copolymer A and other polymer(s) (cross-linking rubber, etc.) which is/are blended as necessary and need(s) to be cross-linked, usually 0.3 to 10 parts by mass, preferably 0.5 to 7.0 parts by mass and more preferably 0.7 to 5.0 parts by mass. When the amount of blend of the sulfur compound is within the above range, the resulting seal packing has no bloom on its surface, and the composition for seal packings exhibits an excellent cross-linking characteristic.

When a sulfur compound is used as a cross-linking agent, it is preferable to use a vulcanizing accelerator in combination.

Examples of vulcanizing accelerators include thiazole-based vulcanizing accelerators, e.g., N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (e.g., Sanceler M (trade name; produced by Sanshin Chemical Industry Co., LTD.)), 2-(4-morphorinodithio)benzothiazole (e.g., NOCCELER MDB-P (trade name; produced by OUCHI SHINKO CHEMICAL INDUSTRIAL CO., LTD)), 2-(2,4-dinitrophenyl)mercaptobenzothiazole, 2-(2,6-diethyl-4-morphorinothio)benzothiazole and dibenzothiazyl disulfide (e.g., Sanceler DM (trade name; produced by Sanshin Chemical Industry Co., LTD.)); guanidine-based vulcanizing accelerators, e.g., diphenylguanidine, triphenylguanidine, and di-ortho-tolylguanidine; aldehydeamine-based vulcanizing accelerators, e.g., acetaldehyde-aniline condensate and butylaldehyde.aniline condensate; imidazoline-based vulcanizing accelerators, e.g., 2-mercaptoimidazoline; thiuram-based vulcanizing accelerators, e.g., tetramethylthiuram monosulfide (e.g., Sanceler TS (trade name; produced by Sanshin Chemical Industry Co., LTD.)), tetramethylthiuram disulfide (e.g., Sanceler TT (trade name; produced by Sanshin Chemical Industry Co., LTD.)), tetraethylthiuram disulfide(e.g., Sanceler TET(trade name; produced by Sanshin Chemical Industry Co., LTD.)), tetrabutylthiuram disulfide (e.g., Sanceler TBT (trade name; produced by Sanshin Chemical Industry Co., LTD.)) and dipentamethylenethiuram tetrasulfide (e.g., Sanceler TRA (trade name; produced by Sanshin Chemical Industry Co., LTD.)); dithioic acid salt-based vulcanizing accelerators, e.g., zinc dimethyldithiocarbamate, zinc diethyldithiocarbamate, zinc dibutyldithiocarbamate (e.g., Sanceler PZ, Sanceler BZ and Sanceler EZ (trade names; produced by Sanshin Chemical Industry Co., LTD.) and tellurium diethyldithiocarbamate; thiourea-based vulcanizing accelerator, e.g., ethylenethiourea (e.g., Sanceler BUR (trade name; produced by Sanshin Chemical Industry Co., LTD.), Sanceler 22-C(trade name; produced by Sanshin Chemical Industry Co., LTD.), N,N'-diethylthiourea and N,N'-dibutylthiourea; and xanthate-based vulcanizing accelerators, e.g., zinc dibutylxanthate.

When a vulcanizing accelerator is used, the amount of blend of the vulcanizing accelerators in the composition for seal packings is, based on the total 100 parts by mass of the ethylene-based copolymer A and other polymer(s) (cross-linking rubber, etc.) which is/are blended as necessary and need(s) to be cross-linked, generally 0.1 to 20 parts by mass, preferably 0.2 to 15 parts by mass and more preferably 0.5 to 10 parts by mass. When the amount of blend of the vulcanizing accelerator is within the above range, the resulting seal packing has no bloom on its surface, and the composition for seal packings exhibits an excellent cross-linking characteristic. When a sulfur compound is used as a cross-linking agent, a vulcanizing aid can be used in combination.

Examples of vulcanizing aids include zinc oxide (e.g., ZnO #1/zinc oxide No. 2, produced by HakusuiTech Co., Ltd.), magnesium oxide, and zinc white (e.g., zinc oxide such as "META-Z102" (trade name; produced by Inoue Calcium Corporation)).

When a vulcanizing aid is used, the amount of blend of the vulcanizing aid in the composition for seal packings is, based on the total 100 parts by mass of the ethylene-based copolymer A and other polymer(s) (cross-linking rubber, etc.) which is/are blended as necessary and need(s) to be cross-linked, usually 1 to 20 parts by mass.

<Softener>

Examples of softeners include petroleum-based softeners such as process oil, lubricating oil, paraffin oil, liquid paraffin, petroleum asphalt and Vaseline; coal tar-based softeners such as coal tar; fatty oil-based softeners such as castor oil, linseed oil, rapeseed oil, soybean oil and coconut oil; wax such as beeswax and carnauba wax; naphthenic acid, pine oil, rosin or derivatives thereof; synthetic polymer materials such as terpene resins, petroleum resins and coumarone indene resins; ester-based softeners such as dioctyl phthalate and dioctyl adipate; and microcrystalline wax, liquid polybutadiene, modified liquid polybutadiene, hydrocarbon-based synthetic lubricating oil, tall oil, and substitute (factice). Among these, petroleum-based softeners are preferable, and in particular, process oil is preferable.

When the composition for seal packings contains a softener, the amount of blend of the softener is, based on the total 100 parts by mass of the ethylene-based copolymer A and other polymer (elastomer, cross-linking rubber, etc.) component(s) which is/are blended as necessary, generally 2 to 100 parts by mass, and preferably 10 to 100 parts by mass.

<Reinforcing Agent>

Examples of reinforcing agents include carbon black, carbon black produced though surface treatment with a silane coupling agent, silica, calcium carbonate, activated calcium carbonate, fine powder talc and fine powder silicic acid.

When the composition for seal packings contains a reinforcing agent, the amount of blend of the reinforcing agent is, based on the total 100 parts by mass of the ethylene-based copolymer A and other polymer(s) (elastomer, cross-linking rubber, etc.) which is/are blended as necessary, generally 5 to 150 parts by mass, and preferably 5 to 100 parts by mass.

<Antioxidant (Stabilizer)>

By blending an antioxidant (stabilizer) into the composition for seal packings according to the present invention 2-1, the product life of a seal packing therefrom can be increased. Examples of such antioxidants include previously known antioxidants, for example, amine-based antioxidants, phenol-based antioxidants, and sulfur-based antioxidants.

Examples of antioxidants include aromatic secondary amine-based antioxidants such as phenylbuthylamine and N,N-di-2-naphthyl-p-phenylenediamine; phenol-based antioxidants such as dibutylhydroxytoluene and tetrakis[methylene(3,5-di-t-butyl-4-hydroxy)hydrocinnamate]methane; thioether-based antioxidants such as bis[2-methyl-4-(3-n-alkylthiopropionyloxy)-5-t-butylphenyl]sulfide; dithiocarbamate-based antioxidants such as nickel dibutyldithiocarbamate; sulfur-based antioxidants such as 2-mercaptobenzoylimidazole, 2-mercaptobenzimidazole, zinc salt of 2-mercaptobenzimidazole, dilauryl thiodipropionate, distearyl thiodipropionate and the like.

When the composition for seal packings contains an antioxidant, the amount of blend of the antioxidant is, based on the total 100 parts by mass of the ethylene-based copolymer A and other polymer(s) (elastomer, cross-linking rubber, etc.) which is/are blended as necessary, usually 0.3 to 10 parts by mass, and preferably 0.5 to 7.0 parts by mass. When the amount of blend of the antioxidant is within the above range, the resulting seal packing has no bloom on its surface, and moreover, the inhibition of vulcanization can be prevented.

<Inorganic Filler>

Examples of inorganic fillers include light calcium carbonate, heavy calcium carbonate, talc, clay and the like. Among these, heavy calcium carbonate such as "Whiton SB" (trade name; SHIRAISHI CALCIUM KAISHA, LTD.) is preferred.

When the composition for seal packings contains an inorganic filler, the amount of blend of the inorganic filler is, based on the total 100 parts by mass of the ethylene-based copolymer A and other polymer(s) (elastomer, cross-linking rubber, etc.) which is/are blended as necessary, usually 2 to 50 parts by mass and preferably 5 to 50 parts by mass. When the amount of blend of the inorganic filler is within the above range, the composition for seal packings exhibits excellent kneadability, and a seal packing with excellent mechanical properties can be achieved.

<Processing Aid>

For a processing aid, for example, those generally blended into rubber as a processing aid can be used widely.

Specific examples of processing aids include fatty acids such as ricinoleic acid, stearic acid, palmitic acid and lauric acid, fatty acid salts such as barium stearate, zinc stearate, calcium stearate as well as esters. Among these, stearic acid is preferable.

When the composition for seal packings contains a processing aid, the amount of blend of the processing aid is, based on the total 100 parts by mass of ethylene-based copolymer A and other polymer(s) (elastomer, cross-linking rubber, etc.) which is/are blended as necessary, usually 10 parts by mass or less, and preferably 8.0 parts by mass or less.

<Activator>

Examples of activators include amines such as di-n-butylamine, dicyclohexylamine and monoethanolamine; activators such as diethylene glycol, polyethylene glycol, lecithin, triarylate mellirate and zinc compounds of aliphatic or aromatic carboxylic acids; zinc peroxide adjusted substances; and ctadecyltrimethylammonium bromide, synthetic hydrotalcite, special quaternary ammonium compounds.

When the composition for seal packings contains an activator, the amount of blend of the activator is, based on the total 100 parts by mass of the ethylene-based copolymer A and other polymer(s) (elastomer, cross-linking rubber, etc.) which is/are blended as necessary, usually 0.2 to 10 parts by mass and preferably 0.3 to 5 parts by mass.

<Moisture Absorbent>

Examples of moisture absorbents include calcium oxide, silica gel, sodium sulfate, molecular sieve, zeolite and white carbon.

When the composition for seal packings contains a moisture absorbent, the amount of blend of the moisture absorbent is, based on the total 100 parts by mass of the ethylene-based copolymer A and other polymer(s) (elastomer, cross-linking rubber, etc.) which is/are blended as necessary, usually 0.5 to 15 parts by mass, and preferably 1.0 to 12 parts by mass.

<Foaming Agent and Foaming Aid>

A seal packing formed from the rubber composition for seal packings 1 of the present invention 2-1 may be non-foamed material or foamed material. When the seal packing is a foamed material, the rubber composition for seal packings 1 is preferred to contain a foaming agent. For foaming agents, any commercially available foaming agent is suitably used. Examples of such foaming agents include, for example, inorganic foaming agents, e.g., sodium bicarbonate, sodium carbonate, ammonium bicarbonate, ammonium carbonate and ammonium nitrite; nitroso compounds, e.g., N,N'-dinitrosoterephthalamide and N,N'-dinitrosopentamethylenetetramine; azo compounds, e.g., azodicarbonamide, azobisisobutyronitrile, azocyclohexylnitrile, azodiaminobenzene and barium azodicarboxylate; sulfonylhydrazide compounds, e.g., benzenesulfonyl hydrazide, toluenesulfonyl hydrazide and p,p'-oxybis(benzenesulfonyl hydrazide) diphenylsulfone-3,3'-disulfonyl hydrazide; and azide compounds, e.g., calcium azide, 4,4'-diphenyldisulfonylazide and para-toluenemalfonylazide. Among these, azo compounds, sulfonylhydrazide compounds, azide compounds are preferably used.

When the rubber composition for seal packings 1 contains a foaming agent, the amount of blend of the foaming agent is selected as appropriate depending on the required performance of the seal packing produced from the rubber composition for seal packings 1, but usually used at a ratio of 0.5 to 30 parts by mass, and preferably 1 to 20 parts by mass based on the total 100 parts by mass of the ethylene-based copolymer A and other polymer(s) (elastomer, cross-linking rubber, etc.) which is/are blended as necessary.

Furthermore, as required, a foaming aid may be used along with a foaming agent. The addition of a foaming aid is advantageous in controlling the decomposition temperature of the foaming agent, uniforming bubbles, etc. Specific examples of foaming aids include organic acids such as salicylic acid, phthalic acid, stearic acid and oxalic acid as well as urea and derivatives thereof.

When the rubber composition for seal packings 1 contains a foaming aid, the amount of blend of the foaming aid is usually used at a ratio of 1 to 100 parts by mass and preferably 2 to 80 parts by mass based on 100 parts by mass of the foaming agent.

[Properties of Composition for Seal Packings]

By using the composition for seal packings according to the present invention 2-1, a seal packing with excellent mechanical properties at ambient temperature and excellent low temperature properties can be formed.

By using the composition for seal packings according to the present invention 2-1, compared to those using conventional EPDMs, a seal packing with superior low temperature flexibility can be obtained, and a seal packing with superior cold resistance can be obtained compared to those using silicone rubber.

[Seal Packing]

The seal packing according to the present invention 2-1 is formed from the composition for seal packings described above.

Methods of producing a seal packing from the composition for seal packings according to the present invention 2-1 include, for example, a method in which the composition 1 (uncross-linked composition) is formed in a shape of a desired seal packing, and, simultaneously with or after the forming, the composition is cross-linked.

Methods of a cross-linking treatment include, for example, a method in which a composition containing a cross-linking agent is used as the composition for seal packings and is heated to be cross-linked and a method in which electron beams are irradiated on the composition for seal packings to cross-link the composition.

In other words, the seal packing according to the present invention 2-1 can be prepared by forming a composition for seal packings in an intended shape using a molding machine such as an extruder, calender roll, press, injection molding machine or transfer molding machine, and then cross linking the molded article by, simultaneously with or after the forming, introducing and heating the molded article in a vulcanization bath at 120 to 270° C. for 1 to 30 minutes or irradiating electron beams.

For a cross-linking treatment, a mold may be used. Alternatively, cross-linking may be carried out without using a mold. When a mold is not used, the forming and cross-linking steps are usually performed repeatedly. For heating methods in vulcanization bath, means such as hot air, glass beads fluidized-bed, UHF (ultra-high frequency electromagnetic waves), steam or the like can be used.

In a cross-linking method, when a cross-linking agent is not used and electron beams are used instead, electron beams usually having energy of 0.1 to 10 MeV and preferably 0.3 to 2 MeV may be irradiated on the composition for seal packings formed in a predetermined shape such that the absorbed dose becomes usually 0.5 to 35 Mrad and preferably 0.5 to 10 Mrad.

The seal packing according to the present invention 2-1 can be utilized suitably as automotive sealing components, machine sealing components, sealing components for electric/electronic parts, gaskets for construction, sealing components for civil engineering and building materials.

Specific examples of seal packings according to the present invention 2-1 include cups for brake master cylinders in hydraulic brakes, cups for brake wheel cylinders, seal packings for controlling hydraulic pressure and O-rings for braking, cups for clutch cylinders in clutches and condenser packings.

[Present Invention 2-2]

The composition of the present invention 2-2 contains particular ethylene.α-olefin.non-conjugated polyene copolymers (1) and (2). Hereinafter, each of these copolymers is also referred to as "copolymer (1)" and "copolymer (2)" respectively. In addition, a structural unit derived from a monomer [α] is also referred to as "structural unit [α]."

The particular ethylene.α-olefin.non-conjugated polyene copolymer (1) used in the present invention 2-2 is the particular ethylene.α-olefin.non-conjugated polyene copolymer (ethylene-based copolymer A) as described in the present invention 2.

Furthermore, the particular ethylene.α-olefin.non-conjugated polyene copolymer (2) contains a structural unit derived from ethylene [A'], a structural unit derived from a $C_3$-$C_{20}$ α-olefin [B'] and a structural unit derived from a non-conjugated polyene [C'], and the ethylene.α-olefin.non-conjugated polyene copolymer (2) satisfies the following (I).

(I) The B value represented by the equation (i) as below is less than 1.20.

$$B \text{ value}=([EX]+2[Y])/[2\times[E]\times([X]+[Y])] \quad \text{(i)}$$

[In the equation (i), [E], [X] and [Y] represent mole fractions of the ethylene [A'], the $C_3$-$C_{20}$ α-olefin [B'] and the non-conjugated polyene [C'] respectively, and [EX] represents the ethylene [A']-$C_3$-$C_{20}$ α-olefin [B'] diad chain fraction.]

The copolymer (1) (ethylene-based copolymer A) has an excellent balance in stickness, processability and fluidity. Therefore, adhesion performance and processing performance of the resulting composition can be improved. In addition, since the copolymer (1) is, like the copolymer (2), an ethylene.α-olefin.non-conjugated polyene copolymer, it is easy to control when the copolymer (1) is blended into the copolymer (2) to be cross-linked and foamed. Therefore, the increase in specific gravity of the resulting molded article can be prevented and the sound insulation performance can be improved.

For the composition of the present invention 2-2, the total content ratio of copolymers (1) and (2) in the composition is usually 20% by mass or more, preferably 20 to 50% by mass and more preferably 25 to 40% by mass.

For the composition of the present invention 2-2, the mass ratio of the copolymer (1) to the copolymer (2) [(1)/(2)] is preferably 10/90 to 50/50, more preferably 10/90 to 45/55 and more preferably 10/90 to 40/60. The composition with the mass ratio within the above range exhibits excellent rolling processability and adhesion performance. Furthermore, a molded article with excellent sound insulation performance and low specific gravity can be obtained by cross-linking (and preferably further foaming) the composition.

<<Ethylene.α-Olefin.Non-Conjugated Polyene Copolymer (2)>>

The ethylene.α-olefin.non-conjugated polyene copolymer (2) contains a structural unit derived from ethylene [A'], a structural unit derived from a $C_3$-$C_{20}$ α-olefin [B'] and a structural unit derived from a non-conjugated polyene [C'].

For each of the $C_3$-$C_{20}$ α-olefin [B'] and non-conjugated polyene [C'], only one type may be used, or two or more types may be used. In other words, the ethylene.α-olefin.non-conjugated polyene copolymer (2) contains a structural unit derived from the ethylene [A'], structural units derived from at least one type of $C_3$-$C_{20}$ α-olefins [B']

and structural units derived from at least one type of non-conjugated polyenes [C'].

The copolymer (2) has (I) the B value represented by the following equation (i) which is less than 1.20, preferably in the range of 0.8 to 1.2 and, in particular, preferably in the range 0.8 to 1.1.

$$B \text{ value}=([EX]+2[Y])/[2\times[E]\times([X]+[Y])] \quad \text{(i)}$$

wherein [E], [X] and [Y] are mole fractions of the ethylene [A'], $C_3$-$C_{20}$ α-olefin(s) [B'] and non-conjugated polyene(s) [C'] respectively, and [EX] exhibits the ethylene [A']-$C_3$-$C_{20}$ α-olefin(s) [B'] diad chain fraction of.

The copolymer (2) with its B value within the above range is believed to have more crystal structures than a copolymer with a high B value and high alternativeness of monomers which constitute the copolymer. When a copolymer having numerous crystal structures is used along with the copolymer (1), the tensile strength of the resulting composition is increased, and the foamability is improved (in other words, even with low specific gravity, a molded article with a high tensile strength can be achieved).

The content of the structural units derived from the ethylene [A'] is, when the total of the structural units of [A'], [B'] and [C'] is 100% by mole, preferably 44 to 89% by mole and more preferably 44 to 88% by mole. The mole percent can be determined by the intensity measurement with a $^1$H-NMR spectrometer.

Examples of $C_3$-$C_{20}$ α-olefins [B'] include, for example, propylene, 1-butene, 1-pentene, 1-hexene, 4-methyl-1-pentene, 1-heptene, 1-octene, 1-decene, 1-dodecene, 1-tetradecene, 1-hexadecane and 1-eicosene. These α-olefins [B'] may be used alone, or two or more types may be used in combination. Among these, $C_3$-$C_8$ α-olefins are preferred, especially propylene, 1-butene, 1-hexene, 1-octene and the like are preferred. Particularly, propylene is suitable.

The content of structural units derived from the $C_3$-$C_{20}$ α-olefin(s) [B'] is, when the total of the structural units of [A'], [B'] and [C'] is 100% by mole, preferably 10 to 50% by mole. The above range is suitable in terms of the flexibility and mechanical properties at a low temperature of a cross-linked foam. The mole percent can be determined by the intensity measurement with a $^1$H-NMR spectrometer.

The copolymer (2) preferably (II) contains, as structural units derived from the non-conjugated polyene(s) [C'], a structural unit derived from a non-conjugated polyene [C'-1] including only one partial structure represented by the following formula (II-1) or (II-2) in the molecule, and a structural unit derived from a non-conjugated polyene [C'-2] including two or more partial structures in total in the molecule selected from the following formulas (II-1) and (II-2).

[Chem. 41]

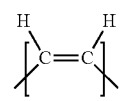
(II-1)

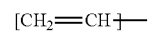
(II-2)

The formula (II-1) is a partial structure of a cyclic olefin.

Examples of non-conjugated polyenes [C'-1] do not include aliphatic polyenes which have vinyl groups ($CH_2$=$CH$—) on both ends of the molecule. Specific examples of non-conjugated polyenes [C'-1] include aliphatic polyenes and alicyclic polyenes as follows.

Specific examples of aliphatic polyenes include 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1, 6-octadiene, 6-ethyl-1,6-octadiene, 6-propyl-1,6-octadiene, 6-butyl-1,6-octadiene, 7-methyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1, 7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene. One type of the aliphatic polyenes may be used, or two or more types of aliphatic polyenes may be used in combination. 7-methyl-1,6-octadiene is preferably used.

Examples of alicyclic polyenes include polyenes composed of an alicyclic portion having one carbon-carbon double bond (unsaturated bond) and a chain portion bounded to the a carbon atom that forms the alicyclic portion by a carbon-carbon double bond (ethylidene, propylidene, etc.). Specific examples thereof include, 5-ethylidene-2-norbornene (ENB), 5-propylidene-2-norbornene and 5-butylidene-2-norbornene. One type of the alicyclic polyenes may be used, or two or more types thereof may be used in combination. In particular, 5-ethylidene-2-norbornene (ENB) is preferable. Other examples of alicyclic polyenes include 2-methyl-2,5-norbornadiene and 2-ethyl-2,5-norbornadiene.

Examples of non-conjugated polyenes [C'-2] include aliphatic polyenes including an alicyclic portion having a carbon-carbon double bond (unsaturated bond) and a chain portion containing a vinyl group which chain portion is bounded to a carbon atom that forms the alicyclic portion, and aliphatic polyenes which have vinyl groups on both ends of the molecule.

Specific examples thereof include 5-alkenyl-2-norbornene such as 5-vinyl-2-norbornene (VNB) or 5-allyl-2-norbornene; alicyclic polyenes such as 2,5-norbornadiene, dicyclopentadiene (DCPD), norbornadiene, tetracyclo[4,4,0,12.5,17.10]deca-3,8-diene; aliphatic polyene such as α,ω-diene, e.g., 1,7-octadiene and 1,9-decadiene. One type of these may be used, or two or more types thereof may be used in combination. Among these, 5-vinyl-2-norbornene (VNB), 5-alkenyl-2-norbornene, dicyclopentadiene, 2,5-norbornadiene, 1,7-octadiene, 1,9-decadiene are preferred and 5-vinyl-2-norbornene (VNB) is especially preferred.

In particular, it is preferred that the non-conjugated polyene [C'-1] is 5-ethylidene-2-norbornene (ENB) and the non-conjugated polyene [C'-2] is 5-vinyl-2-norbornene (VNB).

The total content of structural units [C'-1] and [C'-2] is, when the total of the structural units of [A'], [B'] and [C'] is 100% by mole, preferably 1 to 10% by mole and more preferably 2 to 8% by mole. The above range is suitable in terms of easiness to control the cross-linking reaction speed.

The molar ratio of the contents of the structural units [C'-1] to the structural units [C'-2] ([C'-1]/[C'-2]) is preferably 75/25 to 99.5/0.5 and more preferably 78/22 to 97/3. The above range is suitable in terms of the balance between cross-linking reactivity and gas-retaining property during the foaming reaction.

These can be determined by the intensity measurement with a $^1$H-NMR spectrometer.

The copolymer (2) is preferred to (III) have the Mooney viscosity $ML_{(1+4)}100°$ C. at 100° C. of 20 to 45, and more preferably of 25 to 40. When the Mooney viscosity is the above lower limit or more, the foam as the resulting composition has an excellent mechanical strength. When the Mooney viscosity is the above upper limit or less, a composition with excellent processability can be obtained, and a foam with a high foaming ratio can be achieved.

The copolymer (2) is preferred to (IV) satisfy the following formula (IV-1).

$$\mathrm{Log}\{\eta^*(0.01)\}/\mathrm{Log}\{\eta^*(10)\} > 0.0753 \times \{\text{apparent iodine value derived from non-conjugated polyene [C'-2]}\} + 1.32 \qquad \text{(IV-1)}$$

In the formula (IV-1), $\eta^*(0.01)$ represents the viscosity (Pa·sec) of 0.01 rad/sec at 190° C. and $\eta^*(10)$ represents viscosity (Pa·sec) of 10 rad/sec at 190° C.

$\eta^*(0.01)$ and $\eta^*(10)$ can be measured by use of a viscoelasticity measuring apparatus. In addition, the apparent iodine value can be specifically calculated according to the following equation by measuring the content ratio (% by mass) of structural units derived from the non-conjugated polyene [C'-2] in the copolymer (2) with an NMR. The molecular weight of iodine is 253.81.

Apparent iodine value derived from the non-conjugated polyene [C'-2]=[the content ratio (% by mass) of structural units derived from the non-conjugated polyene [C'-2]]×Y× 253.81/(molecular weight of the non-conjugated polyene [C'-2] as a monomer).

In the equation, Y represents the number of carbon-carbon double bonds contained in structural units derived from the non-conjugated polyene [C'-2].

For more detailed measurement conditions, $\eta^*(0.01)$ and $\eta^*(10)$ can be measured in the method, for example, as described in paragraphs [0143] to [0144] of JP-A-2014-114379, and the apparent iodine value derived from the non-conjugated polyene [C'-2] can be measured in the method, for example, as described in paragraphs [0136] to [0141] of JP-A-2014-114379.

When the copolymer (2) satisfies the formula (IV-1), even though the non-conjugated polyene [C'-2] content is small, the copolymer (2) has more long chain branches. In other words, long chain branches necessary for obtaining excellent shape-retaining property, extrusion processability and foamability can be introduced by copolymerizing a small amount of the non-conjugated polyene [C'-2]. In addition, the rubber shaper article has excellent compression set which is achieved because of the small content of the remaining non-conjugated polyene [C'-2].

Since the copolymer (2) which satisfies the above (II) to (IV) has a low Mooney viscosity as well as a large amount of long chain branches uniformly, the composition containing the copolymer (2) has excellent foamability. Therefore, a cross-linked foam with low specific gravity can be achieved.

<<Process for Producing Ethylene.α-Olefin.Non-Conjugated Polyene Copolymer (2)>>

When synthesizing the copolymer (2), it is preferred to use a transition-metal compound. For producing the copolymer (2), the compound (a2) ((a2) transition-metal compound) represented by the following general formula (IA), (IIA) or (IIIA) is preferred to be used as the transition-metal compound.

The copolymer (2) can be obtained by the following production process. Specifically, the above-mentioned copolymer (2) can be produced by copolymerizing ethylene, $C_3$-$C_{20}$ α-olefin(s), and non-conjugated polyene (s) in the presence of an olefin polymerization catalyst including an (a2) transition-metal compound as well as (b) at least one compound selected from (b-1) an organometallic compound, (b-2) an organoaluminium oxy-compound, and (b-3) a compound which reacts with a transition-metal compound (a2) to form an ion pair.

<Compound (a2)>

The compound (a2) is represented by the following formula (IA), (IIA) or (IIIA).

The compound represented by the formula (IA) will be explained.

[Chem. 42]

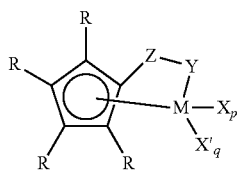

(IA)

In the formula (IA), each R represents independently a group selected from hydrocarbyl, halohydrocarbyl, silyl, germyl and combinations thereof or a hydrogen atom, and the number of atoms other than hydrogen included in the group is 20 or less.

M represents titanium, zirconium, or hafnium.

Y represents —O—, —S—, —NR*— or —PR*—, wherein R* represents a hydrogen atom, a hydrocarbyl group, a hydrocarbyloxy group, a silyl group, a halogenated alkyl group or a halogenated aryl group, and R* contains up to 20 atoms other than hydrogen when R* is not hydrogen.

Z represents a divalent group including boron or a group 14 element and, in addition, containing nitrogen, phosphorus, sulfur, or oxygen, and the number of atoms other than hydrogen included in the divalent group is 60 or less.

X represents, and if present plurally each X independently represents, an anionic ligand having 60 or less atoms (except for a cyclic ligand in which π electrons are delocalized).

X' represents, and if present plurally each X' independently represents, a neutral linked compound having the number of atoms of 20 or less.

p represents 0, 1 or 2.

q represents 0 or 1.

However, when p is 2 and q is 0, M is in an oxidation state of +4 and X is an anionic ligand selected from halides, hydrocarbyl, hydrocarbyloxy, di(hydrocarbyl)amide, di(hydrocarbyl)phosphides, hydrocarbylsulfide, silyl groups, halo-substituted derivatives thereof, di(hydrocarbyl)amino-substituted derivatives thereof, hydrocarbyloxy-substituted derivatives thereof and di(hydrocarbyl)phosphino-substituted derivatives thereof, wherein X has the number of atoms other than hydrogen of 20 or less. Furthermore, In the case where p is 1 and q is 0, M is in an oxidation state of +3 and X is an anionic stabilizing ligand selected from allyl, 2-(N,N'-dimethylaminomethyl)phenyl and 2-(N,N'-dimethyl)aminobenzyl, or alternatively, M is in an oxidation state of +4 and X is a divalent conjugated diene derivative and forms metallacyclopentene with M. In the case where p is 0 and q is 1, M is in an oxidation state of +2 and X' is a neutral conjugated or non-conjugated diene optionally substituted by one or more hydrocarbyl groups, and has 40 or less carbon atoms and forms a π complex with M.

The compound represented by the formula (IIA) will be explained.

[Chem. 43]

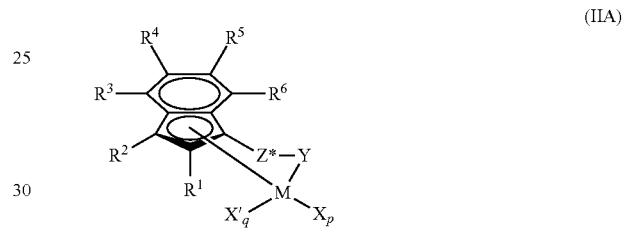

(IIA)

In the formula (IIA), $R^1$ and $R^2$ are hydrogen atoms or $C_1$-$C_6$ alkyl groups, wherein at least one of $R^1$ and $R^2$ is not a hydrogen atom.

$R^3$ to $R^6$ are independently a hydrogen atom or a $C_1$-$C_6$ alkyl group. $R^1$ to $R^6$ are optionally bound together to form a ring.

M is titanium.

Y is —O—, —S—, —NR*— or —PR*—. Z* is $SiR*_2$, $CR*_2$, $SiR*_2SiR*_2$, $CR*_2CR*_2$, $CR*=CR*$, $CR*_2SiR*_2$ or $GeR*_2$, wherein R* is each independently a hydrogen atom, a hydrocarbyl group, a hydrocarbyloxy group, a silyl group, a halogenated alkyl group or a halogenated aryl group, and R* has up to 20 atoms other than hydrogen in the case where R* is not hydrogen. Two R*s (in the case where R* is not hydrogen) bonding to Z* may form a ring, or R* bonding to Z* and R* bonding to Y may form a ring.

p represents 0, 1 or 2.

q represents 0 or 1.

However, in the case where p is 2, q is 0, M is in an oxidation state of +4, and X is each independently a methyl group or a benzyl group. In the case where p is 1, q is 0, M is in an oxidation state of +3, and X is a 2-(N, N'-dimethyl) aminobenzyl group, or alternatively, q is 0, M is in an oxidation state of +4, and X is 1,3-butadienyl. In the case where p is 0, q is 1, M is in an oxidation state of +2, and X' is 1,4-diphenyl-1,3-butadiene, 2,4-hexadiene or 1,3-pentadiene.

The compound represented by the formula (IIIA) will be explained.

[Chem. 44]

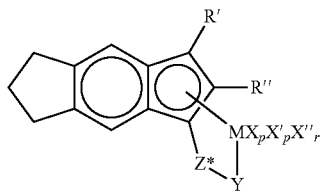

(IIIA)

In the formula (IIIA), R' is a hydrogen atom, a hydrocarbyl group, a di(hydrocarbylamino) group, or a hydrocarbyleneamino group, wherein R' has the number of carbon atoms of 20 or less in the case where R' has a carbon atom.

R" is a $C_1$-$C_{20}$ hydrocarbyl group or a hydrogen atom.

M is titanium.

Y is —O—, —S—, —NR*—, —PR*—, —NR$_2$*, or —PR$_2$*. Z* is —SiR*$_2$—, —CR*$_2$—, —SiR*$_2$SiR*$_2$—, —CR*$_2$CR*$_2$—, —CR*=CR*—, —CR*$_2$SiR*$_2$—, or —GeR*$_2$—. R* is, and if present plurally each R* is independently, a hydrogen atom or a group including at least one selected from the group consisting of hydrocarbyl, hydrocarbyloxy, silyl, halogenated alkyl, and halogenated aryl, wherein R* contains an atom of the atomic number of 2 to 20, and two R*s (in the case where R* is not a hydrogen atom) contained in Z* may optionally form a ring, or R* of Z* and R* of Y may form a ring.

X is a monovalent anionic ligand having the number of atoms of 60 or less excluding a cyclic ligand in which π electrons are delocalized.

X' is a neutral linked group having the number of atoms of 20 or less.

X" is a divalent anionic ligand having the number of atoms of 60 or less.

p represents 0, 1 or 2.

q represents 0 or 1.

r is 0 or 1.

In the case where p is 2, q and r are 0, M is in an oxidation state of +4 (except when Y is —NR*$_2$ or —PR*$_2$), or M is in an oxidation state of +3 (provided that Y is —NR*$_2$ or —PR*$_2$), and X is an anionic ligand selected from halide groups, hydrocarbyl groups, hydrocarbyloxy groups, di(hydrocarbyl)amide groups, di(hydrocarbyl)phosphide groups, hydrocarbylsulfide groups and silyl groups, as well as halogenated groups of these groups, di(hydrocarbyl)amino-substituted groups of these groups, hydrocarbyloxy-substituted groups of these groups and di(hydrocarbyl)phosphino-substituted groups of these groups, wherein the above groups have atoms of the atomic number of 2 to 30.

In the case where r is 1, p and q is 0, M is in an oxidation state of +4, and X" is a dianionic ligand selected from the group consisting of hydrocarbazyl groups, oxyhydrocarbyl groups and hydrocarbylenedioxy groups, wherein X" has an atom of the atomic number of 2 to 30. In the case where p is 1, q and r are 0, M is in an oxidation state of +3, and X is an anionic stabilizing ligand selected from the group consisting of allyl, 2-(N,N-dimethylamino)phenyl, 2-(N,N-dimethylaminomethyl)phenyl, and 2-(N,N-dimethylamino)benzyl. In the case where p and r are 0, q is 1, M is in an oxidation state of +2, and X' is a neutral conjugated diene or a neutral diconjugated diene which is optionally substituted by one or more hydrocarbyl groups, wherein X' has the number of carbon atoms of 40 or less and forms a bond with M by the π-π interaction.

In a more preferable aspect, in the formula (IIIA), in the case where p is 2 and q and r are 0, M is in an oxidation state of +4 and X is each independently methyl, benzyl, or halide, in the case where p and q are 0, r is 1, M is in an oxidation state of +4, and X" is a 1,4-butadienyl group which forms a metallacyclopentene ring with M, in the case where p is 1, q and r are 0, M is in an oxidation state of +3, and X is 2-(N,N-dimethylamino)benzyl, and in the case where p and r are 0, q is 1, M is in an oxidation state of +2, and X' is 1,4-diphenyl-1,3-butadiene or 1,3-pentadiene.

For the formula (IIIA), a compound represented by the following formula (IIIA') is especially preferable.

[Chem. 45]

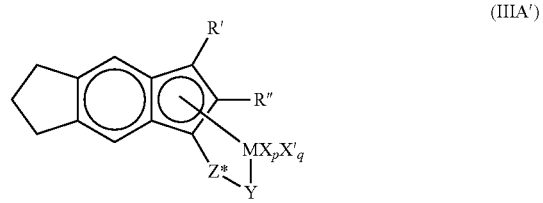

(IIIA')

In the formula (IIIA'), R' is a hydrogen atom or a $C_1$-$C_{20}$ hydrocarbyl group, R" is a $C_1$-$C_{20}$ hydrocarbyl group or a hydrogen atom, M is titanium, Y is —NR*—, Z* is —SiR*$_2$—, wherein R* is each independently a hydrogen atom or a $C_1$-$C_2$ hydrocarbyl group, one of p and q is 0 and the other is 1, wherein in the case where p is 0 and q is 1, M is in an oxidation state of +2, X' is 1,4-diphenyl-1,3-butadiene or 1,3-pentadiene and in the case where p is 1 and q is 0, M is in an oxidation state of +3, X is 2-(N,N-dimethylamino)benzyl.

Examples of $C_1$-$C_{20}$ hydrocarbyl groups include linear alkyl groups such as methyl group, ethyl group and butyl group, and branched alkyl groups such as t-butyl group and neopentyl group. Examples of hydrocarbyloxy groups include linear alkyloxy groups such as methyloxy group, ethyloxy group and butyloxy group, and branched alkyloxy groups such as t-butyloxy group and neopentyloxy group. Examples of halogenated alkyl groups include groups produced by chlorinating, brominating and fluorinating the above linear or branched alkyl groups. Examples of halogenated aryl groups include chlorophenyl group and chloronaphythyl group.

In the formula (III'A), R" is preferably a hydrogen atom or methyl, more preferably, methyl.

The polymerization by use of the above catalysts allows non-conjugated polyenes and the like having a double bond to be copolymerized at a high degree of conversion, and an appropriate amount of long chain branches can be introduced in the resulting copolymer (2).

Examples of particularly preferable catalysts include (t-butylamide)dimethyl($\eta^5$-2-methyl-s-indacen-1-yl)silanetitanium(II)2,4-hexadiene(IV), (t-butylamide)-dimethyl ($\eta^5$-2-methyl-s-indacen-1-yl)silanetitanium (IV) dimethyl (V), (t-butylamide)-dimethyl($\eta^5$-2,3-dimethylindenyl) silanetitanium (II)1,4-diphenyl-1,3-butadiene(VI), (t-butylamide)-dimethyl($\eta^5$-2,3-dimethyl-s-indacen-1-yl) silanetitanium(IV)dimethyl(VII), (t-butylamide)-dimethyl ($\eta^5$-2-methyl-s-indacen-1-yl)silanetitanium(II)1,3-pentadiene(VIII). Among these, (t-butylamide)-dimethyl ($\eta^5$-2-methyl-s-indacen-1-yl)silanetitanium(II)1,3-pentadiene(VIII) is especially preferable.

[Chem. 46]

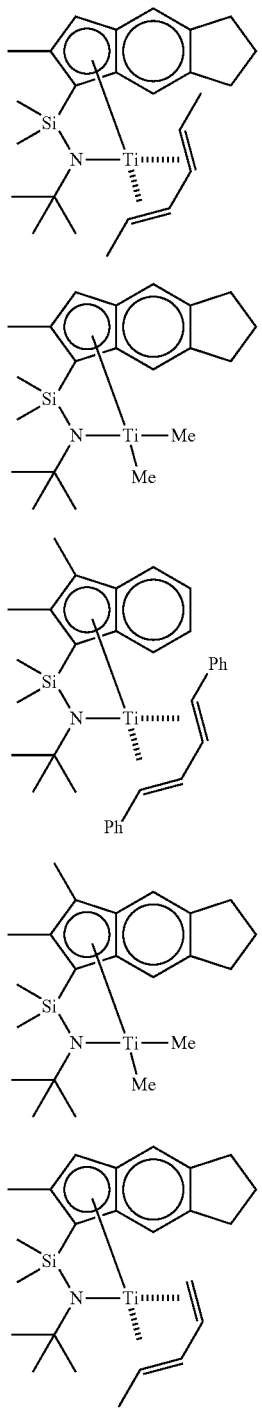

The use of a catalyst represented by the above formula (VIII) results in, regarding the polymerization reaction to obtain the copolymer (2), excellent copolymerizability of non-conjugated polyenes (e.g., component [C'-1] and component [C'-2]). For example, the double bond at a VNB terminal can be incorporated sufficiently and long chain branches can be introduced at a high rate. In addition, since the resulting copolymer (2) has narrow molecular weight distribution and composition distribution as well as a copolymer having a very uniform molecular structure, the formation of gel-like blobs on the surface of the rubber molded article which is a concern along with the production of long chain branches is significantly suppressed. As a result, the rubber molded article containing such a copolymer exhibits an excellent surface appearance due to the absence of gel-like blobs and also has a good production stability due to the excellent shape-retaining property.

(Process for Producing the Compound (a2))

The above compound (a2) can be produced by a known method, and the production process is not particularly limited. One example thereof include, for example, synthesizing methods described in WO 98/49212.

<Preferable Form when Transition-Metal Compound (a2) is Subjected to Catalyst for Ethylene.α-Olefin.Non-Conjugated Polyene Copolymer>

A preferable form for the case in which the above transition-metal compound (a2) is used as a catalyst for the ethylene.α-olefin.non-conjugated polyene copolymer (olefin polymerization catalyst) will be explained.

When the transition-metal compound (a2) is used as an olefin polymerization catalyst component, the catalyst comprises (a2) the transition-metal compound, (b) at least one compound selected from (b-1) an organometallic compound, (b-2) an organoaluminium oxy-compound, and (b-3) a compound which reacts with transition-metal compound (a2) to form an ion pair, and, if necessary, (c) a particulate carrier.

For (b-1) an organometallic compound, (b-2) an organoaluminium oxy-compound, (b-3) a compound which reacts with transition-metal compound (a2) to form an ion pair and (c) a particulate carrier, (b-1) an organometallic compound, (b-2) an organoaluminium oxy-compound, (b-3) a compound which reacts with a bridged metallocene compound (a) to form an ion pair and (c) particulate carrier, as described in the present invention 2 respectively, can be used.

<Process for Polymerizing Monomers in Presence of Catalyst for Ethylene.α-Olefin.Non-Conjugated Polyene Copolymers>

The copolymer (2) can be obtained by copolymerizing ethylene, α-olefin(s) and non-conjugated polyene(s), which can be carried out in the same method as described in the present invention 2 except that the compound (a) is changed to the transition-metal compound (a2) described in the present invention 2-2 and the $C_4$-$C_{20}$ α-olefin [B] is changed to the $C_3$-$C_{20}$ α-olefin [B'].

<<Other Components>>

The composition of the present invention 2-2 is preferred to contain a cross-linking agent in addition to the ethylene.α-olefin.non-conjugated polyene copolymer (1) and the ethylene.α-olefin.non-conjugated polyene copolymer (2).

The composition of the present invention 2-2 may contain other polymer(s) than the copolymers (1) and (2). Examples of other polymers which need to be cross-linked include cross-linking rubber such as natural rubber, isoprene rubber, butadiene rubber, styrene-butadiene rubber, chloroprene rubber, nitrile rubber, butyl rubber, acrylic rubber, silicone rubber, fluororubber, and urethane rubber. Examples of other polymers that do not need to be cross-linked include elastomers such as styrene-based thermoplastic elastomers (TPS), e.g., styrene-butadiene block copolymers (SBS), polystyrene-poly(ethylene-butylene)-polystyrene (SEBS) and polystyrene-poly(ethylene-propylene)-polystyrene (SEPS), olefin thermoplastic elastomers (TPO), vinyl chloride elastomers (TPVC), ester-based thermoplastic elastomers (TPC), amide-based thermoplastic elastomers (TPA), urethane thermoplastic elastomers (TPU), and other thermoplastic elastomers (TPZ). Other polymer(s) can be, based on the total 100 parts by mass of the copolymers (1) and (2), blended usually in an amount of 100 parts by mass or less, and preferably 80 parts by mass or less.

Furthermore, the composition of the present invention 2-2 may contain other additives depending on the purpose, for example, at least one selected from cross-linking aids, vulcanizing accelerators, vulcanizing aids, softeners, inorganic fillers, reinforcing agents, antioxidants, processing aids, activators, moisture absorbents, heat stabilizers, weathering stabilizers, antistatic agents, coloring agents, lubricants, thickeners, foaming agents and foaming aids. Additionally, for each additive, one type may be used alone or two or more types may be used in combination.

<Cross-Linking Agent, Cross-Linking Aid, Vulcanizing Accelerator and Vulcanizing Aid>

Examples of cross-linking agents include cross-linking agents which are generally used to cross-link rubber such as organic peroxides, phenol resins, sulfur compounds, hydrosilicone compounds, amino resins, quinones or derivatives thereof, amine compounds, azo compounds, epoxy compounds and isocyanate compounds. Among these, organic peroxides and sulfur compounds (hereinafter also referred to as "vulcanizing agent") are suitable.

Examples of organic peroxides include dicumyl peroxide, di-tert-butylperoxide, 2,5-di-(tert-butylperoxy)hexane, 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxybenzoate, ertbutylperoxyisopropylcarbonate, diacetyl peroxide, lauroyl peroxide, and tert-butyl cumyl peroxide.

Among these, difunctional organic peroxides such as 2,5-di-(tert-butylperoxy)hexane, 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, and n-butyl-4,4-bis(tert-butylperoxy)valerate are preferable, and 2,5-di-(tert-butylperoxy)hexane and 2,5-dimethyl-2,5-di-(tert-butylperoxy)hexane are the most preferable.

When an organic peroxide is used as a cross-linking agent, the amount of blend of the organic peroxide in the composition of the present invention 2-2 is, based on the total 100 parts by mass of copolymers (1) and (2) and other polymer(s) (cross-linking rubber, etc.) which is/are blended as necessary and need(s) to be cross-linked, usually 0.1 to 20 parts by mass, preferably 0.2 to 15 parts by mass, and more preferably 0.5 to 10 parts by mass. When the amount of blend of the organic peroxide is within the above range, the resulting molded article has no bloom on its surface, and the composition of the present invention 2-2 exhibits an excellent cross-linking characteristic.

When an organic peroxide is used as a cross-linking agent, it is preferred to use a cross-linking aid in combination.

Examples of cross-linking aids include sulfur; quinone dioxime based cross-linking aids such as p-quinonedioxime; acrylic cross-linking aids, e.g., ethylene glycol dimethacrylate and trimethylolpropane trimethacrylate; allyl cross-linking aids, e.g., diallyl phthalate and triallyl isocyanurate; maleimide-based cross-linking aids; divinylbenzene; and metallic oxides such as zinc oxide (e.g., ZnO #1/zinc oxide No. 2, produced by HakusuiTech Co., Ltd.), magnesium oxide, and zinc white (e.g., zinc oxide such as "META-Z102" (trade name; produced by Inoue Calcium Corporation)).

When a cross-linking aid is used, the amount of blend of the cross-linking aid in the composition of the present invention 2-2 is, based on 1 mol of the organic peroxide, usually 0.5 to 10 mol, preferably 0.5 to 7 mol, and more preferably 1 to 5 mol.

Examples of sulfur compounds (vulcanizing agent) include sulfur, sulfur chloride, sulfur dichloride, morpholine disulfide, alkylphenol disulfide, tetramethylthiuram disulfide and selenium dithiocarbamate.

When a sulfur compound is used as a cross-linking agent, the amount of blend of the sulfur compound in the composition of the present invention 2-2 is, based on the total 100 parts by mass of the copolymers (1) and (2) and other polymer(s) (cross-linking rubber, etc.) which is/are blended as necessary and need(s) to be cross-linked, usually 0.3 to 10 parts by mass, preferably 0.5 to 7.0 parts by mass, and more preferably 0.7 to 5.0 parts by mass. When the amount of blend of the sulfur compound is within the above range, the resulting molded article has no bloom on its surface, and the composition of the present invention 2-2 exhibits an excellent cross-linking characteristic.

When a sulfur compound is used as a cross-linking agent, it is preferred to use a vulcanizing accelerator in combination.

Examples of vulcanizing accelerators include thiazole-based vulcanizing accelerators, e.g., N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (e.g., Sanceler M (trade name; produced by Sanshin Chemical Industry Co., LTD.)), 2-(4-morphorinodithio)benzothiazole (e.g., NOCCELER MDB-P (trade name; produced by OUCHI SHINKO CHEMICAL INDUSTRIAL CO., LTD)), 2-(2,4-dinitrophenyl)mercaptobenzothiazole, 2-(2,6-diethyl-4-morphorinothio)benzothiazole and dibenzothiazyl disulfide (e.g., Sanceler DM (trade name; produced by Sanshin Chemical Industry Co., LTD.)); guanidine-based vulcanizing accelerators, e.g., diphenylguanidine, triphenylguanidine, and di-ortho-tolylguanidine; aldehydeamine-based vulcanizing accelerators, e.g., acetaldehyde-aniline condensate and butylaldehyde aniline condensate; imidazoline-based vulcanizing accelerators, e.g., 2-mercaptoimidazoline; thiuram-based vulcanizing accelerators, e.g., tetramethylthiuram monosulfide (e.g., Sanceler TS (trade name; produced by Sanshin Chemical Industry Co., LTD.)), tetramethylthiuram disulfide (e.g., Sanceler TT (trade name; produced by Sanshin Chemical Industry Co., LTD.)), tetraethylthiuram disulfide (e.g., Sanceler TET(trade name; produced by Sanshin Chemical Industry Co., LTD.)), tetrabutylthiuram disulfide (e.g., Sanceler TBT (trade name; produced by Sanshin Chemical Industry Co., LTD.)) and dipentamethylenethiuram tetrasulfide (e.g., Sanceler TRA (trade name; produced by Sanshin Chemical Industry Co., LTD.)); dithioic acid salt-based vulcanizing accelerators, e.g., zinc dimethyldithiocarbamate, zinc diethyldithiocarbamate, zinc dibutyldithiocarbamate (e.g., Sanceler PZ, Sanceler BZ and Sanceler EZ (trade names; produced by Sanshin Chemical Industry Co., LTD.) and tellurium diethyldithiocarbamate; thiourea-based vulcanizing accelerator, e.g., ethylenethiourea (e.g., Sanceler BUR (trade name; produced by Sanshin Chemical Industry Co., LTD.), Sanceler 22-C(trade name; produced by Sanshin Chemical Industry Co., LTD.), N,N'-diethylthiourea and N,N'-dibutylthiourea; and xanthate-based vulcanizing accelerators, e.g., zinc dibutylxanthate.

When a vulcanizing accelerator is used, the amount of blend of the vulcanizing accelerator in the composition of the present invention 2-2 is, based on the total 100 parts by mass of copolymers (1) and (2) and other polymer(s) (cross-linking rubber, etc.) which is/are blended as necessary and need(s) to be cross-linked, usually 0.1 to 20 parts by mass, preferably 0.2 to 15 parts by mass, and more preferably 0.5 to 10 parts by mass. When the amount of blend of the vulcanizing accelerator is within the above range, the resulting molded article has no bloom on its surface, and the composition of the present invention 2-2 exhibits an excellent cross-linking characteristic.

When a sulfur compound is used as a cross-linking agent, a vulcanizing aid can be used in combination.

Examples of vulcanizing aids include zinc oxide (e.g., ZnO #1/zinc oxide No. 2, produced by HakusuiTech Co., Ltd.), magnesium oxide, and zinc white (e.g., zinc oxide such as "META-Z102" (trade name; produced by Inoue Calcium Corporation)).

When a vulcanizing aid is used, the amount of blend of the vulcanizing aid in the composition of the present invention 2-2 is, based on the total 100 parts by mass of the copolymers (1) and (2) as well as other polymer(s) (cross-linking rubber, etc.) which is/are blended as necessary and need(s) to be cross-linked, usually 1 to 20 parts by mass.

<Softener>

Examples of softeners include petroleum-based softeners such as process oil, lubricating oil, paraffin oil, liquid paraffin, petroleum asphalt and Vaseline; coal tar-based softeners such as coal tar; fatty oil-based softeners such as castor oil, linseed oil, rapeseed oil, soybean oil and coconut oil; wax such as beeswax and carnauba wax; naphthenic acid, pine oil, rosin or derivatives thereof; synthetic polymer materials such as terpene resins, petroleum resins and coumarone indene resins; ester-based softeners such as dioctyl phthalate and dioctyl adipate; and microcrystalline wax, liquid polybutadiene, modified liquid polybutadiene, hydrocarbon-based synthetic lubricating oil, tall oil, and substitute (factice). Among these, petroleum-based softeners are preferable, and process oil is especially preferable.

When the composition of the present invention 2-2 contains a softener, the amount of blend of the softener is, based on the total 100 parts by mass of the copolymers (1) and (2) as well as other polymer(s) (elastomer, cross-linking rubber, etc.) which is/are blended as necessary, usually 2 to 100 parts by mass, and preferably 10 to 100 parts by mass.

<Inorganic Filler>

Examples of inorganic fillers include light calcium carbonate, heavy calcium carbonate, talc, clay, and the like. Among these, heavy calcium carbonate such as "Whiton SB" (trade name; produced by SHIRAISHI CALCIUM KAISHA, LTD.) is preferable.

When the composition of the present invention 2-2 contains an inorganic filler, the amount of blend of the inorganic filler is, based on the total 100 parts by mass of the copolymers (1) and (2) and other polymer(s) (elastomer, cross-linking rubber, etc.) which is/are blended as necessary, usually 2 to 200 parts by mass, and preferably 5 to 200 parts by mass. When the amount of blend of the inorganic filler is within the above range, the composition of the present invention 2-2 exhibits excellent kneadability, and a molded article with excellent mechanical properties can be obtained.

<Reinforcing Agent>

Examples of reinforcing agents include carbon black, carbon black produced though surface treatment with a silane coupling agent, silica, calcium carbonate, activated calcium carbonate, fine powder talc, fine powder silicic acid, etc.

When the composition of the present invention 2-2 contains a reinforcing agent, the amount of blend of the reinforcing agent is, based on the total 100 parts by mass of the copolymers (1) and (2) and other polymer(s) (elastomer, cross-linking rubber, etc.) which is/are blended as necessary, usually 10 to 200 parts by mass, and preferably 20 to 180 parts by mass.

<Antioxidant (Stabilizer)>

By blending an antioxidant (stabilizer) into the composition of the present invention 2-2, the product life of a molded article therefrom can be increased. Examples of such antioxidants include previously known antioxidants, for example, amine-based antioxidants, phenol-based antioxidants, and sulfur-based antioxidants.

Examples of antioxidants include aromatic secondary amine-based antioxidants such as phenylbuthylamine and N,N-di-2-naphthyl-p-phenylenediamine; phenol-based antioxidants such as dibutylhydroxytoluene and tetrakis[methylene(3,5-di-t-butyl-4-hydroxy)hydrocinnamate]methane; thioether-based antioxidants such as bis[2-methyl-4-(3-n-alkylthiopropionyloxy)-5-t-butylphenyl]sulfide; dithiocarbamate-based antioxidants such as nickel dibutyldithiocarbamate; sulfur-based antioxidants such as 2-mercaptobenzoylimidazole, zinc salt of 2-mercaptobenzimidazole, dilauryl thiodipropionate, distearyl thiodipropionate and the like.

When the composition of the present invention 2-2 contains an antioxidant, the amount of blend of the antioxidant is, based on the total 100 parts by mass of the copolymers (1) and (2) and other polymer(s) (elastomer, cross-linking rubber, etc.) which is/are blended as necessary, usually 0.3 to 10 parts by mass and preferably 0.5 to 7.0 parts by mass. When the amount of blend of the antioxidant is within the above range, the resulting molded article has no bloom on its surface, and the inhibition of vulcanization can be prevented.

<Processing Aid>

For a processing aid, those generally blended into rubber as a processing aid can be used widely. Examples of processing aids include fatty acids such as ricinoleic acid, stearic acid, palmitic acid and lauric acid, fatty acid salts such as barium stearate, zinc stearate, calcium stearate, fatty acid esters such as ricinoleic acid esters, stearic acid esters, palmitic acid esters and lauric acid esters, and fatty acid derivatives such as N-substituted fatty acid amides. Among these, stearic acid is preferable.

When the composition of the present invention 2-2 contains a processing aid, the amount of blend of the processing aid is, based on the total 100 parts by mass of the copolymers (1) and (2) and other polymer(s) (elastomer, cross-linking rubber, etc.) which is/are blended as necessary, usually 10 parts by mass or less, and preferably 8.0 parts by mass or less.

<Activator>

Examples of activators include amines such as di-n-butylamine, dicyclohexylamine and monoethanolamine; activators such as diethylene glycol, polyethylene glycol, lecithin, triarylate mellirate and zinc compounds of aliphatic or aromatic carboxylic acids; zinc peroxide adjusted substances; and ctadecyltrimethylammonium bromide, synthetic hydrotalcite, special quaternary ammonium compounds.

When the composition of the present invention 2-2 contains an activator, the amount of blend of the activator is, based on the total 100 parts by mass of the copolymers (1) and (2) and other polymer(s) (elastomer, cross-linking rubber, etc.) which is/are blended as necessary, usually 0.2 to 10 parts by mass and preferably 0.3 to 5 parts by mass.

<Moisture Absorbent>

Examples of moisture absorbents include calcium oxide, silica gel, sodium sulfate, molecular sieve, zeolite and white carbon.

When the composition of the present invention 2-2 contains a moisture absorbent, the amount of blend of the moisture absorbent is, based on the total 100 parts by mass of the copolymers (1) and (2) and other polymer(s) (elastomer, cross-linking rubber, etc.) which is/are blended as necessary, usually 0.5 to 15 parts by mass, and preferably 1.0 to 12 parts by mass.

<Foaming Agent and Foaming Aid>

A molded article obtained from the composition of the present invention 2-2 may be non-foamed material or foamed material, but preferably a foamed material. When forming a foamed material, a foaming agent can be used, and examples of such foaming agents include inorganic foaming agents, e.g., sodium bicarbonate, sodium carbonate, ammonium bicarbonate, ammonium carbonate and ammonium nitrite; nitroso compounds e.g., N,N'-dinitroterephthalamide and N,N'-dinitrosopentamethylenetetramine; azo compounds, e.g., azodicarbonamide, azobisisobutyronitrile, azocyclohexylnitrile, azodiaminobenzene and barium azodicarboxylate; sulfonylhydrazide compounds, e.g., benzenesulfonyl hydrazide, toluenesulfonyl hydrazide and p,p'-oxybis(benzenesulfonyl hydrazide)diphenylsulfone-3, 3'-disulphenyl hydrazide; and azide compounds, e.g., calcium azide, 4,4'-diphenylsulfonylazide and para-toluenesulfonylazide.

When the composition of the present invention 2-2 contains a foaming agent, the amount of blend of the foaming agent is appropriately selected such that the specific gravity of the foamed material after being cross-linked and foamed is usually 0.01 to 0.9, preferably 0.01 to 0.7, and more preferably 0.01 to 0.5. The amount of blend of the foaming agent is, based on the total 100 parts by mass of the copolymers (1) and (2) and other polymer(s) (elastomer, cross-linking rubber, etc.) which is/are blended as necessary, usually 5 to 50 parts by mass and preferably 10 to 40 parts by mass.

Furthermore, in addition to a foaming agent, a foaming aid may be used as required. The foaming aid has a function of lowering the decomposition temperature, accelerating the decomposition, uniforming bubbles or the like with regard to a foaming agent. Examples of foaming aids include organic acids, e.g., salicylic acid, phthalic acid, oxalic acid and citric acid or salts thereof; and urea or derivatives thereof. The amount of blend of the foaming aid is, based on the total 100 parts by mass of the copolymers (1) and (2) as well as other polymer(s) (elastomer, cross-linking rubber, etc.) which is/are blended as necessary, usually 0.1 to 5 parts by mass and preferably 0.5 to 4 parts by mass.

Furthermore, physical foaming by high pressure gas is also possible. In other words, for example, when the composition of the present invention 2-2 is extruded, foamed materials can be obtained sequentially by injecting a volatile or inorganic gas foaming agent through an injection hole provided in the middle of the extruder and extruding the composition from the cap. Specific examples of physical foaming agents include volatile foaming agents such as fron, butane, pentane, hexane and cyclohexane as well as inorganic gas foaming agents such as nitrogen, air, water, carbon dioxide. Moreover, in extruding and foaming the composition, a bubble core forming agent such as calcium carbonate, talc, clay and magnesium oxide may be added. The blending ratio of the physical foaming agent is, based on the total 100 parts by mass of the copolymers (1) and (2) and other polymer(s) (elastomer, rubber, etc.) which is/are blended as necessary, usually 5 to 60 parts by mass and preferably 10 to 50 parts by mass.

[Preparation and Property of Composition]

The composition of the present invention 2-2 can be prepared by kneading the copolymers (1) and (2) and other component (s) which is/are blended as necessary at a desired temperature, using a kneading machine, such as, for example, a mixer, kneader or a roll.

Specifically, the composition of the present invention 2-2 can be prepared by kneading the copolymers (1) and (2) and other component 1 which is blended as required at a predetermined temperature for a predetermined period of time, for example, at 80 to 200° C. for 3 to 30 minutes, using a previously known kneading machine such as a mixer or a kneader, and then adding to the resulting kneaded material other component 2 as required to knead the mixture, using a roll, at a predetermined temperature for a predetermined period of time, for example, at a toll temperature of 30 to 80° C. for 1 to 30 minutes.

Examples of the other component 1 include at least one selected from, for example, cross-linking aids, vulcanizing accelerators, vulcanizing aids, softeners, inorganic fillers, reinforcing agents, antioxidants, processing aids, activators, moisture absorbents, heat stabilizers, weathering stabilizers, antistatic agents, coloring agents, lubricants and thickeners as described above. Examples of the other component 2 include, for example, cross-linking agents (vulcanizing agents) and at least one selected from cross-linking aids, vulcanizing accelerators, vulcanizing aids, softeners, inorganic fillers, reinforcing agents, antioxidants, processing aids, activators, moisture absorbents, heat stabilizers, weathering stabilizers, antistatic agents, coloring agents, lubricants, thickeners, foaming agents and foaming aids.

The composition of the present invention 2-2 contains a particular ethylene.α-olefin.non-conjugated polyene copolymer (1) with the B value of 1.20 or more and an ethylene.α-olefin.non-conjugated polyene copolymer (2) with the B value less than 1.20.

The composition of the present invention 2-2 exhibits excellent processability when uncross-linked since the copolymer (1) as well as the copolymer (2) are blended. The composition of the present invention 2-2 has the Mooney viscosity $ML_{(1+4)}100°$ C. at 100° C. of preferably 60 or less and more preferably 5 to 50. Furthermore, the composition of the present invention 2-2 has the lowest viscosity (Vm) of preferably 60 or less and more preferably 5 to 50. Measuring conditions of these properties are as described in Examples.

Additionally, the composition of the present invention 2-2 which contains as a rubber component the copolymer (1) in addition to the copolymer (2) has improved adhesion performance compared to the composition which only contains the copolymer (2) as a rubber component.

The composition of the present invention 2-2 exhibits excellent processability and adhesion performance when uncross-linked. Furthermore, by cross-linking (preferably further foaming) the composition, a molded article with high sound insulation performance and small specific gravity can be achieved. The composition of the present invention 2-2 can be used suitably for the use of sound insulation material formation due to the above properties.

[Molded Article]

The molded article of the present invention 2-2 is formed from the above composition.

Methods to produce a molded article from the composition of the present invention 2-2 include, for example, a method in which the said composition (uncross-linked composition) is formed in a desired shape and then cross-linked simultaneously with or after the forming.

For example, a method (I) in which the composition of the present invention 2-2 containing a cross-linking agent is used, formed in a desired shape and then cross-linked by a heating treatment and a method (II) in which the composition of the present invention 2-2 is formed in a desired shape and cross-linked by irradiating electron beams on the composition are included.

In the forming as described above, an extruder, a calender roll, a press molding machine, an injection molding machine or a transfer molding machine is used to form the composition of the present invention 2-2 in a desired shape. Examples of shapes of the molded article include a shape of a board.

The molded article of the present invention 2-2 may be a (non-foamed) cross-linked material or a cross-linked foam.

In the above method (I), simultaneously with or after the forming, the molded article is, for example, heated at 50 to 200° C. for 1 to 120 minutes. By this heating, cross-linking treatment or foaming treatment along with cross-linking treatment is carried out. Examples of cross-linking baths include steam vulcanization baths, hot air vulcanization baths, glass beads fluidized-beds, molten salt vulcanization baths, and microwave baths. One of these cross-linking bathes may be used alone, or two or more may be used in combination.

In the above method (II), simultaneously with or after the forming, electron beams having energy of 0.1 to 10 MeV are irradiated on the molded article such that the absorbed dose is usually 0.5 to 35 Mrad and preferably 0.5 to 20 Mrad. In this case, the foaming treatment is carried out in the previous or following stage of the irradiation.

In the above method (I), the cross-linking agent as described above is used, and if required, a cross-linking accelerator and/or cross-linking aid is/are also used in combination. In addition, in order to cross-link and foam the composition, a foaming agent is usually added to the composition.

The cross-linked foam of the present invention 2-2 is formed from the above composition, and its specific gravity is preferably within the range of preferably 0.01 to 0.9, preferably 0.01 to 0.7, more preferably 0.01 to 0.5.

The cross-linked material of the present invention 2-2 exhibits excellent sound insulation performance and is suitable for sound insulation material because of the small Tg and high sound insulation performance within a broad frequency range in the case of non-foamed cross-linked material, and because of the large sound transmission loss in the case of cross-linked foam, for example.

The cross-linked foam according to the present invention 2-2 has, as described above, excellent sound insulation performance and low specific gravity property. As a result, the said cross-linked foam can be used suitably for sound insulation materials, heat insulation materials, sealing materials, and foamed material rolls, for example. Sealing materials are those used to be installed in masonry joints and spaces of structures such as, for example, building and civil engineering products, electric devices, automobiles, vehicles, ships, and household equipment.

Examples of cross-linked foams include, specifically, weather strop sponges, e.g., sponges for door sponges, sponges for opening trim, sponges for hood sealing and sponges for tunk sealing; and highly foamed sponge materials such as heat insulation sponges and dam rubbers.

[Present invention 2-3]

The composition for hose forming of the present invention 2-3 contains a particular ethylene.α-olefin.non-conjugated polyene copolymer (ethylene-based copolymer A) as described in the present invention 2. Hereinafter, the composition for hose forming containing the ethylene-based copolymer A is also referred to as the composition for hose forming.

The ethylene-based copolymer A has flexibility at a low temperature and exhibits a good balance between rubber elasticity at a low temperature and tensile strength at ambient temperature because the compression set at a low temperature is small and the results of a torsion test at a low temperature are good. Therefore, the composition for hose forming containing the ethylene-based copolymer A can be used suitably for the applications of automobiles, motor bikes, industrial machines, construction machines, agricultural machines and the like which can be used in a cold climate.

For the composition for hose forming of the present invention 2-3, the content ratio of the ethylene-based copolymer A in the composition is usually 20% by mass or more, preferably 20 to 50% by mass, and more preferably 25 to 40% by mass.

<<Other Components>>

The composition for hose forming of the present invention 2-3 preferably contains a cross-linking agent in addition to the above-mentioned ethylene.α-olefin.non-conjugated polyene copolymer (ethylene-based copolymer A).

The composition for hose forming of the present invention 2-3 may contain other polymer(s) than the ethylene-based copolymer A. Examples of polymers which need to be cross-linked include cross-linking rubber such as natural rubber, isoprene rubber, butadiene rubber, styrene butadiene rubber, chloroprene rubber, nitrile rubber, butyl rubber, acrylic rubber, silicone rubber, fluororubber, and urethane rubber. Examples of other polymers which do not need to be cross-linked include elastomers such as styrene-based thermoplastic elastomers (TPS), e.g., styrene-butadiene block copolymers (SBS), polystyrene-poly(ethylene-butylene)-polystyrene(SEBS) and polystyrene-poly(ethylene-propylene)-polystyrene(SEPS), olefin thermoplastic elastomers (TPO), vinyl chloride elastomers(TPVC), ester-based thermoplastic elastomers (TPC), amide-based thermoplastic elastomers (TPA), urethane thermoplastic elastomers (TPU) and other thermoplastic elastomers (TPZ). Other polymer(s) can be usually blended in an amount of 100 parts by mass or less, and preferably 80 parts by mass or less, based on 100 parts by mass of the ethylene-based copolymer A.

Furthermore, the composition for hose forming of the present invention 2-3 may contain other additives depending on the purpose, for example, at least one selected from cross-linking aids, vulcanizing accelerators, vulcanizing aids, softeners, inorganic fillers, reinforcing agents, antioxidants, processing aids, activators, moisture absorbents, heat stabilizers, weathering stabilizers, antistatic agents, coloring agents, lubricants, thickeners and foaming agents. In addition, for each additive, one type alone may be used or two or more types may be used in combination.

The composition for hose forming of the present invention 2-3 can be prepared by, kneading the ethylene-based copolymer A and other component(s) blended as required at a desired temperature, using a kneading machine such as, for example, a mixer, kneader or a roll. The composition for hose forming can be prepared favorably since the ethylene-based copolymer A has excellent kneadability.

Specifically, the composition for hose forming of the present invention 2-3 can be prepared by kneading the ethylene-based copolymer A and other component 1 as necessary at a predetermined temperature for a predetermined period of time, for example, 80 to 200° C. for 3 to 30 minutes, using a previously known kneading machine such as a mixer or a kneader, and then adding to the resulting kneaded material other component 2 as necessary such as a cross-linking agent, using a roll, at a predetermined temperature for a predetermined period of time, for example, at a roll temperature of 30 to 80° C. for 1 to 30 minutes.

Examples of the other component 1 include at least one selected from other polymers, cross-linking aids, vulcanizing accelerators, vulcanizing aids, softeners, inorganic fillers, reinforcing agents, antioxidants, processing aids, activators, moisture absorbents, heat stabilizers, weathering stabilizers, antistatic agents, coloring agents, lubricants and thickeners. Examples of other component 2 include, for example, cross-linking agents (vulcanizing agents) and at least one selected from cross-linking aids, vulcanizing accelerators, vulcanizing aids, softeners, inorganic fillers, reinforcing agents, antioxidants, processing aids, activators, moisture absorbents, heat stabilizers, weathering stabilizers, antistatic agents, coloring agents, lubricants, thickeners and foaming agents.

<Cross-Linking Agent, Cross-Linking Aid, Vulcanizing Accelerator and Vulcanizing Aid>

Examples of cross-linking agents include cross-linking agents which are generally used to cross-link rubber such as organic peroxides, phenol resins, sulfur compounds, hydrosilicone compounds, amino resins, quinones or derivatives thereof, amine compounds, azo compounds, epoxy compounds and isocyanate compounds. Among these, organic peroxides and sulfur compounds (hereinafter also referred to as "vulcanizing agent") are suitable.

Examples of organic peroxides include dicumyl peroxide, di-tert-butylperoxide, 2,5-di-(tert-butylperoxy)hexane, 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, ert-butylperoxyisopropylcarbonate, diacetyl peroxide, lauroyl peroxide, and tert-butyl cumyl peroxide.

Among these, difunctional organic peroxides such as 2,5-di-(tert-butylperoxy)hexane, 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, and n-butyl-4,4-bis(tert-butylperoxy)valerate are preferable, and 2,5-di-(tert-butylperoxy)hexane and 2,5-dimethyl-2,5-di-(tert-butylperoxy)hexane are the most preferable.

When an organic peroxide is used as a cross-linking agent, the amount of blend of the organic peroxide in the composition for hose forming is, based on the total 100 parts by mass of the ethylene-based copolymer A and other polymer(s) (cross-linking rubber, etc.) which is/are blended as necessary and need(s) to be cross-linked, usually 0.1 to 20 parts by mass, preferably 0.2 to 15 parts by mass, and more preferably 0.5 to 10 parts by mass. When the amount of blend of the organic peroxide is within the above range, the resulting hose has no bloom on its surface, and the composition for hose forming exhibits an excellent cross-linking characteristic.

When an organic peroxide is used as a cross-linking agent, it is preferred that a cross-linking aid is used in combination.

Examples of cross-linking aids include sulfur; quinone dioxime based cross-linking aids such as p-quinonedioxime; acrylic cross-linking aids, e.g., ethylene glycol dimethacrylate and trimethylolpropane trimethacrylate; allyl cross-linking aids, e.g., diallyl phthalate and triallyl isocyanurate; maleimide-based cross-linking aids; divinylbenzene; and metallic oxides such as zinc oxide (e.g., ZnO #1/zinc oxide No. 2, produced by HakusuiTech Co., Ltd.), magnesium oxide, and zinc white (e.g., zinc oxide such as "META-Z102" (trade name; produced by Inoue Calcium Corporation)).

When a cross-linking aid is used, the amount of blend of the cross-linking aid in the composition for hose forming is, based on 1 mol of the organic peroxide, usually 0.5 to 10 mol, preferably 0.5 to 7 mol, and more preferably 1 to 5 mol.

Examples of sulfur compounds (vulcanizing agent) include sulfur, sulfur chloride, sulfur dichloride, morpholine disulfide, alkylphenol disulfide, tetramethylthiuram disulfide and selenium dithiocarbamate.

When a sulfur compound is used as a cross-linking agent, the amount of blend of the sulfur compound in the composition for hose forming is, based on the total 100 parts by mass of the ethylene-based copolymer A and other polymer (s) (cross-linking rubber, etc.) which is/are blended as necessary and need(s) to be cross-linked, usually 0.3 to 10 parts by mass, preferably 0.5 to 7.0 parts by mass, and more preferably 0.7 to 5.0 parts by mass. When the amount of blend of the sulfur compound is within the above range, the resulting hose has no bloom on its surface, and the composition for hose forming exhibits an excellent cross-linking characteristic.

When a sulfur compound is used as a cross-linking agent, it is preferred to use a vulcanizing accelerator in combination.

Examples of vulcanizing accelerators include thiazole-based vulcanizing accelerators such as N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (e.g., Sanceler M (trade name; produced by Sanshin Chemical Industry Co., LTD.)), 2-(4-morphorinodithio)benzothiazole (e.g., NOCCELER MDB-P (trade name; produced by OUCHI SHINKO CHEMICAL INDUSTRIAL CO., LTD)), 2-(2,4-dinitrophenyl)mercaptobenzothiazole, 2-(2,6-diethyl-4-morphorinothio)benzothiazole and dibenzothiazyl disulfide (e.g., Sanceler DM (trade name; produced by Sanshin Chemical Industry Co., LTD.)); guanidine-based vulcanizing accelerators, e.g., diphenylguanidine, triphenylguanidine, and di-ortho-tolylguanidine; aldehydeamine-based vulcanizing accelerators, e.g., acetaldehyde.aniline condensate and butylaldehyde aniline condensate; imidazoline-based vulcanizing accelerators, e.g., 2-mercaptoimidazoline; thiuram-based vulcanizing accelerators, e.g., tetramethylthiuram monosulfide (e.g., Sanceler TS (trade name; produced by Sanshin Chemical Industry Co., LTD.)), tetramethylthiuram disulfide(e.g., Sanceler TT (trade name; produced by Sanshin Chemical Industry Co., LTD.)), tetraethylthiuram disulfide (e.g., Sanceler TET (trade name; produced by Sanshin Chemical Industry Co., LTD.)), tetrabutylthiuram disulfide (e.g., Sanceler TBT (trade name; produced by Sanshin Chemical Industry Co., LTD.)) and dipentamethylenethiuram tetrasulfide(e.g., Sanceler TRA (trade name; produced by Sanshin Chemical Industry Co., LTD.)); dithioic acid salt-based vulcanizing accelerators, e.g., zinc dimethyldithiocarbamate, zinc diethyldithiocarbamate, zinc dibutyldithiocarbamate (e.g., Sanceler PZ, Sanceler BZ and Sanceler EZ (trade names; produced by Sanshin Chemical Industry Co., LTD.) and tellurium diethyldithiocarbamate; thiourea-based vulcanizing accelerator, e.g., ethylenethiourea (e.g., Sanceler BUR (trade name; produced by Sanshin Chemical Industry Co., LTD.), Sanceler 22-C(trade name; produced by Sanshin Chemical Industry Co., LTD.), N,N'-diethylthiourea and N,N'-dibutylthiourea; and xanthate-based vulcanizing accelerators, e.g., zinc dibutylxanthate.

When a vulcanizing accelerator is used, the amount of blend of the vulcanizing accelerator in the composition for hose forming is, based on the total 100 parts by mass of the ethylene-based copolymer A and other polymer(s) (cross-linking rubber, etc.) which is/are blended as necessary and need(s) to be cross-linked, usually 0.1 to 20 parts by mass, preferably 0.2 to 15 parts by mass and more preferably 0.5 to 10 parts by mass. When the amount of blend of the vulcanizing accelerator is within the above range, the resulting hose has no bloom on its surface, and the composition for hose forming exhibits an excellent cross-linking characteristic.

When a sulfur compound is used as a cross-linking agent, a vulcanizing aid can be used in combination.

Examples of vulcanizing aids include zinc oxide (e.g., ZnO #1/zinc oxide No. 2, produced by HakusuiTech Co., Ltd.), magnesium oxide, and zinc white (e.g., zinc oxide such as "META-Z102" (trade name; produced by Inoue Calcium Corporation)).

When a vulcanizing aid is used, the amount of blend of the vulcanizing aid in the composition for hose forming is, based on the total 100 parts by mass of the ethylene-based copolymer A and other polymer(s) (cross-linking rubber, etc.) which is/are blended as necessary and need(s) to be cross-linked, usually 1 to 20 parts by mass.

<Softener>

Examples of softeners include petroleum-based softeners such as process oil, lubricating oil, paraffin oil, liquid paraffin, petroleum asphalt and Vaseline; coal tar-based softeners such as coal tar; fatty oil-based softeners such as castor oil, linseed oil, rapeseed oil, soybean oil and coconut oil; wax such as beeswax and carnauba wax; naphthenic acid, pine oil, rosin or derivatives thereof; synthetic polymer materials such as terpene resins, petroleum resins and coumarone indene resins; ester-based softeners such as dioctyl phthalate and dioctyl adipate; and microcrystalline wax, liquid polybutadiene, modified liquid polybutadiene, hydrocarbon-based synthetic lubricating oil, tall oil, and substitute (factice). Among these, petroleum-based softeners are preferable, and process oil is especially preferable.

When the composition for hose forming contains a softener, the amount of blend of the softener is, based on the total 100 parts by mass of the ethylene-based copolymer A and other polymer(s) (elastomer, cross-linking rubber, etc.) which is/are blended as necessary, usually 2 to 100 parts by mass, and preferably 10 to 100 parts by mass.

<Inorganic Filler>

Examples of inorganic fillers include light calcium carbonate, heavy calcium carbonate, talc, clay and the like. Among these, heavy calcium carbonate such as "Whiton SB" (trade name; SHIRAISHI CALCIUM KAISHA, LTD.) is preferable.

When the composition for hose forming contains an inorganic filler, the amount of blend of the inorganic filler is, based on the total 100 parts by mass of the ethylene-based copolymer A and other polymer(s) (elastomer, cross-linking rubber, etc.) which is/are blended as necessary, usually 2 to 100 parts by mass, and preferably 5 to 100 parts by mass. When the amount of blend of the inorganic filler is within the above range, the composition for hose forming has excellent kneadability, and a hose with excellent mechanical properties can be obtained.

<Reinforcing Agent>

Examples of reinforcing agents include carbon black, carbon black produced though surface treatment with a silane coupling agent, silica, calcium carbonate, activated calcium carbonate, fine powder talc, fine powder silicic acid and the like.

When the composition for hose forming contains a reinforcing agent, the amount of blend of the reinforcing agent is, based on the total 100 parts by mass of the ethylene-based copolymer A and other polymer(s) (elastomer, cross-linking rubber, etc.) which is/are blended as necessary, usually 30 to 200 parts by mass, and preferably 50 to 180 parts by mass.

<Antioxidant (Stabilizer)>

By blending an antioxidant (stabilizer) into the composition for hose forming of the present invention, the product life of a hose therefrom can be increased. Examples of such antioxidants include previously known antioxidants, for example, amine-based antioxidants, phenol-based antioxidants, and sulfur-based antioxidants.

Examples of antioxidants include aromatic secondary amine-based antioxidants such as phenylbuthylamine and N,N-di-2-naphthyl-p-phenylenediamine; phenol-based antioxidants such as dibutylhydroxytoluene and tetrakis[methylene(3,5-di-t-butyl-4-hydroxy)hydrocinnamate]methane; thioether-based antioxidants such as bis[2-methyl-4-(3-n-alkylthiopropionyloxy)-5-t-butylphenyl]sulfide; dithiocarbamate-based antioxidants such as nickel dibutyldithiocarbamate; sulfur-based antioxidants such as 2-mercaptobenzoylimidazole, zinc salt of 2-mercaptobenzimidazole, dilauryl thiodipropionate and distearyl thiodipropionate.

When the composition for hose forming contains an antioxidant, the amount of blend of the antioxidant is, based on the total 100 parts by mass of the ethylene-based copolymer A and other polymer(s) (elastomer, cross-linking rubber, etc.) which is/are blended as necessary, usually 0.3 to 10 parts by mass and preferably 0.5 to 7.0 parts by mass. When the amount of blend of the antioxidant is within the above range, the resulting hose has no bloom on its surface, and the inhibition of vulcanization can be prevented.

<Processing Aid>

For processing aids, those which are generally blended in rubber as processing aids can be widely used. Examples of processing aids include fatty acids such as ricinoleic acid, stearic acid, palmitic acid and lauric acid, fatty acid salts such as barium stearate, zinc stearate and calcium stearate, fatty acid esters such as ricinoleic acid esters, stearic acid esters, palmitic acid esters, lauric acid esters and fatty acid derivatives such as N-substituted fatty acid amide. Among these, stearic acid is preferable.

When the composition for hose forming contains a processing aid, the amount of blend of the processing aid is, based on the total 100 parts by mass of the ethylene-based copolymer A and other polymer(s) (elastomer, cross-linking rubber, etc.) which is/are blended as necessary, usually 10 parts by mass or less, and preferably 8.0 parts by mass or less.

<Activator>

Examples of activators include amines such as di-n-butylamine, dicyclohexylamine, and monoethanolamine; activators such as diethylene glycol, polyethylene glycol, lecithin, triarylate mellirate, and zinc compounds of aliphatic or aromatic carboxylic acids; zinc peroxide adjusted substances; ctadecyltrimethylammonium bromide, synthetic hydrotalcite, and special quaternary ammonium compounds.

When the composition for hose forming contains an activator, the amount of blend of the activator is, based on the total 100 parts by mass of the ethylene-based copolymer A and other polymer(s) (elastomer, cross-linking rubber, etc.) which is/are blended as necessary, usually 0.2 to 10 parts by mass and preferably 0.3 to 5 parts by mass.

<Moisture Absorbent>

Examples of moisture absorbents include calcium oxide, silica gel, sodium sulfate, molecular sieve, zeolite and white carbon.

When the composition for hose forming contains a moisture absorbent, the amount of blend of the moisture absorbent is, based on the total 100 parts by mass of the ethylene-based copolymer A and other polymer(s) (elastomer, cross-linking rubber, etc.) which is/are blended as necessary, usually 0.5 to 15 parts by mass, and preferably 1.0 to 12 parts by mass.

<Foaming Agent>

A hose made from the rubber composition for forming a hose of the present invention 2-3 may be a non-foamed material or may be a foamed material. When forming a foamed material, a foaming agent can be used, and examples thereof include, for example, inorganic foaming agents, e.g., sodium bicarbonate, sodium carbonate, ammonium bicarbonate, ammonium carbonate, and ammonium nitrite; nitroso compounds such as N,N'-dinitroterephthalamide and N,N'-dinitrosopentamethylenetetramine; azo compounds such as azodicarbonamide, azobisisobutyronitrile, azocyclohexylnitrile, azodiaminobenzene, and barium azodicarboxylate; sulfonylhydrazide compounds such as benzenesulfonyl hydrazide, toluenesulfonyl hydrazide, and p,p'-oxybis(benzenesulfonyl hydrazide)diphenylsulfone-3,3'-disulphenyl hydrazide; and azide compounds such as calcium azide, 4,4'-diphenylsulfonylazide and para-toluenesulfonylazide.

When the composition for hose forming contains a foaming agent, the amount of blend of the foaming agent is appropriately selected such that the specific gravity of the foamed material after being cross-linked and foamed is usually 0.01 to 0.9. The amount of blend of the foaming agent is, based on the total 100 parts by mass of the ethylene-based copolymer A and other polymer(s) (elastomer, cross-linking rubber, etc.) which is/are blended as necessary, usually 0.5 to 30 parts by mass, and preferably 1 to 20 parts by mass.

[Properties of the Composition for Hose Forming]

By using the composition for hose forming of the present invention 2-3, a hose with excellent mechanical properties at ambient temperature and excellent low temperature properties can be formed. For example, a hose which has a great tensile strength at ambient temperature as well as small compression set at a low temperature and good results of a torsion test at a low temperature can be obtained.

[Hoses]

The hose of the present invention 2-3 has layers formed from the above composition for hose forming. The hose of the present invention 2-3 may be a hose of a single layer or two layers which only contains a layer(s) formed from the composition for hose forming as described above, and also may contain other layers, for example, one layer or two or more layers selected from layers made from natural rubber, fabric layers, thermoplastic resin layers and thermosetting resin layers.

Examples of methods of producing a hose from the composition for hose forming of the present invention 2-3 include a method of forming the said composition (uncross-linked composition) in a desired hose shape and, simultaneously with or after the forming, cross-linking the said composition.

For example, a method (I) in which the composition for hose forming of the present invention 2-3 containing a cross-linking agent is used and formed in a desired shape and then cross-linked by heating and a method (II) in which the composition for hose forming of the present invention 2-3 is formed in a desired shape and cross-linked by the irradiation of electron beams are included.

In the formation as described above, the composition for hose forming of the present invention 2-3 is formed in a hose shape having a hollow portion using an extruder, calender roll, press molding machine, injection molding machine, transfer molding machine or the like.

In the above method (I), simultaneously with or after the formation, the molded article is heated, for example, at 50 to 200° C. for 1 to 120 minutes. By this heating, the molded article is cross-linked or cross-linked as well as foamed. Examples of cross-linking baths include steam vulcanization baths, hot air vulcanization baths, glass beads fluidized-beds, molten salt vulcanization baths, and microwave bathes. One type alone of these cross-linking baths or two types or more thereof in combination may be used.

In the above method (II), simultaneously with or after the formation, electron beams having energy of 0.1 to 10 MeV are irradiated on the molded article such that the absorbed dose is usually 0.5 to 35 Mrad, and preferably 0.5 to 20 Mrad.

Additionally, shaping treatment may be carried out in which a mandrel is inserted in the hollow portion of the hose thus obtained to heat the hose. After the shaping treatment, the hose is cooled. In the shaping treatment, since the final shaping is performed after the mandrel is inserted in the cross-linked hose, scratches on the surface or crushed end portions at the time of the insertion of the mandrel can be prevented, whereby reducing the occurrence of defective products. Thus, a hose can be produced effectively even if the hose has a complicated shape.

The hose of the present invention 2-3 can be suitably employed as hoses for automobiles, motor bikes, industrial machines, construction machines, agricultural machines and the like. Particularly, the hose of the present invention 2-3 can be suitably used as a variety of hoses such as radiator hoses for cooling an engine, drain hoses for radiator overflow, heater hoses for a room heater, air conditioning drain hoses, water supply hoses for a windshield wiper, roof drain hoses, and prolact hoses.

EXAMPLES

For the present invention 1, the present invention will be described below more in detail by use of Examples, but the present invention 1 is not to be limited to these Examples.

Structures of a bridged metallocene compound and a precursor thereof were determined by measuring the $^1$H NMR spectrum (270 MHz, JEOL LTD., GSH-270), FD-mass (hereinafter, FD-MS) spectrum (JEOL LTD., SX-102A) and the like.

A component of the bridged metallocene compound, $\eta^5$-octamethyloctahydrodibenzofluorenyl group represents a 1,1,4,4,7,7,10,10-octamethyl-(5a,5b,11a,12,12a-η⁵)-1,2,3,4,7,8,9,10-octahydrodibenzo[b,h]fluorenyl group. Therefore, for example, [bis(4-methylphenyl)methylene(η⁵-cyclopentadienyl) (η⁵-octamethyloctahydrodibenzofluorenyl)]hafnium dichloride represents a structure of the following formula.

[Chem. 47]

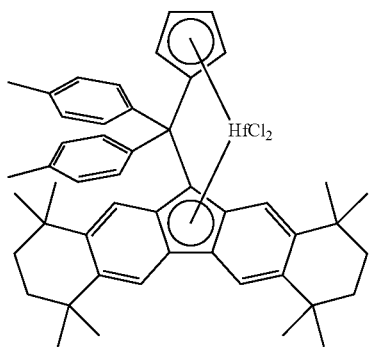

Properties/characteristics of the ethylene/α-olefin/non-conjugated polyene copolymer were measured in the following manner.

[Ethylene Content, Propylene Content, ENB Content of the Ethylene/Propylene/5-Ethylidene-2-Norbornene (ENB) Copolymer]

The measurement solvent was o-dichlorobenzene/benzene-d₆(4/1[vol/vol %]), and the ¹³C NMR spectrum thereof was measured and calculated under the measurement condition of a measurement temperature of 120° C., a spectral width of 250 ppm, a pulse repetition time of 5.5 seconds and a pulse width of 4.7 μsec (a 45 degree pulse) (100 MHz, JEOL LTD., ECX400P) or under the measurement condition of a measurement temperature of 120° C., a spectral width of 250 ppm, a pulse repetition time of 5.5 seconds and a pulse width of 5.0 μsec (a 45 degree pulse) (125 MHz, Bruker BioSpin K.K., AVANCEIIIcryo-500).

The calculated contents (mol %) were rounded off to one decimal place.

[Ethylene Content, 1-Butene Content, ENB Content of Ethylene/1-Butene/5-Ethylidene-2-Norbornene (ENB) Copolymer]

The measurement solvent was o-dichlorobenzene-d₄, and the ¹H NMR spectrum thereof was measured and calculated under the measurement condition of a measurement temperature of 120° C., with spectral width of 20 ppm, a pulse repetition time of 7.0 seconds and a pulse width of 6.15 μsec (a 45 degree pulse) (400 MHz, JEOL LTD., ECX400P).

The calculated contents (mol %) were rounded off to one decimal point.

[B Value]

The measurement solvent was o-dichlorobenzene/benzene-d₆ (4/1 [vol/vol %]), and the ¹³C NMR spectrum thereof was measured under the measurement condition of a measurement temperature of 120° C., with a spectral width of 250 ppm, a pulse repetition time of 5.5 seconds and a pulse width of 4.7 μsec (a 45 degree pulse) (100 MHz, JEOL LTD., ECX400P) or under the measurement condition of a measurement temperature of 120° C., with a spectral width of 250 ppm, a pulse repetition time of 5.5 seconds and a pulse width of 5.0 μsec (a 45 degree pulse) (125 MHz, Bruker BioSpin K.K.AVANCEIIIcryo-500) and calculated according to the following general equation [XVII].

$$B \text{ value} = (c+d)/[2 \times a \times (e+f)] \quad \text{[XVII]}$$

(In the equation [XVII], a, e and f are respectively the mole fraction of the ethylene, the mole fraction of the α-olefin and the mole fraction of the non-conjugated polyene in the ethylene/α-olefin/non-conjugated polyene copolymer, c is the ethylene-α-olefin diad mole fraction, and d is the ethylene-non-conjugated polyene diad mole fraction.)

[Weight Average Molecular Weight (Mw), Number Average Molecular Weight (Mn)]

The weight average molecular weight (Mw) and the number average molecular weight (Mn) were measured as follows, using a gel permeation chromatograph, Alliance GPC 2000 produced by Waters. TSKgel GMH6-HT×2 and TSKgel GMH6-HTL×2 (both produced by TOSOH CORPORATION) were used as separation columns with the column size of 7.5 mm in diameter and 300 mm in length and the column temperature of 140° C. The mobile phase was o-dichlorobenzene (Wako Pure Chemical Industries, LTD.) as well as 0.025 wt % of BHT (Takeda Pharmaceutical Company Limited) as an antioxidant and pumped at a rate of 1.0 ml/min. The sample concentration was 15 mg/10 ml, and the sample injection amount was 500 μl. A differential refractometer was used as a detector. For standard polystyrenes, polystyrenes produced by TOSOH CORPORATION were used for those with a molecular weight of Mw<1000 and Mw>4×10⁵, and polystyrenes produced by Pressure Chemical Company were used for those of 1000≤Mw≤4×10⁵. Each average molecular weight was calculated as a polystyrene equivalent molecular weight according to a general calibration procedure.

[Ratio of Weight Average Molecular Weight to Number Average Molecular Weight (Mw/Mn)]

The ratio was calculated by dividing the Mw as measured by the above measurement by the Mn as also measured by the above measurement.

[Limiting Viscosity ([η])]

A decalin solvent was used and measured at 135° C. About 20 mg of the polymer was resolved in 15 ml of decalin, and the specific viscosity $\eta_{sp}$ was measured in an oil bath at 135° C. After this decalin solution was diluted by the addition of 5 ml of the decalin solvent, the specific viscosity $\eta_{sp}$ was measured in the same way. The dilution was repeated two more times and the value $\eta_{sp}/C$ obtained by extrapolating the concentration (C) to 0 was used as the limiting viscosity.

$$[\eta] = \lim(\eta_{sp}/C) \quad (C \to 0)$$

Synthesis Example A1

Synthesis of [bis(4-methylphenyl)methylene(η⁵-cyclopentadienyl) (η⁵-2,3,6,7-tetramethylfluorenyl)] hafnium dichloride (i) Synthesis of bis(4-methylphenyl) (cyclopentadienyl) (2,3,6,7-tetramethylfluorenyl)methane In nitrogen atmosphere, to a 100 ml three-neck flask, 30 ml of dehydrated t-butylmethyl ether, and 0.725 g (3.26 mmol) of 2,3,6,7-tetramethylfluorene were introduced. To this solution, in an ice water bath, 2.05 ml (3.34 mmol) of a hexane solution of n-butyllithium (1.63 M) was dropwise added over a period of 5 minutes. The mixture was stirred at 40° C. for 2 hours. 0.893 g (3.46 mmol) of 6,6-bis(4-methylphenyl)fulvene was added. The mixture was stirred under reflux for 15 hours. To the reaction solution, a saturated aqueous ammonium chloride solution was introduced to separate the organic layer. The aqueous layer was subjected to extraction with 100 ml of hexane and 100 ml of toluene. The extract combined with the organic layer previously obtained was washed with water and a saturated aqueous sodium chloride solution. The organic layer washed was dried with magnesium sulfate, and the solvent was distilled off. The resultant solid was washed with hexane. As a result, bis4-(methylphenyl) (cyclopentadienyl) (2,3,6,7-tetramethylfluorenyl)methane was obtained as a flesh-color powder. The yielded amount was 0.645 g, and the yield was 41%. bis(4-methylphenyl) (cyclopentadienyl) (2,3,6,7-tetramethylfluorenyl)methane was identified by FD-MS spectrum. A measured value thereof is shown below.

FD-MS spectrum: M/z 480 (M$^+$)

(ii) Synthesis of [bis(4-methylphenyl)methylene($\eta^5$-cyclopentadienyl) ($\eta^5$-2,3,6,7-tetramethylfluorenyl)] hafnium dichloride In nitrogen atmosphere, to a 30 ml Schlenk flask, 0.300 g (0.624 mmol) of bis(4-methylphenyl) (cyclopentadienyl) (2,3,6,7-tetramethylfluorenyl)methane, 0.147 g (1.27 mmol) of α-methylstyrene, and 0.628 g of dehydrated cyclopentylmethyl ether were introduced. 0.78 ml (1.3 mmol) of a 1.63 M n-butyllithium hexane solution was dropwise added over a period of 10 minutes. After the temperature was elevated to 70° C., the mixture was stirred for 4 hours. After the mixture was cooled in an ice/acetone bath, the pressure inside the system was reduced for 5 minutes, and was returned to normal pressure with nitrogen. 0.209 g (0.652 mmol) of hafnium tetrachloride was added. The mixture was allowed to react at room temperature for 17 hours. The solvent was distilled off, and the resultant solid was washed with dehydrated hexane. About 10 ml of dehydrated dichloromethane was added to extract soluble components. The resultant solution was concentrated, and about 3 ml of dehydrated hexane was added. A solid precipitated was collected by filtration. As a result, [bis(4-methylphenyl)methylene($\eta^5$-cyclopentadienyl) ($\eta^5$-2,3,6,7-tetramethylfluorenyl)]hafnium dichloride was obtained as a golden yellow powder. The yielded amount was 0.233 g, and the yield was 51%. [bis(4-methylphenyl)methylene($\eta^5$-cyclopentadienyl) ($\eta^5$-2,3,6,7-tetramethylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 7.88 (s, 2H), 7.78 (dd, J=7.9, 2.3 Hz, 2H), 7.69 (dd, J=7.9, 2.3 Hz, 2H), 7.21 (d, J=8.2 Hz, 2H), 7.12 (d, J=8.2 Hz, 2H), 6.25 (t, J=2.8 Hz, 2H), 6.14 (s, 2H), 5.66 (t, J=2.8 Hz, 2H), 2.49 (s, 6H), 2.34 (s, 6H), 2.05 (s, 6H)

FD-MS spectrum: M/z 728 (M$^+$)

Synthesis Example A2

Synthesis of [bis(4-methoxyphenyl)methylene(1-cyclopentadienyl) ($\eta^5$-2,3,6,7-tetramethylfluorenyl)] hafnium dichloride (i) Synthesis of 6,6-bis(4-methoxyphenyl)fulvene In nitrogen atmosphere, to a 500 ml three-neck flask, 8.28 g (115 mmol) of lithium cyclopentadienide, and 200 ml of dehydrated THF were added. With the mixture cooled in an ice bath, 13.6 g (119 mmol) of DMI was added. The mixture was stirred at room temperature for 30 minutes. Thereafter, 25.3 g (105 mmol) of 4,4'-dimethoxybenzophenone was added. The mixture was stirred under heat refluxing for 1 week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel. The organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane:ethyl acetate=4:1). As a result, a red solution was obtained. The solvent was distilled off under reduced pressure. As a result, 9.32 g (32.1 mmol, 30.7%) of 6,6-bis(4-methoxyphenyl) fulvene was obtained as an orange solid. 6, 6-bis(4-methoxyphenyl) fulvene was identified by $^1$H NMR spectrum. A measured value thereof is shown below.

$^1$H NMR spectrum (270 MHz, CDCl$_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl) (cyclopentadienyl) (2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of a n-butyllithium/hexane solution (1.63 M) was gradually added. The mixture was stirred at room temperature for 18 hours. 591 mg (2.03 mmol) of 6,6-bis(4-methoxyphenyl) fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl) (cyclopentadienyl)(2,3,6,7-tetramethylfluorenyl)methane was obtained. bis(4-methoxyphenyl) (cyclopentadienyl) (2,3,6,7-tetramethylfluorenyl)methane was identified by FD-MS spectrum. A measured value thereof is shown below.

FD-MS spectrum: M/z 512 (M$^+$)

(iii) Synthesis of [bis(4-methoxyphenyl)methylene ($\eta^5$-cyclopentadienyl) ($\eta^5$-2,3,6,7-tetramethylfluorenyl)]hafnium dichloride In nitrogen atmosphere, to a 100 ml Schlenk flask, 272 mg (0.531 mmol) of bis(4-methoxyphenyl) (cyclopentadienyl) (2,3,6,7-tetramethylfluorenyl)methane, 20 ml of dehydrated toluene, and 90 ml (1.1 mmol) of THF were sequentially added. With the mixture cooled in an ice bath, 0.68 ml (1.1 mmol) of a n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl) ($\eta^5$-2,3,6,7-tetramethylfluorenyl)]hafnium dichloride was obtained as a yellow solid. [bis(4-methoxyphenyl)methylene($\eta^5$-cyclopentadienyl) ($\eta^5$-2,3,6,7-tetramethylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H)

FD-MS spectrum: M/z 760 (M$^+$)

Synthesis Example A3

Synthesis of [bis[4-(dimethylamino)phenyl]methylene($\eta^5$-cyclopentadienyl) ($\eta^5$-2,3,6,7-tetramethylfluorenyl)]hafnium dichloride (i) Synthesis of 6,6-bis[4-(dimethylamino)phenyl]fulvene In nitrogen atmosphere, to a 200 ml three-neck flask, 3.06 g (42.4 mmol) of lithium cyclopentadienide, 10.1 g (37.5 mmol) of 4,4'-bis(dimethylamino)benzophenone, and 100 ml of dehydrated DME were added. With the mixture cooled in an ice bath, 4.86 g (42.6 mmol) of DMI was added. Thereafter, the mixture was subjected to under heat refluxing for 8 days. With the mixture cooled in an ice bath, 50 ml of water was gradually added, and further, 50 ml of dichloromethane was added. The mixture was stirred at room temperature for 30 minutes. The resultant two-layer solution was transferred to a 300 ml separating funnel. The organic layer was washed three times with 100 ml of water. The organic layer washed was dried with anhydrous magnesium sulfate for 30 minutes. Thereafter, the solvent was distilled off under reduced pressure, which was followed by extraction with a hexane/ethyl acetate mixed solvent (4:1). The solvent was distilled off under reduced pressure, and recrystallization was performed in ethanol. As a result, 1.04 g (3.29 mmol, 8.8%) of 6,6-bis[4-(dimethylamino)phenyl]fulvene was obtained as a red-brown solid. 6,6-bis[4-(dimethylamino)phenyl]fulvene was identified by $^1$H NMR spectrum and FD-MS spectrum. A measured value thereof is shown below.

$^1$H NMR spectrum (270 MHz, CDCl$_3$): δ/ppm 7.29-7.25 (m, 4H), 6.71-6.65 (m, 4H), 6.57-6.54 (m, 2H), 6.36-6.34 (m, 2H), 3.02 (s, 12H)

FD-MS spectrum: M/z 316 (M$^+$)

(ii) Synthesis of bis[4-(dimethylamino)phenyl](cyclopentadienyl) (2,3,6,7-tetramethylfluorenyl)methane In nitrogen atmosphere, to a 100 ml three-neck flask, 1.50 g (6.75 mmol) of 2,3,6,7-tetramethylfluorene, and 80 ml of dehydrated cyclopentylmethyl ether were added. With the mixture cooled at −20° C., 4.50 ml (7.08 mmol) of a n-butyllithium/hexane solution (1.58 M) was gradually added. The mixture was stirred at room temperature for 20 hours. The reaction liquid was again cooled to −20° C., and thereafter, 2.27 g (7.17 mmol) of 6,6-bis[4-(dimethylamino)phenyl]fulvene was added. While gradually returned to room temperature, the mixture was stirred for 4 hours. An aqueous ammonium chloride solution was added to separate off the aqueous layer, and the residue was washed with water. Thereafter, the solvent was distilled off. The resultant solid was washed with methanol. As a result, 2.14 g (3.97 mmol, 58.9%) of bis[4-(dimethylamino)phenyl](cyclopentadienyl) (2,3,6,7-tetramethylfluorenyl)methane was obtained as a pale-yellow white solid. bis[4-(dimethylamino)phenyl](cyclopentadienyl) (2,3,6,7-tetramethylfluorenyl)methane was identified by $^1$H NMR spectrum. A measured value thereof is shown below.

$^1$H NMR spectrum (270 MHz, CDCl$_3$): δ/ppm 7.22 (s), 7.12 (br), 6.73 (br), 6.51 (br), 6.16 (br), 5.19 (s), 2.86 (s), 2.20 (s), 2.06 (s)

(iii) Synthesis of [bis[4-(dimethylamino)phenyl] methylene($\eta^5$-cyclopentadienyl) ($\eta^5$-2,3,6,7-tetramethylfluorenyl)]hafnium dichloride In nitrogen atmosphere, to a 50 ml Schlenk flask, 0.800 g (1.48 mmol) of bis[4-(dimethylamino)phenyl](cyclopentadienyl) (2,3,6,7-tetramethylfluorenyl)methane, 10 ml of dehydrated toluene, and 0.4 g of dehydrated THF were added. With the mixture cooled at −20° C., 1.90 ml (2.97 mmol) of a n-butyllithium/hexane solution (1.58 M) was gradually added, with stirring. After returned to room temperature, the mixture was heated to 45° C., and stirred for 4 hours. The reaction solution was allowed to return to room temperature. The solvent was distilled off, and to the resultant solid, 80 ml of dehydrated diethyl ether was added. The mixture was cooled to −20° C. While the mixture was stirred, 0.470 g (1.47 mmol) of hafnium tetrachloride was added. While the temperature was gradually elevated to room temperature, the mixture was stirred for 16 hours. Thereafter, the solvent was distilled off. The resultant solid was washed with dehydrated diethyl ether, and extracted with dehydrated dichloromethane. The solvent was distilled off. The resultant solid was washed with a small amount of dehydrated diethyl ether. As a result, 0.520 g (0.661 mmol, 44.7%) of [bis[4-(dimethylamino)phenyl]methylene($\eta^5$-cyclopentadienyl) ($\eta^5$-2,3,6,7-tetramethylfluorenyl)]hafnium dichloride was obtained as a yellow-orange solid. [bis[4-(dimethylamino)phenyl]methylene($\eta^5$-cyclopentadienyl) ($\eta^5$-2,3,6,7-tetramethylfluorenyl)]hafnium dichloride was identified by $^1$H NMR spectrum. A measured value thereof is shown below.

$^1$H NMR spectrum (270 MHz, CDCl$_3$): δ/ppm 7.85 (s, 2H), 7.67-7.60 (m, 4H), 6.72-6.69 (m, 4H), 6.23-6.21 (m, 4H), 5.66 (t, J=2.6 Hz, 2H), 2.92 (s, 12H), 2.47 (s, 6H), 2.05 (s, 6H)

Synthesis Example A4

Synthesis of [bis(3, 4-dimethoxyphenyl)methylene ($\eta^5$-cyclopentadienyl) ($\eta^5$-2,3,6,7-tetramethylfluorenyl)]hafnium dichloride (i) Synthesis of 3,3',4,4'-tetramethoxybenzophenone To a 300 ml three-neck flask, 17.3 g (125.2 mmol) of 1,2-dimethoxybenzene, and 200 ml of polyphosphoric acid were added, and stirred at room temperature. Further, 22.8 g (125.2 mmol) of 3,4-dimethoxybenzoic acid was added. The mixture was heated at 100° C., and stirred for 6 hours. Thereafter, the reaction product was added to water to filter off insoluble substances. The resultant solid was washed with ethanol. As a result, 26.2 g (69%) of 3,3',4,4'-tetramethoxybenzophenone was obtained as a white powder. 3,3',4,4'-tetramethoxybenzophenone was identified by $^1$H NMR spectrum. A measured value thereof is shown below.

$^1$H NMR spectrum (270 MHz, CDCl$_3$): δ/ppm 7.42 (d, J=2.0 Hz, 2H), 7.36 (dd, J=8.2, 2.0 Hz, 2H), 6.89 (d, J=8.2 Hz, 2H), 3.95 (s, 6H), 3.93 (s, 6H)

(ii) Synthesis of 6,6-bis(3,4-dimethoxyphenyl)fulvene

In nitrogen atmosphere, to a 200 ml three-neck flask, 1.74 g (19.8 mmol) of cyclopentadiene sodium salt, and 100 ml of dehydrated THF were introduced. Thereto, in an ice water bath, 3.0 ml (27.3 mmol) of 1,3-dimethyl-2-imidazolidinone, and 4.65 g (15.38 mmol) of 3,3',4,4'-tetramethoxybenzophenone were added. The mixture was stirred under heat refluxing at 60° C. for 3 days. Thereafter, to the reaction solution, an aqueous hydrochloric acid solution was added to separate the organic layer. This was followed by extraction with ethyl acetate. The resultant organic layer was washed one time with a saturated aqueous sodium bicarbonate solution, one time with water, and one time with a saturated saline solution. The organic layer washed was dried with magnesium sulfate, and the solvent was distilled off. The resultant solid was purified by column chromatography. As a result, 3.0 g (56%) of 6,6-bis(3,4-dimethoxyphenyl)fulvene was obtained as an orange powder. 6,6-bis(3,4-dimethoxyphenyl)fulvene was identified by $^1$H NMR spectrum. A measured value thereof is shown below.

$^1$H NMR spectrum (270 MHz, CDCl$_3$): δ/ppm 6.89-6.87 (m, 6H), 6.59 (d, J=6.6 Hz, 2H), 6.32 (d, J=6.6 Hz, 2H), 3.93 (s, 6H), 3.82 (s, 6H)

(iii) Synthesis of bis(3,4-dimethoxyphenyl) (cyclopentadienyl) (2,3,6,7-tetramethylfluorenyl)methane In nitrogen atmosphere, to a 100 ml three-neck flask, 1.0 g (4.5 mmol) of 2,3,6,7-tetramethylfluorene, and 80 ml of dehydrated cyclopentylmethyl ether were introduced. With the mixture cooled in a dry ice methanol bath to −20° C., 2.9 ml (4.7 mmol) of a n-butyllithium/hexane solution (1.66 M) was slowly dropwise added. While gradually returned to room temperature, the mixture was stirred for 20 hours. Thereafter, with the mixture cooled again in a dry ice methanol bath to −20° C., 1.51 g (4.3 mmol) of 6,6-bis(3,4-dimethoxyphenyl)fulvene was added. The mixture was stirred at room temperature for 20 hours. Thereafter, to the reaction solution, a saturated aqueous ammonium chloride solution was added to separate the organic layer, and the aqueous layer was subjected to extraction with diethyl ether. The resultant organic layers were combined and washed three times with water, and the solvent was distilled off. The resultant solid was washed with a small amount of diethyl ether. The resultant solid was dried. As a result, 1.2 g (46.6%) of bis(3,4-dimethoxyphenyl) (cyclopentadienyl) (2,3,6,7-tetramethylfluorenyl)methane was obtained as a pale-pink white powder. bis(3,4-dimethoxyphenyl) (cyclopentadienyl) (2,3,6,7-tetramethylfluorenyl)methane was identified by $^1$H NMR spectrum. A measured value thereof is shown below.

$^1$H NMR spectrum (270 MHz, CDCl$_3$): δ/ppm 8.4-8.3 (br), 7.5-7.1 (br), 7.1-6.2 (br), 5.3-5.1 (br), 4.0-3.7 (br), 3.7-3.3 (br), 3.2-3.0 (br), 3.0-2.8 (br), 2.4-2.0 (br), 1.7-1.4 (br)

(iv) Synthesis of [bis(3, 4-dimethoxyphenyl)methylene($\eta^5$-cyclopentadienyl) ($\eta^5$-2,3,6,7-tetramethylfluorenyl)]hafnium dichloride In nitrogen atmosphere, to a 50 ml Schlenk flask, 0.6 g (1.1 mmol) of bis(3,4-dimethoxyphenyl) (cyclopentadienyl) (2,3,6,7-tetramethylfluorenyl)methane, 10 ml of dehydrated toluene, and 0.2 g of dehydrated THF were added. With the mixture cooled in a dry ice bath, 1.3 ml (2.1 mmol) of a n-butyllithium/hexane solution (1.60 M) was gradually added. The mixture was stirred at room temperature for 30 minutes, heated at 45° C., and stirred for 4 hours. After the temperature of the reaction solution returned to room temperature, the solvent was distilled off. To the resultant solid, 80 ml of dehydrated diethyl ether was added, followed by cooling to −20° C., and 0.49 g (1.1 mmol) of hafnium tetrachloride.bis(diethyl ether) complex was added. While the temperature was gradually elevated to room temperature, the mixture was stirred for 16 hours. Thereafter, the solvent was distilled off. The resultant solid was extracted with dehydrated dichloromethane. The extract was concentrated again, and extracted with dehydrated toluene. As a result, 0.32 g (20.9%) of [bis(3,4-dimethoxyphenyl)methylene($\eta^5$-cyclopentadienyl) ($\eta^5$-2,3,6,7-tetramethylfluorenyl)]hafnium dichloride was obtained as a yellow solid. [bis(3,4-dimethoxyphenyl)methylene($\eta^5$-cyclopentadienyl) ($\eta^5$-2,3,6,7-tetramethylfluorenyl)]hafnium dichloride was identified by $^1$H NMR spectrum. A measured value thereof is shown below.

$^1$H NMR spectrum (270 MHz, CDCl$_3$): δ/ppm 7.92-7.83 (m, 2H), 7.51-7.10 (m, 6H), 6.96-6.75 (m, 2H), 6.35-6.10 (m, 4H), 5.74-5.60 (m, 2H), 3.96-3.83 (m, 9H), 3.68-3.59 (m, 3H), 2.55-2.44 (m, 6H), 2.13-2.02 (m, 6H)

Synthesis Example A5

Synthesis of [bis(4-N-morpholinylphenyl)methylene ($\eta^5$-cyclopentadienyl) ($\eta^5$-2,3,6,7-tetramethylfluorenyl)]hafnium dichloride (i) Synthesis of bis(4-N-morpholinylphenyl) (cyclopentadienyl) (2,3,6,7-tetramethylfluorenylfluorenyl) methane In nitrogen atmosphere, to a 100 ml three-neck flask, 0.7 g (3.2 mmol) of 2,3,6,7-tetramethylfluorene, and 100 ml of dehydrated cyclopentylmethyl ether were introduced. With the mixture cooled in a dry ice methanol bath to −20° C., 2.1 ml (3.3 mmol) of a n-butyllithium/hexane solution (1.60 M) was slowly dropwise added. While gradually returned to room temperature, the mixture was stirred for 20 hours. Thereafter, with the mixture cooled again in a dry ice methanol bath to −20° C., 1.3 g (3.2 mmol) of 6,6-bis(4-N-morpholinylphenyl)fulvene was added. The mixture was stirred at room temperature for 4 hours. Thereafter, to the reaction solution, a saturated aqueous ammonium chloride solution was added to separate the organic layer, and the aqueous layer was subjected to extraction with diethyl ether. The resultant organic layers were combined and washed three times with water, and the solvent was distilled off. The resultant solid was washed with methanol, and dried. As a result, 1.3 g (69.0%) of bis(4-N-morpholinylphenyl) (cyclopentadienyl) (2,3,6,7-tetramethylfluorenylfluorenyl)methane was obtained as an ocher-white powder. bis(4-N-morpholinylphenyl) (cyclopentadienyl) (2,3,6,7-tetramethylfluorenylfluorenyl)methane was identified by $^1$H NMR spectrum.

A measured value thereof is shown below.

$^1$H NMR spectrum (270 MHz, CDCl$_3$): δ/ppm 7.4-7.0 (br), 6.8-6.5 (br), 6.4-6.0 (br), 5.3-5.1 (br), 4.0-3.7 (br), 3.3-3.2 (br), 3.2-2.8 (br), 2.4-2.2 (br), 2.2-1.9 (br)

(ii) Synthesis of [bis(4-N-morpholinylphenyl)methylene($\eta^5$-cyclopentadienyl) ($\eta^5$-2,3,6,7-tetramethylfluorenyl)]hafnium dichloride In nitrogen atmosphere, to a 50 ml Schlenk flask, 0.7 g (1.1 mmol) of bis(4-N-morpholinylphenyl) (cyclopentadienyl) (2,3,6,7-tetramethylfluorenyl)methane, 30 ml of dehydrated toluene, and 0.2 g of dehydrated THF were added. With the mixture cooled in a dry ice bath, 1.4 ml (2.2 mmol) of a n-butyllithium/hexane solution (1.60 M) was gradually added. The mixture was stirred at room temperature for 30 minutes, heated at 45° C., and stirred for 4 hours. After the temperature of the reaction solution returned to room temperature, the solvent was distilled off. To the resultant solid, 50 ml of dehydrated diethyl ether was added, followed by cooling to −20° C., and 0.52 g (1.1 mmol) of hafnium tetrachloride.bis(diethyl ether) complex was added. While the temperature was gradually elevated to room temperature, the mixture was stirred for 16 hours. Thereafter, the solvent was distilled off, which was followed by extraction with diethyl ether. The extract was concentrated again, and washed with a small amount of dehydrated diethyl ether. As a result, 0.37 g (37.8%) of [bis(4-N-morpholinylphenyl)methylene($\eta^5$-cyclopentadienyl) ($\eta^5$-2,3,6,7-tetramethylfluorenyl)]hafnium dichloride was obtained as a yellow solid. [bis(4-N-morpholinylphenyl)methylene($\eta^5$-cyclopentadienyl) ($\eta^5$-2,3,6,7-tetramethylfluorenyl)]hafnium dichloride was identified by $^1$H NMR spectrum. A measured value thereof is shown below.

$^1$H NMR spectrum (270 MHz, CDCl$_3$): δ/ppm 7.86 (s, 2H), 7.79-7.59 (m, 4H), 6.95-6.79 (m, 4H), 6.27-6.21 (m, 2H), 6.20-6.13 (m, 2H), 5.69-5.57 (m, 2H), 3.94-3.73 (m, 8H), 3.22-2.98 (m, 8H), 2.54-2.41 (m, 6H), 2.10-1.96 (m, 6H)

Comparative Synthesis Example A1

Synthesis of [bis(4-methylphenyl)methylene($\eta^5$-cyclopentadienyl) ($\eta^5$-fluoren yl)]hafnium dichloride (i) Synthesis of bis(4-methylphenyl)(cyclopentadienyl)(fluorenyl)methane In nitrogen atmosphere, to a 200 ml three-neck flask, 1.72 g (10.3 mmol) of fluorene, and 30 ml of dehydrated THF were added. With the mixture cooled in an ice bath, 6.5 ml (10.6 mmol) of a n-butyllithium/hexane solution (1.63 M) was gradually added. The mixture was stirred for 3 hours. With the mixture cooled in a methanol/dry ice bath, a solution of 3.22 g (12.5 mmol) of 6,6-bis(4-methylphenyl)fulvene dissolved in 50 ml of dehydrated THF was added. While the temperature was gradually elevated to room temperature, the mixture was stirred for 19 hours. The organic phase was extracted and washed with 100 ml of hydrochloric acid (2 M), with 100 ml of a saturated aqueous sodium bicarbonate solution (two times), and subsequently with 100 ml of a saturated aqueous sodium chloride solution, and dehydrated with anhydrous magnesium sulfate. The solvent was distilled off under reduced pressure. As a result, a red solid was obtained. The resultant solid was washed with hexane and methanol, and dried under reduced pressure. As a result, 2.52 g (5.95 mmol, 57.6%) of bis(4-methylphenyl)(cyclopentadienyl)(fluorenyl)methane was obtained as a yellow powder. bis(4-methylphenyl)(cyclopentadienyl)(fluorenyl)methane was identified by FD-MS. A measured value thereof is shown below.

FD-MS spectrum: M/z 424 (M$^+$)

(ii) Synthesis of [bis(4-methylphenyl)methylene($\eta^5$-cyclopentadienyl) ($\eta^5$-fluoren yl)]hafnium dichloride In nitrogen atmosphere, to a 100 ml Schlenk flask, 805 mg (1.90 mmol) of bis(4-methylphenyl)(cyclopentadienyl)(fluorenyl)methane, and 50 ml of dehydrated diethyl ether were added. With the mixture cooled in a methanol/dry ice bath, 2.5 ml (4.1 mmol) of a n-butyllithium/hexane solution (1.63 M) was gradually added, and at room temperature the mixture was stirred for 22 hours. With the mixture cooled in a methanol/dry ice bath, 602 mg (1.88 mmol) of hafnium tetrachloride was added. While the temperature was gradually elevated to room temperature, the mixture was stirred for 22 hours. As a result, an orange slurry was obtained. The solvent was distilled off under reduced pressure. The resultant solid was transferred into a glove box, and extracted with diethyl ether. The solvent was distilled off under reduced pressure. To the resultant solid, a small amount of dichloromethane and hexane was added. The mixture was allowed to be left at −20° C. As a result, a yellow solid was precipitated out. This solid was collected by filtration, washed with a small amount of hexane, and dried under reduced pressure. As a result, 273 mg (406 μmol, 21.6%) of [bis(4-methylphenyl)methylene($\eta^5$-cyclopentadienyl) ($\eta^5$-fluoren yl)]hafnium dichloride was obtained as a yellow solid. [bis(4-methylphenyl)methylene($\eta^5$-cyclopentadienyl) ($\eta^5$-fluoren yl)]hafnium dichloride was identified by $^1$H NMR and FD-MS. A measured value thereof is shown below.

$^1$H NMR spectrum (270 MHz, CDCl$_3$): δ/ppm 8.16-8.13 (m, 2H), 7.79-7.67 (m, 4H), 7.55-7.48 (m, 2H), 7.22-7.10 (m, 4H), 7.01-6.94 (m, 2H), 6.52-6.48 (m, 2H), 6.29 (t, J=2.7 Hz, 2H), 5.72 (t, J=2.7 Hz, 2H), 2.33 (s, 6H)

FD-MS spectrum: M/z 672 (M$^+$)

Comparative Synthesis Example A2

Synthesis of [bis(4-methylphenyl)methylene($\eta^5$-cyclopentadienyl) ($\eta^5$-2,7-dimethylfluorenyl)]hafnium dichloride (i) Synthesis of bis(4-methylphenyl)(cyclopentadienyl) (2,7-dimethylfluorenyl)methane In nitrogen atmosphere, to a 200 ml three-neck flask, 876 mg (4.51 mmol) of 2,7-dimethylfluorene, and 20 ml of dehydrated THF were added. With the mixture cooled in a methanol/dry ice bath, 3.0 ml (4.9 mmol) of a n-butyllithium/hexane solution (1.63 M) was gradually added. The mixture was stirred at room temperature for 4 hours. With the mixture cooled in a methanol/dry ice bath, a solution of 1.28 g (4.96 mmol) of 6,6-bis(4-methylphenyl) fulvene dissolved in 25 ml of THF solution was added. While the temperature was gradually elevated to room temperature, the mixture was stirred for 23 hours. As a result, an orange slurry was obtained. The organic phase was extracted and washed with 100 ml of a saturated aqueous ammonium chloride solution, with 100 ml of a saturated aqueous sodium bicarbonate solution, and subsequently with 100 ml of a saturated aqueous sodium chloride solution, and dehydrated with anhydrous magnesium sulfate. The solvent was distilled off under reduced pressure. As a result, a yellow solid was obtained. The resultant solid was washed with hexane and methanol, and dried under reduced pressure. As a result, 880 mg (1.94 mmol, 43.1%) of bis(4-methylphenyl)(cyclopentadienyl)(2,7-dimethylfluorenyl)methane was obtained as a yellow powder. bis(4-methylphenyl)(cyclopentadienyl)(2,7-dimethylfluorenyl) methane was identified by FD-MS spectrum. A measured value thereof is shown below.

FD-MS spectrum: M/z 453 (M$^+$)

(ii) Synthesis of [bis(4-methylphenyl)methylene($\eta^5$-cyclopentadienyl) ($\eta^5$-2,7-dimethylfluorenyl)]hafnium dichloride In nitrogen atmosphere, to a 100 ml Schlenk flask, 843 mg (1.86 mmol) of 4,4'-ditolyl(cyclopentadienyl)(2,7-dimethylfluorenyl)methane, and 50 ml of dehydrated diethyl ether were added. With the mixture cooled in a methanol/dry ice bath, 2.5 ml (4.0 mmol) of a n-butyllithium/hexane solution (1.59 M) was gradually added. The mixture was stirred at room temperature for 24 hours. With the mixture cooled in a methanol/dry ice bath, 594 mg (1.86 mmol) of hafnium tetrachloride was added. While the temperature was gradually elevated to room temperature, the mixture was stirred for 19 hours. As a result, an orange slurry was obtained. The solvent was distilled off under reduced pressure. The resultant solid was transferred into a glove box, and extracted with methylene chloride. The solvent was distilled off under reduced pressure. To the resultant solid, a small amount of methylene chloride and hexane was added. The mixture was allowed to be left at −20° C. As a result, a yellow solid was precipitated out. This solid was collected by filtration, washed with a small amount of hexane, and dried under reduced pressure. As a result, 670 mg (957 μmol, 51.6%) of [bis(4-methylphenyl)methylene($\eta^5$-cyclopentadienyl) ($\eta^5$-2,7-dimethylfluorenyl)]hafnium dichloride was obtained as a yellow solid. [bis(4-methylphenyl)methylene($\eta^5$-cyclopentadienyl) ($\eta^5$-2,7-dimethylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 7.96 (d, J=8.6 Hz, 2H), 7.76 (dd, J=8.1 Hz, 2.4 Hz, 2H), 7.67 (dd, J=7.8 Hz, 1.9 Hz, 2H), 7.31 (dd, J=8.6 Hz, 1.4 Hz, 2H), 7.20 (br d, J=7.8 Hz, 2H), 7.10 (br d, J=7.8 Hz, 2H), 6.28 (t, J=8.0 Hz, 2H), 6.15 (br s, 2H), 5.68 (t, J=8.0 Hz, 2H), 2.33 (s, 6H), 2.12 (s, 6H)

FD-MS spectrum: M/z 700 (M$^+$)

Comparative Synthesis Example A3

Synthesis of [bis(4-methylphenyl)methylene($\eta^5$-cyclopentadienyl) ($\eta^5$-2,7-di-t-butylfluorenyl)]hafnium dichloride (i) Synthesis of [bis(4-methylphenyl)methylene($\eta^5$-cyclopentadienyl) ($\eta^5$-2,7-di-t-butylfluorenyl)]hafnium dichloride In nitrogen atmosphere, to a 100 ml Schlenk flask, 684 g (1.27 mmol) of bis(4-methylphenyl) (cyclopentadienyl) (2,7-di-t-butylfluorenyl)methane, and 50 ml of dehydrated diethyl ether were added. With the mixture cooled in a methanol/dry ice bath, 1.7 ml (2.8 mmol) of a n-butyllithium/hexane solution (1.63 M) was gradually added. The mixture was stirred at room temperature for 17 hours. With the mixture cooled in a methanol/dry ice bath, 406 mg (1.27 mmol) of hafnium tetrachloride was added. While the temperature was gradually elevated to room temperature, the mixture was stirred for 16 hours. As a result, an orange slurry was obtained. The solvent was distilled off under reduced pressure. The resultant solid was transferred into a glove box, and extracted with diethyl ether. The solvent was distilled off under reduced pressure. To the resultant solid, a small amount of methylene chloride and hexane was added. The mixture was allowed to be left at −20° C. As a result, a yellow solid was precipitated out. This solid was collected by filtration, washed with a small amount of hexane, and dried under reduced pressure. As a result, 131 mg (167 μmol, 13.2%) of [bis(4-methylphenyl)methylene($\eta^5$-cyclopentadienyl) ($\eta^5$-2,7-di-t-butylfluorenyl)]hafnium dichloride was obtained as a yellow solid. [bis(4-methylphenyl)methylene ($\eta^5$-cyclopentadienyl) ($\eta^5$-2,7-di-t-butylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 7.99 (d, J=8.9 Hz, 2H), 7.80 (dd, J=8.0 Hz, 2.2 Hz, 2H), 7.73 (dd, J=8.0 Hz, 2.2 Hz, 2H), 7.54 (dd, J=8.9 Hz, 1.6 Hz, 2H), 7.22 (br d, J=8.9 Hz, 2H), 7.14 (br d, J=8.6 Hz, 2H), 6.36 (d, J=0.8 Hz, 2H) 6.26 (t, J=2.7 Hz, 2H), 5.60 (t, J=2.7 Hz, 2H), 2.32 (s, 6H), 1.03 (s, 18H)

FD-MS spectrum: M/z 784 (M$^+$)

Comparative Synthesis Example A4

Synthesis of [bis(4-methylphenyl)methylene($\eta^5$-cyclopentadienyl) ($\eta^5$-3,6-dimethylfluorenyl)]hafnium dichloride (i) Synthesis of bis(4-methylphenyl)(cyclopentadienyl)(3,6-dimethylfluorenyl) methane In nitrogen atmosphere, to a 30 ml Schlenk flask, 20 ml of dehydrated t-butylmethyl ether, and 0.399 g (2.06 mmol) of 3,6-dimethylfluorene were introduced. To this solution, in an ice water bath, 1.31 ml (2.08 mmol) of a hexane solution of n-butyllithium (1.59 M) was dropwise added over a period of 10 minutes. The mixture was stirred at room temperature for 18 hours. 0.539 g (2.08 mmol) of 6,6-bis (4-methylphenyl)fulvene was added. The mixture was stirred at room temperature for 24 hours. To the reaction solution, a saturated aqueous ammonium chloride solution was introduced to separate the organic layer. The aqueous layer was subjected to extraction with 100 ml of hexane and 60 ml of toluene. The extract combined with the organic layer previously obtained was washed with water and a saturated aqueous sodium chloride solution. The organic layer washed was dried with magnesium sulfate, and filtered through silica gel. The solvent was distilled off, and the resultant solid was washed with ethanol. As a result, 0.741 g (1.64 mmol, 80%) of bis(4-methylphenyl)(cyclopentadienyl)(3,6-dimethylfluorenyl)methane was obtained. bis(4-methylphenyl)(cyclopentadienyl)(3,6-dimethylfluorenyl)methane was identified by FD-MS spectrum. A measured value thereof is shown below.

FD-MS spectrum: M/z 452 (M+)

(ii) Synthesis of [bis(4-methylphenyl)methylene($\eta^5$-cyclopentadienyl) ($\eta^5$-3,6-dimethylfluorenyl)]hafnium dichloride In nitrogen atmosphere, to a 30 ml Schlenk flask, 0.350 g (0.773 mmol) of a ligand, 0.183 g (1.55 mmol) of α-methylstyrene, 0.774 g of cyclopentylmethyl ether, and 18.0 g of toluene were introduced. 0.98 ml (1.6 mmol) of a 1.59 M n-butyllithium hexane solution was dropwise added over a period of 10 minutes. After the temperature was elevated to 70° C., the mixture was stirred for 4 hours. After the mixture was cooled in an ice/acetone bath, the pressure inside the system was reduced for 5 minutes, and was returned to normal pressure with nitrogen. 0.249 g (0.776 mmol) of hafnium tetrachloride was added. The mixture was allowed to react at room temperature for 18 hours. The solvent was distilled off, and the resultant solid was washed with hexane. About 10 ml of dichloromethane was added to extract soluble components. The resultant solution was concentrated, and about 3 ml of hexane was added. A solid precipitated was collected by filtration. As a result, 0.450 g (0.642 mmol, 83.1%) of [bis(4-methylphenyl)methylene ($\eta^5$-cyclopentadienyl) (5-3,6-dimethylfluorenyl)]hafnium dichloride was obtained. [bis(4-methylphenyl)methylene ($\eta^5$-cyclopentadienyl) ($\eta^5$-3,6-dimethylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 7.92 (t, J=0.8 Hz, 2H), 7.76 (dd, J=7.9, 2.3 Hz, 2H), 7.69 (dd, J=8.1, 2.1 Hz, 2H), 7.19 (dd, J=8.1, 1.8 Hz, 2H), 7.10 (dd, J=8.2, 2.0 Hz, 2H), 6.83 (dd, J=8.9, 1.6 Hz, 2H), 6.36 (d, J=8.9 Hz, 2H), 6.26 (t, J=2.6 Hz, 2H), 5.67 (t, J=2.8 Hz, 2H), 2.57 (s, 6H), 2.32 (s, 6H)

FD-MS spectrum: M/z 700 (M+)

Comparative Synthesis Example A5

Synthesis of [bis(4-methylphenyl)methylene($\eta^5$-cyclopentadienyl) ($\eta^5$-3,6-di-t-butylfluorenyl)]hafnium dichloride (i) Synthesis of bis(4-methylphenyl)(cyclopentadienyl)(3,6-di-t-butylfluorenyl)methane In nitrogen atmosphere, to a 200 ml three-neck flask, 2.50 g (8.98 mmol) of 3,6-di-t-butylfluorene, and 150 ml of dehydrated THF were added and stirred. With this solution cooled to −20° C., 5.9 ml (9.26 mmol) of a n-butyllithium/hexane solution (1.57 M) was gradually added. Thereafter, the mixture was stirred at room temperature for 14 hours. The resultant solution was cooled again to −20° C. Thereafter, a THF solution of 2.78 g (10.76 mmol) of 6,6-bis(4-methylphenyl)fulvene was dropwise added. Thereafter, the mixture was stirred at room temperature for 14 hours. Thereafter, the reaction solution was quenched with a saturated aqueous ammonium chloride solution, and extraction was performed with diethyl ether. The resultant organic layer was washed one time with a saturated aqueous sodium bicarbonate solution, one time with water, and one time with a saturated saline solution. The organic layer washed was dried with magnesium sulfate, and the solvent was distilled off. The resultant solid was washed with methanol. As a result, 3.45 g (72%) of bis(4-methylphenyl)(cyclopentadienyl)(3,6-di-t-butylfluorenyl)methane was obtained as a white solid. bis(4-methylphenyl)(cyclopentadienyl)(3,6-di-t-butylfluorenyl)methane was identified by $^1$H NMR spectrum. A measured value thereof is shown below.

H NMR spectrum (270 MHz, CDCl$_3$): δ/ppm 7.5-6.7 (m), 5.38 (s), 3.0-2.8 (br), 2.3 (br), 1.3 (s)

(ii) Synthesis of [bis(4-methylphenyl)methylene($\eta^5$-cyclopentadienyl) ($\eta^5$-3, 6-di-t-butylfluorenyl)]hafnium dichloride In nitrogen atmosphere, to a 50 ml Schlenk flask, 0.565 g (1.05 mmol) of bis(4-methylphenyl) (cyclopentadienyl) (3,6-di-t-butylfluorenyl)methane, 10 ml of dehydrated toluene, and 0.3 g of dehydrated THF were added. With the mixture cooled in a dry ice bath, 1.3 ml (2.11 mmol) of a n-butyllithium/hexane solution (1.66 M) was gradually added. The mixture was stirred at room temperature for 30 minutes, and thereafter, heated at 40° C., and stirred for 4 hours. After the reaction solution was returned to room temperature, the solvent was distilled off. To the resultant solid, 80 ml of dehydrated diethyl ether was added, followed by cooling to −20° C., and 0.318 g (1.0 mmol) of hafnium tetrachloride was added. While the temperature was gradually elevated to room temperature, the mixture was stirred for 16 hours. Thereafter, the solvent was distilled off, and the resultant solid was extracted with dehydrated diethyl ether and dehydrated dichloromethane, and thereafter the solvent was distilled off. The resultant solid was washed with a small amount of dehydrated diethyl ether. As a result, 0.32 g (38%) of [bis(4-methylphenyl)methylene($\eta^5$-cyclopentadienyl) ($\eta^5$-3, 6-di-t-butylfluorenyl)]hafnium dichloride was obtained as a yellow solid. [bis(4-methylphenyl)methylene ($\eta^5$-cyclopentadienyl) ($\eta^5$-3, 6-di-t-butylfluorenyl)]hafnium dichloride was identified by $^1$H NMR spectrum. A measured value thereof is shown below.

$^1$H NMR spectrum (270 MHz, CDCl$_3$): δ/ppm 8.05 (d, J=1.0 Hz, 2H), 7.76-7.70 (m, 4H), 7.19-7.10 (m, 4H), 7.07 (d, J=9.2 Hz, 2H), 6.39 (d, J=9.2 Hz, 2H), 6.25 (t, J=2.6 Hz, 2H), 5.67 (t, J=2.6 Hz, 2H), 2.32 (s, 6H), 1.40 (s, 18H)

Comparative Synthesis Example A6

Synthesis of [bis(4-methylphenyl)methylene($\eta^5$-cyclopentadienyl) ($\eta^5$-2,7-dim ethyl-3,6-di-t-butylfluorenyl)]hafnium dichloride (i) Synthesis of bis(4-methylphenyl) (cyclopentadienyl) (2,7-dimethyl-3,6-di-t-butylfluorenyl)methane In nitrogen atmosphere, to a 200 ml three-neck flask, 1.45 g (4.73 mmol) of 2,7-dimethyl-3,6-di-t-butylfluorene, and 100 ml of dehydrated THF were introduced. Thereto, in an ice water bath, 3.1 ml (5.14 mmol) of 1.66 M n-butyllithium hexane solution was slowly dropwise added. While gradually returned to room temperature, the mixture was stirred for 20 hours. After the mixture was cooled to −20° C., 1.5 g (5.8 mmol) of 6,6-bis(4-methylphenyl)fulvene was added. The mixture was stirred at room temperature for 2 hours. Thereafter, the reaction solution was quenched with an aqueous hydrochloric acid solution, and extraction was performed with diethyl ether. The resultant organic layer was washed one time with a saturated aqueous sodium bicarbonate solution, one time with water, and one time with a saturated saline solution. The organic layer washed was dried with magnesium sulfate, and the solvent was distilled off. The resultant solid was washed with methanol. As a result, 2.2 g (83%) of bis(4-methylphenyl) (cyclopentadienyl) (2,7-dimethyl-3,6-di-t-butylfluorenyl)methane was obtained as a white powder. bis(4-methylphenyl) (cyclopentadienyl) (2,7-dimethyl-3,6-di-t-butylfluorenyl)methane was identified by $^1$H NMR spectrum. A measured value thereof is shown below.

$^1$H NMR spectrum (270 MHz, CDCl$_3$): δ/ppm 7.43 (s), 7.12 (s), 6.68 (br s), 6.32 (br s), 5.22 (s), 3.73 (s), 2.97 (br s), 2.84 (br s), 2.32 (s), 1.38 (s)

(ii) Synthesis of [bis(4-methylphenyl)methylene($\eta^5$-cyclopentadienyl) ($\eta^5$-2,7-dim ethyl-3,6-di-t-butylfluorenyl)]hafnium dichloride In nitrogen atmosphere, to a 100 ml Schlenk flask, 1.0 g (1.77 mmol) of bis(4-methylphenyl) (cyclopentadienyl) (2,7-dimethyl-3,6-di-t-butylfluorenyl)methane, 20 ml of dehydrated toluene, and 0.5 g of dehydrated THF were added. With the mixture cooled in a dry ice bath, 2.1 ml (3.54 mmol) of a n-butyllithium/hexane solution (1.66 M) was gradually added. The mixture was stirred at room temperature for 30 minutes, and thereafter, heated at 40° C., and stirred for 4 hours. After the reaction solution was returned to room temperature, the solvent was distilled off. To the resultant solid, 30 ml of dehydrated diethyl ether was added, followed by cooling to −20° C., and 0.59 g (1.84 mmol) of hafnium tetrachloride was added. While the temperature was gradually elevated to room temperature, the mixture was stirred for 16 hours. Thereafter, the solution was subjected to filtration, concentration, solidification by drying, and thereafter extraction with dehydrated hexane. The extract was again concentrated, solidified by drying, and thereafter washed with a small amount of dehydrated hexane and dehydrated diethyl ether. As a result, 0.53 g (37%) of [bis(4-methylphenyl)methylene($\eta^5$-cyclopentadienyl) ($\eta^5$-2,7-dim ethyl-3,6-di-t-butylfluorenyl)]hafnium dichloride was obtained as a yellow solid. [bis(4-methylphenyl)methylene($\eta^5$-cyclopentadienyl) ($\eta^5$-2,7-dim ethyl-3,6-di-t-butylfluorenyl)]hafnium dichloride was identified by $^1$H NMR. A measured value thereof is shown below.

$^1$H NMR spectrum (270 MHz, CDCl$_3$): δ/ppm 8.04 (s, 2H), 7.78-7.66 (m, 4H), 7.20-7.07 (m, 4H), 6.24 (t, J=2.6 Hz, 2H), 6.09 (s, 2H), 5.61 (t, J=2.6 Hz, 2H), 2.33 (s, 6H), 2.28 (s, 6H), 1.49 (s, 18H)

Comparative Synthesis Example A7

Synthesis of [bis(4-methylphenyl)methylene($\eta^5$-cyclopentadienyl) ($\eta^5$-octamethyloctahydrodibenzofluorenyl)]hafnium dichloride (i) Synthesis of [bis(4-methylphenyl)methylene($\eta^5$-cyclopentadienyl) ($\eta^5$-octamethyloctahydrodibenzofluorenyl)]hafnium dichloride In nitrogen atmosphere, to a 200 ml Schlenk flask, 3.07 g (4.76 mmol) of bis(4-methylphenyl) (cyclopentadienyl) (octamethyloctahydrodibenzofluorenyl)methane, 80 ml of dehydrated toluene, and 0.80 ml (9.9 mmol) of dehydrated THF were sequentially added. With the mixture cooled in an ice bath, 6.00 ml (9.90 mmol) of a n-butyllithium/hexane solution (1.65 M) was gradually added. The mixture was stirred at 45° C. for 5 hours. The solvent was distilled off under reduced pressure, and 100 ml of dehydrated diethyl ether was added to provide a solution again. With the solution cooled in a methanol/dry ice bath, 1.43 g (4.46 mmol) of hafnium tetrachloride was added. While the temperature was gradually elevated to room temperature, the mixture was stirred for 15 hours. As a result, an orange slurry was obtained. The solvent was distilled off under reduced pressure. The resultant solid was transferred into a glove box, washed with hexane, and thereafter extracted with dichloromethane. The solvent was distilled off under reduced pressure. The resultant was allowed to dissolve in a small amount of dichloromethane again. Hexane was added, and thereafter the solvent was distilled off little by little under reduced pressure. As a result, an orange solid was precipitated out, and collected. The solid was washed with hexane, and dried under reduced pressure. As a result, 3.14 g (3.51 mmol, 78.7%) of [bis(4-methylphenyl)methylene ($\eta^5$-cyclopentadienyl) ($\eta^5$-octamethyloctahydrodibenzofluorenyl)]hafnium dichloride was obtained as an orange solid. [bis(4-methylphenyl)methylene($\eta^5$-cyclopentadienyl) ($\eta^5$-octamethyloctahydrodibenzofluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 8.02 (s, 2H), 7.82-7.69 (m, 4H), 7.25-7.10 (m, 4H), 6.22 (s, 2H), 6.19 (t, J=2.6 Hz, 1H), 5.50 (t, J=2.6 Hz, 1H), 2.32 (s, 6H), 1.7-1.5 (br m, 8H), 1.46 (s, 6H), 1.39 (s, 6H), 0.94 (s, 6H), 0.83 (s, 6H) FD-MS spectrum: M/z 892 (M$^+$)

Comparative Synthesis Example A8

Synthesis of [bis(4-methoxyphenyl)methylene($\eta^5$-cyclopentadienyl) ($\eta^5$-3,6-di-t-butylfluorenyl)]hafnium dichloride (i) Synthesis of bis(4-methoxyphenyl) (cyclopentadienyl) (3,6-di-t-butylfluorenyl) methane In nitrogen atmosphere, to a 200 ml three-neck flask, 1.06 g (3.80 mmol) of 3,6-di-t-butylfluorene, and 80 ml of dehydrated t-butylmethyl ether were added. With the mixture cooled in an ice bath, 2.50 ml (4.08 mmol) of a n-butyllithium/hexane solution (1.63 M) was gradually added. Thereafter, the mixture was stirred at room temperature for 4 hours. 1.01 g (3.46 mmol) of 6,6-bis(4-methoxyphenyl)fulvene was added. The mixture was subjected to heat refluxing for 40 hours. With the mixture cooled in an ice bath, 50 ml of water was gradually added. The resultant two-layer solution was transferred to a 500 ml separating funnel, to which 50 ml of diethyl ether was added. The mixture was shaken several times to remove the aqueous layer. The organic layer was washed three times with 100 ml of water, and one time with 100 ml of a saturated saline solution. The organic layer washed was dried with anhydrous magnesium sulfate for 30 minutes. Thereafter, the solvent was distilled off under reduced pressure. As a result, an orange solid was obtained. The solid was washed with diethyl ether, and extracted with dichloromethane. The solvent was distilled off under reduced pressure. The resultant solid was allowed to dissolve in a small amount of dichloromethane. This solution was allowed to flow through a small amount of silica gel. The solvent was distilled off under reduced pressure. As a result, 698 mg (1.23 mmol, 35.4%) of bis(4-methoxyphenyl) (cyclopentadienyl) (3,6-dit-butylfluorenyl)methane was obtained as a pale yellow solid. bis(4-methoxyphenyl) (cyclopentadienyl) (3,6-di-t-butylfluorenyl)methane was identified by FD-MS spectrum. A measured value thereof is shown below.

FD-MS spectrum: M/z 568 (M$^+$)

(ii) Synthesis of [bis(4-methoxyphenyl)methylene ($\eta^5$-cyclopentadienyl) ($\eta^5$-3, 6-di-t-butylfluorenyl)] hafnium dichloride In nitrogen atmosphere, to a 100 ml Schlenk flask, 651 mg (1.14 mmol) of bis(4-methoxyphenyl)(cyclopentadienyl)(3,6-di-t-butylfluorenyl)methane, and 40 ml of dehydrated diethyl ether were sequentially added. With the mixture cooled in an ice bath, 1.50 ml (2.45 mmol) of a n-butyl-lithium/hexane solution (1.63 M) was gradually added. The mixture was stirred at room temperature for 24 hours. With the mixture cooled in a methanol/dry ice bath, 334 mg (1.04 mmol) of hafnium tetrachloride was added. While the temperature was gradually elevated to room temperature, the mixture was stirred for 16 hours. The solvent was distilled off under reduced pressure. The resultant solid was transferred into a glove box, washed with hexane, and thereafter extracted with dichloromethane. The solvent was distilled off under reduced pressure. As a result, 740 mg (907 µmol, 86.9%) of [bis(4-methoxyphenyl)methylene($\eta^5$-cyclopentadienyl) ($\eta^5$-3, 6-di-t-butylfluorenyl)]hafnium dichloride was obtained as a yellow solid. [bis(4-methoxyphenyl)methylene($\eta^5$-cyclopentadienyl) ($\eta^5$-3,6-di-t-butylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 8.06 (d, J=1.3 Hz, 2H), 7.80-7.69 (m, 4H), 7.10-7.06 (m, 2H), 6.93-6.86 (m, 4H), 6.41 (d, J=9.2 Hz, 2H), 6.26 (t, J=2.6 Hz, 2H), 5.67 (t, J=2.6 Hz, 2H), 3.80 (s, 6H), 1.41 (s, 18H)
FD-MS spectrum: M/z 816 (M$^+$)

Comparative Synthesis Example A9

Synthesis of [bis(4-methoxyphenyl)methylene($\eta^5$-cyclopentadienyl) ($\eta^5$-2,7-di methyl-3,6-di-t-butylfluorenyl)]hafnium dichloride (i) Synthesis of bis(4-methoxyphenyl) (cyclopentadienyl) (2,7-dimethyl-3,6-di-t-butylfluorenyl) methane In nitrogen atmosphere, to a 100 ml three-neck flask, 1.2 g (3.92 mmol) of 2,7-dimethyl-3,6-di-t-butylfluorene, and 40 ml of dehydrated cyclopentylmethyl ether were introduced. Thereto, in an ice water bath, 2.5 ml (4.11 mmol) of a 1.66 Mn-butyllithium hexane solution was slowly dropwise added. While gradually returned to room temperature, the mixture was stirred for 20 hours. Thereto, in an ice water bath, 1.25 g (4.31 mmol) of 6,6-bis(4-methoxyphenyl)fulvene was added. The mixture was stirred at room temperature for 4 hours. Thereafter, the reaction solution was quenched with an aqueous hydrochloric acid solution, and extraction was performed with diethyl ether. The resultant organic layer was washed one time with a saturated aqueous sodium bicarbonate solution, one time with water, and one time with a saturated saline solution. The organic layer washed was dried with magnesium sulfate, and the solvent was distilled off. The resultant solid was washed with hexane. As a result, 1.7 g (74%) of bis(4-methoxyphenyl) (cyclopentadienyl) (2,7-dimethyl-3,6-di-t-butylfluorenyl) methane was obtained as a white powder. bis(4-methoxyphenyl) (cyclopentadienyl) (2,7-dimethyl-3,6-di-t-butylfluorenyl)methane was identified by $^1$H NMR spectrum. A measured value thereof is shown below.

$^1$H NMR spectrum (270 MHz, CDCl$_3$): δ/ppm 7.43 (s), 7.12 (s), 6.68 (br s), 6.32 (br s), 5.22 (s), 3.73 (s), 2.97 (br s), 2.84 (br s), 2.32 (s), 1.38 (s)

(ii) Synthesis of [bis(4-methoxyphenyl)methylene ($\eta^5$-cyclopentadienyl) ($\eta^5$-2,7-di methyl-3,6-di-t-butylfluorenyl)]hafnium dichloride In nitrogen atmosphere, to a 100 ml Schlenk flask, 0.8 g (1.22 mmol) of bis(4-methoxyphenyl) (cyclopentadienyl) (2,7-dimethyl-3,6-di-t-butylfluorenyl)methane, 20 ml of dehydrated toluene, and 0.5 g of dehydrated THF were added. With the mixture cooled in a dry ice bath, 1.7 ml (2.75 mmol) of a n-butyllithium/hexane solution (1.66 M) was gradually added. The mixture was stirred at room temperature for 30 minutes, and thereafter, heated at 40° C., and stirred for 4 hours. After the reaction solution was returned to room temperature, the solvent was distilled off. To the resultant solid, 30 ml of dehydrated diethyl ether was added, followed by cooling to −20° C., and 0.41 g (1.28 mmol) of hafnium tetrachloride was added. While the temperature was gradually elevated to room temperature, the mixture was stirred for 16 hours. Thereafter, the solvent was distilled off. The resultant solid was washed with dehydrated hexane, and thereafter was extracted with dehydrated diethyl ether and dehydrated dichloromethane. The dichloromethane solution was concentrated again, and washed with dehydrated diethyl ether. As a result, 0.70 g (79.1%) of [bis(4-methoxyphenyl)methylene($\eta^5$-cyclopentadienyl) ($\eta^5$-2,7-dimethyl-3,6-di-t-butylfluorenyl)]hafnium dichloride was obtained as a yellow solid. [bis(4-methoxyphenyl)methylene($\eta^5$-cyclopentadienyl) ($\eta^5$-2,7-di methyl-3,6-di-t-butylfluorenyl)]hafnium dichloride was identified by $^1$H NMR spectrum. A measured value thereof is shown below.

$^1$H NMR spectrum (270 MHz, CDCl$_3$): δ/ppm 8.05 (s, 2H), 7.80-7.66 (m, 4H), 6.96-6.84 (m, 4H), 6.25 (t, J=2.8 Hz, 2H), 6.12 (s, 2H), 5.61 (t, J=2.8 Hz, 2H), 3.80 (s, 6H), 2.29 (s, 6H), 1.49 (s, 18H)

Comparative Synthesis Example A10

Synthesis of [bis(4-methoxyphenyl)methylene($\eta^5$-cyclopentadienyl) ($\eta^5$-octamethyloctahydrodibenzofluorenyl)]hafnium dichloride (i) Synthesis of bis(4-methoxyphenyl)(cyclopentadienyl)(octamethyloctahydrodibenzofluorenyl)methane In nitrogen atmosphere, to a 200 ml three-neck flask, 1.33 g (3.45 mmol) of octamethyloctahydrodibenzofluorene, and 100 ml of dehydrated t-butylmethyl ether were added. With the mixture cooled in an ice bath, 2.30 ml (3.75 mmol) of a n-butyllithium/hexane solution (1.63 M) was gradually added. The mixture was stirred at room temperature for 4 hours. 0.909 g (3.13 mmol) of 6,6-bis(4-methoxyphenyl) fulvene was added. The mixture was subjected to heat refluxing for 40 hours. With the mixture cooled in an ice bath, 50 ml of water and 50 ml of diethyl ether were gradually added. The resultant solution was transferred to a 500 ml separating funnel. The mixture was shaken several times to separate off the aqueous layer. The organic layer was washed three times with 100 ml of water, and one time with 100 ml of a saturated saline solution. The organic layer washed was dried with anhydrous magnesium sulfate for 30 minutes. Thereafter, the solvent was distilled off under reduced pressure, which was followed by separation with silica gel chromatograph (150 g, hexane:ethyl acetate=19:1). As a result, a colorless solution was obtained. The solvent was distilled off under reduced pressure. As a result, 2.06 g (3.04 mmol, 97.3%) of bis(4-methoxyphenyl)(cyclopentadienyl)(octamethyloctahydrodibenzofluorenyl)methane was obtained as a pale yellow solid. bis(4-methoxyphenyl)(cyclopentadienyl)(octamethyloctahydrodibenzofluorenyl) methane was identified by FD-MS spectrum. A measured value thereof is shown below.

FD-MS spectrum: M/z 676 (M$^+$)

(ii) Synthesis of [bis(4-methoxyphenyl)methylene ($\eta^5$-cyclopentadienyl) ($\eta^5$-octamethyloctahydrodibenzofluorenyl)]hafnium dichloride In nitrogen atmosphere, to a 100 ml Schlenk flask, 1.06 g (1.57 mmol) of bis(4-methoxyphenyl)(cyclopentadienyl)(octamethyloctahydrodibenzofluorenyl)methane, 40 ml of dehydrated toluene, and 270-1 (3.33 mmol) of dehydrated THF were sequentially added. With the mixture cooled in an ice bath, 2.00 ml (3.28 mmol) of a n-butyllithium/hexane solution (1.64 M) was gradually added. The mixture was stirred at 45° C. for 5 hours. As a result, a red solution was obtained. The solvent was distilled off under reduced pressure, and 40 ml of dehydrated diethyl ether was added to provide a red solution again. With the solution cooled in a methanol/dry ice bath, 718 mg (1.53 mmol) of hafnium tetrachloride.bis(diethyl ether) complex was added. While the temperature was gradually elevated to room temperature, the mixture was stirred for 17 hours. As a result, an orange slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in toluene, hexane was added, and the solvent was distilled off little by little under reduced pressure. As a result, an orange solid was precipitated out. This solid was collected by filtration, washed with hexane, and dried under reduced pressure. As a result, 984 mg (1.06 mmol, 69.4%) of [bis(4-methoxyphenyl)methylene($\eta^5$-cyclopentadienyl) ($\eta^5$-octamethyloctahydrodibenzofluorenyl)]hafnium dichloride was obtained as an orange solid. [bis(4-methoxyphenyl)methylene($\eta^5$-cyclopentadienyl) ($\eta^5$-octamethyloctahydrodibenzofluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 8.02 (s, 2H), 7.83-7.69 (m, 4H), 6.98-6.85 (m, 4H), 6.27 (s, 2H), 6.20 (t, J=2.6 Hz, 1H), 5.50 (t, J=2.6 Hz, 1H), 3.79 (s, 6H), 1.7-1.5 (br m, 8H), 1.46 (s, 6H), 1.40 (s, 6H), 0.98 (s, 6H), 0.86 (s, 6H) FD-MS spectrum: M/z 924 (M$^+$)

Comparative Synthesis Example A11

Synthesis of [bis[4-(dimethylamino)phenyl]methylene($\eta^5$-cyclopentadienyl) ($\eta^5$-3,6-di-t-butylfluorenyl)]hafnium dichloride (i) Synthesis of bis[4-(dimethylamino)phenyl](cyclopentadienyl) (3,6-di-t-butyl fluorenyl)methane In nitrogen atmosphere, to a 100 ml three-neck flask, 867 mg (3.12 mmol) of 3,6-di-t-butylfluorene, and 50 ml of dehydrated t-butylmethyl ether were added. With the mixture cooled in an ice bath, 2.10 ml (3.34 mmol) of a n-butyllithium/hexane solution (1.59 M) was gradually added. Thereafter, the mixture was stirred at room temperature for 19 hours. 988 mg (3.12 mmol) of 6,6-bis[4-(dimethylamino)phenyl]fulvene was added. The mixture was subjected to heat refluxing for 2 days. With the mixture cooled in an ice bath, 50 ml of water was gradually added. The resultant two-layer solution was transferred to a 300 ml separating funnel, to which 100 ml of diethyl ether was added. The mixture was shaken several times to remove the aqueous layer. The organic layer was washed three times with 50 ml of water, and one time with 50 ml of a saturated saline solution. The organic layer washed was dried with anhydrous magnesium sulfate for 30 minutes. Thereafter, the solvent was distilled off under reduced pressure. As a result, a brown solid was obtained, which was then recrystallized from hexane. As a result, 1.07 g (1.81 mmol, 58.0%) of bis[4-(dimethylamino)phenyl](cyclopentadienyl)(3,6-di-t-butyl fluorenyl)methane was obtained as a white solid. bis[4-(dimethylamino)phenyl](cyclopentadienyl)(3,6-di-t-butyl fluorenyl)methane was identified by FD-MS spectrum. A measured value thereof is shown below.

FD-MS spectrum: M/z 594 (M$^+$)

(ii) Synthesis of [bis[4-(dimethylamino)phenyl] methylene($\eta^5$-cyclopentadienyl) ($\eta^5$-3,6-di-t-butylfluorenyl)]hafnium dichloride In nitrogen atmosphere, to a 100 ml Schlenk flask, 501 mg (841 µmol) of bis[4-(dimethylamino)phenyl](cyclopentadienyl)(3,6-di-t-butyl fluorenyl)methane, 30 ml of dehydrated toluene, and 0.14 ml (1.7 mmol) of dehydrated THF were sequentially added. With the mixture cooled in an ice bath, 1.10 ml (1.75 mmol) of a n-butyllithium/hexane solution (1.59 M) was gradually added. The mixture was stirred at 45° C. for 5 hours. As a result, a red solution was obtained. The solvent was distilled off under reduced pressure, and 30 ml of dehydrated diethyl ether was added to provide a red solution again. With the solution cooled in a methanol/dry ice bath, 235 mg (735 µmol) of hafnium tetrachloride was added. While the temperature was gradually elevated to room temperature, the mixture was stirred for 16 hours. The solvent was distilled off under reduced pressure. The resultant solid was transferred into a glove box, washed with hexane, and thereafter extracted with dichloromethane. The solvent was distilled off under reduced pressure, and the resultant was concentrated. A small amount of hexane was added, and thereafter recrystallization was performed at −20° C. A solid precipitated was washed with a small amount of hexane, and dried under reduced pressure. As a result, 459 mg (545 µmol, 74.2%) of [bis[4-(dimethylamino)phenyl]methylene($\eta^5$-cyclopentadienyl) ($\eta^5$-3,6-di-t-butylfluorenyl)]hafnium dichloride was obtained as a yellow solid. [bis[4-(dimethylamino)phenyl]methylene($\eta^5$-cyclopentadienyl) ($\eta^5$-3, 6-di-t-butylfluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 8.04 (d, J=1.3 Hz, 2H), 7.70-7.60 (m, 4H), 7.08-7.04 (m, 2H), 6.72-6.69 (m, 4H), 6.52-6.48 (m, 2H), 6.24 (t, J=2.6 Hz, 2H), 5.68 (t, J=2.6 Hz, 2H), 2.93 (s, 12H), 1.40 (s, 18H)

FD-MS spectrum: M/z 842 (M$^+$)

Comparative Synthesis Example A12

Synthesis of [bis[4-(dimethylamino)phenyl]methylene($\eta^5$-cyclopentadienyl) ($\eta^5$-octamethyloctahydrodibenzofluorenyl)]hafnium dichloride (i) Synthesis of bis[4-(dimethylamino)phenyl](cyclopentadienyl) (octamethyloctahydrodibenzofluorenyl)methane In nitrogen atmosphere, to a 500 ml three-neck flask, 3.69 g (9.53 mmol) of octamethyloctahydrodibenzofluorene, and 250 ml of dehydrated cyclopentylmethyl ether were added. With the mixture cooled in an ice bath, 6.10 ml (10.1 mmol) of a n-butyllithium/hexane solution (1.65 M) was gradually added. Thereafter, the mixture was stirred at room temperature for 24 hours. 3.00 g (9.48 mmol) of 6,6-bis[4-(dimethylamino)phenyl]fulvene was added. The mixture was subjected to heat refluxing for 6 days. With the mixture cooled in an ice bath, 200 ml of water was gradually added. The resultant two-layer solution was transferred to a 1 L separating funnel, to which 200 ml of diethyl ether was added. The mixture was shaken several times to remove the aqueous layer. The organic layer was washed three times with 200 ml of water, and one time with 200 ml of a saturated saline solution. The organic layer washed was dried with anhydrous magnesium sulfate for 30 minutes. Thereafter, the solvent was distilled off under reduced pressure. As a result, an orange-brown solid was obtained, which was then recrystallized from acetone. As a result, 4.63 g (6.58 mmol, 69.4%) of bis[4-(dimethylamino)phenyl](cyclopentadienyl) (octamethyloctahydrodibenzofluorenyl)methane was obtained as a pale yellow solid. bis[4-(dimethylamino)phenyl](cyclopentadienyl) (octamethyloctahydrodibenzofluorenyl)methane was identified by FD-MS spectrum. A measured value thereof is shown below.

FD-MS spectrum: M/z 702 (M+)

(ii) Synthesis of [bis[4-(dimethylamino)phenyl] methylene($\eta^5$-cyclopentadienyl) ($\eta^5$-octamethyloctahydrodibenzofluorenyl)]hafnium dichloride In nitrogen atmosphere, to a 200 ml Schlenk flask, 3.08 g (4.39 mmol) of bis[4-(dimethylamino)phenyl](cyclopentadienyl) (octamethyloctahydrodibenzofluorenyl)methane, 80 ml of dehydrated toluene, and 0.74 ml (9.1 mmol) of dehydrated THF were sequentially added. With the mixture cooled in an ice bath, 5.50 ml (9.08 mmol) of a n-butyllithium/hexane solution (1.65 M) was gradually added. The mixture was stirred at 45° C. for 5 hours. As a result, a red solution was obtained. The solvent was distilled off under reduced pressure, and 80 ml of dehydrated diethyl ether was added to provide a red solution again. With the solution cooled in a methanol/dry ice bath, 1.37 g (4.27 mmol) of hafnium tetrachloride was added. While the temperature was gradually elevated to room temperature, the mixture was stirred for 16 hours. As a result, an orange slurry was obtained. The solvent was distilled off under reduced pressure. The resultant solid was transferred into a glove box, washed with hexane, and thereafter extracted with dichloromethane. The solvent was distilled off under reduced pressure, and a small amount of toluene was added to provide a slurry. Hexane was added, and the solvent was distilled off little by little under reduced pressure. As a result, an orange solid was collected. This solid was washed with hexane, and dried under reduced pressure. As a result, 2.49 g (2.62 mmol, 61.4%) of [bis[4-(dimethylamino)phenyl] methylene($\eta^5$-cyclopentadienyl) ($\eta^5$-octamethyloctahydrodibenzofluorenyl)]hafnium dichloride was obtained as an orange solid. [bis[4-(dimethylamino)phenyl]methylene($\eta^5$-cyclopentadienyl) ($\eta^5$-octamethyloctahydrodibenzofluorenyl)]hafnium dichloride was identified by $^1$H NMR spectrum and FD-MS spectrum. A measured value thereof is shown below.

$^1$H NMR spectrum (270 MHz, CDCl$_3$): δ/ppm 8.00 (s, 2H), 7.74-7.61 (m, 4H), 6.80-6.69 (m, 4H), 6.35 (s, 2H), 6.18 (t, J=2.6 Hz, 2H), 5.52 (t, J=2.6 Hz, 2H), 2.90 (s, 12H), 1.7-1.5 (br m, 8H), 1.46 (s, 6H), 1.39 (s, 6H), 0.99 (s, 6H), 0.86 (s, 6H) FD-MS spectrum: M/z 950 (M+)

Example A1

Ethylene/propylene/ENB copolymerization using [bis(4-methylphenyl)methylene($\eta^5$-cyclopentadienyl) ($\eta^5$-2,3,6,7-tetramethyl-fluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl) ($\eta^5$-2,3,6,7-tetramethyl-fluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 4.77 g of an ethylene/propylene/ENB copolymer was obtained in which the ethylene content was 71.1 mol %, the propylene content was 26.3 mol %, the ENB content was 2.6 mol %, Mw=1,860,000, Mn=578,000, and Mw/Mn=3.22.

Example A2

Ethylene/propylene/ENB copolymerization using [bis(4-methoxyphenyl)methylene($\eta^5$-cyclopentadienyl) ($\eta^5$-2,3,6,7-tetramethyl-fluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methoxyphenyl)methylene($\eta^5$-cyclopentadienyl) ($\eta^5$-2,3,6,7-tetramethyl-fluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 5.22 g of an ethylene/propylene/ENB copolymer was obtained in which the ethylene content was 72.4 mol %, the propylene content was 24.9 mol %, the ENB content was 2.7 mol %, Mw=1,820,000, Mn=599,000, and Mw/Mn=3.04.

Comparative Example A1

Ethylene/propylene/ENB copolymerization using [bis(4-methylphenyl)methylene($\eta^5$-cyclopentadienyl) ($\eta^5$-fluoren yl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl) ($\eta^5$-fluoren yl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 1.57 g of an ethylene/propylene/ENB copolymer was obtained in which the ethylene content was 66.1 mol %, the propylene content was 31.4 mol %, the ENB content was 2.4 mol %, Mw=1,130,000, Mn=404,000, and Mw/Mn=2.80.

Comparative Example A2

Ethylene/propylene/ENB copolymerization using [bis(4-methylphenyl)methylene($\eta^5$-cyclopentadienyl) ($\eta^5$-2,7-dimethylfluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl) ($\eta^5$-2,7-dimethylfluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1 [vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 2.60 g of an ethylene/propylene/ENB copolymer was obtained in which the ethylene content was 69.1 mol %, the propylene content was 28.4 mol %, the ENB content was 2.5 mol %, Mw=1,600,000, Mn=549,000, and Mw/Mn=2.91.

Comparative Example A3

Ethylene/propylene/ENB copolymerization using [bis(4-methylphenyl)methylene($\eta^5$-cyclopentadienyl)($\eta^5$-2,7-di-t-butylfluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0010 M [bis(4-methylphenyl)methylene($\eta^5$-cyclopentadienyl)($\eta^5$-2,7-di-t-butylfluorenyl)]hafnium dichloride was injected. Subsequently, 0.25 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 2.15 g of an ethylene/propylene/ENB copolymer was obtained in which the ethylene content was 67.2 mol %, the propylene content was 30.8 mol %, the ENB content was 2.0 mol %, Mw=977,000, Mn=389,000, and Mw/Mn=2.51.

Comparative Example A4

Ethylene/propylene/ENB copolymerization using [bis(4-methylphenyl)methylene($\eta^5$-cyclopentadienyl) ($\eta^5$-3,6-dimethylfluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl) ($\eta^5$-3,6-dimethylfluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 1.58 g of an ethylene/propylene/ENB copolymer was obtained in which the ethylene content was 67.8 mol %, the propylene content was 29.3 mol %, the ENB content was 2.9 mol %, Mw=1,280,000, Mn=485,000, and Mw/Mn=2.64.

Comparative Example A5

Ethylene/propylene/ENB copolymerization using [bis(4-methylphenyl)methylene($\eta^5$-cyclopentadienyl) ($\eta^5$-3,6-di-t-butylfluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl) ($\eta^5$-3,6-di-t-butylfluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 1.90 g of an ethylene/propylene/ENB copolymer was obtained in which the ethylene content was 68.6 mol %, the propylene content was 29.2 mol %, the ENB content was 2.2 mol %, Mw=1,600,000, Mn=481,000, and Mw/Mn=3.33.

Comparative Example A6

Ethylene/propylene/ENB copolymerization using [bis(4-methylphenyl)methylene($\eta^5$-cyclopentadienyl) ($\eta^5$-2,7-dim ethyl-3,6-di-t-butylfluorenyl)] hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl)($\eta^5$-2,7-dim ethyl-3,6-di-t-butylfluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1 [vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 3.65 g of an ethylene/propylene/ENB copolymer was obtained in which the ethylene content was 70.6 mol %, the propylene content was 27.1 mol %, the ENB content was 2.3 mol %, Mw=2,170,000, Mn=683,000, and Mw/Mn=3.18.

Comparative Example A7

Ethylene/propylene/ENB copolymerization using [bis(4-methylphenyl)methylene($\eta^5$-cyclopentadienyl) ($\eta^5$-octamethyloctahydrodibenzofluorenyl)] hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methylphenyl)methylene($\eta^5$-cyclopentadienyl) ($\eta^5$-octamethyloctahydrodibenzofluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 0.89 g of an ethylene/propylene/ENB copolymer was obtained in which the ethylene content was 65.0 mol %, the propylene content was 33.1 mol %, the ENB content was 1.9 mol %, Mw=1,600,000, Mn=501,000, and Mw/Mn=3.19.

Comparative Example A8

Ethylene/propylene/ENB copolymerization using [bis(4-methoxyphenyl)methylene($\eta^5$-cyclopentadienyl) ($\eta^5$-2,7-dimethyl-3,6-di-t-butylfluorenyl)]hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0010 M [bis(4-methoxyphenyl)methylene($\eta^5$-cyclopentadienyl) ($\eta^5$-2,7-di methyl-3,6-di-t-butylfluorenyl)]hafnium dichloride was injected. Subsequently, 0.25 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 2.59 g of an ethylene/propylene/ENB copolymer was obtained in which the ethylene content was 71.7 mol %, the propylene content was 25.9 mol %, the ENB content was 2.3 mol %, Mw=2,080,000, Mn=641,000, and Mw/Mn=3.24.

Comparative Example A9

Ethylene/propylene/ENB copolymerization using [bis(4-methoxyphenyl)methylene($\eta^5$-cyclopentadienyl) ($\eta^5$-octamethyloctahydrodibenzofluorenyl)] hafnium dichloride To a stainless (SUS) autoclave with an inner volume of 1 L sufficiently nitrogen-purged, 470 ml of n-heptane from which impurities had been removed with activated alumina and 4.0 ml of ENB were introduced at 25° C. By feeding ethylene at a rate of 100 l/h, the liquid phase and the gas phase were saturated for 10 minutes. The autoclave was sealed, and kept at 80° C. Propylene at a partial pressure of 0.20 MPa was introduced. Thereafter, the pressure was increased to 0.80 MPa-G with ethylene. First, 0.1 ml of a toluene solution of 1 M triisobutylaluminum was injected. Subsequently, 0.1 ml of a toluene solution of 0.0015 M [bis(4-methoxyphenyl)methylene($\eta^5$-cyclopentadienyl) ($\eta^5$-octamethyloctahydrodibenzofluorenyl)]hafnium dichloride was injected. Subsequently, 0.375 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 80° C., and the pressure was kept with ethylene pressurization at 0.80 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 1.30 g of an ethylene/propylene/ENB copolymer was obtained in which the ethylene content was 69.1 mol %, the propylene content was 28.9 mol %, the ENB content was 2.9 mol %, Mw=2,550,000, Mn=709,000, and Mw/Mn=3.60.

Example A3

Ethylene/propylene/ENB copolymerization using [bis(4-methylphenyl)methylene($\eta^5$-cyclopentadienyl) ($\eta^5$-2,3,6,7-tetramethyl-fluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.3 ml of a toluene solution of 0.001 M [bis(4-methylphenyl)methylene($\eta^5$-cyclopentadienyl) ($\eta^5$-2,3,6,7-tetramethyl-fluorenyl)]hafnium dichloride was injected. Subsequently, 0.3 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 6.03 g of an ethylene/propylene/ENB copolymer was obtained in which the ethylene content was 73.3 mol %, the propylene content was 23.6 mol %, the ENB content was 3.2 mol %, and [q]=4.40 dl/g.

Example A4

Ethylene/propylene/ENB copolymerization using [bis(4-methoxyphenyl)methylene($\eta^5$-cyclopentadienyl)($\eta^5$-2,3,6,7-tetramethyl-fluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.2 ml of a toluene solution of 0.001 M [bis(4-methoxyphenyl)methylene(q-cyclopentadienyl) ($\eta^5$-2,3,6,7-tetramethyl-fluorenyl)]hafnium dichloride was injected. Subsequently, 0.2 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 4.31 g of an ethylene/propylene/ENB copolymer was obtained in which the ethylene content was 73.6 mol %, the propylene content was 23.3 mol %, the ENB content was 3.1 mol %, and [r]=4.78 dl/g.

Example A5

Ethylene/propylene/ENB copolymerization using [bis[4-(dimethylamino)phenyl]methylene($\eta^5$-cyclopentadienyl) ($\eta^5$-2,3,6,7-tetramethylfluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.2 ml of a toluene solution of 0.001 M [bis[4-(dimethylamino)phenyl]methylene($\eta^5$-cyclopentadienyl) ($\eta^5$-2,3,6,7-tetramethylfluorenyl)]hafnium dichloride was injected. Subsequently, 0.2 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 8.67 g of an ethylene/propylene/ENB copolymer was obtained in which the ethylene content was 74.5 mol %, the propylene content was 22.5 mol %, the ENB content was 3.0 mol %, and [n]=4.82 dl/g.

Example A6

Ethylene/propylene/ENB copolymerization using [bis(3,4-dimethoxyphenyl)methylene($\eta^5$-cyclopentadienyl) ($\eta^5$-2,3,6,7-tetramethylfluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.2 ml of a toluene solution of 0.001

M [bis(3,4-dimethoxyphenyl)methylene($\eta^5$-cyclopentadienyl) ($\eta^5$-2,3,6,7-tetramethylfluorenyl)]hafnium dichloride was injected. Subsequently, 0.2 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 2.76 g of an ethylene/propylene/ENB copolymer was obtained in which the ethylene content was 72.3 mol %, the propylene content was 24.0 mol %, the ENB content was 3.7 mol %, and [n]=5.03 dl/g.

Example A7

Ethylene/propylene/ENB copolymerization using [bis(4-N-morpholinylphenyl)methylene($\eta^5$-cyclopentadienyl) ($\eta^5$-2,3,6,7-tetramethylfluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.4 ml of a toluene solution of 0.001 M [bis(4-N-morpholinylphenyl)methylene($\eta^5$-cyclopentadienyl) ($\eta^5$-2,3,6,7-tetramethylfluorenyl)]hafnium dichloride was injected. Subsequently, 0.4 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 13.64 g of an ethylene/propylene/ENB copolymer was obtained in which the ethylene content was 78.2 mol %, the propylene content was 18.2 mol %, the ENB content was 3.6 mol %, and [n]=6.21 dl/g.

Comparative Example A10

Ethylene/propylene/ENB copolymerization using [bis(4-methylphenyl)methylene($\eta^5$-cyclopentadienyl)($\eta^5$-2,7-dimethylfluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.4 ml of a toluene solution of 0.001 M [bis(4-methylphenyl)methylene($\eta^5$-cyclopentadienyl) ($\eta^5$-2,7-dimethylfluorenyl)]hafnium dichloride was injected. Subsequently, 0.4 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 5.56 g of an ethylene/propylene/ENB copolymer was obtained in which the ethylene content was 70.6 mol %, the propylene content was 26.5 mol %, the ENB content was 2.9 mol %, and [n]=3.84 dl/g.

Comparative Example A11

Ethylene/propylene/ENB copolymerization using [bis(4-methoxyphenyl)methylene($\eta^5$-cyclopentadienyl) ($\eta^5$-3,6-di-t-butylfluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.25 ml of a toluene solution of 0.001 M [bis(4-methoxyphenyl)methylene($\eta^5$-cyclopentadienyl) ($\eta^5$-3,6-di-t-butylfluorenyl)]hafnium dichloride was injected. Subsequently, 0.25 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1 [vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 1.47 g of an ethylene/propylene/ENB copolymer was obtained in which the ethylene content was 70.2 mol %, the propylene content was 27.1 mol %, the ENB content was 2.6 mol %, and [r]=4.14 dl/g.

Comparative Example A12

Ethylene/propylene/ENB copolymerization using [bis(4-methoxyphenyl)methylene($\eta^5$-cyclopentadienyl) ($\eta^5$-2,7-di methyl-3,6-di-t-butylfluorenyl)] hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.3 ml of a toluene solution of 0.001 M [bis(4-methoxyphenyl)methylene($\eta^5$-cyclopentadienyl) ($\eta^5$-2,7-di methyl-3,6-di-t-butylfluorenyl)]hafnium dichloride was injected. Subsequently, 0.3 ml of a toluene solution of 0.004 M triphenylcarbeniumtetrakis(pentafluorophenyl) borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 1.95 g of an ethylene/propylene/ENB copolymer was obtained in which the ethylene content was 72.6 mol %, the propylene content was 24.6 mol %, the ENB content was 2.8 mol %, and [n]=5.22 dl/g.

Comparative Example A13

Ethylene/propylene/ENB copolymerization using [bis(4-methoxyphenyl)methylene($\eta^5$-cyclopentadienyl) ($\eta^5$-octamethyloctahydrodibenzofluorenyl)] hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.6 ml of a toluene solution of 0.001 M [bis(4-methoxyphenyl)methylene($\eta^5$-cyclopentadienyl) ($\eta^5$-octamethyloctahydrodibenzofluorenyl)]hafnium dichloride was injected. Subsequently, 0.6 ml of a toluene solution of 0.004 M triphenylcarbeniumtetrakis(pentafluorophenyl) borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 3.84 g of an ethylene/propylene/ENB copolymer was obtained in which the ethylene content was 66.1 mol %, the propylene content was 31.7 mol %, the ENB content was 2.2 mol %, and [r]=3.63 dl/g.

Comparative Example A14

Ethylene/propylene/ENB copolymerization using [bis[4-(dimethylamino)phenyl]methylene($\eta^5$-cyclopentadienyl) ($\eta^5$-3,6-di-t-butylfluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 0.6 ml of a toluene solution of 0.001 M [bis[4-(dimethylamino)phenyl]methylene($\eta^5$-cyclopentadienyl) ($\eta^5$-3,6-di-t-butylfluorenyl)]hafnium dichloride was injected. Subsequently, 0.6 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 5.25 g of an ethylene/propylene/ENB copolymer was obtained in which the ethylene content was 71.3 mol %, the propylene content was 26.3 mol %, the ENB content was 2.5 mol %, and [n]=4.35 dl/g.

Comparative Example A15

Ethylene/propylene/ENB copolymerization using [bis[4-(dimethylamino)phenyl]methylene($\eta^5$-cyclopentadienyl)($\eta^5$-octamethyloctahydrodibenzofluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.55 MPa was introduced. Thereafter, the pressure was increased to 1.60 MPa-G with ethylene. First, 0.3 ml of a toluene solution of 1 M triisobutylaluminum was injected. Subsequently, 1.5 ml of a toluene solution of 0.001 M [bis[4-(dimethylamino)phenyl]methylene($\eta^5$-cyclopentadienyl) ($\eta^5$-octamethyloctahydrodibenzofluorenyl)]hafnium dichloride was injected. Subsequently, 1.5 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 13.14 g of an ethylene/propylene/ENB copolymer was obtained in which the ethylene content was 68.7 mol %, the propylene content was 29.3 mol %, the ENB content was 2.0 mol %, and [η]=3.83 dl/g.

Example A8

Ethylene/propylene/ENB copolymerization using [bis(4-methoxyphenyl)methylene($\eta^5$-cyclopentadienyl) ($\eta^5$-2,3,6,7-tetramethyl-fluorenyl)]hafnium dichloride To a stainless (SUS) autoclave with an inner volume of 2 L sufficiently nitrogen-purged, 940 ml of n-heptane from which impurities had been removed with activated alumina and 10.0 ml of ENB were introduced at 25° C. The autoclave was sealed, and kept at 120° C. Propylene at a partial pressure of 0.45 MPa was introduced, and 400 ml of hydrogen was introduced. Thereafter, the pressure was increased to 1.60 MPa-G with ethylene. First, 0.3 ml of a toluene solution of 1 M triisobutylaluminum was injected. Subsequently, 0.15 ml of a toluene solution of 0.001 M [bis(4-methoxyphenyl)methylene($\eta^5$-cyclopentadienyl) (1-2,3,6,7-tetramethyl-fluorenyl)]hafnium dichloride was injected. Subsequently, 0.15 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 120° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 6.21 g of an ethylene/propylene/ENB copolymer was obtained in which the ethylene content was 79.0 mol %, the propylene content was 17.9 mol %, the ENB content was 3.1 mol %, and [η]=2.58 dl/g.

Example A9

Ethylene/propylene/ENB copolymerization using [bis(4-methoxyphenyl)methylene($\eta^5$-cyclopentadienyl) ($\eta^5$-2,3,6,7-tetramethyl-fluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.15 ml of a toluene solution of 0.001 M [bis(4-methoxyphenyl)methylene($\eta^5$-cyclopentadienyl) ($\eta^5$-2,3,6,7-tetramethyl-fluorenyl)]hafnium dichloride was injected. Subsequently, 0.15 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 6.21 g of an ethylene/propylene/ENB copolymer was obtained in which the ethylene content was 73.0 mol %, the propylene content was 24.4 mol %, the ENB content was 2.7 mol %, and [η]=9.88 dl/g.

Example A10

Ethylene/propylene/ENB copolymerization using [bis[4-(dimethylamino)phenyl]methylene($\eta^5$-cyclopentadienyl) ($\eta^5$-2,3,6,7-tetramethylfluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.25 ml of a toluene solution of 0.001 M [bis[4-(dimethylamino)phenyl]methylene($\eta^5$-cyclopentadienyl) ($\eta^5$-2,3,6,7-tetramethylfluorenyl)]hafnium dichloride was injected. Subsequently, 0.25 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 16.83 g of an ethylene/propylene/ENB copolymer was obtained in which the ethylene content was 74.7 mol %, the propylene content was 22.5 mol %, the ENB content was 2.8 mol %, and [q]=10.0 dl/g.

Comparative Example A16

Ethylene/propylene/ENB copolymerization using [bis(4-methylphenyl)methylene($\eta^5$-cyclopentadienyl)($\eta^5$-2,7-dimethylfluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.3 ml of a toluene solution of 0.001 M [bis(4-methylphenyl)methylene($\eta^5$-cyclopentadienyl)($\eta^5$-2,7-dimethylfluorenyl)]hafnium dichloride was injected. Subsequently, 0.3 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 8.98 g of an ethylene/propylene/ENB copolymer was obtained in which the ethylene content was 70.0 mol %, the propylene content was 27.6 mol %, the ENB content was 2.4 mol %, and [q]=8.06 dl/g.

Comparative Example A17

Ethylene/propylene/ENB copolymerization using [bis(4-methoxyphenyl)methylene($\eta^5$-cyclopentadienyl)($\eta^5$-3,6-di-t-butylfluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.3 ml of a toluene solution of 0.001 M [bis(4-methoxyphenyl)methylene($\eta^5$-cyclopentadienyl) ($\eta^5$-3,6-di-t-butylfluorenyl)]hafnium dichloride was injected. Subsequently, 0.3 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 4.91 g of an ethylene/propylene/ENB copolymer was obtained in which the ethylene content was 69.8 mol %, the propylene content was 27.9 mol %, the ENB content was 2.3 mol %, and [n]=8.51 dl/g.

Comparative Example A18

Ethylene/propylene/ENB copolymerization using [bis(4-methoxyphenyl)methylene($\eta^5$-cyclopentadienyl) ($\eta^5$-2,7-di methyl-3,6-di-t-butylfluorenyl)] hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.2 ml of a toluene solution of 0.001 M [bis(4-methoxyphenyl)methylene($\eta^5$-cyclopentadienyl) ($\eta^5$-2,7-di methyl-3,6-di-t-butylfluorenyl)]hafnium dichloride was injected. Subsequently, 0.2 ml of a toluene solution of 0.004 M triphenylcarbeniumtetrakis(pentafluorophenyl) borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 2.72 g of an ethylene/propylene/ENB copolymer was obtained in which the ethylene content was 73.0 mol %, the propylene content was 24.7 mol %, the ENB content was 2.3 mol %, and [n]=10.8 dl/g.

Comparative Example A19

Ethylene/propylene/ENB copolymerization using [bis(4-methoxyphenyl)methylene($\eta^5$-cyclopentadienyl) ($\eta^5$-octamethyloctahydrodibenzofluorenyl)] hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.6 ml of a toluene solution of 0.001 M [bis(4-methoxyphenyl)methylene($\eta^5$-cyclopentadienyl) ($\eta^5$-octamethyloctahydrodibenzofluorenyl)]hafnium dichloride was injected. Subsequently, 0.6 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 5.45 g of an ethylene/propylene/ENB copolymer was obtained in which the ethylene content was 66.9 mol %, the propylene content was 31.3 mol %, the ENB content was 1.8 mol %, and [η]=9.48 dl/g.

Comparative Example A20

Ethylene/propylene/ENB copolymerization using [bis[4-(dimethylamino)phenyl]methylene($\eta^5$-cyclopentadienyl) ($\eta^5$-3,6-di-t-butylfluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 0.6 ml of a toluene solution of 0.001 M [bis[4-(dimethylamino)phenyl]methylene($\eta^5$-cyclopentadienyl) ($\eta^5$-3,6-di-t-butylfluorenyl)]hafnium dichloride was injected. Subsequently, 0.6 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 12.79 g of an ethylene/propylene/ENB copolymer was obtained in which the ethylene content was 71.4 mol %, the propylene content was 26.4 mol %, the ENB content was 2.3 mol %, and [η]=8.50 dl/g.

Comparative Example A21

Ethylene/propylene/ENB copolymerization using [bis[4-(dimethylamino)phenyl]methylene($\eta^5$-cyclopentadienyl) ($\eta^5$-octamethyloctahydrodibenzofluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced. Thereafter, the pressure was increased to 1.60 MPa-G with ethylene. First, 0.3 ml of a toluene solution of 1 M triisobutylaluminum was injected. Subsequently, 1.0 ml of a toluene solution of 0.001 M [bis[4-(dimethylamino)phenyl]methylene($\eta^5$-cyclopentadienyl) ($\eta^5$-octamethyloctahydrodibenzofluorenyl)]hafnium dichloride was injected. Subsequently, 1.0 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 14.37 g of an ethylene/propylene/ENB copolymer was obtained in which the ethylene content was 70.0 mol %, the propylene content was 28.0 mol %, the ENB content was 1.9 mol %, and [q]=10.2 dl/g.

Example A11

Ethylene/propylene/ENB copolymerization using [bis(4-methoxyphenyl)methylene($\eta^5$-cyclopentadienyl) ($\eta^5$-2,3,6,7-tetramethyl-fluorenyl)]hafnium dichloride To a stainless (SUS) autoclave with an inner volume of 2 L sufficiently nitrogen-purged, 940 ml of n-heptane from which impurities had been removed with activated alumina and 12.0 ml of ENB were introduced at 25° C. The autoclave was sealed, and kept at 95° C. Propylene at a partial pressure of 0.45 MPa was introduced, and 400 ml of hydrogen was introduced. Thereafter, the pressure was increased to 1.60 MPa-G with ethylene. First, 0.3 ml of a toluene solution of 1 M triisobutylaluminum was injected. Subsequently, 0.15 ml of a toluene solution of 0.001 M [bis(4-methoxyphenyl) methylene($\eta^5$-cyclopentadienyl) ($\eta^5$-2,3,6,7-tetramethyl-fluorenyl)]hafnium dichloride was injected. Subsequently, 0.15 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/propylene/ENB copolymer precipitated was collected by filtration, and was dried for 10 hours under the conditions of 130° C. and −600 mmHg. As a result, 13.75 g of an ethylene/propylene/ENB copolymer was obtained in which the ethylene content was 73.2 mol %, the propylene content was 24.2 mol %, the ENB content was 2.7 mol %, and [η]=3.31 dl/g.

Example A12

Ethylene/1-butene/ENB copolymerization using [bis(4-methylphenyl)methylene($\eta^5$-cyclopentadienyl) ($\eta^5$-2,3,6,7-tetramethyl-fluorenyl)]hafnium dichloride To a stainless (SUS) autoclave with an inner volume of 2 L sufficiently nitrogen-purged, 750 ml of n-hexane (produced by Kanto Chemical Co., Inc., hexane (dehydrated)), 10.0 ml of ENB, and 350 ml of 1-butene were introduced at 25° C. The autoclave was sealed, and kept at 95° C. Thereafter, the pressure was increased to 1.60 MPa-G with ethylene. First, 0.3 ml of a toluene solution of 1 M triisobutylaluminum was injected. Subsequently, 0.2 ml of a toluene solution of 0.001 M [bis(4-methylphenyl)methylene ($\eta^5$-cyclopentadienyl) ($\eta^5$-2,3,6,7-tetramethyl-fluorenyl)] hafnium dichloride was injected. Subsequently, 0.2 ml of a toluene solution of 0.004 M triphenylcarbeniumtetrakis (pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/1-butene/ENB copolymer precipitated out was collected, and was dried for 10 hours under the conditions of 130° C. and −600 mmHg. As a result, 5.91 g of an ethylene/1-butene/ENB copolymer was obtained in which the ethylene content was 62.0 mol %, the 1-butene content was 36.6 mol %, the ENB content was 1.5 mol %, and [i]=7.60 dl/g.

Example A13

Ethylene/1-butene/ENB copolymerization using [bis(4-methoxyphenyl)methylene($\eta^5$-cyclopentadienyl) ($\eta^5$-2,3,6,7-tetramethyl-fluorenyl)]hafnium dichloride To a stainless (SUS) autoclave with an inner volume of 2 L sufficiently nitrogen-purged, 750 ml of n-hexane (produced by Kanto Chemical Co., Inc., hexane (dehydrated)), 350 ml of 1-butene, and 10.0 ml of ENB were introduced at 25° C. The autoclave was sealed, and kept at 95° C. Thereafter, the pressure was increased to 1.60 MPa-G with ethylene. First, 0.3 ml of a toluene solution of 1 M triisobutylaluminum was injected. Subsequently, 0.22 ml of a toluene solution of 0.001 M [bis(4-methoxyphenyl)methylene($\eta^5$-cyclopentadienyl) ($\eta^5$-2,3,6,7-tetramethyl-fluorenyl)]hafnium dichloride was injected. Subsequently, 0.22 ml of a toluene solution of 0.004 M triphenylcarbeniumtetrakis (pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1 [vol/vol %]) containing 5 ml of concentrated hydrochloric acid. Thereafter, the mixture was stirred and deashed for 1 hour at room temperature. An ethylene/1-butene/ENB copolymer precipitated out was collected, and was dried for 10 hours under the conditions of 130° C. and −600 mmHg. As a result, 7.58 g of an ethylene/1-butene/ENB copolymer was obtained in which the ethylene content was 63.3 mol %, the 1-butene content was 35.2 mol %, the ENB content was 1.5 mol %, and [η]=8.26 dl/g.

Example A14

Ethylene/1-butene/ENB copolymerization using [bis[4-(dimethylamino)phenyl]methylene($\eta^5$-cyclopentadienyl) ($\eta^5$-2,3,6,7-tetramethylfluorenyl)]hafnium dichloride To a stainless (SUS) autoclave with an inner volume of 2 L sufficiently nitrogen-purged, 750 ml of n-hexane (produced by Kanto Chemical Co., Inc., hexane (dehydrated)), 350 ml of 1-butene, and 10.0 ml of ENB were introduced at 25° C. The autoclave was sealed, and kept at 95° C. Thereafter, the pressure was increased 15 to 1.60 MPa-G with ethylene. First, 0.3 ml of a toluene solution of 1 M triisobutylaluminum was injected. Subsequently, 0.2 ml of a toluene solution of 0.001 M [bis[4-(dimethylamino)phenyl] methylene($\eta^5$-cyclopentadienyl) ($\eta^5$-2,3,6,7-tetramethyl-fluorenyl)]hafnium dichloride was injected. Subsequently, 0.2 ml of a toluene solution of 0.004 M triphenylcarbeniumtetrakis(pentafluorophenyl)borate was injected. Thereby, polymerization reaction was performed for 15 minutes. During the polymerization reaction, the temperature was kept at 95° C., and the pressure was kept with ethylene pressurization at 1.60 MPa-G. Fifteen minutes after the start of the polymerization reaction, 2 ml of methanol was injected with nitrogen to terminate the polymerization reaction.

The resultant polymerization solution was mixed into 1 L of a methanol/acetone mixed solution (1/1[vol/vol %]) containing 5 ml of concentrated hydrochloric acid. Thereafter, the mixture was stirred and deashed for 1 hour at room temperature. An ethylene/1-butene/ENB copolymer precipitated out was collected, and was dried for 10 hours under the conditions of 130° C. and −600 mmHg. As a result, 10.11 g of an ethylene/1-butene/ENB copolymer was obtained in which the ethylene content was 64.4 mol %, the 1-butene content was 34.1 mol %, the ENB content was 1.5 mol %, and [η]=8.41 dl/g.

Examples A1 and A2, and Comparative Examples A1 to A9 are shown in Table 1; Examples A3 to A11, and Comparative Examples A10 to A21 are shown in Table 2; and Examples A12 to A14 are shown in Table 3.

TABLE 1

Polymerization Results of Ethylene/Propylene/ENB Copolymers

| | Component (A) | | Component (B) (B-1) | | (B-3) | | Total Pressure | Propylene Partial Pressure | ENB Load | Hydrogen Load | Polymerization Temperature | Polymerization Time |
|---|---|---|---|---|---|---|---|---|---|---|---|---|
| | Type[1] | mmol | Type[2] | mmol | Type[3] | mmol | Mpa-G | MPa | ml | ml | °C. | min |
| Example A1 | i | 0.00015 | a | 0.1 | b | 0.0015 | 0.8 | 0.2 | 4.0 | 0 | 80 | 15 |
| Example A2 | ii | 0.00015 | a | 0.1 | b | 0.0015 | 0.8 | 0.2 | 4.0 | 0 | 80 | 15 |
| Comparative Example A1 | iii | 0.00015 | a | 0.1 | b | 0.0015 | 0.8 | 0.2 | 4.0 | 0 | 80 | 15 |
| Comparative Example A2 | iv | 0.00015 | a | 0.1 | b | 0.0015 | 0.8 | 0.2 | 4.0 | 0 | 80 | 15 |
| Comparative Example A3 | v | 0.00010 | a | 0.1 | b | 0.0010 | 0.8 | 0.2 | 4.0 | 0 | 80 | 15 |
| Comparative Example A4 | vi | 0.00015 | a | 0.1 | b | 0.0015 | 0.8 | 0.2 | 4.0 | 0 | 80 | 15 |
| Comparative Example A5 | vii | 0.00015 | a | 0.1 | b | 0.0015 | 0.8 | 0.2 | 4.0 | 0 | 80 | 15 |
| Comparative Example A6 | viii | 0.00015 | a | 0.1 | b | 0.0015 | 0.8 | 0.2 | 4.0 | 0 | 80 | 15 |
| Comparative Example A7 | ix | 0.00015 | a | 0.1 | b | 0.0015 | 0.8 | 0.2 | 4.0 | 0 | 80 | 15 |
| Cornparative Example A8 | x | 0.00010 | a | 0.1 | b | 0.0010 | 0.8 | 0.2 | 4.0 | 0 | 80 | 15 |
| Comparative Example A9 | xi | 0.00015 | a | 0.1 | b | 0.0015 | 0.8 | 0.2 | 4.0 | 0 | 80 | 15 |

| | Polymer Yield g | mileage kg/mmol-Hf | Ethylene/Propylene/ENB Contents mol %/mol %/mol %[4] | ENB Content wt % | Mw | Mn | Mw/Mn[5] | B value |
|---|---|---|---|---|---|---|---|---|
| Example A1 | 4.77 | 31.8 | 71.1/26.3/2.6 | 9.2 | 1,860,000 | 578.000 | 3.2 | 1.18 |
| Example A2 | 5.22 | 34.8 | 72.4/24.9/2.7 | 9.6 | 1,820,000 | 599,000 | 3.0 | 1.18 |
| Comparative Example A1 | 1.57 | 10.5 | 66.1/31.4/2.4 | 8.4 | 1,130,000 | 404,000 | 2.8 | |
| Comparative Example A2 | 2.60 | 17.4 | 69.1/28.4/2.5 | 8.7 | 1,600,000 | 549,000 | 2.9 | |
| Comparative Example A3 | 2.15 | 21.5 | 67.2/30.8/2.0 | 7.0 | 977,000 | 389,000 | 2.5 | |
| Comparative Example A4 | 1.58 | 10.5 | 67..8/29.3/2.9 | 10.1 | 1,280,000 | 485,000 | 2.6 | |
| Comparative Example A5 | 1.90 | 12.7 | 68.6/29.2/2.2 | 7.7 | 1,600,000 | 481,000 | 3.3 | |
| Comparative Example A6 | 3.65 | 24.3 | 70.6/27.1/2.3 | 8.2 | 2,170,000 | 683,000 | 3.2 | |
| Comparative Example A7 | 0.89 | 5.9 | 65.0/33.1/1.9 | 6.6 | 1,600,000 | 501,000 | 3.2 | 1.12 |
| Comparative Example A8 | 2.59 | 25.9 | 71.7/25.9/2.3 | 8.3 | 2,080,000 | 641,000 | 3.2 | |
| Comparative Example A9 | 1.30 | 8.7 | 69.1/28.9/2.9 | 7.0 | 2,550,000 | 709,000 | 3.6 | |

Note
[1] As component (A), bridged metallocene compounds shown below were used. i: [bis(4-methylphenyl)methylene($\eta^5$-cyclopentadienyl)($\eta^5$-2,3,6,7-tetramethylfluorenyl)]hafnium dichloride ii: [bis(4-methoxyphenyl)methylene($\eta^5$-cyclopentadienyl)($\eta^5$-2,3,6,7-tetramethylfluorenyl)]hafnium dichloride iii: [bis(4-methylphenyl)methylene($\eta^5$-cyclopentadienyl)($\eta^5$-fluorenyl)]hafnium dichloride iv: [bis(4-methylphenyl)methylene($\eta^5$-cyclopentadienyl)($\eta^5$-2,7-dimethylfluorenyl)]hafnium dichloride v: [bis(4-methylphenyl)methylene($\eta^5$-cyclopentadienyl)($\eta^5$-2,7-di-t-butyliluorenyl)]hafnium dichloride vi: [bis(4-methylphenyl)methylene($\eta^5$-cyclopentadienyl)($\eta^5$-3,6-dimethylfluorenyl)]hafnium dichloride vii: [bis(4-methylphenyl)methylene($\eta^5$-cyclopentadienyl)($\eta^5$-3,6-di-t-butylfluorenyl)]hafnium dichloride viii: [bis(4-methylphenyl)methylene($\eta^5$-cyclopentadienyl)($\eta^5$-2,7-dimethyl-3,6-di-t-butylfluorenyl)]hafnium dichloride ix: [bis(4-methylphenyl)methylene($\eta^5$-cyclopentadienyl)($\eta^5$-octamethyloctahydrodibenzofluorenyl)]hafnium dichloride x: [bis(4-methoxyphenyl)methylene($\eta^5$-cyclopentadienyl)($\eta^5$-2,7-dimethyl-3,6-di-t-butylfluorenyl)]hafnium dichloride xi: [bis(4-methoxyphenyl)methylene($\eta^5$-cyclopentadienyl)($\eta^5$-octamethyloctahydrodibenzofluorenyl)]hafnium dichloride Note
[2] As component (B-1), an organometallic metal compound shown below was used. a.: triisobutylaluminum Note
[3] As component (B-3), a compound which reacts with a bridged metallocene compound (A) to form an ion pair, shown below, was used. b: triphenylcarbeniumtetrakis(pentafluorophenyl)borate Note
[4] Values indicated have been rounded to the first decimal place.

Note
[5] Values indicated have been rounded to the first decimal place.

TABLE 2

Polymerization Results of Ethylene/Propylene/ENB Copolymers

| | Component (A) | | Component (B) | | | | Total Pressure | Propylene Partial Pressure | ENB Load | Hydrogen Load | Polymerization Temperature | Polymerization Time |
|---|---|---|---|---|---|---|---|---|---|---|---|---|
| | | | (B-1) | | (B-3) | | | | | | | |
| | Type*1) | mmol | Type*2) | mmol | Type*3) | mmol | Mpa-G | MPa | ml | ml | ° C. | min |
| Example A3 | i | 0.0003 | a | 0.3 | b | 0.0012 | 1.60 | 0.55 | 10 | 0 | 120 | 15 |
| Example A4 | ii | 0.0002 | a | 0.3 | b | 0.0008 | 1.60 | 0.55 | 10 | 0 | 120 | 15 |
| Example A8 | ii | 0.00015 | a | 0.3 | b | 0.0006 | 1.60 | 0.45 | 10 | 400 | 120 | 15 |
| Example A9 | ii | 0.00015 | a | 0.3 | b | 0.0006 | 1.60 | 0.45 | 12 | 0 | 95 | 15 |
| Example A11 | ii | 0.00015 | a | 0.3 | b | 0.0006 | 1.60 | 0.45 | 12 | 400 | 95 | 15 |
| Example A5 | xii | 0.0002 | a | 0.3 | b | 0.0008 | 1.60 | 0.55 | 10 | 0 | 120 | 15 |
| Example A10 | xii | 0.00025 | a | 0.3 | b | 0.0010 | 1.60 | 0.45 | 12 | 0 | 95 | 15 |
| Example A6 | xvi | 0.0002 | a | 0.3 | b | 0.0008 | 1.60 | 0.55 | 10 | 0 | 120 | 15 |
| Example A7 | xvii | 0.0004 | a | 0.3 | b | 0.0016 | 1.60 | 0.55 | 10 | 0 | 120 | 15 |
| Comparative Example A10 | iv | 0.0004 | a | 0.3 | b | 0.0016 | 1.60 | 0.55 | 10 | 0 | 120 | 15 |
| Comparative Example A16 | iv | 0.0003 | a | 0.3 | b | 0.0012 | 1.60 | 0.45 | 12 | 0 | 95 | 15 |
| Comparative Example A11 | xiii | 0.00025 | a | 0.3 | b | 0.0010 | 1.60 | 0.55 | 10 | 0 | 120 | 15 |
| Comparative Example A17 | xiii | 0.0003 | a | 0.3 | b | 0.0012 | 1.60 | 0.45 | 12 | 0 | 95 | 15 |
| Comparative Example A12 | x | 0.0003 | a | 0.3 | b | 0.0012 | 1.60 | 0.55 | 10 | 0 | 120 | 15 |
| Comparative Example A18 | x | 0.0002 | a | 0.3 | b | 0.0008 | 1.60 | 0.45 | 12 | 0 | 95 | 15 |
| Comparative Example A13 | xi | 0.0006 | a | 0.3 | b | 0.0024 | 1.60 | 0.55 | 10 | 0 | 120 | 15 |
| Comparative Example A19 | xi | 0.0006 | a | 0.3 | b | 0.0024 | 1.60 | 0.45 | 12 | 0 | 95 | 15 |
| Comparative Example A14 | xiv | 0.0006 | a | 0.3 | b | 0.0024 | 1.60 | 0.55 | 10 | 0 | 120 | 15 |
| Comparative Example A20 | xiv | 0.0006 | a | 0.3 | b | 0.0024 | 1.60 | 0.45 | 12 | 0 | 95 | 15 |
| Comparative Example A15 | xv | 0.0015 | a | 0.3 | b | 0.0060 | 1.60 | 0.55 | 10 | 0 | 120 | 15 |
| Comparative Example A21 | xv | 0.0010 | a | 0.3 | b | 0.0040 | 1.60 | 0.45 | 12 | 0 | 95 | 15 |

| | Polymer Yield g | mileage kg/mmol-Hf | Ethylene/Propylene/ENB Contents mol %/mol %/mol %*4) | ENB Content wt % | [η] dl/g |
|---|---|---|---|---|---|
| Example A3 | 6.03 | 20.1 | 73.3/23.6/3.2 | 11.1 | 4.40 |
| Example A4 | 4.31 | 21.6 | 73.6/23.3/3.1 | 11.0 | 4.78 |
| Example A8 | 6.21 | 41.4 | 79.0/17.9/3.1 | 11.0 | 2.58 |
| Example A9 | 6.21 | 41.4 | 73.0/24.4/2.7 | 9.4 | 9.88 |
| Example A11 | 13.75 | 91.7 | 73.2/24.2/2.7 | 9.4 | 3.31 |
| Example A5 | 8.67 | 43.4 | 74.5/22.5/3.0 | 10.6 | 4.82 |
| Example A10 | 16.83 | 67.3 | 74.7/22.5/2.8 | 9.9 | 10.0 |
| Example A6 | 2.76 | 13.8 | 72.3/24.0/3.7 | 12.8 | 5.03 |
| Example A7 | 13.64 | 34.1 | 78.2/18.2/3.6 | 12.8 | 6.21 |
| Comparative Example A10 | 5.56 | 13.9 | 70.6/26.5/2.9 | 10.1 | 3.84 |
| Comparative Example A16 | 8.98 | 29.9 | 70.0/27.6/2.4 | 8.5 | 8.06 |
| Comparative Example A11 | 1.47 | 5.9 | 702/27.1/2.6 | 9.2 | 4.14 |
| Comparative Example A17 | 4.91 | 16.4 | 69.8/27.9/2.3 | 8.0 | 8.51 |
| Comparative Example A12 | 1.95 | 6.5 | 72.6/24.6/2.8 | 9.7 | 5.22 |
| Comparative Example A18 | 2.72 | 13.6 | 73.0/24.7/2.3 | 8.3 | 10.8 |
| Comparative Example A13 | 3.84 | 6.4 | 66.1/31.7/2.2 | 7.6 | 3.63 |
| Comparative Example A19 | 5.45 | 9.1 | 66.9/31.3/1.8 | 6.3 | 9.48 |
| Comparative Example A14 | 5.25 | 8.8 | 71.3/26.3/2.5 | 8.7 | 4.35 |
| Comparative Example A20 | 12.79 | 21.3 | 71.4/26.4/2.3 | 8.0 | 8.50 |

TABLE 2-continued

Polymerization Results of Ethylene/Propylene/ENB Copolymers

| Comparative Example A15 | 13.14 | 8.8 | 68.7/29.3/2.0 | 7.1 | 3.83 |
| --- | --- | --- | --- | --- | --- |
| Comparative Example A21 | 14.37 | 14.4 | 70.0/28.0/1.9 | 6.9 | 10.2 |

Note
*[1])As component (A), bridged metallocene compounds shown below were used. i: [bis(4-methylphenyl)methylene($\eta^5$-cyclopentadienyl)($\eta^5$-2,3,6,7-tetramethylfluorenyl)]hafnium dichloride ii: [bis(4-methoxyphenyl)methylene($\eta^5$-cyclopentadienyl)($\eta^5$-2,3,6,7-tetramethylfluorenyl)]hafnium dichloride iv: [bis(4-methylphenyl)methylene($\eta^5$-cyclopentadienyl)($\eta^5$-2,7-dimethylfluorenyl)]hafnium dichloride x: [bis(4-methoxyphenyl)methylene($\eta^5$-cyclopentadienyl)($\eta^5$-2,7-dimethyl-3,6-di-t-butylfluorenyl)]hafnium dichloride xi: [bis(4-methoxyphenyl)methylene($\eta^5$-cyclopentadienyl)($\eta^5$-octamethyloctahydrodibenzofluorenyl)]hafnium dichloride xii: [bis[4-(dimethylamino)phenyl]methylene($\eta^5$-cyclopentadienyl)($\eta^5$-2,3,6,7-tetramethylfluorenyl)]hafnium dichloride xiii: [bis(4-methoxyphenyl)methylene($\eta^5$-cyclopentadienyl)($\eta^5$-3,6-di-t-butylfluorenyl)]hafnium dichloride xiv: [bis[4-(dimethylamino)phenyl]methylene($\eta^5$-cyclopentadienyl)($\eta^5$-3,6-di-t-butylfluorenyl)]hafnium dichloride xv: [bis[4-(dimethylamino)phenyl]methylene($\eta^5$-cyclopentadienyl)($\eta^5$-octamethyloctahydrodibenzofluorenyl)]hafnium dichloride xvi: [bis(3,4-dimethoxyphenyl)methylene($\eta^5$-cyclopentadienyl)($\eta^5$-2,3,6,7-tetramethylfluorenyl)]hafnium dichloride xvii: [bis(4-N-morpholinylphenyl)methylene($\eta^5$-cyclopentadienyl)($\eta^5$-2,3,6,7-tetramethylfluorenyl)]hafnium dichloride Note
*[2])As component (B-1), an organometallic metal compound shown below was used. a: triisobutylaluminum Note
*[3])As component (B-3), a compound which reacts with a bridged metallocene compound (A) to form an ion pair, shown below, was used. b: triphenylcarbeniumtetrakis(pentafluorophenyl)borate Note
*[4])Values indicated have been rounded to the first decimal place.

TABLE 3

Polymerization Results of Ethylene/1-Eutene/ENB Copolymers

| | Component (A) | | Component (B) | | | | Total Pressure Mpa-G | 1-Butene Load ml | ENB Load ml | Hydrogen Load ml | Polymerization Temperature °C. | Polymerization Time min |
| --- | --- | --- | --- | --- | --- | --- | --- | --- | --- | --- | --- | --- |
| | | | (B-1) | | (B-3) | | | | | | | |
| | Type*[1)] | mmol | Type*[2)] | mmol | Type*[3)] | mmol | | | | | | |
| Example 12 | i | 0.0002 | a | 0.3 | b | 0.0008 | 1.60 | 350 | 10 | 0 | 95 | 15 |
| Example 13 | ii | 0.00022 | a | 0.3 | b | 0.00088 | 1.60 | 350 | 10 | 0 | 95 | 15 |
| Example 14 | xii | 0.0002 | a | 0.3 | b | 0.0008 | 1.60 | 350 | 10 | 0 | 95 | 15 |

| | Polymer Yield g | mileage kg/mmol-Hf | Ethylene/1-Butene/ENB Content mol %/mol %/mol %*[4)] | ENB Content wt % | [η] dl/g |
| --- | --- | --- | --- | --- | --- |
| Example 12 | 5.91 | 29.6 | 62.0/36.6/1.5 | 4.4 | 7.60 |
| Example 13 | 7.58 | 34.5 | 63.3/35.2/1.5 | 4.5 | 8.26 |
| Example 14 | 10.11 | 50.6 | 64.4/34.1/1.5 | 4.6 | 8.41 |

Note
*[1])As component (A), bridged metallocene compounds shown below were used. i: [bis(4-methylphenyl)methylene($\eta^5$-cyclopentadienyl)($\eta^5$-2,3,6,7-tetramethylfluorenyl)]hafnium dichloride ii: [bis(4-methoxyphenyl)methylene($\eta^5$-cyclopentadienyl)($\eta^5$-2,3,6,7-tetramethylfluorenyl)]hafnium dichloride xii: [bis[4-(dimethylamino)phenyl]methylene($\eta^5$-cyclopentadienyl)($\eta^5$-2,3,6,7-tetramethylfluorenyl)]hafnium dichloride Note
*[2])As component(B-1), an organometallic metal compound shown below was used. a: triisobutylaluminum Note
*[3])As component (B-3), a compound which reacts with a bridged metallocene compound (A) to form an ion pair, shown below, was used. b: triphenylcarbeniumtetrakis(pentafluorophenyl)borate Note
*[4])Values indicated have been rounded to the first decimal place.

For the present invention 2, the present invention will be described below more in detail by use of Examples, but the present invention 2 is not to be limited to these Examples.

Evaluation methods for each property in Example B and Comparative Example B are as follows.

<<Properties of Ethylene-Based Copolymer>>

[Molar Amounts of Structural Units Derived from Ethylene [A] and Structural Units Derived from α-Olefin [B]]

They were determined by the intensity measurement with a $^1$H-NMR spectrometer.

[Molar Amount of Structural Units Derived from Non-Conjugated Polyene [C]]

It was determined by the intensity measurement with a $^1$H-NMR spectrometer.

[Mooney Viscosity]

The Mooney viscosity ($ML_{1+4}$ (125° C.) was measured according to JIS K 6300 (1994), using a Mooney viscometer (SHIMADZU CORPORATION, Model SMV202).

[B Value]

The measurement solvent was o-dichlorobenzene-$d_4$/benzene-$d_6$ (4/1 [v/v]), and the $^{13}$C-NMR spectrum thereof was measured (100 MHz, produced by JEOL LTD., ECX400P) at a measurement temperature of 120° C. and calculated according to the following general equation (i).

$$B \text{ value} = ([EX] + 2[Y])/[2 \times [E] \times ([X] + [Y])] \quad (i)$$

wherein [E], [X] and [Y] are the mole fractions of the ethylene [A], the $C_4$-$C_{20}$ α-olefin [B] and the non-conjugated polyene [C] respectively, and [EX] is the ethylene [A]-$C_4$-$C_{20}$ α-olefin [B] diad chain fraction.

<<Ethylene Copolymer Composition and Properties of Molded Article>>

[Preparation of Ethylene-Based Copolymer Composition]

For the composition before vulcanization with respect to the composition containing the ethylene-based copolymer of the present invention, MIXTRON BB MIXER (produced by Kobe Steel, LTD., Model BB-2, volume 1.7 L, rotor 2WH) was used, and zinc oxide, "zinc oxide No. 2" (trade name; produced by HakusuiTech Co., Ltd.) serving as a vulcanizing aid, stearic acid serving as a processing aid, carbon black, "Asahi #60G" (trade name; produced by ASAHI CARBON CO., LTD.) serving as a reinforcing agent and paraffin-based process oil, "Diana process oil PS-430" (trade name; produced by Idemitsu Kosan Co., Ltd) serving as a softener were blended in the amounts shown in Table 4 based on 100 parts by weight of the ethylene-based copolymer and then the mixture was kneaded. As for the kneading condition, the number of revolutions of the rotor was 40 rpm, the floating weight pressure was 3 kg/cm$^2$, the kneading time was 5 minutes, and the kneading discharge temperature was 144° C.

Subsequently, after it was ascertained that the temperature of the above compound reached the temperature of 40° C., using a 6-inch roll, 2-mercaptobenzothiazole, "Sanceler M" (trade name; produced by SANSHIN CHEMICAL INDUSTRY CO., LTD.), tetramethylthiuram disulfide, "Sanceler TT" (trade name; produced by SANSHIN CHEMICAL INDUSTRY CO., LTD.) and dipentamethylenethiuram tetrasulfide, "Sanceler TRA" (trade name; produced by SANSHIN CHEMICAL INDUSTRY CO., LTD.) serving as a vulcanizing accelerator as well as sulfur as a cross-linking agent (vulcanizing agent) were added in the amounts shown in Table 4 and the mixture was kneaded.

As for the kneading condition, the roll temperature of the front roll/rear roll was 50° C./50° C., the roll peripheral speed of the front roll/rear roll was 18 rpm/15 rpm, and the roll gap was 3 mm. Sheeting was performed after 8 minutes of kneading.

Sequentially, the compound was vulcanized at 160° C. for 20 minutes to prepare a sheet having a thickness of 2 mm, using a press molding machine. A Rubber block for the compression set test was prepared by vulcanizing the compound at 160° C. for 25 minutes. With regard to the unvulcanized material and the resulting vulcanized material, unvulcanized material properties, tension test, hardness test and compression set test were carried out in the following manner.

[Hardness Test (Durometer-A)]

Flat portions of the vulcanized molded articles were piled to have a thickness of 12 mm, and hardness (JIS-A) was measured according to JIS K 6253.

[Tension Test]

The tension test was performed on the vulcanized molded article according to JIS K 6251 under the condition of a measurement temperature of 23° C. and a pulling rate of 500 mm/min, and the strength at break (TB) and the elongation at break (EB) were measured.

[Compression Set Test]

For a test piece for compression set (CS) measurement, a right cylindrical test piece having a thickness of 12.7 mm and a diameter of 29 mm was obtained by the vulcanization at 160° C. for 25 minutes. After a −40° C.×22-hour treatment, the resulting test piece was measured for the compression set according to JIS K 6262 (1997).

Synthesis of Transition-Metal Compound

Synthesis of [bis(4-methoxyphenyl)methylene($\eta^5$-cyclopentadienyl) ($\eta^5$-2,3,6,7-tetramethylfluorenyl)] hafnium dichloride (catalyst-a1)

(i) Synthesis of 6,6-bis(4-methoxyphenyl)fulvene

In nitrogen atmosphere, to a 500 ml three-neck flask, 8.28 g (115 mmol) of lithium cyclopentadienide, and 200 ml of dehydrated THF were added. With the mixture cooled in an ice bath, 13.6 g (119 mmol) of DMI was added. The mixture was stirred at room temperature for 30 minutes. Thereafter, 25.3 g (105 mmol) of 4,4'-dimethoxybenzophenone was added. The mixture was stirred under heat refluxing for 1 week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel. The organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane:ethyl acetate=4:1). As a result, a red solution was obtained. The solvent was distilled off under reduced pressure. As a result, 9.32 g (32.1 mmol, 30.7%) of 6,6-bis(4-methoxyphenyl) fulvene was obtained as an orange solid. 6, 6-bis(4-methoxyphenyl) fulvene was identified by $^1$H NMR spectrum. A measured value thereof is shown below. $^1$H NMR spectrum (270 MHz, CDCl$_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl) (cyclopentadienyl) (2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of a n-butyllithium/hexane solution (1.63 M) was gradually added. The mixture was stirred at room temperature for 18 hours. 591 mg (2.03 mmol) of 6,6-bis(4-methoxyphenyl) fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl)(cyclopentadienyl)(2,3,6,7-tetramethylfluorenyl)methane was obtained. bis(4-methoxyphenyl) (cyclopentadienyl) (2,3,6,7-tetramethylfluorenyl)methane was identified by FD-MS spectrum. A measured value thereof is shown below. FD-MS spectrum: M/z 512 (M+)

(iii) Synthesis of [bis(4-methoxyphenyl)methylene ($\eta^5$-cyclopentadienyl) ($\eta^5$-2,3,6,7-tetramethylfluorenyl)]hafnium dichloride In nitrogen atmosphere, to a 100 ml Schlenk flask, 272 mg (0.531 mmol) of bis(4-methoxyphenyl) (cyclopentadienyl) (2,3,6,7-tetramethylfluorenyl)methane, 20 ml of dehydrated toluene, and 90 µl (1.1 mmol) of THF were sequentially added. With the mixture cooled in an ice bath, 0.68 ml (1.1 mmol) of a n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl) ($\eta^5$-2,3,6,7-tetramethylfluorenyl)]hafnium dichloride was obtained as a yellow solid. [bis(4-methoxyphenyl)methylene($\eta^5$-cyclopentadienyl) ($\eta^5$-2,3,6,7-tetramethylfluorenyl)]hafnium dichloride was identified by $^1$H NMR spectrum and FD-MS spectrum. A measured value thereof is shown below. $^1$H NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H) FD-MS spectrum: M/z 760 (M+)

Example B1

Production of Ethylene-Based Copolymer

A polymerization reactor having a volume of 300 L and provided with a mixing blade was used, and polymerization reaction of a tertiary copolymer composed of ethylene, 1-butene as an α-olefin (B), and 5-ethylidene-2-norbornene (ENB) as a non-conjugated polyene (C) was conducted at 95° C. continuously.

Hexane (feed amount: 31.9 L/h) was used as a polymerization solvent, and ethylene in an amount of feed of 3.1 Kg/h, 1-butene in an amount of feed of 13 Kg/h, ENB in an amount of feed of 520 g/h and hydrogen in an amount of feed of 0.5 NL/h were continuously fed into the polymerization reactor.

The polymerization pressure and the polymerization temperature were maintained at 1.6 MPa and 95° C. respectively, and the catalyst mentioned above (catalyst-a1) as a main catalyst was fed continuously in an amount of feed of 0.042 mmol/h. In addition, (C$_6$H$_5$)$_3$CB(C$_6$F$_5$)$_4$ as a cocatalyst and triisobutylaluminum (TIBA) as an organoaluminium compound were fed continuously in an amount of feed of 0.21 mmol/h and in an amount of feed of 5 mmol/h, respectively.

Thus, an ethylene.1-butene.ENB copolymer composed of ethylene, 1-butene and ENB was obtained in a solution state of 12.9 wt %. To the polymerization reaction liquid drawn from the lower portion of the polymerization reactor was added a small amount of methanol to terminate the polymerization reaction. Ethylene.α-olefin.non-conjugated polyene copolymer rubber was separated from the solvent by a steam stripping treatment and then was dried at 80° C. under reduced pressure for one whole day and night.

By the above procedure, the ethylene.1-butene.ENB copolymer (EBDM-1) formed from ethylene, butene and ENB was obtained at a rate of 4.8 Kg per hour.

Properties of the resulting EBDM-1 were measured by the method described above. The results are shown in Table 5.

<Preparation of Ethylene-Based Copolymer Composition>

A compound was obtained in the amounts of blend shown in Table 5 according to the method described above and then vulcanized to obtain a sheet. Properties of the resulting sheet was measured in the method described above. The results are shown in Table 5.

Examples B2 and 3

Ethylene.1-butene.ENB copolymers (EBDM-2 and EBDM-3) were obtained respectively in the same method as in Example B1 except that the polymerization conditions were changed to those shown in Table 4. Then, compounds were obtained in the amounts of blend shown in Table 5 and then vulcanized to obtain sheets. Properties of the resulting sheets were measured by the method described above. The results are shown in Table 5.

Comparative Examples B1 to 3

Ethylene.1-butene.ENB copolymers (EBDM-4 and EBDM-5) were obtained respectively in the same way as in Example B1 except that the catalyst-a1, the main catalyst used in Example B1 was changed to (t-butylamide)dimethyl (η5-2-methyl-s-indacen-1-yl)silanetitanium(II)1,3-pentadiene (catalyst-2) and that the polymerization conditions were changed to those shown in Table 4. Then, compounds were obtained in the amounts of blend shown in Table 5 and then vulcanized to obtain sheets. Properties of the resulting sheets were measured in the method described above. The results are shown in Table 5.

TABLE 4

| | | EBDM-1 | EBDM-2 | EBDM-3 | EBDM-4 | EBDM-5 | EBDM-6 |
|---|---|---|---|---|---|---|---|
| <Polymerization Conditions> | | | | | | | |
| Main Catalyst | | — | Catalyst-a1 | Catalyst-a1 | Catalyst-a1 | Catalyst-2 | Catalyst-2 | Catalyst-2 |
| Polymerization Temperature | ° C. | 95 | 95 | 95 | 80 | 60 | 90 |

TABLE 4-continued

|  |  | EBDM-1 | EBDM-2 | EBDM-3 | EBDM-4 | EBDM-5 | EBDM-6 |
|---|---|---|---|---|---|---|---|
| Polymerization Pressure | MPaG | 1.6 | 1.6 | 1.6 | 1.6 | 1.6 | 1.6 |
| Feed of Hexane | L/h | 31.9 | 31.9 | 33.3 | 37 | 28 | 35.9 |
| Feed of Ethylene | kg/h | 3.1 | 3.2 | 3.4 | 4.5 | 5.2 | 4.8 |
| Feed of Butene | kg/h | 13 | 12 | 10.8 | 14.5 | 14.9 | 10.1 |
| FEED OF ENB | g/h | 520 | 520 | 450 | 700 | 700 | 850 |
| Feed of Hydrogen | NL/h | 0.5 | 0 | 1 | 0.5 | 1.5 | 5 |
| Feed of Main Catalyst | mmol/h | 0.042 | 0.03 | 0.02 | 0.015 | 0.01 | 0.01 |
| FEED OF CB-3 | mmol/h | 0.21 | 0.15 | 0.1 | 0.075 | 0.05 | 0.05 |
| Feed of TiBA | mmol/h | 5 | 10 | 10 | 10 | 10 | 10 |
| Polymer Concentration | wt % | 12.9 | 14.9 | 13.7 | 16.6 | 18.4 | 20.3 |
| Production Rate (Load) | kg/h | 4.8 | 5.4 | 5 | 7.4 | 7.3 | 7.8 |
| <Condition of Drying Under Reduced Pressure> |  |  |  |  |  |  |  |
| Drying Temperature | ° C. | 80 | 80 | 80 | 80 | 80 | 80 |

TABLE 5

| Ethylene-based Copolymers | Unit | Example B1 EBDM-1 | Example B2 EBDM-2 | Example B3 EBDM-3 | Comparative Example B1 EBDM-4 | Comparative Example B2 EBDM-5 | Comparative Example B3 EBDM-6 |
|---|---|---|---|---|---|---|---|
| <Copolymer Properties> |  |  |  |  |  |  |  |
| ML(1 + 4)125 ° C. | — | 53 | 83 | 82 | 35 | 52 | 34 |
| Ethylene Content/1-Butene Content | Molar Ratio | 50.2/49.8 | 55.2/44.8 | 60.5/39.5 | 55.0/45.0 | 56.0/44.0 | 63.5/36.5 |
| ENB Content | mol % | 1.6 | 1.6 | 1.4 | 1.8 | 1.6 | 2.2 |
| B value |  | 1.28 | 1.29 | 1.28 | 1.11 | 1.11 | 1.10 |
| <Compound> |  |  |  |  |  |  |  |
| Ethylene-based Copolymers | phr | 100 | 100 | 100 | 100 | 100 | 100 |
| Zinc Oxide | phr | 5 | 5 | 5 | 5 | 5 | 5 |
| Stearic Acid | phr | 1 | 1 | 1 | 1 | 1 | 1 |
| FEF Carbon (Asahi 60G) | phr | 80 | 80 | 80 | 80 | 80 | 80 |
| Paraffin Oil (PS-430) | phr | 50 | 50 | 50 | 50 | 50 | 50 |
| Sanceler M | phr | 0.5 | 0.5 | 0.5 | 0.5 | 0.5 | 0.5 |
| Sanceler TT | phr | 1 | 1 | 1 | 1 | 1 | 1 |
| Sulfur | phr | 1.5 | 1.5 | 1.5 | 1.5 | 1.5 | 1.5 |
| <Sheet Properties> 160° C. × 20 min |  |  |  |  |  |  |  |
| Hardness (Durometer-A) | — | 62 | 62 | 62 | 63 | 62 | 65 |
| M100 | MPa | 2.63 | 2.73 | 2.68 | 2.34 | 2.31 | 2.91 |
| TB | MPa | 11.0 | 11.7 | 11.9 | 10.1 | 11.6 | 11.1 |
| EB | % | 403 | 407 | 414 | 427 | 475 | 390 |
| <CS>160° C. × 25 min |  |  |  |  |  |  |  |
| −40° C. × 22 h | % | 35 | 35 | 35 | 46 | 42 | 49 |

For the present invention 2-1, the present invention will be described more in detail below by use of Examples, but the present invention 2-1 is not to be limited to these Examples.

In the description of Example C, "parts" means "parts by mass" unless otherwise specified.

<<Ethylene.α-Olefin.Non-Conjugated Polyene Copolymer>>

[Molar Amount of Each Structural Unit]

Molar amounts of the structural units derived from ethylene [A], the structural units derived from the α-olefin [B] and the structural units derived from the non-conjugated polyene [C] of the ethylene.α-olefin.non-conjugated polyene copolymer were determined by the intensity measurement with a $^1$H-NMR spectrometer.

[Mooney Viscosity]

Mooney viscosity $ML_{(1+4)}$125° C. of the ethylene.α-olefin.non-conjugated polyene copolymer was measured according to JIS K 6300 (1994), using the Mooney viscometer (SHIMADZU CORPORATION, Model SMV202).

[B Value]

The measurement solvent was o-dichlorobenzene-$d_4$/benzene-$d_6$ (4/1 [v/v]). The ethylene.α-olefin.non-conjugated polyene copolymer was measured for the $^{13}$C-NMR spectrum (100 MHz, produced by JEOL LTD., ECX400P) at a measurement temperature of 120° C. to calculate a B value according to the following equation (i).

$$B \text{ value} = ([EX] + 2[Y])/[2 \times [E] \times ([X] + [Y])] \qquad (i)$$

wherein, [E], [X] and [Y] are mole fractions of the ethylene [A], the $C_4$-$C_{20}$ α-olefin [B] and the non-conjugated polyene [C] respectively, and [EX] is the ethylene [A]-$C_4$-$C_{20}$ α-olefin [B] diad chain fraction.

[Limiting Viscosity]

The limiting viscosity [η] of the ethylene.α-olefin.non-conjugated polyene copolymer is a value measured at 135° C., using a decalin solvent.

Specifically, about 20 mg of ethylene.α-olefin.non-conjugated polyene copolymer was dissolved in 15 ml of decalin, and the specific viscosity ηsp was measured in an oil bath at 135° C. After the decalin solution was diluted by the addition of 5 ml of decalin solvent, the specific viscosity ηsp was measured in a similar manner. The dilution was repeated two more times. By extrapolating the concentration (C) to 0, the value ηsp/C was obtained as the limiting viscosity (see the following equation).

$$[\eta] = \lim(\eta sp/C)(C \rightarrow 0)$$

Synthesis of Transition-Metal Compound

Synthesis of [bis(4-methoxyphenyl)methylene($\eta^5$-cyclopentadienyl) ($\eta^5$-2,3,6,7-tetramethylfluorenyl)]hafnium dichloride (catalyst-a1)

(i) Synthesis of 6,6-bis(4-methoxyphenyl)fulvene

In nitrogen atmosphere, to a 500 ml three-neck flask, 8.28 g (115 mmol) of lithium cyclopentadienide, and 200 ml of dehydrated THF (tetrahydrofuran) were added. With the mixture cooled in an ice bath, 13.6 g (119 mmol) of DMI (1,3-dimethyl-2-imidazolidinone) was added. The mixture was stirred at room temperature for 30 minutes. Thereafter, 25.3 g (105 mol) of 4,4'-dimethoxybenzophenone was added. The mixture was stirred under heat refluxing for 1 week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel, and the organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane:ethyl acetate=4:1). As a result, a red solution was obtained. The solvent was distilled off under reduced pressure. As a result, 9.32 g (32.1 mmol, 30.7%) of 6,6-bis(4-methoxyphenyl)fulvene was obtained as an orange solid. 6,6-bis(4-methoxyphenyl) fulvene was identified by $^1$H-NMR spectrum. A measured value thereof is shown below. $^1$H-NMR spectrum (270 MHz, CDCl$_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl)(cyclopentadienyl)(2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of a n-butyllithium/hexane solution (1.63 M) was gradually added. The mixture was stirred at room temperature for 18 hours. 591 mg (2.03 mmol) of 6,6-bis(4-methoxyphenyl) fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl) (cyclopentadienyl) (2,3,6,7-tetramethylfluorenyl)methane was obtained. bis(4-methoxyphenyl) (cyclopentadienyl) (2,3,6,7-tetramethylfluorenyl) methane was identified by FD-MS spectrum. A measured value thereof is shown below. FD-MS spectrum: M/z 512 (M$^+$)

(iii) Synthesis of [bis(4-methoxyphenyl)methylene ($\eta^5$-cyclopentadienyl) ($\eta^5$-2,3,6,7-tetramethylfluorenyl)]hafnium dichloride In nitrogen atmosphere, to a 100 ml Schlenk flask, 272 mg (0.531 mmol) of bis(4-methoxyphenyl) (cyclopentadienyl) (2,3,6,7-tetramethylfluorenyl)methane, 20 ml of dehydrated toluene, and 90 μl (1.1 mmol) of THF were sequentially added. With the mixture cooled in an ice bath, 0.68 ml (1.1 mmol) of a n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl) ($\eta^5$-2,3,6,7-tetramethylfluorenyl)]hafnium dichloride was obtained as a yellow solid. [bis(4-methoxyphenyl)methylene($\eta^5$-cyclopentadienyl) ($\eta^5$-2,3,6,7-tetramethylfluorenyl)]hafnium dichloride was identified by $^1$H-NMR spectrum and FD-MS spectrum. A measured value thereof is shown below.

$^1$H-NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H) FD-MS spectrum: M/z 760 (M$^+$)

Synthesis Example C1

A polymerization reactor having a volume of 300 L and provided with a mixing blade was used, and polymerization reaction of ethylene, 1-butene and 5-ethylidene-2-norbornene (ENB) was conducted at 95° C. continuously.

Hexane (feed amount: 31 L/h) was used as a polymerization solvent, and ethylene in an amount of feed of 3.8 Kg/h, 1-butene in an amount of feed of 7 Kg/h, ENB in an amount of feed of 390 g/h and hydrogen in an amount of feed of 3 NL/h were continuously fed into the polymerization reactor.

The polymerization pressure and the polymerization temperature were maintained at 1.6 MPaG and 95° C. respectively. The catalyst-a1 mentioned above was used as a main catalyst and fed continuously into the polymerization reactor in an amount of feed of 0.020 mmol/h. In addition, $(C_6H_5)_3CB(C_6F_5)_4$ (CB-3) as a cocatalyst and triisobutylaluminum (TiBA) as an organoaluminium compound were fed continuously into the polymerization reactor in an amount of feed of 0.100 mmol/h and in an amount of feed of 10 mmol/h respectively.

Thus, a solution containing 14% by mass of the ethylene.1-butene.ENB copolymer composed of ethylene, 1-butene and ENB was obtained. To the polymerization reaction liquid drawn from the lower portion of the polymerization reactor was added a small amount of methanol to terminate the polymerization reaction. The ethylene.1-butene.ENB copolymer was separated from the solvent by a steam stripping treatment and then was dried at 80° C. under reduced pressure for one whole day and night.

By the above procedure, the ethylene.1-butene.ENB copolymer (EBDM-1) formed from ethylene, butene and ENB was obtained at a rate of 4.5 Kg per hour.

Properties of the resulting EBDM-1 were measured by the method described above. The results are shown in Table 6.

Synthesis Examples C2 to 6

An ethylene.1-butene.ENB copolymer(EBDM-2) for Synthesis Example C2, an ethylene.1-butene.ENB copolymer (EBDM-3) for Synthesis Example C3, an ethylene.1-butene.ENB copolymer(EBDM-4) for Synthesis Example C4, an ethylene.1-butene.ENB copolymer (EBDM-5) for Synthesis Example C5, and an ethylene.1-butene.ENB copolymer(EBDM-6) for Synthesis Example C6 were obtained in the same method as in Synthesis Example C1 except that the polymerization conditions were changed to those shown in Table 6. The results are shown in Table 6.

TABLE 6

| Ethylene-based Copolymers | | Synthesis Example C1 EBDM-1 | Synthesis Example C2 EBDM-2 | Synthesis Example C3 EBDM-3 | Synthesis Example C4 EBDM-4 | Synthesis Example C5 EBDM-5 | Synthesis Example C6 EBDM-6 |
|---|---|---|---|---|---|---|---|
| <Polymerization Conditions> | | | | | | | |
| Main Catalyst | — | Catalyst-a1 | Catalyst-a1 | Catalyst-a1 | Catalyst-a1 | Catalyst-a1 | Catalyst-a1 |
| Reactor Volume | L | 300 | 300 | 300 | 300 | 300 | 300 |
| Polymerization Temperature | ° C. | 95 | 95 | 95 | 95 | 95 | 95 |
| Polymerization Pressure | MPaG | 1.6 | 1.6 | 1.6 | 1.6 | 1.6 | 1.6 |
| Feed of Hexane | L/h | 31 | 32 | 27 | 27 | 27 | 27 |
| Feed of Ethylene | kg/h | 3.8 | 2.7 | 3.5 | 3.5 | 3.5 | 3.5 |
| Feed of Butene | kg/h | 7 | 14 | 13 | 13 | 13 | 13 |
| FEED OF ENB | g/h | 390 | 520 | 1100 | 1100 | 1100 | 1400 |
| Feed of Hydrogen | NL/h | 3 | 0.5 | 7 | 4 | 1 | 1.5 |
| Feed of Main Catalyst | mmol/h | 0.020 | 0.035 | 0.070 | 0.088 | 0.062 | 0.083 |
| FEED OF CB-3 | mmol/h | 0.100 | 0.175 | 0.350 | 0.440 | 0.310 | 0.415 |
| Feed of TiBA | mmol/h | 10 | 10 | 10 | 10 | 10 | 10 |
| Polymer Concentration | wt % | 14 | 12 | 21 | 19 | 20 | 22 |
| Production Rate (Load) | kg/h | 4.5 | 4.4 | 7.4 | 6.7 | 6.9 | 7.5 |
| <Condition of Drying Under Reduced Pressure> | | | | | | | |
| Drying Temperature | ° C. | 80 | 80 | 80 | 80 | 80 | 80 |
| <Copolymer Properties> | | | | | | | |
| Ethylene Content | wt % | 51.6 | 30.7 | 35.2 | 36.5 | 35.3 | 35.4 |
| Ethylene Content | mol % | 69.1 | 47.7 | 53.6 | 55.2 | 53.8 | 54.2 |
| (1) Ethylene Content/1-Butene Content | Molar Ratio | 70.2/29.8 | 48.2/51.7 | 55.1/44.9 | 56.7/43.3 | 55.3/44.7 | 56.0/44.0 |
| ENB Content | wt % | 4.2 | 3.5 | 7.5 | 7.7 | 7.7 | 9.0 |
| (2) ENB Content | mol % | 1.32 | 1.27 | 2.66 | 2.72 | 2.75 | 3.22 |
| (3) $ML_{(1+4)}125°$ C. | — | 29 | 15 | 9 | 14 | 20 | 12 |
| (4) B value | — | 1.28 | 1.29 | 1.29 | 1.29 | 1.29 | 1.29 |

Example C1

Composition for Seal Packings

Using MIXTRON BBE MIXER (produced by Kobe Steel, LTD., Model BB-2, volume 1.7 L, rotor 2WH), 100 parts of EBDM-1 obtained from Synthesis Example C1 was blended with 5 parts of zinc oxide (ZnO #1/zinc oxide No. 2 (JIS(K-1410)), produced by HakusuiTech Co., Ltd.) serving as a cross-linking aid, 1 part of stearic acid serving as a processing aid, 40 parts of carbon black, "Asahi #60G" (trade name; produced by ASAHI CARBON CO., LTD.) serving as a reinforcing agent, two parts of Sandant MB (2-mercaptobenzimidazole, produced by SANSHIN CHEMICAL INDUSTRY CO. LTD.) serving as an antioxidant, and 1 part of Irganox 1010 (dibutylhydroxytoluene, tetrakis[methylene(3,5-di-t-butyl-4-hydroxy)hydrocinnamate]methane, produced by BASF) serving as an antioxidant and then the mixture was kneaded to obtain a compound 1.

As for the kneading condition, the number of revolutions of the rotor was 40 rpm, the floating weight pressure was 3 kg/cm$^2$, the kneading time was 5 minutes, and the kneading discharge temperature was 144° C.

Then, after it was ascertained that the compound 1 reached the temperature of 40° C., using a 6 inch-roll, Kayakumiru D-40C (dicumyl peroxide, 40% by mass, produced by Kayaku Akzo Co., Ltd.) in an amount of blend of 6.8 parts was added as a cross-linking agent (vulcanizing agent) to the compound 1 and the mixture was kneaded to obtain a compound 2 (composition for seal packings).

As for the kneading condition, the roll temperature of the front roll/rear roll was 50° C./50° C., the roll peripheral speed of the front roll/rear roll was 18 rpm/15 rpm, and the roll gap was 3 mm. Sheeting was performed after 8 minutes of kneading to obtain the compound 2.

[Property Test of Unvulcanized Material 1: Mooney Viscosity]

The compound 2 was measured for the Mooney viscosity $ML_{(1+4)}100°$ C. according to JIS K 6300 (1994), using the Mooney viscometer (SHIMADZU CORPORATION, Model SMV202).

[Property Test of Unvulcanized Material 2: Vulcanization Characteristic Evaluation]

The compound 2 was measured for the vulcanization induction time (TS1) and vulcanization rate (TC90) as follows, using a vulcanization measurement device: MDR2000 (produced by ALPHA TECHNOLOGIES).

The changes in torque obtained under the condition of a certain temperature and a certain shear rate were measured.

The vulcanization induction time (TS1; min) was the time required to increase the minimum torque value by 1 point of torque (1 dNm).

TC90 (min) was defined by the time required for the torque value to achieve 90% of the difference between the maximum torque value (S'Max) and the minimum torque value (S'Min). With regard to the measurement condition, the temperature was 180° C. and the time was 15 minutes. A smaller TC 90 indicated a faster rate of vulcanization.

<<Evaluation of Vulcanized Material (Cross-Linked Material)>>

The compound 2 was cross-linked at 180° C. for 10 minutes, using a press molding machine, thereby preparing a sheet (vulcanized material) having a thickness of 2 mm.

According to the following methods, the hardness test, tension test, calculation of cross-linking density, thermal aging resistance test, Gehman torsion test, T-R test, low temperature flexibility test, and storage modulus test were performed on the resulting sheet.

The compound 2 was vulcanized at 180° C. for 13 minutes, using a press molding machine equipped with a cylindrical die to produce a right cylindrical test piece having a thickness of 12.7 mm and a diameter of 29 mm. A test piece for a compression set (CS) test (vulcanized material) was thus obtained.

The resulting test piece for the compression set (CS) test was used to evaluate the compression set according to the following method.

The results are shown in Table 8.

[Hardness Test: Hardness (Durometer-A)]

The hardness of the sheet was measured according to the description of "7: Hardness test" in JIS K 7312 (1996), "Physical testing methods for molded products of thermosetting polyurethane elastomers" and the description of Test type A of "6: Durometer hardness test" in JIS K 6253 (2006), "Rubber, vulcanized or thermoplastic-Determination of hardness."

[Tension Test: Modulus, Tensile Stress at Break, Tensile Elongation at Break]

The modulus, tensile stress at break, and tensile elongation at break of the sheet were measured in the following manner.

The sheet was stamped out to prepare a dumbbell shaped No. 3 test piece as described in JIS K 6251 (1993). This test piece was used to carry out a tension test, according to the method as provided in JIS K 6251, Article 3, under the condition of a measurement temperature of 25° C. and a pulling rate of 500 mm/min, thereby measuring the tensile strength at an elongation rate of 25% (25% modulus (M25)), the tensile strength at an elongation rate of 50% (50% modulus (M50)), the tensile strength at an elongation rate of 100% (100% modulus (M100)), the tensile strength at an elongation rate of 200% (200% modulus (M200)), tensile stress at break (TB), and tensile elongation at break(EB).

[Calculation of Cross-Linking Density]

The cross-linking density v of the sheet was calculated from the following equation of Flory-Rehner (a) which utilizes equilibrium swelling.

The cross-linked sheet of 2 mm was extracted with toluene under the condition of 37° C.×72 h to determine the $V_R$ in the equation (a).

[Num. 1]

$$v[\text{cross-linkage/cc}] = \frac{V_R + \text{Ln}(1 - V_R) + \mu V_R^2}{-V_0(V_R^{1/3} - V_R/2)} \times A \qquad (1)$$

$V_R$: Volume ratio of pure rubber in swollen cross-linking rubber $V_0$: Molecular volume in solvent (108.15 cc@37° C.)

μ: Interaction constant between rubber and solvent (EBDM-toluene: 0.49)

A: Avogadro constant

[Thermal Aging Resistance Test]

A thermal aging test was performed on the sheet according to JIS K 6257 in which the temperature was maintained at 150° C. for 168 h. Hardness, tensile stress at break, tensile elongation at break of the sheet after thermal aging test were measured in the same way as in the [Hardness (Durometer-A)] section described above and the [Modulus, tensile stress at break, tensile elongation at break] section described above.

AH (Duro-A) was obtained from the difference of hardness before and after the thermal aging test. On the basis of the tensile stress at break (TB) and tensile elongation at break (EB) before and after the thermal aging test, the change rates of the values before the thermal aging test to those after the test were obtained as Ac(TB) and Ac(EB) respectively,

[Gehman Torsion Test (Low Temperature Torsion Test)]

A low temperature torsion test was performed according to JIS K6261 (1993), and using aGehman torsion test machine, $T_2$(° C.), $T_5$(° C.), and $T_{10}$(° C.) of the sheets were measured. These temperatures are considered as an indicator of low temperature flexibility of vulcanized rubber. For example, the lower $T_2$ is, the better low temperature flexibility is.

[T-R Test (Low Temperature Resilience Test)]

T-R test (low temperature resilience test) was performed on the sheet according to JIS K 6261 to measure the cold resistance.

In the test, the elongated sheet is frozen, and the temperature is increased continuously, thereby measuring the resilience of the elongated sheet (temperatures when the length of the test piece shrinks (resilient) due to the temperature increase by 10%, 30%, 50% and 70% are designated as TR10, TR30, TR50 and TR70 respectively). It can be judged that as the TR10 (unit: ° C.) is low, the cold resistance is superior.

[Low Temperature Flexibility Test: Tan δ-Tg (Low Temperature Flexibility)]

A strip-shaped sample having a width of 10 mm, a thickness of 2 mm and a length of 30 mm was prepared from the sheet.

Using this sample, the temperature dispersion (−70° C. to 25° C.) of the viscoelasticity was measured under the condition of the strain of 0.5% and the frequency of 1 Hz by use of RDS-II produced by Rheometric Scientific. tan δ-Tg (° C.) was obtained by reading the peak temperature from the temperature-dependent curve tan δ.

[Storage Modulus Test: Storage Modulus (−40° C.)]

Using RDS-II produced by Rheometric Scientific, the sheet was measured in the torsion mode (twist) of a width of 10 mm and a length of 38 mm from −100° C. to 100° C. at an increasing rate of 2° C./min at 10 Hz, and the value of the storage modulus G' (Pa) at −40° C. was obtained.

[Compression Set]

For a test sample for the compression set (CS) measurement, the compression set after a 125° C.×72 hour-treatment and a 0° C., −40° C. or −50° C.×22 hour-treatment was measured according to JIS K 6262 (1997).

Examples C2 to 10

For Examples C2 to 10, the compound 1 and the compound 2 were obtained for each Example in the same way as in Example C1 except that the types of EBDM and the amounts of carbon black, "Asahi #60G" were changed as described in Table 7.

A sheet was created in the same way as in Example C1, the hardness test, tension test, the calculation of cross-linking density, thermal aging resistance test, Gehman torsion test, T-R test, low temperature flexibility test and storage modulus test were performed. Further, as in Example C1, a test piece for the compression set (CS) test was created, and the compression set was measured. The results are shown in Table 8.

The type of EBDM and the amount of carbon black, "Asahi #60G" for each Example C are shown in Table 7.

C1, a test piece for the compression set (CS) test was created, and the compression set was measured. The results are shown in Table 9.

EPDM 14030 is an ethylene.propylene.ENB copolymer produced by Mitsui Chemicals, Inc., in which the Mooney viscosity $(ML_{(1+4)}125°$ C.)=17, the Mooney viscosity $(ML_{(1+4)}100°$ C.)=26, the ethylene content=51% by mass, and the ENB content=8.1% by mass.

EP331 is an ethylene.propylene.ENB copolymer produced JSR Corporation, in which the Mooney viscosity $(ML_{(1+4)}125°$ C.)=23, the Mooney viscosity $(ML_{(1+4)}100°$ C.)=35, the ethylene content=47%, the ENB content=11.3%, and the amount of oil extension=0 (PHR).

Comparative Examples C3 to 6

Sheeting was performed after 8 minute-kneading of 100 parts by mass of silicone rubber and 2 parts by mass of a gray paste (produced by Shin-Etsu Chemical Co., Ltd.) containing 2,5-dimethyl-2,5-bis(tertiarybutylperoxy)hexane by about 25%, wherein the roll temperature of the front roll/rear roll was 30° C./30° C., the roll peripheral speed of the front roll/rear roll was 18 rpm/15 rpm, and the roll gap was 3 mm, to obtain a silicone rubber compound(compound). The resulting compound was measured for the Mooney viscosity and the vulcanization characteristic evaluation in the same way as in Example C1.

This compound was cross-linked at 180° C. for 10 minutes, using a press-molding machine to prepare a sheet (vulcanized material) having a thickness of 2 mm. For the resulting sheet, as in Example C1, the hardness test, tension test, thermal aging resistance test, Gehman torsion test, T-R test, low temperature flexibility test and storage modulus test were performed.

In addition, a molding machine equipped with a cylindrical die was used to vulcanize the compound at 180° C. for 13 minutes to create a right cylindrical test piece having a

TABLE 7

| | Example C1 | Example C2 | Example C3 | Example C4 | Example C5 | Example C6 | Example C7 | Example C8 | Example C9 | Example C10 |
|---|---|---|---|---|---|---|---|---|---|---|
| EBDM | EBDM-1 | EBDM-2 | EBDM-3 | EBDM-4 | EBDM-4 | EBDM-4 | EBDM-4 | EBDM-4 | EBDM-5 | EBDM-6 |
| Asahi #60G [parts] | 40 | 40 | 40 | 10 | 20 | 40 | 60 | 80 | 40 | 40 |

Comparative Examples C1, 2

The compound 1 and the compound 2 were obtained for Comparative Examples C1 and 2 each in the same way as in Example C1 except that EBDM-1 was changed to EPDM 14030 (Comparative Example C1) and EP331 (Comparative Example C2).

A sheet was created in the same way as in Example C1, the hardness test, tension test, the calculation of cross-linking density, thermal aging resistance test, Gehman torsion test, T-R test, low temperature flexibility test and storage modulus test were performed. Further, as in Example thickness of 12.7 mm and a diameter of 29 mm, and a test piece for the compression set (CS) test (vulcanized material) was obtained to measure the compression set as in Example C1.

For silicone rubber, KE-941-U (density(23° C.) 1.11 g/cm$^3$) (Comparative Example C3), KE-951-U (density(23° C.) 1.14 g/cm$^3$) (Comparative Example C4), KE-971-U (density(23° C.) 1.30 g/cm$^3$) (Comparative Example C5), and KE-981-U (density(23° C.) 1.42 g/cm$^3$) (Comparative Example C6) (all of which are produced by Shin-Etsu Chemical Co., Ltd.) were used.

The results are shown in Table 9.

TABLE 8

|  |  | Example C1 | Example C2 | Example C3 | Example C4 | Example C5 | Example C6 | Example C7 | Example C8 | Example C9 | Example C10 |
|---|---|---|---|---|---|---|---|---|---|---|---|
| <<Unvulcanized Rubber Properties>> | | | | | | | | | | | |
| ML(1 + 4)100° C. | — | 74 | 45 | 26 | 18 | 22 | 36 | 64 | — | 50 | 38 |
| MDR(180° C. × 15 min) | | | | | | | | | | | |
| TC90 | min | 3.1 | 3.0 | 3.4 | 3.9 | 3.6 | 3.4 | 3.3 | 4.1 | 2.9 | 3.3 |
| TS1 | min | 0.4 | 0.4 | 0.4 | 0.7 | 0.6 | 0.4 | 0.3 | 0.3 | 0.4 | 0.4 |
| S' Max-S' Min | dNm | 21.8 | 11.9 | 16.8 | 10.1 | 12.3 | 18.1 | 23.7 | 26.4 | 17.6 | 18.1 |
| <<Vulcanized Rubber Properties>> | | | | | | | | | | | |
| Hardness (Duro-A) | — | 66 | 58 | 63 | 46 | 50 | 64 | 74 | 78 | 63 | 65 |
| M25 | MPa | 0.94 | 0.61 | 0.75 | 0.42 | 0.50 | 0.79 | 1.18 | 1.64 | 0.80 | 0.79 |
| M50 | MPa | 1.51 | 0.94 | 1.24 | 0.68 | 0.82 | 1.29 | 2.03 | 3.39 | 1.31 | 1.30 |
| M100 | MPa | 2.98 | 1.69 | 2.45 | 1.08 | 1.38 | 2.65 | 4.87 | 9.40 | 2.68 | 2.70 |
| M200 | MPa | 8.46 | 4.63 | 6.85 | 2.14 | 3.45 | 7.51 | 13.22 | | 7.69 | 7.00 |
| TB | MPa | 15.5 | 12.0 | 11.7 | 4.2 | 6.6 | 12.8 | 15.8 | 17.6 | 12.2 | 12.8 |
| EB | % | 309 | 395 | 297 | 301 | 296 | 287 | 243 | 168 | 273 | 280 |
| <Cross-linking Density> | Cross-linkage/cc | 1.4E+20 | 7.6E+19 | 1.1E+20 | 8.1E+19 | 9.2E+19 | 1.2E+20 | 1.5E+20 | 2.1E+20 | 1.3E+20 | 1.2E+20 |
| <Thermal Aging Resistance> 150° C. × 168 h | | | | | | | | | | | |
| Hardness (Duro-A) | — | 70 | 65 | 70 | 49 | 56 | 70 | 81 | 85 | 71 | 71 |
| TB | MPa | 15.9 | 13.0 | 12.8 | 4.7 | 7.8 | 13.4 | 16.9 | 17.2 | 14.4 | 13.4 |
| EB | % | 314 | 411 | 285 | 303 | 303 | 278 | 228 | 155 | 290 | 269 |
| AH (Duro-A) | — | 4 | 7 | 7 | 3 | 6 | 6 | 7 | 7 | 8 | 6 |
| Ac (TB) | % | 2 | 8 | 9 | 13 | 17 | 5 | 7 | -2 | 17 | 5 |
| Ac (EB) | % | 2 | 4 | -4 | 1 | 2 | -3 | -6 | -8 | 6 | -4 |
| <Gehman Torsion Test> | | | | | | | | | | | |
| T2 | ° C. | -51 | -40 | -40 | -45 | -44 | -41 | -39 | -36 | -41 | -39 |
| T5 | ° C. | -59 | -47 | -46 | -49 | -48 | -47 | -46 | -45 | -46 | -45 |
| T10 | ° C. | -61 | -50 | -49 | -50 | -50 | -50 | -50 | -49 | -57 | -47 |
| <Compression Set> | | | | | | | | | | | |
| 125° C. × 72 h | % | 9 | 14 | 16 | 9 | 8 | 15 | 9 | 8 | 10 | 11 |
| 0° C. × 22 h | % | 11 | 11 | 11 | 8 | 8 | 10 | 9 | 8 | 8 | 8 |
| -40° C. × 22 h | % | 40 | 43 | 40 | 27 | 27 | 36 | 32 | 34 | 28 | 32 |
| -50° C. × 22 h | % | 67 | 76 | 77 | 62 | 68 | 74 | 79 | 80 | 73 | 79 |
| <T-R Test> | | | | | | | | | | | |
| TR10 | ° C. | -62 | -52 | -51 | -52 | -52 | -52 | -51 | -51 | -52 | -49 |
| TR30 | ° C. | -57 | -48 | -47 | -49 | -48 | -48 | -46 | -45 | -48 | -45 |
| TR50 | ° C. | -50 | -42 | -42 | -46 | -45 | -44 | -42 | -40 | -44 | -42 |
| TR70 | ° C. | -38 | -35 | -34 | -39 | -39 | -37 | -34 | -33 | -38 | -35 |
| <tanδ-Tg> | ° C. | -51 | -41 | -41 | -41 | -41 | -41 | -41 | -40 | -41 | -39 |
| <Storage Modulus> -40° C. | Pa | 9.3.E+06 | 3.8.E+07 | 4.5.E+07 | 1.5.E+07 | 1.8.E+07 | 3.7.E+07 | 7.8.E+07 | 9.6.E+07 | 4.5.E+07 | 7.6.E+07 |

TABLE 9

|  |  | Comparative Example C1 | Comparative Example C2 | Comparative Example C3 | Comparative Example C4 | Comparative Example C5 | Comparative Example C6 |
|---|---|---|---|---|---|---|---|
| <<Unvulcanized Rubber Properties>> | | | | | | | |
| ML(1 + 4)100° C. | — | 51 | 63 | 16 | 19 | 29 | 61 |
| MDR (180° C. × 15 min) | | | | | | | |
| TC90 | min | 4.0 | 3.9 | 1.4 | 1.1 | 1.0 | 0.9 |
| TS1 | min | 0.4 | 0.4 | 0.4 | 0.4 | 0.3 | 0.3 |
| S' Max-S' Min | dNm | 23.2 | 24.2 | 7.2 | 10.3 | 19.8 | 31.0 |

TABLE 9-continued

|  |  | Comparative Example C1 | Comparative Example C2 | Comparative Example C3 | Comparative Example C4 | Comparative Example C5 | Comparative Example C6 |
|---|---|---|---|---|---|---|---|
| <<Vulcanized Rubber Properties>> | | | | | | | |
| Hardness (Duro-A) | | — | 68 | 68 | 35 | 47 | 68 | 81 |
| M25 | MPa | 1.00 | 0.99 | 0.28 | 0.40 | 0.99 | 2.24 |
| M50 | MPa | 1.82 | 1.68 | 0.44 | 0.64 | 1.85 | 3.94 |
| M100 | MPa | 3.34 | 3.84 | 0.75 | 1.21 | 3.22 | 5.48 |
| M200 | MPa | 9.60 | 12.27 | 1.70 | 2.75 | 4.83 | |
| TB | MPa | 16.5 | 15.7 | 8.5 | 8.2 | 6.2 | 5.6 |
| EB | % | 273 | 231 | 523 | 410 | 276 | 119 |
| <Cross-linking Density> | Cross-linkage/cc | 1.5E+20 | 1.9E+20 | | | | |
| <Thermal Aging Resistance> 150° C. × 168 h | | | | | | | |
| Hardness (Duro-A) | | — | 72 | 74 | 37 | 50 | 71 | 86 |
| TB | MPa | 16.5 | 18.0 | 7.9 | 7.9 | 6.9 | 8.0 |
| EB | % | 274 | 237 | 467 | 369 | 240 | 88 |
| AH(Dura-A) | | — | 4 | 6 | 2 | 3 | 3 | 5 |
| Ac(TB) | % | 0 | 15 | −7 | −4 | 11 | 43 |
| Ac(EB) | % | 0 | 3 | −11 | −10 | −13 | −26 |
| <Gehman Torsion Test> | | | | | | | |
| T2 | ° C. | −44 | −40 | −44 | −44 | −45 | −46 |
| T5 | ° C. | −50 | −44 | −45 | −45 | −46 | −50 |
| T10 | ° C. | −57 | −45 | −46 | −47 | −49 | −51 |
| <Compression Set> | | | | | | | |
| 125° C. × 72 h | % | 10 | 8 | 8 | 8 | 7 | 21 |
| 0° C. × 22 h | % | 10 | 9 | 4 | 4 | 4 | 7 |
| −40° C. × 22 h | % | 49 | 39 | 9 | 8 | 19 | 13 |
| −50° C. × 22 h | % | 89 | 97 | 94 | 98 | 99 | 98 |
| <T-R Test> | | | | | | | |
| TR10 | ° C. | −51 | −45 | −41 | −41 | −41 | −49 |
| TR30 | ° C. | −46 | −42 | −41 | −40 | −39 | −43 |
| TR50 | ° C. | −40 | −39 | −40 | −40 | −38 | −42 |
| TR70 | ° C. | −33 | −35 | −40 | −39 | −37 | −40 |
| <tanδ-Tg> | ° C. | −41 | −36 | | | | |
| <Storage Modulus>−40° C. | Pa | 1.9.E+07 | 1.8.E+08 | 2.8.E+07 | 1.9.E+07 | 3.9.E+07 | 3.5.E+07 |

The comparison of Example C with Comparative Example C (Comparative Examples C1, 2) in which EPDM was used shows that when Example C1 and Comparative Examples C1, 2 have the similar values for hardness, the resulting sheet in Example C1 has lower $T_2$(° C.), $T_5$(° C.), and $T_{10}$(° C.) in Gehman torsion test, which indicates that the resulting sheet in Example 1 is superior in low temperature flexibility. The results of the T-R test (especially the results of TR10) show that the resulting sheet in Example C1 is superior in cold resistance.

Furthermore, the comparison of Example C with Comparative Example C (Comparative Examples C3 to 6) in which a silicone rubber compound was used indicates that when Example C and Comparative Example C have similar values for hardness, as seen in the results of the T-R test (especially the results of TR10), the resulting sheets in Example C are superior in cold resistance, and TB and EB also tend to have good results.

Hereinafter, for the present invention 2-2, the present invention will be described more in detail by use of Examples, the present invention 2-2 is not to be limited to these Examples.

In the description below of Example D, "parts" means "parts by mass" unless otherwise specified.

<<Ethylene.α-Olefin.Non-Conjugated Polyene Copolymers (1), (2)>>

[Molar Amount of Each Structural Unit]

For the copolymers (1) and (2), molar amounts of the structural units derived from the ethylene, the structural units derived from the α-olefin, and the structural units derived from the non-conjugated polyene were determined by the intensity measurement with a $^1$H-NMR spectrometer.

[Mooney Viscosity]

Mooney viscosity $ML_{(1+4)}$125° C. and Mooney viscosity $ML_{(1+4)}$100° C. were measured according to JIS K 6300 (1994), using a Mooney viscometer (produced by SHIMADZU CORPORATION, Model SMV202).

[B value]

The measurement solvent was o-dichlorobenzene-$d_4$/benzene-$d_6$ (4/1 [v/v]). The 13C-NMR spectrum (100 MHz, produced by JEOL LTD., ECX400P) was measured according to the following equation (i) to determine the B value.

$$B \text{ value}=([EX]+2[Y])/[2\times[E]\times([X]+[Y])] \quad (i)$$

In the case of the above copolymer (1), [E], [X] and [Y] are mole fractions of the ethylene [A], a $C_4$-$C_{20}$ α-olefin [B] and a non-conjugated polyene [C] respectively, and [EX] is the ethylene [A]-$C_4$-$C_{20}$ α-olefin [B] diad chain fraction; and in the case of above copolymer (2), [E], [X] and [Y] are mole fractions of ethylene [A'], $C_3$-$C_{20}$ α-olefin(s) [B'], and non-conjugated polyene(s) [C'] respectively, and [EX] is the ethylene [A']-$C_3$-$C_{20}$ α-olefin(s) [B'] diad chain fraction.

Synthesis of Transition-Metal Compound

Synthesis of [bis(4-methoxyphenyl)methylene($\eta^5$-cyclopentadienyl) ($\eta^5$-2,3,6,7-tetramethylfluorenyl)] hafnium dichloride (catalyst-a1)

(i) Synthesis of 6,6-bis(4-methoxyphenyl)fulvene

In nitrogen atmosphere, to a 500 ml three-neck flask, 8.28 g (115 mmol) of lithium cyclopentadienide, and 200 ml of dehydrated THF (tetrahydrofuran) were added. With the mixture cooled in an ice bath, 13.6 g (119 mmol) of DMI (1,3-dimethyl-2-imidazolidinone) was added. The mixture was stirred at room temperature for 30 minutes. Thereafter, 25.3 g (105 mol) of 4,4'-dimethoxybenzophenone was added. The mixture was stirred under heat refluxing for 1 week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel. The organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane:ethyl acetate=4:1). As a result, a red solution was obtained. The solvent was distilled off under reduced pressure. As a result, 9.32 g (32.1 mmol, 30.7%) of 6,6-bis(4-methoxyphenyl)fulvene was obtained as an orange solid. 6,6-bis(4-methoxyphenyl)fulvene was identified by $^1$H NMR spectrum. A measured value thereof is shown below. $^1$H NMR spectrum (270 MHz, CDCl$_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl) (cyclopentadienyl) (2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of a n-butyllithium/hexane solution (1.63 M) was gradually added. The mixture was stirred at room temperature for 18 hours. 591 mg (2.03 mmol) of 6,6-bis(4-methoxyphenyl) fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl) (cyclopentadienyl) (2,3,6,7-tetramethylfluorenyl)methane was obtained. bis(4-methoxyphenyl) (cyclopentadienyl) (2,3,6,7-tetramethylfluorenyl) methane was identified by FD-MS spectrum. A measured value thereof is shown below. FD-MS spectrum: M/z 512 (M$^+$)

(iii) Synthesis of [bis(4-methoxyphenyl)methylene ($\eta^5$-cyclopentadienyl) ($\eta^5$-2,3,6,7-tetramethylfluorenyl)]hafnium dichloride In nitrogen atmosphere, to a 100 ml Schlenk flask, 272 mg (0.531 mmol) of bis(4-methoxyphenyl)(cyclopentadienyl) (2,3,6,7-tetramethylfluorenyl)methane, 20 ml of dehydrated toluene, and 90 μl (1.1 mmol) of THF were sequentially added. With the mixture cooled in an ice bath, 0.68 ml (1.1 mmol) of a n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl) ($\eta^5$-2,3,6,7-tetramethylfluorenyl)]hafnium dichloride was obtained as a yellow solid. [bis(4-methoxyphenyl)methylene($\eta^5$-cyclopentadienyl) ($\eta^5$-2,3,6,7-tetramethylfluorenyl)]hafnium dichloride was identified by $^1$H NMR spectrum and FD-MS spectrum. A measured value thereof is shown below. $^1$H NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H) FD-MS spectrum: M/z 760 (M$^+$)

Synthesis Example D1

Polymerization reaction of ethylene, 1-butene, and 5-ethylidene-2-norbornene (ENB) was carried out continuously at 95° C., using a polymerization reactor having a volume of 300 L and provided with a mixing blade.

Hexane (feed amount: 27 L/h) was used as a polymerization solvent and continuously fed into the polymerization reactor such that the amount of feed of ethylene was 3.5 kg/h, the amount of feed of 1-butene was 13 kg/h, the amount of feed of ENB was 1100 g/h, and the amount of feed of hydrogen was 4 NL/h.

The polymerization pressure and the polymerization temperature were maintained at 1.6 MPaG and 95° C. respectively while the above-mentioned catalyst-a1 was used as a main catalyst and continuously fed into the polymerization reactor in an amount of feed of 0.088 mmol/h. Additionally, (C$_6$H5)$_3$CB(CF$_5$)$_4$ (CB-3) as a cocatalyst in an amount of feed of 0.440 mmol/h and triisobutylaluminum (TIBA) as an organoaluminium compound in an amount of feed of 10 mmol/h were each fed into the polymerization reactor continuously.

Thus, a solution containing 19% by mass of the ethylene.1-butene.ENB copolymer formed from ethylene, 1-butene, and ENB was obtained. To the polymerization reaction liquid drawn from the lower portion of the polymerization reactor was added a small amount of methanol to terminate the polymerization reaction. The ethylene.1-butene.ENB copolymer was separated from the solvent by a steam stripping treatment, and then dried at 80° C. under reduced pressure for one whole day and night.

By the above procedure, the ethylene.1-butene.ENB copolymer (EBDM-1) formed from ethylene, butene, and ENB was obtained at a rate of 6.7 kg per hour.

Properties of the resulting EBDM-1 were measured in the method described above. The results are shown in Table 10.

TABLE 10

|  |  | Synthesis Example D1 |
|---|---|---|
| Copolymer |  | EBDM-1 |
| <Polymerization Conditions> |  |  |
| Reactor Volume | L | 300 |
| Main Catalyst |  | Catalyst-a1 |
| Polymerization Temperature | ° C. | 95 |
| Polymerization Pressure | MPaG | 1.6 |
| Feed of Hexane | L/h | 27 |
| Feed of Ethylene | kg/h | 3.5 |
| Feed of 1-Butene | kg/h | 13 |
| FEED OF ENB | g/h | 1100 |
| Feed of Hydrogen | NL/h | 4 |
| Feed of Main Catalyst | mmol/h | 0.088 |
| FEED OF CB-3 | mmol/h | 0.440 |
| FEED OF TIBA | mmol/h | 10 |
| Polymer Concentration | wt % | 19 |
| Production Rate | kg/h | 6.7 |
| <Condition of Drying Under Reduced Pressure> |  |  |
| Drying Temperature | ° C. | 80 |
| <Polymer Property> |  |  |
| Ethylene Content | mol % | 55.2 |
| 1-Butene Content | mol % | 42.1 |
| (1) Ethylene Content/1-Butene Content | Molar Ratio | 57/43 |
| (2) ENB Content | mol % | 2.7 |
| (3) ML(1 + 4)125° C. |  | 14 |
| (4) B value |  | 1.29 |

Example D1

Using MIXTRON BB MIXER (produced by Kobe Steel, LTD., Model BB-2, volume 1.7 L, rotor 2WH), 8 parts of zinc oxide, "META-Z102" (trade name; produced by Inoue Calcium Corporation) serving as a vulcanizing aid, 2 parts of stearic acid serving as a processing aid, 1 part of polyethylene glycol, "PEG #4000" (trade name; produced by Lion Corporation) serving as an activator, 30 parts of SRF grade carbon black, "Asahi 50G" (trade name; produced by ASAHI CARBON CO., LTD.) serving as a reinforcing agent, 150 parts of heavy calcium carbonate, "Whiton SB" (trade name; produced by SHIRAISHI CALCIUM KAISHA, LTD.) serving as an inorganic filler, 50 parts of paraffin-based oil, "Diana process oi PS-430" (trade name; produced by Idemitsu Kosan Co., Ltd) serving as a softener were blended with 100 parts of a rubber component composed of 20 parts of the ethylene.1-butene.ENB copolymer (EBDM-1) resulted from Synthesis Example D1 and 80 parts of "Mitsui EPT 8030M" (produced by Mitsui Chemicals, Inc.), and then the mixture was kneaded to obtain the compound 1.

For the kneading condition, the number of revolutions of the rotor was 40 rpm, the floating weight pressure was 3 kg/cm², the kneading time was 5 minutes, and the kneading discharge temperature was 144° C.

<Non-Foamed Cross-Linked Material>

After it was ascertained that the compound 1 reached the temperature of 40° C., using a 6 inch-roll, 1.5 parts of "Sanceler M," 1.5 parts of "Sanceler BZ," 1.5 parts of "Sanceler PZ," and 1.5 parts of "Sanceler BUR" (all of which are trade names; produced by SANSHIN CHEMICAL INDUSTRY CO. LTD.) serving as a vulcanizing accelerator as well as 1.5 parts of sulfur serving as a cross-linking agent (vulcanizing agent) were added to the compound 1, and the resulting mixture was kneaded to obtain a compound 2.

For the kneading condition, the roll temperature was of the front roll/rear roll was 50° C./50° C., the roll peripheral speed of the front roll/rear roll was 18 rpm/15 rpm, and the roll gap was 3 mm. Sheeting was performed after 8 minute-kneading to obtain the compound 2.

Using a press molding machine, the resulting compound 2 was vulcanized at 180° C. for 5 minutes to obtain a non-foamed cross-linked sheet of 2 mmt.

<Cross-Linked Foam>

After it was ascertained that the compound 1 reached the temperature of 40° C., using a 14 Inch-roll, 1.5 parts of "Sanceler M," 1.5 parts of "Sanceler BZ," 1.5 parts of "Sanceler PZ," and 1.5 parts of "Sanceler BUR" (all of which are trade names; produced by SANSHIN CHEMICAL INDUSTRY CO. LTD.) serving as a vulcanizing accelerator, 1.5 parts of sulfur serving as a cross-linking agent (vulcanizing agent) and 35 parts of azodicarbonamide serving as a foaming agent, and 1 part of urea as a foaming aid were added to the compound 1, and the resulting mixture was kneaded to obtain a compound 3.

For the kneading condition, the roll temperature of the front roll/rear roll was 80° C./80° C., the roll peripheral speed of the front roll/rear roll was 18 rpm/15 rpm, and the roll gap was 3 mm. Sheeting was performed after 10 minute-kneading to obtain the compound 3.

The resulting compound 3 was extruded, using an extruder having a diameter of 60 mm equipped with a tabular die (4 mm long, 20 mm wide) under the condition of the die temperature of 80° C. and the cylinder temperature of 70° C. and was formed into a tabular shape. Simultaneously with the forming, the resulting molded article was introduced in a hot air vulcanization device (HAV) and heated at a temperature of 180° C. for 8 minutes to vulcanize and foam the molded article, and a tabular sponge was obtained.

Example D2, Comparative Examples D1 and 2

The compounds 1 to 3 were obtained for each of Example D2 and Comparative Examples D1 to 2 in the same method as in Example D1 except that the rubber components were changed as described in Table 11. As in Example D1, a non-foamed cross-linked sheet of 2 mmt and a tabular sponge were created to carry out a variety of evaluations.

Details of the products used as the rubber components are as follows.

EPT 8030M: produced by Mitsui Chemicals, Inc., "Mitsui EPT 8030M" (trade name), EPDM, ethylene content=47%, diene content=9.5%, Mooney viscosity $ML_{(1+4)}100°$ C.=32, the amount of oil extension=0 (PHR).

The B value of EPT 8030M was 1.0.

BUTYL 268: produced JSR Corporation "JSR BUTYL 268" (trade name), butyl rubber, specific gravity: 0.92 g/cm³, degree of unsaturation: 1.5 mol %, Mooney viscosity $ML_{(1+8)}125°$ C.=51.

The property values of the above products are catalog values except the B value.

[Properties of Compound 1]
[Mooney Viscosity]

The compound 1 was used to measure the Mooney viscosity $ML_{(1+4)}100°$ C. according to JIS K 6300 (1994), using a Mooney viscometer (SHIMADZU CORPORATION, Model SMV202).

[Probe Tack Test]

The probe tack was measured according to JIS Z 3284, using a TAC-II produced by RHESCA Co., Ltd. The condition was as follows: Temperature: 50° C., Immersion speed: 120 mm/min, Preload: 600 gf, Test speed: 120 mm/min and Press time: 60 s.

[Properties of Non-Foamed Cross-Linked Sheet of 2 mmt]
[Hardness Test (Shore A)]

The non-foamed cross-linked sheet of 2 mmt was used to measure the shore A hardness according to JIS K 6253. Using a measurement device type A, immediately after the pressing needle was touched, the scale was read.

[Low Temperature Flexibility Test: Tg (Low Temperature Flexibility)]

A strip-shaped sample having a width of 10 mm, a thickness of 2 mm and a length of 30 mm was prepared from the non-foamed cross-linked sheet of 2 mmt. Using this sample, the temperature dispersion (−70° C. to 25° C.) of the viscoelasticity was measured under the condition of the strain of 0.5% and the frequency of 1 Hz by use of ARES produced by TA Instruments. Tg (° C.) was obtained by reading the peak temperature from the temperature-dependent curve of tan δ. Additionally, tan δ at 25° C. was measured.

[Properties of Compound 3]
[Minimum Viscosity (Vm), and Scorch Time (Min)]

The property test of the unvulcanized composition was carried out according to JIS K 6300. Specifically, using a Mooney viscometer (produced by SHIMADZU CORPORATION, Model SMV202), a change in the Mooney viscosity at 110° C. of the compounds 3 resulted from Example D and Comparative Example D were measured. The minimum viscosity (Vm) was obtained at the start of the measurement, and the time for the minimum viscosity (Vm) to increase by 5 points was obtained as a scorch time (t5, min).

[Properties of Cross-Linked Foam (Tabular Sponge)]
[Specific Gravity]

The tabular sponge was cut into a shape of a sheet, and a test piece of 20 mm×20 mm was stamped out. Stains on the surface were wiped off with alcohol. This test piece was mounted on an automatic densimeter (produced by Toyo Seiki Seisaku-sho, LTD.): Model M-1) under the atmosphere at 25° C. The specific gravity was measured on the basis of the difference between the mass in the air and the mass in pure water.

[Sound Transmission Loss]

A test piece having a diameter of 29 mm and a thickness of 11 mm was stamped out from the tabular sponge. Using a 4206-T acoustic tube (produced by Bruel&Kjaer) having an inner diameter of 29 mm, and a software for measurement (PULSE Material Testing Type 7758, produced by Bruel&Kjaer), the normal incidence transmission loss was measured, and the sound transmission loss at 500 to 5000 Hz was obtained. The results are shown in FIG. 1.

TABLE 11

| | Comparative Example D1 | Example D1 | Example D2 | Comparative Example D2 |
|---|---|---|---|---|
| <Rubber Component Blend/phr> | | | | |
| EPT8030M | 100 | 80 | 70 | 80 |
| EBDM-1(Synthesis Example 1) | | 20 | 30 | |
| BUTYL268 | | | | 20 |
| <Property of Compound 1 for Cross-Linked Material> | | | | |
| ML(1 + 4)100° C. | 19 | 16 | 16 | 18 |
| Probe Tack (gf) | 252 | 303 | 314 | 314 |
| <Property of Non-foamed Cross-linked Sheet of 2 mmt > | | | | |
| Hardness (Shore A) | 45 | 45 | 45 | 45 |
| Tg ° C. | −35 | −38 | −39 | −37 |
| Tanδ (25° C., 1 Hz) | 0.10 | 0.14 | 0.12 | 0.16 |
| <Property of Compound 3 for Cross-linked Foam> | | | | |
| Vm (110° C.) | 19 | 18 | 16 | 20 |
| t5 (110° C.) min | 6.8 | 6.6 | 6.7 | 7.1 |
| <Property of Tabular Sponge> | | | | |
| Specific Gravity (HAV: 180° C. × 8 min) | 0.06 | 0.07 | 0.07 | 0.08 |
| Sound Transmission Loss (2500 Hz) dB | 10.5 | 13.8 | 13.5 | 12.8 |

Compared to Comparative Example D1 in which EPT 8030M was blended, in Comparative Example D2 in which BUTYL 268 as well as EPT 8030M were blended, the Mooney viscosity is smaller, but the specific gravity is greater. On the other hand, in Example D in which EPT 8030M and EBDM-1 were blended, the Mooney viscosity and minimum viscosity are small, which indicates excellent roll processability. The sound insulation performance is excellent since the sound transmission loss is high. Moreover, the specific gravity is small. Therefore, Example D exhibits an excellent balance between processability, sound insulation performance and specific gravity.

For the present invention 2-3, the present invention will be described below more in detail by use of Examples. However, the present invention 2-3 is not to be limited to these Examples.

In the description below of Example E, "parts" means "parts by mass" unless otherwise specified.

<<Ethylene.α-Olefin.Non-Conjugated Polyene Copolymer>>

[Molar Amount of Each Structural Unit]

Molar amounts of the structural units derived from ethylene [A], the structural units derived from the α-olefin [B], and the structural units derived from the non-conjugated polyene [C] were determined by the intensity measurement with a ¹H-NMR spectrometer.

[Mooney Viscosity]

Mooney viscosity $ML_{(1+4)}$ 125° C. was measured according to JIS K 6300 (1994), using the Mooney viscometer (produced by SHIMADZU CORPORATION, Model SMV202).

[B Value]

The measurement solvent was o-dichlorobenzene-$d_4$/benzene-$d_6$ (4/1 [v/v]). The $^{13}$C-NMR spectrum (100 MHz, produced by JEOL LTD., ECX400P) was measured based on the following equation (i) to determine the B value.

$$B \text{ value} = ([EX] + 2[Y])/[2 \times [E] \times ([X] + [Y])] \quad (i)$$

wherein [E], [X] and [Y] are mole fractions of the ethylene [A], the $C_4$-$C_{20}$ α-olefin [B] and the non-conjugated polyene [C] respectively, and [EX] is the ethylene [A]-$C_4$-$C_{20}$α-olefin [B] diad chain fraction.

Synthesis of Transition-Metal Compound

Synthesis of [bis(4-methoxyphenyl)methylene($\eta^5$-cyclopentadienyl) ($\eta^5$-2,3,6,7-tetramethylfluorenyl)] hafnium dichloride (catalyst-a1)

(i) Synthesis of 6,6-bis(4-methoxyphenyl)fulvene

In nitrogen atmosphere, to a 500 ml three-neck flask, 8.28 g (115 mmol) of lithium cyclopentadienide, and 200 ml of dehydrated THF (tetrahydrofuran) were added. With the mixture cooled in an ice bath, 13.6 g (119 mmol) of DMI (1,3-dimethyl-2-imidazolidinone) was added. The mixture was stirred at room temperature for 30 minutes. Thereafter, 25.3 g (105 mol) of 4,4'-dimethoxybenzophenone was added. The mixture was stirred under heat refluxing for 1 week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel. The organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane:ethyl acetate=4:1). As a result, a red solution was obtained. The solvent was distilled off under reduced pressure. As a result, 9.32 g (32.1 mmol, 30.7%) of 6,6-bis(4-methoxyphenyl)fulvene was obtained as an orange solid. 6,6-bis(4-methoxyphenyl)fulvene was identified by $^1$H NMR spectrum. A measured value thereof is shown below. $^1$H NMR spectrum (270 MHz, $CDCl_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl) (cyclopentadienyl) (2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of a n-butyllithium/hexane solution (1.63 M) was gradually added. The mixture was stirred at room temperature for 18 hours. 591 mg (2.03 mmol) of 6,6-bis(4-methoxyphenyl)fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl)(cyclopentadienyl)(2,3,6,7-tetramethylfluorenyl)methane was obtained. bis(4-methoxyphenyl) (cyclopentadienyl) (2,3,6,7-tetramethylfluorenyl)methane was identified by FD-MS spectrum. A measured value thereof is shown below. FD-MS spectrum: M/z 512 (M.)

(iii) Synthesis of [bis(4-methoxyphenyl)methylene ($\eta^5$-cyclopentadienyl) ($\eta^5$-2,3,6,7-tetramethylfluorenyl)]hafnium dichloride In nitrogen atmosphere, to a 100 ml Schlenk flask, 272 mg (0.531 mmol) of bis(4-methoxyphenyl) (cyclopentadienyl) (2,3,6,7-tetramethylfluorenyl)methane, 20 ml of dehydrated toluene, and 90 μl (1.1 mmol) of THF were sequentially added. With the mixture cooled in an ice bath, 0.68 ml (1.1 mmol) of a n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl) ($\eta^5$-2,3,6,7-tetramethylfluorenyl)]hafnium dichloride was obtained as a yellow solid. [bis(4-methoxyphenyl)methylene($\eta^5$-cyclopentadienyl) ($\eta^5$-2,3,6,7-tetramethylfluorenyl)]hafnium dichloride was identified by $^1$H NMR spectrum and FD-MS spectrum. A measured value thereof is shown below. $^1$H NMR spectrum (270 MHz, $CDCl_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H) FD-MS spectrum: M/z 760 ($M^+$)

Synthesis Example E1

Using a polymerization reactor having a volume of 300 L and provided with a mixing blade, the polymerization reaction of ethylene, 1-butene, and 5-ethylidene-2-norbornene (ENB) was carried out continuously at 95° C.

Hexane (feed amount: 32 L/h) was used as a polymerization solvent and continuously fed into the polymerization reactor so that the amount of feed of ethylene was 3.2 kg/h, the amount of feed of 1-butene was 12 kg/h, the amount of feed of ENB was 520 g/h, and the amount of feed of hydrogen was 0 NL/h.

While the polymerization pressure and the polymerization temperature were maintained at 1.6 MPaG and 95° C. respectively, the above catalyst-a1 was used as a main catalyst and fed continuously into the polymerization reactor in an amount of feed of 0.030 mmol/h. Additionally, $(C_6H_5)_3CB(C_6F_5)_4$ (CB-3) as a cocatalyst in an amount of feed of 0.15 mmol/h and triisobutylaluminum (TIBA) as an organo-aluminium compound in an amount of feed of 10 mmol/h were continuously fed into the polymerization reactor.

Thus, a solution containing 15% by mass of the ethylene.1-butene.ENB copolymer formed from ethylene, 1-butene, and ENB was obtained. To the polymerization reaction liquid drawn from the lower portion of the polymerization reactor was added a small amount of methanol to terminate the polymerization reaction, ethylene.1-butene.ENB copolymer was separated from the solvent by a steam stripping treatment, and then dried under reduced pressure at 80° C. for one whole day and night.

By the above procedure, the ethylene.1-butene.ENB copolymer (EBDM-1) formed from ethylene, 1-butene, and ENB was obtained at a rate of 5.4 kg per hour.

Properties of the resulting EBDM-1 were measured in the method described above. The results are shown in Table 12.

Synthesis Examples E2, 3

An ethylene.1-butene.ENB copolymer (EBDM-2) for Synthesis Example E2 and an ethylene.1-butene.ENB copolymer (EBDM-3) for Synthesis Example E3 were obtained in the same manner as in Synthesis Example E1 except that the polymerization conditions were changed as described in Table 12.

TABLE 12

|  |  | Synthesis Example E1 | Synthesis Example E2 | Synthesis Example E3 |
|---|---|---|---|---|
| Ethylene-based Copolymers |  | EBDM-1 | EBDM-2 | EBDM-3 |
| <Polymerization Conditions> |  |  |  |  |
| Reactor Volume | L | 300 | 300 | 300 |
| Main Catalyst |  | Catalyst-a1 | Catalyst-a1 | Catalyst-a1 |
| Polymerization Temperature | ° C. | 95 | 95 | 95 |
| Polymerization Pressure | MPaG | 1.6 | 1.6 | 1.6 |
| Feed of Hexane | L/h | 32 | 33 | 33 |
| Feed of Ethylene | kg/h | 3.2 | 3.4 | 3.4 |
| Feed of 1-Butene | kg/h | 12 | 11 | 11 |
| FEED OF ENB | g/h | 520 | 450 | 450 |
| Feed of Hydrogen | NL/h | 0.0 | 0.8 | 0.5 |
| Feed of Main Catalyst | mmol/h | 0.030 | 0.019 | 0.020 |
| FEED OF CB-3 | mmol/h | 0.15 | 0.10 | 0.10 |
| FEED OF TIBA | mmol/h | 10 | 10 | 10 |
| Polymer Concentration | wt % | 15 | 14 | 14 |
| Production Rate | kg/h | 5.4 | 5.0 | 5.0 |
| <Condition of Drying Under Reduced Pressure> |  |  |  |  |
| Drying Temperature | ° C. | 80 | 80 | 80 |

TABLE 12-continued

|  |  | Synthesis Example E1 | Synthesis Example E2 | Synthesis Example E3 |
|---|---|---|---|---|
| <Copolymer Properties> |  |  |  |  |
| Ethylene Content | mol % | 56.05 | 59.13 | 60.16 |
| 1-Butene Content | mol % | 42.47 | 39.63 | 38.58 |
| (1)EthyleneContent/1-Butene Content | Molar Ratio | 57/43 | 60/40 | 61/39 |
| (2)ENB Content | mol % | 1.48 | 1.24 | 1.26 |
| (3)ML(1 + 4)125° C. |  | 83 | 71 | 82 |
| (4)B value |  | 1.29 | 1.29 | 1.28 |

Composition for Hose Forming

Example E1

Using MIXTRON BB MIXER (produced by Kobe Steel, LTD., Model BB-2, volume 1.7 L, rotor 2WH), 5 parts of zinc oxide, "META-Z102" (trade name; produced by Inoue Calcium Corporation) serving as a vulcanizing aid, 2 parts of stearic acid serving as a processing aid, 1 part of polyethylene glycol, "PEG #4000" (trade name; produced by Lion Corporation) serving as an activator, 2 parts of a mixture of N-substituted fatty acid amide and fatty acid calcium, "Struktol WB16" (trade name; produced by S&S JAPAN Co., Ltd.) serving as a processing aid, 90 parts of carbon black, "Asahi #60G" (trade name; produced by ASAHI CARBON CO., LTD.) serving as a reinforcing agent, 80 parts of "Dixie Clay" (trade name; produced by R.T.Vanderbilt) serving as an inorganic filler, 58 parts of paraffin-based process oil, "Diana process oil PW-380" (trade name; produced by Idemitsu Kosan Co., Ltd) serving as a softener were blended into 100 parts of the ethylene.1-butene.ENB copolymer(EBDM-1) resulted from Synthesis Example E1, and the resulting mixture was kneaded to obtain the compound 1.

For the kneading condition, the number of revolutions of the rotor was 40 rpm, the floating weight pressure was 3 kg/cm$^2$, the kneading time was 5 minutes, and the kneading discharge temperature was 144° C.

Then, after it was ascertained that the compound 1 reached the temperature of 40° C., using a 6 inch-roll, 1.8 parts of zinc dibutyldithiocarbamate, "Sanceler BZ," 0.5 parts of tetramethylthiuram disulfide, "Sanceler TT" and 0.5 parts of ethylenethiourea, "Sanceler 22-C" (all of which are trade names; produced by SANSHIN CHEMICAL INDUSTRY CO. LTD.) as a vulcanizing accelerator as well as 1.5 parts of morpholine disulfide, "Sanfel R" (trade name; produced by SANSHIN CHEMICAL INDUSTRY CO. LTD.) and 0.5 parts of sulfur as a cross-linking agent (vulcanizing agent) were added to the compound 1, and the resulting mixture was kneaded to obtain the compound 2.

For the kneading condition, the roll temperature of the front roll/rear roll was 50° C./50° C., the roll peripheral speed of the front roll/rear roll was 18 rpm/15 rpm, and the roll gap was 3 mm. Sheeting was performed after the kneading of 8 minutes to obtain the compound 2.

The compound 1 was press-molded at 150° C. for 3 minutes, using a die with a thickness of 3 mm (sheet for detachment: Lumirror®), and further press-molded at 50° C. for 120 minutes, using a die with a thickness of 2 mm (sheet for detachment: Teflon®) to obtain an unvulcanized rubber sheet having a thickness of 2 mm. In addition, the compound 2 was vulcanized at 170° C. for 15 minutes, using a press molding machine, to obtain a vulcanized rubber sheet having a thickness of 2 mm. Furthermore, using a cylindrical die, a right cylindrical test piece having a thickness of 12.7 mm and a diameter of 29 mm was made from the compound 2, and then vulcanized at 170° C. for 20 minutes to obtain a test piece for the compression set (CS) test. For the unvulcanized material and the resulting vulcanized material, unvulcanized material property test, hardness test, tension test, electrical property test, low temperature torsion test, and compression set test were performed in the following methods.

Examples E2 to 4, Comparative Examples E1 to 6

Compounds 1 and 2 were obtained for each of Examples E2 to 4 and Comparative Examples E1 to 6 in the same method as in Example E1 except that the blending composition was changed as described in Table 13. As in Example E1, a sheet and a test piece were created to carry out a variety of evaluations.

The details of rubber used in Comparative Example E are as follows.

3090EM: produced by Mitsui Chemicals, Inc., EPDM, ethylene content=48%, diene content=5.2%, Mooney viscosity $ML_{(1+4)}125°$ C.=59, the amount of oil extension=10 (PHR)

3062EM: produced by Mitsui Chemicals, Inc., EPDM, ethylene content=65%, diene content=4.5, Mooney viscosity $ML_{(1+4)}125°$ C.=43, the amount of oil extension=20 (PHR)

3110M: produced by Mitsui Chemicals, Inc., EPDM, ethylene content=56%, diene content=5.0, Mooney viscosity $ML_{(1+4)}125°$ C.=78, the amount of oil extension=0 (PHR)

EP27: produced JSR Corporation, EPDM, ethylene content=54.5%, ENB content=4%, Mooney viscosity $ML_{(1+4)}$ 125° C.=70, the amount of oil extension=0 (PHR)

EP96: produced JSR Corporation, EPDM, ethylene content=66%, ENB content=5.8%, Mooney viscosity $ML_{(1+4)}$ 125° C.=61, the amount of oil extension=50(PHR)

Es552: produced by Sumitomo Chemical Co., Ltd., ESPLENE EPDM, ethylene content=55%, diene content=4.0%, Mooney viscosity $ML_{(1+4)}125°$ C.=85, the amount of oil extension=0 (PHR)

The property values of the above products are catalog values.

[Unvulcanized Material Property Test 1: Minimum Viscosity (Vm) and Scorch Time (Min)]

The property test of the unvulcanized composition was performed according to JIS K 6300. Specifically, using a Mooney viscometer (produced by SHIMADZU CORPORATION, Model SMV202), a change in the Mooney viscosity at 125° C. of the compounds 2 resulted from Example E and Comparative Example E respectively were measured. The minimum viscosity (Vm) was obtained at the start of the measurement, and the time required for the minimum viscosity (Vm) to increase by 5 points or 35 points was obtained as a scorch time (t5, min) and scorch time (t35, min).

[Unvulcanized Material Property Test 2: Vulcanization Characteristic Evaluation]

The compounds 2 resulted from Example E and Comparative Example E were used to measure the vulcanization rate (TC90) as follows by use of a vulcanization measurement device: MDR2000 (produced by ALPHA TECHNOLOGIES).

The change in torque obtained under the condition of a certain temperature and a certain shear rate was measured. The time required for the torque value to reach 90% of the difference between the maximum torque value (S'Max) and the minimum torque value (S'Min) was considered as TC90 (min). For the measurement condition, the temperature was 170° C. and the time was 20 minutes. The smaller the TC90 is, the faster the vulcanization rate is.

[Unvulcanized Material Property Test 3: Green Strength (GS; 23° C.)]

The tension test was performed on the unvulcanized rubber sheets having a thickness of 2 mm resulted from Example E and Comparative Example E according to JIS K 6251 under the condition of a measurement temperature of 23° C. and a pulling rate of 500 mm/min to measure the strength at break (TB) and the elongation at break(EB).

[Hardness Test (Durometer-A)]

Flat portion of the vulcanized rubber sheets resulted from Example E and Comparative Example E were piled to form a sheet having a thickness of 12 mm, and hardness (JIS-A) was measured according to JIS K6253.

[Tension Test]

The tension test was performed on the vulcanized rubber sheets having a thickness of 2 mm resulted from Example E and Comparative Example E in accordance with JIS K 6251 under the condition of a measurement temperature of 23° C. and a pulling rate of 500 mm/min to measure the tensile strength at an elongation rate of 25% (25% modulus (M25)), the tensile strength at an elongation rate of 50% (50% modulus (M50)), the tensile strength at an elongation rate of 100% (100% modulus (M100)), the tensile strength at an elongation rate of 200% (200% modulus (M200)), the tensile strength at an elongation rate of 300% (300% modulus (M300)), the strength at break(TB), and the elongation at break (EB).

[Electrical Property Test]

The vulcanized rubber sheets having a thickness of 2 mm resulted from Example E and Comparative Example E were evaluated for the volume resistivity according to ASTM D 257.

<Low Temperature Torsion Test (Gehman Torsion Test)>

The low temperature torsion test was performed, according to JIS K 6261 (1993), on the vulcanized rubber sheets having a thickness of 2 mm resulted from Example E and Comparative Example E to measure $T_2$ (° C.), $T_5$ (° C.), and $T_{10}$ (° C.), using a Gehman torsion test machine. These temperatures are an indicator of flexibility at a low temperature of vulcanized rubber. For example, the lower the $T_2$ is, the better the flexibility at a low temperature is.

[Compression Set Test]

For the test piece for compression set (CS) test, the compression set after a 125° C., 70° C. or −25° C.×22 hour-treatment was measured according to JIS K 6262 (1997).

TABLE 13

| | | Comparative Example E1 | Comparative Example E2 | Comparative Example E3 | Comparative Example E4 | Comparative Example E5 | Comparative Example E6 | Example E1 | Example E2 | Example E3 | Example E4 |
|---|---|---|---|---|---|---|---|---|---|---|---|
| <Blend/phr> | | | | | | | | | | | |
| 3090EM | | 110 | 44 | 66 | | | | | | | |
| 3062EM | | | 72 | | | | | | | | |
| 3110M | | | | 40 | | | | | | | |
| EP27 | | | | | 100 | 50 | | | | | |
| EP96 | | | | | | 75 | | | | | |
| Es552 | | | | | | | 100 | | | | |
| EBDM-1 | | | | | | | | 100 | | | |
| EBDM-2 | | | | | | | | | 100 | | |
| EBDM-3 | | | | | | | | | | 100 | 100 |
| META-Z102 | | 5 | 5 | 5 | 5 | 5 | 5 | 5 | 5 | 5 | 5 |
| Stearic Acid | | 2 | 2 | 2 | 2 | 2 | 2 | 2 | 2 | 2 | 2 |
| PEG#4000 | | 1 | 1 | 1 | 1 | 1 | 1 | 1 | 1 | 1 | 1 |
| Struktol WB16 | | 2 | 2 | 2 | 2 | 2 | 2 | 2 | 2 | 2 | |
| Asahi #60G | | 90 | 90 | 90 | 90 | 90 | 90 | 90 | 90 | 90 | 100 |
| Dixie Clay | | 80 | 80 | 80 | 80 | 80 | 80 | 80 | 80 | 80 | 80 |
| PW-380 | | 48 | 42 | 52 | 58 | 33 | 58 | 58 | 58 | 58 | 58 |
| <Total> | | 338 | 338 | 338 | 338 | 338 | 338 | 338 | 338 | 338 | 348 |
| Sanceler BZ | | 1.8 | 1.8 | 1.8 | 1.8 | 1.8 | 1.8 | 1.8 | 1.8 | 1.8 | 1.8 |
| Sanceler TT | | 0.5 | 0.5 | 0.5 | 0.5 | 0.5 | 0.5 | 0.5 | 0.5 | 0.5 | 0.5 |
| Sanceler 22-C | | 0.5 | 0.5 | 0.5 | 0.5 | 0.5 | 0.5 | 0.5 | 0.5 | 0.5 | 0.5 |
| Sanfel R | | 1.5 | 1.5 | 1.5 | 1.5 | 1.5 | 1.5 | 1.5 | 1.5 | 1.5 | 1.5 |
| Sulfur S | | 0.5 | 0.5 | 0.5 | 0.5 | 0.5 | 0.5 | 0.5 | 0.5 | 0.5 | 0.5 |
| <Unvulcanized Rubber Property> Mooney Scorch | | | | | | | | | | | |
| Vm(125° C.) | | 56 | 59 | 61 | 51 | 59 | 55 | 48 | 45 | 53 | 59 |
| t5(125° C.) | min | 6.4 | 9.3 | 9.5 | 6.8 | 7.5 | 6.1 | 5.8 | 6.0 | 6.0 | 5.9 |
| t35(125° C.) | min | 10.3 | 5.2 | 5.1 | 11.2 | 3.7 | 9.7 | 8.7 | 9.4 | 8.9 | 8.8 |
| MDR (170° C. × 20 min) TC90 | min | 5.7 | 5.8 | 6.2 | 5.7 | 5.0 | 6.2 | 6.0 | 6.3 | 6.2 | 6.2 |
| S'Max-S'Min | dNm | 14.0 | 14.7 | 14.3 | 12.2 | 12.7 | 13.6 | 10.8 | 11.0 | 11.6 | 11.7 |
| S'Max | dNm | 15.8 | 16.4 | 16.1 | 14.2 | 14.6 | 15.6 | 12.4 | 12.5 | 13.5 | 13.8 |
| GS(23° C.) | MPa | 0.66 | 1.40 | 0.72 | 0.65 | 1.82 | 0.65 | 0.51 | 0.50 | 0.56 | 0.66 |
| TB | | | | | | | | | | | |
| EB | % | 280 | 424 | 154 | 180 | 245 | 270 | 560 | 460 | 450 | 310 |
| <Vulcanized Rubber Property> | | | | | | | | | | | |
| Hardness (Duro-A) | — | 69 | 72 | 11 | 69 | 71 | 70 | 64 | 64 | 66 | 68 |
| M25 | MPa | 1.10 | 1.18 | 1.14 | 1.08 | 1.18 | 1.13 | 0.86 | 0.87 | 0.90 | 1.05 |
| M50 | MPa | 1.61 | 1.69 | 1.70 | 1.65 | 1.78 | 1.70 | 1.35 | 1.33 | 1.40 | 1.66 |
| M100 | MPa | 2.60 | 2.63 | 2.76 | 2.88 | 2.97 | 2.80 | 2.26 | 2.19 | 2.33 | 2.83 |
| M200 | MPa | 5.30 | 5.26 | 5.44 | 6.34 | 6.00 | 5.82 | 4.49 | 4.38 | 4.66 | 5.68 |
| M300 | MPa | 7.66 | 7.44 | 7.51 | 9.80 | 8.64 | 8.44 | 6.34 | 6.24 | 6.56 | 7.80 |
| TB | MPa | 12.0 | 12.3 | 12.3 | 11.8 | 13.3 | 12.7 | 9.4 | 9.4 | 9.4 | 10.5 |
| ES | % | 497 | 519 | 520 | 375 | 459 | 447 | 482 | 515 | 480 | 442 |
| <Electrical Property> | | | | | | | | | | | |
| Volume Resistivity | Ω·cm | 7.4.E+05 | 4.2.E+06 | 4.7.E+05 | 4.8.E+05 | 7.8.E+06 | 2.0.E+06 | 3.3.E+05 | 2.3.E+05 | 3.3.E+05 | 2.8.E+05 |
| <Gehman Torsion Test> | | | | | | | | | | | |
| T2 | °C. | −26 | −15 | −23 | −27 | −19 | −27 | −37 | −35 | −38 | −34 |
| T5 | °C. | −40 | −33 | −38 | −42 | −37 | −41 | −48 | −49 | −50 | −49 |
| T10 | °C. | −45 | −41 | −44 | −47 | −44 | −46 | −52 | −53 | −55 | −53 |
| <Compression Set> | | | | | | | | | | | |
| 125° C. × 22 h | % | 36 | 35 | 36 | 41 | 38 | 42 | 33 | 36 | 31 | 35 |
| 70° C. × 22 h | % | 16 | 15 | 13 | 18 | 16 | 17 | 15 | 16 | 15 | 16 |
| −25° C. × 22 h | % | 64 | 87 | 70 | 64 | 79 | 73 | 37 | 38 | 38 | 37 |

From the results shown in Table 13, compared to Comparative Example E, the results of the Gehman torsion test at a low temperature ($T_2, T_5, T_{10}$) in Example E are small, and the compression set (−25° C.×22 h) is also small. Thus, Example E exhibits excellent cold resistance (low temperature properties) and a good balance between the cold resistance (low temperature properties) and mechanical properties at ambient temperature (elongation property, tensile strength, etc.). The above compositions derived from Example E which have the properties as described above can be used to produce a hose having an excellent balance between low temperature properties and mechanical properties.

The invention claimed is:

1. An ethylene.α-olefin.non-conjugated polyene copolymer comprising a structural unit derived from an ethylene [A], a structural unit derived from a $C_4$-$C_{20}$ α-olefin [B] and a structural unit derived from a non-conjugated polyene [C], and satisfying the following (1) to (4):
   (1) a molar ratio ([A]/[B]) of the structural units derived from the ethylene [A] to the structural units derived from the α-olefin [B] is 48.3/51.7 to 70.2/29.8;
   (2) a content of the structural units derived from the non-conjugated polyene [C] is 1.24 to 3.22 mol % based on the total of the structural units of [A], [B] and [C] as 100 mol %;
   (3) a Mooney viscosity ML(1+4)125° C. at 125° C. is 5 to 100; and
   (4) a B value represented by the following formula (i) is in the range of 1.28 to 1.29:

$$B \text{ value}=([EX]+2[Y])/[2\times[E]\times([X]+[Y])] \quad \text{(i)},$$

wherein [E], [X] and [Y] represent a mole fraction of the ethylene [A], the C4-C20 α-olefin [B] and the non-conjugated polyene [C] respectively, and [EX] represents an ethylene [A]-$C_4$-$C_{20}$ α-olefin [B] diad chain fraction, wherein the ethylene.α-olefin.non-conjugated polyene copolymer is obtained by copolymerizing an ethylene, a C4-C20 α-olefin and a non-conjugated polyene in the presence of an olefin polymerization catalyst containing:

(a) a transition metal compound represented by the following general formula [VII]:

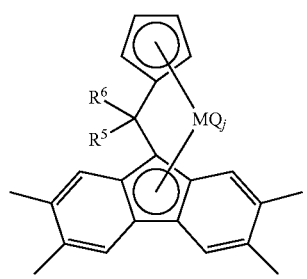

[VII]

wherein M is a titanium atom, a zirconium atom, or a hafnium atom;

$R^5$ and $R^6$ are substituted aryl groups wherein one or more of the hydrogen atoms of an aryl group are substituted with an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group optionally comprises a substituent selected from C1-C20 hydrocarbon groups, silicon-containing groups, nitrogen-containing groups, oxygen-containing groups, halogen atoms and halogen-containing groups other than the electron-donating substituents; and wherein when the substituted aryl group comprises a plurality of the substituents, each of the substituents may be the same or different;

Q is selected in an identical or different combination from halogen atoms, C1-C20 hydrocarbon groups, anionic ligands, and neutral ligands capable of being coordinated with a lone electron pair; and j is an integer of 1 to 4; and (b) at least one compound selected from
   (b-1) organometallic compounds,
   (b-2) organoaluminum oxy-compounds, and
   (b-3) components which react with the transition metal compound (a) to form an ion pair, wherein the C4-C20 α-olefin [B] is 1 butene, and
   wherein the non-conjugated polyene [C] is 5-ethylidene-2-norbornene.

2. A cross-linked ethylene.α-olefin.non-conjugated polyene copolymer, wherein the ethylene.α-olefin.non-conjugated polyene copolymer according to claim 1 is cross-linked using a cross-linking agent.

3. A molded article formed using the ethylene.α-olefin.non-conjugated polyene copolymer according to claim 1 or a cross-linked ethylene.α-olefin.non-conjugated polyene copolymer wherein the ethylene.α-olefin.non-conjugated polyene copolymer according to claim 1 is cross-linked using a cross-linking agent.

4. A composition comprising the ethylene.α-olefin.non-conjugated polyene copolymer according to claim 1.

5. A composition for a seal packing, wherein the composition comprises the ethylene.α-olefin.non-conjugated polyene copolymer according claim 1.

6. A seal packing formed using the composition for a seal packing according to claim 5.

7. The seal packing according to claim 6, wherein the seal packing is a seal component for automobiles, a seal component for machinery, a seal component for electronic and electrical components, a gasket for construction, or a seal component for civil engineering and building materials.

8. A composition for forming a hose, wherein the composition comprises the ethylene.α-olefin.non-conjugated polyene copolymer according to claim 1.

9. A hose having a layer formed by cross-linking treatment of the composition according to claim 8 for forming a hose.

10. The hose according to claim 9, wherein the hose is used for any of uses for automobiles, motorbikes, industrial machinery, construction machinery or agricultural machinery.

* * * * *